US008605658B2

(12) United States Patent
Fujimoto

(10) Patent No.: US 8,605,658 B2
(45) Date of Patent: Dec. 10, 2013

(54) MULTI-ANTENNA WIRELESS COMMUNICATION METHOD AND MULTI-ANTENNA WIRELESS COMMUNICATION DEVICE

(75) Inventor: Atsushi Fujimoto, Tokyo (JP)

(73) Assignee: Iwatsu Electric Co., Ltd., Tokyo (JP)

( * ) Notice: Subject to any disclaimer, the term of this patent is extended or adjusted under 35 U.S.C. 154(b) by 364 days.

(21) Appl. No.: 13/143,525

(22) PCT Filed: Dec. 28, 2009

(86) PCT No.: PCT/JP2009/007332
§ 371 (c)(1),
(2), (4) Date: Jul. 6, 2011

(87) PCT Pub. No.: WO2010/079582
PCT Pub. Date: Jul. 15, 2010

(65) Prior Publication Data
US 2011/0268037 A1 Nov. 3, 2011

(30) Foreign Application Priority Data

Jan. 7, 2009 (JP) ................................. 2009-001617
Dec. 25, 2009 (JP) ................................. 2009-295292

(51) Int. Cl.
*H04W 4/00* (2009.01)
(52) U.S. Cl.
USPC ............ 370/328; 375/267; 455/101; 455/137
(58) Field of Classification Search
USPC ........................................................ 375/267
See application file for complete search history.

(56) References Cited

U.S. PATENT DOCUMENTS

| 6,657,590 | B2 | 12/2003 | Yoshida |
| 7,120,199 | B2 * | 10/2006 | Thielecke et al. ............ 375/267 |
| 7,126,531 | B2 | 10/2006 | Nakaya et al. |
| 7,193,562 | B2 | 3/2007 | Shtrom et al. |
| 2004/0009755 | A1 | 1/2004 | Yoshida |
| 2005/0157807 | A1 * | 7/2005 | Shim et al. .................... 375/267 |

(Continued)

FOREIGN PATENT DOCUMENTS

| JP | 2002-368520 A | 12/2002 |
| JP | 2003-338781 A | 11/2003 |

(Continued)

OTHER PUBLICATIONS

International Search Report for PCT/JP2009/007332, mailing date of Apr. 13, 2010.
Japanese Office Action dated Jun. 15, 2010, corresponding to Japanese Patent Application No. 2009-295292.

(Continued)

*Primary Examiner* — Huy D Vu
*Assistant Examiner* — James P Duffy
(74) *Attorney, Agent, or Firm* — Westerman, Hattori, Daniels & Adrian, LLP

(57) ABSTRACT

The wireless communication devices A and B determine the optimal diversity combining weight information that optimizes a diversity reception state at each antenna group $A_1$, $A_2$, ..., $A_P$ through two-way training signal transfer between the wireless communication devices A and B. This optimal diversity combining weight information is set to each antenna of each antenna group $A_1, A_2, \ldots, A_P$. Wireless communication units A', B' perform spacial mapping of signals from antenna group $A_1, A_2, \ldots, A_P$ using MIMO technology. Communication area can be enlarged by hierarchization MIMO using the optimal diversity combining weight information.

20 Claims, 37 Drawing Sheets

(56) References Cited

U.S. PATENT DOCUMENTS

| | | | |
|---|---|---|---|
| 2005/0184906 | A1 | 8/2005 | Nakaya et al. |
| 2007/0191067 | A1* | 8/2007 | Nguyen et al. ............. 455/562.1 |
| 2007/0230328 | A1 | 10/2007 | Saitou |
| 2007/0281746 | A1 | 12/2007 | Takano et al. |
| 2009/0058724 | A1 | 3/2009 | Xia et al. |
| 2009/0175243 | A1* | 7/2009 | Han et al. ...................... 370/335 |

FOREIGN PATENT DOCUMENTS

| | | |
|---|---|---|
| JP | 2004-015179 A | 1/2004 |
| JP | 2005-509316 A2 | 4/2005 |
| JP | 2005-160030 A | 6/2005 |
| JP | 2005-244339 A | 9/2005 |
| JP | 2007-274048 A | 10/2007 |
| JP | 2008-92433 A | 4/2008 |
| JP | 2008-160532 A | 7/2008 |

OTHER PUBLICATIONS

"Part 16: Air Interface for Fixed and Mobile Broadband Wireless Access Systems, Amendment 2: Physical and Medium Access Control Layers for Combined Fixed and Mobile Operation in Licensed Bands and Corrigendum 1", IEEE Standard 802.16e, 2005 and IEEE Standard 802.16, 2004/Cor1-2005.

"Part 11: Wireless LAN Medium Access Control (MAC) and Physical Layer (PHY) specifications: Amendment 5: Enhancements for Higher Throughput", IEEE, 2008.

International Preliminary Report on Patentability dated Aug. 16, 2011 of PCT/JP2009/007332, with Forms PCT/IB/373 and PCT/ISA/237.

Notification Concerning Transmittal of International Preliminary Report on Patentability (Forms PCT/IB/326) of International Application No. PCT/JP2009/007332 mailed Jul. 21, 2011 with Forms PCT/IB/373 and PCT/ISA/237.

* cited by examiner

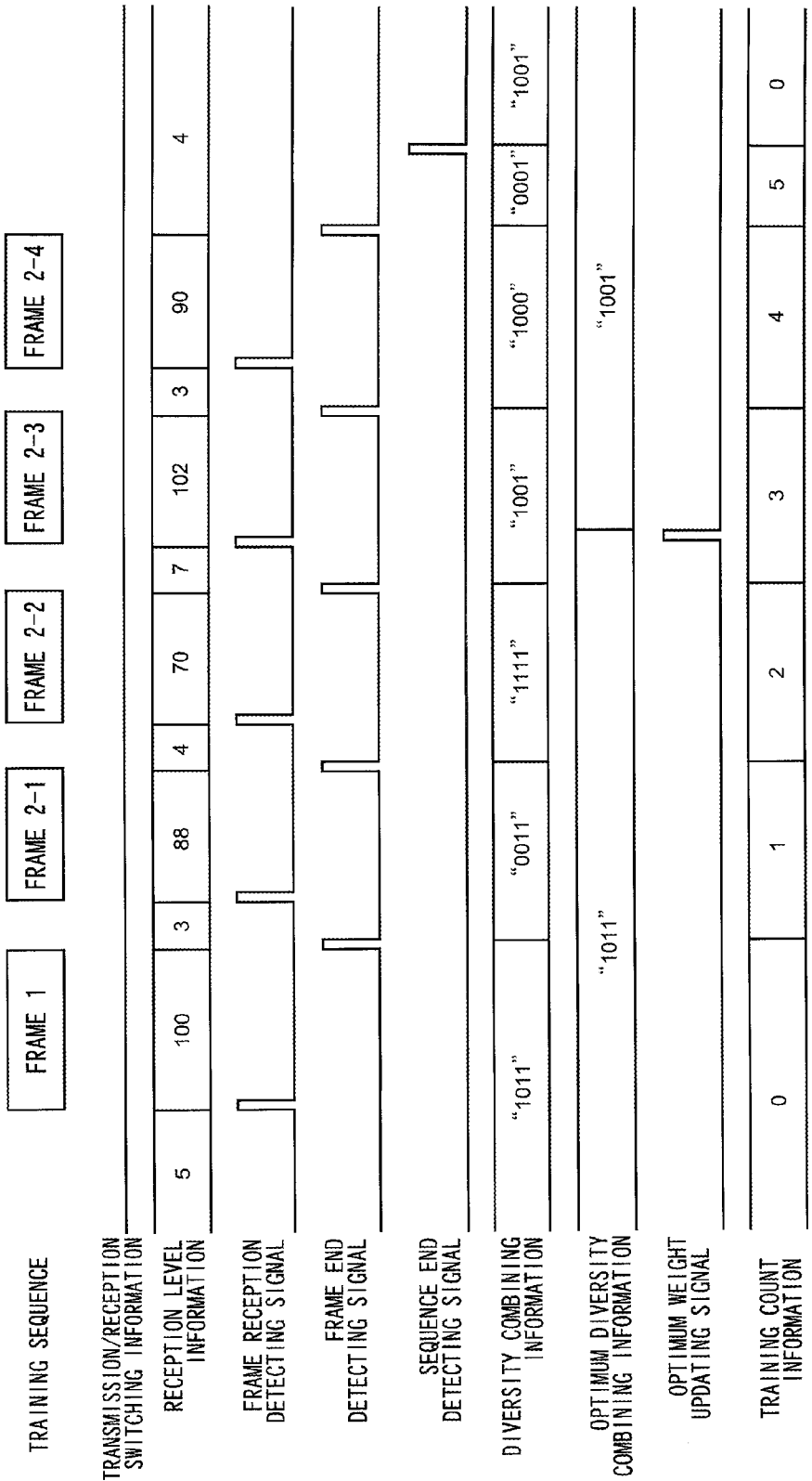

RECEPTION SIGNAkL VECTOR OF FRAkME 1
"1011"
(100)

RECEPTION SIGNAkL VECTOR
OF FRAkME 2-1
"0011"
(88)

RECEPTION SIGNAkL VECTOR
OF FRAkME 2-2
"1111"
(70)

RECEPTION SIGNAkL VECTOR
OF FRAkME 2-3
"1001"
(102)

RECEPTION SIGNAL VECTOR
OF FRAME 2-4
"1000"
(90)

— RECEPTION BASEBAND SIGNAL I
---- RECEPTION BASEBAND SIGNAL Q

— CORRELATION INFORMATION (REAL)
---- CORRELATION INFORMATION (IMAGINAL)

MULTI-ANTENNA WIRELESS COMMUNICATION METHOD AND MULTI-ANTENNA WIRELESS COMMUNICATION DEVICE

TECHNICAL FIELD

The present invention relates to a multi-antenna wireless communication method, a multi-antenna wireless communication system, and a multi-antenna wireless communication device, and more particularly, relates to a multi-antenna wireless communication method, a multi-antenna wireless communication system, and a multi-antenna wireless communication device, in which wireless communication is performed with MIMO (Multiple Input Multiple Output) or SIMO (Single Input Multiple Output) technology using a plurality of radios in transmitting side or in receiving side or both and in which an antenna group comprising multiple antennas is used at every transmitting/receiving circuit and each antenna group performs wireless communication with MIMO technology.

BACKGROUND ART

The thinness of the semiconductor process rule makes it possible that a plurality of radio circuits are implemented in one semiconductor chip. As a result, the adoption of MIMO technology has become more popular in broadband wireless communication systems for the purpose of enhancing the capacity of system or improving the reliability of communications. For example, although most of wireless LAN system which has become more popular in a home and in a office are in conformity with IEEE802.11a or IEEE802.11g which are based on OFDM (Orthogonal Frequency Division Multiplexing) technique, the new standard of IEEE802.11n which is a new standard by use of MIMO technology is pushed forward. And recently, release of the product based on the MIMO technology in conformity with the draft of IEEE802.11n begins. The draft of IEEE802.11n is described in non-patent literature 1.

Further, the MIMO technique has been introduced in many standards of next generation wireless system such as Next Generation PHS and mobile WiMAX. About these systems, it is described in non-patent literature 2.

And, in the mobile system, it is expected that an MIMO technology will be introduced after super 3G (the name of coming generation mobile system of NTT DoCoMo) or ultra 3G (the name of coming generation mobile system of KDDI) with which next generation broadband service will be provided. Thus, it is expected that the MIMO technology prevails rapidly as broadband wireless communications become popular. This is because high throughput and reliable wireless communication can be realized by the use of MIMO technology with which space-multiplexing and transmission or reception diversity can be implemented.

According to Shannon's theorem based on information theory, throughput is limited mainly by the bandwidth of the transmission channel. With MIMO technology, channel capacity can be largely increased in case of high S/N in comparison with SISO. FIG. 41 is a diagram which shows enhancement effect of the channel capacity by use of MIMO transmission. In the figure, a solid line, a broken line, the alternate long and short dash line show the Shannon's channel capacity in case of the number of receive and transmit antennas is 4*4, 2*2, and 1*1, respectively.

As for the enhancement of the channel capacity by the use of MIMO technology, it can be realized by multi-stream transmission which transmits a plurality of data series independently from each other on the same location, in same frequency at the same time.

In the method of performing a multi-stream transfer, there are two schemes. One is the method transmitting a plurality of data series using eigenbeams which are orthogonal to each other. And the other is the method transmitting a plurality of data series and estimating the data series using techniques such as the pseudo inverse matrices in a receiving side. Information sharing of the channel matrix between the transmitter and receiver is necessary in the former scheme.

Besides multi-stream transmission, transmitting/receiving diversity can be performed by use of MIMO technology.

In case of the information of channel matrix is known in transmitting side, transmission diversity can be performed using the information in a transmitting side. Further, in case of the information of channel matrix is unknown in transmitting side, transmission diversity can be performed by use of the space-time code, too. In the case that the number of antennas in the receiving side is greater than that of spatial streams, reception diversity of equal-gain combining or maximum ratio combining can be performed by use of baseband processing.

In most of the wireless system which MIMO technology has been introduced, the number of antennas of hand-held terminal is one in general because of power consumption and battery life. In the case of this, high-speed transmission by use of multi-stream transfer cannot be achieved. However, even in this case, the channel capacity of the transfer between base-station and hand-held terminal can be increased by improving the mean S/N of the transfer by applying transmission diversity and the reception diversity by use of space-time code.

FIG. 42 is a block diagram which shows the wireless communication system using the conventional MIMO technology. In this wireless communication system, two-way wireless communication is performed between wireless communication device A and wireless communication device B.

Wireless communication device A includes P antennas of A1, A2, . . . , AP, P transmitter-receiver circuit 13-1, 13-2, . . . , 13-P, spatial mapping unit 14, space time block code coding/decoding unit 15, K baseband (BB) modulating/demodulating unit 16-1, 16-2, . . . , 16-k and stream parser 17. Herein, k is the number of the spatial streams. Wireless communication device B includes Q antennas of B1, B2, . . . , BQ, Q transmitter-receiver circuit 23-1, 23-2, . . . , 23-Q, spatial mapping unit 24, space-time block code coding/decoding unit 25, K baseband (BB) modulating/demodulating unit 26-1, 26-2, . . . , 26-k and stream parser 27.

First, in the case that channel matrix is unknown in the transmitting side and multi-stream transmission is performed between the wireless communication devices, data series of transmitting is divided into the data series of the k (k is a natural number more than or equal to 2) in stream parser 17 in wireless communication device of the transmitting side, e.g., wireless communication device A. Each divided data series is modulated by baseband modulating/demodulating unit 16-1, 16-2, . . . , 16-k, and K baseband modulating signal are generated. The baseband modulating signal is output to space-time block codes coding/decoding unit 15. In this case, because the space-time block code is not used in this system, the input signal of space-time block codes coding/decoding unit 15 is just output to spatial mapping unit 14. And in spatial mapping unit 14, direct mapping is applied. And finally, each baseband-modulating signal is provided to each transmitting/receiving circuit 13-1, 13-2, . . . , 13-k, and each baseband-modulating signal is converted into RF frequency and transmitted through each antenna A1, A2, . . . , AK. Note that, the transmission diversity can be performed by selecting K antennas with which good communication quality is obtained of P antennas and by using them. For example, in IEEE802.11n, antenna selection sequence for this antenna selection is determined.

The signals transmitted from the wireless communication device A are received in each antenna B1, B2, . . . , BQ, and down-converted to baseband received signals by each transmitting/receiving circuit 23-1, 23-2, . . . , 23-Q in the wireless communication device of the receiving side, e.g., wireless communication device B. The baseband received signals are provided to the spatial mapping unit 24 in which an estimation of the baseband received signals corresponding to each data series is performed by use of techniques such as the pseudo inverse matrices in which the estimated information of the channel matrix is used, and the spatial mapping unit 24 outputs the baseband received signals to the space-time block codes coding/decoding unit 25. In this case, because the space-time code is not used in this system, space-time block codes coding/decoding unit 25 just outputs an input signal to baseband modulating/demodulating unit 26-1, 26-2, . . . , 26-k. Herein, k is the number of the spatial streams. Baseband received signal is demodulated by baseband demodulation unit 26-1, 26-2, . . . , 26-k which output the decoded data of each data series. The decoded data from baseband demodulating unit 26-1, 26-2, . . . , 26-k are provided to the stream parser 27 which outputs the synthesized received data.

The estimation of channel matrix is performed by use of received signal of preamble. An example is provided as follows. Orthogonal series of Hadamard codes S is transmitted in preamble sequence from each antenna A1, A2, . . . , AP of wireless communication device A in the transmitting side. For example, in the case that the number of antennas is four, (1,1,1,1), (1,−1,1,−1), (1,1,−1,−1), (1,−1,−1,1) is transmitted from each antenna A1, A2, A3, A4, respectively. In the case that the number of antennas in the receiving side is four, reception series BT in each antenna B1, B2, B3, B4 corresponding to the preamble sequence can be expressed in a 4 by 4 matrix, and the estimation of the channel matrix H can be obtained by H=T·S−1. If Hadamard matrix is used, the above-mentioned calculation can be implemented just making addition and subtraction of received signal of preamble sequence.

Next, in the case that channel matrix is known in the transmitting side and multi-stream transfer is performed using eigenbeams, the transmitting data series is divided into K (K is a natural number of more than or equal to 2) data series in the stream parser 17 in the wireless communication device A. Each divided data series is modulated by baseband modulating/demodulating unit 16-1, 16-2, . . . , 16-k which output baseband-modulating signals. The baseband modulating signals are provided to the space-time block codes coding/decoding unit 15. In this case, the input signal of the space-time block codes coding/decoding unit 15 is just output to the spatial mapping unit 14, because space-time block code is not used.

In the spatial mapping unit 14, the baseband modulating signals of each data series are multiplied by K eigenvectors which can be calculated from known channel matrix. For example, in the case that the number of spatial streams K is 2 and the number of antennas is 4, two eigenvectors V1 (v11, v12,v13,v14) and V2 (v21,v22,v23,v24) are calculated by use of the preamble, and corresponding to two baseband modulating signal m1, m2, v11·m1+v21·m2, v12·m1+v22·m2, v13·m1+v23·m2, v14·m1+v24·m2 are calculated for each antenna, respectively, and theses signals are transmitted from each of the antenna. The output signals of spatial mapping unit 14 are provided to each transmitting/receiving circuit 13-1, 13-2, . . . , 13-4, and are up-converted into RF frequency and transmitted through antennas A1, A2, . . . , A4, respectively.

The signals transmitted from the wireless communication device A are received in each radio antenna B1, B2, . . . , B4, and down-converted to baseband received signals by each transmitting/receiving circuit 23-1, 23-2, . . . , 23-4 in the wireless communication device B. In the spatial mapping unit 24, the baseband received signals of each data series are multiplied by K eigenvectors which can be obtained from the channel matrix. For example, in the case that the number of the spatial streams k is two and the number of antennas is four, two eigenvectors V1' (v11',v12',v13',v14') and V2' (v21',v22', v23',v24') can be obtained by the reception of preamble, and four baseband received signals r1,r2,r3,r4, v11'·r1+v12'·r2+ v13'·r3+v14'·r4 and v21'·r1+v22'·r2+v23'·r3+v24' are calculated and provided to the space-time block codes coding/ decoding unit 25. In this case, the space-time block codes coding/decoding unit 25 just outputs an input signal to the baseband modulating/demodulating unit 26-1, 26-2, . . . , 26-k, because space-time block code is not used.

The baseband received signal is demodulated by the baseband demodulation unit 26-1, 26-2, . . . , 26-k which output the decoded data of each data series. The decoded data from the baseband demodulation unit 26-1, 26-2, . . . , 26-k are provided to the Stream parser 27 which outputs the synthesized decoded data as the final received data.

Note that, there are two methods to obtain the channel matrix information in the transmitting side. One is a method estimating channel matrix using a preamble of the received signal from the opposite wireless communication device in the nearest past. And the other is a method receiving the feedback information on the channel matrix which is estimated at the opposite wireless communication device.

Next, in the case that the channel matrix is unknown in the transmitting side and a space-time code is used to perform transmit diversity, the transmitting data is divided into K data series (K is a natural number more than or equal to 1) in the stream parser 17 in the wireless communication device A. In case of k is one, transmitted data is just output to baseband modulating/demodulating unit 16-1. Each divided data series is modulated by the baseband modulating/demodulating unit 16-1, 16-2, . . . , 16-k which output the baseband modulating signals. The baseband modulating signal is provided to the space-time block codes coding/decoding unit 15.

In the space-time block codes coding/decoding unit 15, the block coding by use of space-time code is performed in every m symbols (m is a natural number more than or equal to 2). For example, for the hand-held terminal which uses 1-stream transfer, coding procedure of two antennas is performed for information data symbol. In this case, two information symbols (s0,s1) are transmitted in two-symbol period. In more detail, antenna 0 transmits signals (s0,−s1*) is transmitted from antenna 0, 1 antenna transmission symbol (s1,s0*), and the information of 2 symbols is transmitted during 2 symbol periods (coded rate 1). In this example, two series of space-time block code are provided by the space-time block codes coding/decoding unit 15. In spatial mapping unit 14, direct mapping is performed. In other words, the output signal of space-time block codes coding/decoding unit 15 is just output to transmitting/receiving circuit 13-1, 13-2, . . . , 13-L, and they are up-converted into RF frequency and transmitted through each antennas of A1, A2, . . . , AL. Herein, L is a natural numbers more than or equal to 2 which represents the number of series of the space-time block code.

The signals transmitted from the wireless communication device A are received in each antenna B1, B2, ..., BQ, and downconverted to baseband received signal by each transmitting/receiving circuit 23-1, 23-2, ..., 23-Q which are provided to the spatial mapping unit 24 in the wireless communication device B. In the spatial mapping unit 24, diversity combining is performed by use of Q input signals, and L synthesized baseband received signal can be obtained. In the case of Q=L, an input signal is just output to space-time block codes coding/decoding unit 25.

In the space-time block codes coding/decoding unit 25, the baseband received signal corresponding to each data series are calculated by use of the estimated channel matrix which are provided to the baseband modulating/demodulating unit 26-1, 26-2, ..., 26-k. For example, for the hand-held terminal which uses 1-stream transfer, the space-time block code is decoded by use of numerical expression (1) concerning information symbol (s0,s1), reception symbol (r0,r1) and estimated symbol (s0,s1). Herein, X* represents a complex conjugate of X.

[EQUATION 1]

$$\begin{pmatrix} s_0 \\ s_1 \end{pmatrix} = \begin{pmatrix} h_0^* & h_1 \\ h_1^* & -h_0 \end{pmatrix} \cdot \begin{pmatrix} r_0 \\ r_1^* \end{pmatrix} \quad (1)$$

Baseband received signal is demodulated by baseband demodulation unit 26-1, 26-2, ..., 26-k which output decoded data corresponding to each data series. The decoded data from baseband demodulation unit 26-1, 26-2, ..., 26-k are provided to the Stream parser 27 which outputs the synthesized received data.

In the broadband wireless communication system based on these conventional MIMO technology, a high-throughput is realized by use of multi-level modulation such as 64QAM and 256QAM or by use of spatial mapping of the MIMO technology, the area where high-throughput is achieved is limited to the area near base-station in which S/N (Signal to noise power ratio) is very high.

Although it is possible to enlarge the area in which high-throughput transfer can be performed by use of both diversity combining and spatial multiplexing of MIMO technology, the diversity gain which is available in the high-throughput area is 5 dB extent at most. In the diversity gain of this extent, the great enhancement of the area where high-throughput transfer can be performed cannot be expected.

As an example, in FIG. 43, the simulation result on the relationship between the throughput and the distance from base-station in IEEE802.11n system. It is assumed that transmission power PT is 23 dBm and mean received signal power decay with the distance using 3.5-power rule in FIG. 43.

Solid line indicates the simulation result in which MIMO technology of 2 (transmitting)*4 (receiving) is used and spatial multiplexing (SDM) of 2-streams is performed. In this case, thick line indicates the simulation result of using 64QAM. In this case, PHY transmission rate is 108 Mbps and MAC maximum throughput is 78 Mbps as is shown in this figure. Thin line indicates the simulation result of 256QAM. In this case, PHY transmission rate is 144 Mbps and MAC maximum throughput is 92 Mbps as is shown in this figure. From this figure, it can be found that both PHY transmission rate and MAC maximum throughput of 256 QAM is greater than that of 64QAM, but radius of service area of 256QAM is smaller than that of 64QAM. The area in which throughput takes the value of almost 100 Mbps is limited to the surrounding area near AP and the range of the high-throughput transmission is around 10 m or less.

Broken line indicates the simulation result in which MIMO technology of 3 (transmitting)*4 (receiving) is used and spatial multiplexing (SDM) of 3-streams is performed. In this case, thick line indicates the simulation result of using 64QAM. In this case, PHY transmission rate is 162 Mbps and MAC maximum throughput is 100 Mbps as is shown in this figure. Thin line indicates the simulation result of 256QAM. In this case, PHY transmission rate is 216 Mbps and MAC maximum throughput is 118 Mbps as is shown in this figure. In this case, it can be found from this figure, that both PHY transmission rate and MAC maximum throughput of 256 QAM is greater than that of 64QAM, but radius of service area of 256QAM is smaller than that of 64QAM.

Next, Dash-dot indicates the simulation result in which MIMO technology of 4 (transmitting)*4 (receiving) is used and spatial multiplexing (SDM) of 2-streams is performed. In this case, thick line indicates the simulation result of using 64QAM. And thin line indicates the simulation result of using 256QAM. In these cases, the radius of service area is a little greater than that of the case in which spatial multiplexing is not used. However, the amount of this improvement is small and the area in which throughput takes the value of almost 100 Mbps is limited to the surrounding area near AP and the range of the high-throughput transmission is around 10 m or less in this case after all. A space-time code is a kind of the transmission diversity, and both PHY transmission rate and MAC maximum throughput are the same as that of the case using spatial multiplexing of 2-stream without STBC.

Dash-dot-dot indicates the simulation result in which MIMO technology of 4 (transmitting)*4 (receiving) is used and spatial multiplexing (SDM) of 3-streams and transmit antenna selecting diversity is performed. In this case, thick line indicates the simulation result of using 64QAM. And thin line indicates the simulation result of using 256QAM. In these cases, the radius of service area is a little greater than that of the case in which spatial multiplexing of 3-streams is performed but transmit antenna-selecting diversity is not performed. However, the amount of this improvement is still small and the area in which throughput takes the value of almost 100 Mbps is limited to the surrounding area near AP and the range of the high-throughput transmission is around 10 m or less in this case after all. The selection of transmit antenna is a kind of the transmission diversity, and PHY transmission rate and MAC maximum throughput are the same as that of the case using spatial multiplexing of 3-stream without TS.

The radius of service area of the wireless LAN system of IEEE802.11n is said to be around 100 m, however, the area where high-throughput transmission around 100 Mbps is achieved is limited to PAN (Personal Area Network) area in which the distance from AP is around 10 m or less.

There are several techniques which extend the service area of wireless LAN. For example, Xirrus Inc. (U.S.A.) has already developed the technology which extend the area of wireless LAN and base-stations based on this technique is already manufactured.

FIG. 44 is a block diagram showing the basic structure of the wireless base-station by use of the technique developed by of Xirrus. This wireless base-station includes 16 access points (AP), and each access point includes a directional antenna, respectively. The direction of the directional antennas of each access points differs from each other and directivity for all azimuths is provided with 16 directional antennas. Different channel of the radio frequency is assigned to each access point from each other. The wireless controller of Xirrus controls 16 access points and the directional antennas. In the case of the access point provided by Xirrus, the antenna gain of about 12 dB can be obtained in comparison with the case that an omni-antenna is used.

Other example of the technique which extends the service area of wireless LAN is provided by Ruckus Wireless Inc. (U.S.A.) and wireless base-station based on this technique is already manufactured. This technique is described in patent document 1.

FIG. 45 is a block diagram showing the structure of wireless base-station based on the technique of Ruckus Wireless Inc. The technology of Ruckus Wireless is the same as that of Xirrus in the point that antenna gain of 16 directional antennas is used to extend service area. However, the combination of active directional antenna is changed by use of high-frequency switch adaptively in the technology of Ruckus Wireless while a plurality of AP including a directional antenna is used in the technology of Xirrus. With this structure, there should be only one access point in a wireless base-station, therefore cost and power consumption power may be reduced.

With theses technology using directional antennas such as Xirrus or Ruckus Wireless in the AP, antenna gain of 12 dB can be obtained in transmission/reception of the AP at most, and as a result, the radius of the area where high-throughput transmission around 100 Mbps can be performed will be extended to around 2 times. However, a radius of the extended service area is only around 20 m, and the service area is still almost PAN rather than LAN.

Further, beam forming of MIMO technology can be used to extend communications area. This is the technique which forms an optimum beam based on channel matrix information both in transmitting side and in receiving side by setting diversity combining information to the signal of each antenna, and which extend the communications area. There are two kinds of beam forming techniques. One is a technique using eigenvectors. The other is a technique estimating the arrival direction of the received signals. Though the former can extend communications area greatly by suppressing multi-path fading, it is needed to feed back the information of channel matrix within a time much smaller than fading period. On the other hand, latter can form a beam based on the estimated arrival direction of received signals. The estimated value of arrival direction does not change rapidly, so fast feedback will not be required. However, the gain in transmitting/receiving signals is 12 dB extent at most, therefore great extension of the communication area will not be obtained.

As mentioned above, the beam forming technique is mandatory to achieve large amount of extension of the communications area. In other words, eigenbeam transmission is needed to expand communications area greatly. To obtain the diversity combining information corresponding to the signal of each antenna, a calculation of correlation matrix of the channel matrix should be done first in the conventional technique. And a calculation of eigenvector corresponding to the maximum eigenvalue of the correlation matrix is done next. And finally, the calculated eigenvectors are set as optimum diversity combining information for each antenna.

Here, the amount of arithmetic processing of the calculation of correlation matrix is proportional to the square of the number of the antennas, and the amount of arithmetic processing of the calculation of the eigenvector is proportional to the cube of the number of the antennas. As the number of antennas increase, the amount of arithmetic processing to find optimum diversity combining information increases rapidly. Therefore, there is the upper limit on the number of antennas.

In the case that maximum fading frequency is 50 Hz (corresponding to the velocity of 10 km/hour under the condition that carrier frequency is 5 GHz), the wireless communication device should transfer the information of channel matrix within several milliseconds in order to reduce estimation error of the channel matrix. Therefore the calculation of eigenvectors should have been completed in several milliseconds. In the case that the number of antennas is more than or equal to 5, the eigenvectors cannot be obtained arithmetically. In this case, the eigenvectors can be obtained by use of repetitive operation, and therefore the processing time for the calculation becomes critical.

Also, though huge transmission gain can be obtained by using an eigenbeam transfer of MIMO technology, transmission of the information of channel matrix is needed in order to share the information of channel matrix between the transmitter and the receiver of the transmission. As the number of the antennas increase, the amount of information of the channel matrix increases. In fast fading environment, a frequent transfer of the information of channel matrix is necessary, and this will cause deterioration of channel capacity of the system.

Considering the conditions as described above, the upper bound of the number of the antenna is around four. Practically, in many standard of wireless communication systems which use the most advanced MIMO technology such as IEEE802.11n and IEEE802.16, the maximum number of antennas is defined as four.

Further, in the conventional MIMO technology, diversity combining is performed by a baseband processing, and therefore the input signal of each transmitting/receiving circuit is a received signal which is not subjected to diversity combining. Here, there is no diversity gain or MIMO gain on the input signal of each transmitting/receiving circuit. As described above, the detection of received signal should be done in the transmitting/receiving circuit without the use of transmit beam forming in the state of initial acquisition of eigenbeam. Therefore, in the conventional MIMO technology, the communications area is limited to the area where eigenbeam can be formed without initial acquisition.

In order to realize the true broadband wireless LAN system with which high-throughput transfer of around 100 Mbps can be performed at any point in the service area, the performance of conventional MIMO technology which uses the combination of beam forming and spatial multiplexing is not enough. And there is no technology which provides enough performance of that.

CITATION LIST

Patent Literature

[Patent Literature 1] Circuit board having a peripheral antenna apparatus with selectable antenna elements (U.S. Pat. No. 7,193,562)

Non Patent Literature

[Non Patent Literature 1] IEEE802.11n Draft 5.0
[Non Patent Literature 2] IEEE802.16e-2005

SUMMARY OF INVENTION

Technical Problem

Recently, the broadband wireless communication systems of high-throughput around 100 Mbps by use of MIMO technology has been put to practical use. However, though high-throughput transmission can be performed in neighborhood area of the base-station, the throughput is deteriorated in the execrable area apart from the base-station in such a conventional broadband wireless communication systems in which adaptive modulation scheme is used.

In other words, in conventional broadband wireless communication systems, the area where broadband network service is provided is narrow like a spot, and the broadband network service cannot be obtained in the execrable area apart from base-station. Therefore, there exists a problem that it is almost impossible to provide broadband wireless environment throughout the whole service area.

It is an object of the present invention to solve the above-mentioned problems and provide a wireless communication method, a wireless communication system and a wireless communication device each of which has a simple structure that enables the construction of a broadband wireless communication system that has a service area equivalent to that of the current wireless systems.

Solution to Problem

To achieve the object, the multi-antenna wireless communication method according to the present invention has the first feature in that wireless communication is performed with MIMO (Multiple Input Multiple Output) or SIMO (Single Input Multiple Output) technology using a plurality of radios in transmitting side or in receiving side or both and in which an antenna group comprising multiple antennas is used at every transmitting/receiving circuit and each antenna group performs wireless communication with MIMO technology, the multi-antenna wireless communication method comprising: a first step of determining diversity combining information with respect to each signal of the antennas of each antenna group that optimizes a diversity reception state at each antenna group as a value optimum in each wireless communication device through two-way training signal transfer between the wireless communication devices that perform transmission and reception; a second step of setting the value optimum of each diversity combining information with respect to each signal of the antennas of each antenna group determined by the first step for each wireless communication device; and a third step of enabling each wireless communication device to perform beam forming and diversity combining for a time of data transmission/reception at each antenna group in a state in which the value optimum of each diversity combining information has been set by the second step; wherein, in the first step, in each diversity reception in one or a plurality of times two-way training signal transfer, diversity combining information that optimizes a diversity reception state at each antenna group is obtained based on training reception information showing a receiving state of a diversity-combining received signal at each antenna group, thereafter diversity combining information is updated by the resulting diversity combining information after diversity reception, thereafter the diversity combining information updated thereby is set, and a training signal is transmitted, thereby determining a set of vectors asymptotically approaching to a set of eigenvectors with respect to a maximum eigenvalue of a correlation matrix of a channel matrix in a transfer between antenna groups of a couple of wireless communication devices that perform transmission and reception as the value optimum of diversity combining information between antenna groups of the couple of wireless communication devices.

Further, the multi-antenna wireless communication method according to the present invention has the second feature in that wireless communication is performed with MIMO (Multiple Input Multiple Output) or SIMO (Single Input Multiple Output) technology using a plurality of radios in transmitting side or in receiving side or both and in which an antenna group comprising multiple antennas is used at every transmitting/receiving circuit and each antenna group performs wireless communication with MIMO technology, the multi-antenna wireless communication method comprising: a first step of determining diversity combining information with respect to each signal of the antennas of each antenna group that optimizes a diversity reception state at each antenna group as a value optimum in each wireless communication device through one or a plurality of times two-way training signal transfer between the wireless communication devices that perform transmission and reception; a second step of setting the value optimum of each diversity combining information with respect to each signal of the antennas of each antenna group determined by the first step for each wireless communication device; and a third step of enabling each wireless communication device to perform beam forming and diversity combining for a time of data transmission/reception at each antenna group in a state in which the value optimum of each diversity combining information has been set by the second step; wherein the training signal is composed of a plurality of training sub-signals, and, in the first step, in diversity reception of the training sub-signals, one piece of diversity combining information with respect to each signal of the antennas of the antenna group of the wireless communication devices is sequentially changed, thereafter diversity combining information with respect to each signal of the antennas of the antenna group is updated by diversity combining information having a more excellent receiving state of a diversity-combining received signal before and after a sequential changing operation of the diversity combining information, thereafter the diversity combining information updated thereby is set, and a training signal is transmitted, thereby determining a set of vectors asymptotically approaching to a set of eigenvectors with respect to a maximum eigenvalue of a correlation matrix of a channel matrix in a transfer between antenna groups of a couple of wireless communication devices that perform transmission and reception as the value optimum of diversity combining information between antenna groups of the couple of wireless communication devices.

Further, the multi-antenna wireless communication method according to the present invention has the third feature in that wireless communication is performed with MIMO (Multiple Input Multiple Output) or SIMO (Single Input Multiple Output) technology using a plurality of radios in transmitting side or in receiving side or both and in which an antenna group comprising multiple antennas is used at every transmitting/receiving circuit and each antenna group performs wireless communication with MIMO technology, the multi-antenna wireless communication method comprising: a first step of determining diversity combining information with respect to each signal of the antennas of each antenna group that optimizes a diversity reception state at each antenna group as a value optimum in each wireless communication device through one or a plurality of times two-way training signal transfer between the wireless communication devices that perform transmission and reception; a second step of setting the value optimum of each diversity combining information with respect to each signal of the antennas of each antenna group determined by the first step for each wireless communication device; and a third step of enabling each wireless communication device to perform beam forming and diversity combining for a time of data transmission/reception at each antenna group in a state in which the value optimum of each diversity combining information has been set by the second step; wherein the training signal is composed of a plurality of training sub-signals, and, in the first step, in diversity reception of the plurality of training sub-signals, diversity combining information with respect to each signal of the antennas of the antenna group of the wireless communication devices is sequentially changed, thereafter diversity combining information that optimizes a receiving state of a diversity-combining received signal at each antenna group is determined based on training reception information showing a receiving state corresponding to each of the diversity combining information, thereafter diversity combining information with respect to each signal of the antennas of each antenna group is updated by the resulting diversity combining information after diversity reception, thereafter the diversity combining information updated thereby is set, and a training signal is transmitted, thereby determining a set of vectors asymptotically approaching to a set of eigenvectors with respect to a maximum eigenvalue of a correlation matrix of a channel matrix in a transfer between antenna groups of a couple of wireless communication devices that perform transmission and reception as the value optimum of diversity combining information between antenna groups of the couple of wireless communication devices.

Further, the multi-antenna wireless communication method according to the present invention has the fourth feature in that wireless communication is performed with MIMO (Multiple Input Multiple Output) or SIMO (Single Input Multiple Output) technology using a plurality of radios in transmitting side or in receiving side or both and in which an antenna group comprising multiple antennas is used at every transmitting/receiving circuit and each antenna group performs wireless communication with MIMO technology, the multi-antenna wireless communication method comprising: a first step of determining diversity combining information with respect to each signal of the antennas of each antenna group that optimizes a diversity reception state at each antenna group as a value optimum in each wireless communication device through one or a plurality of times two-way training signal transfer between the wireless communication devices that perform transmission and reception; a second step of setting the value optimum of each diversity combining information with respect to each signal of the antennas of each antenna group determined by the first step for each wireless communication device; and a third step of enabling each wireless communication device to perform beam forming and diversity combining for a time of data transmission/reception at each antenna group in a state in which the value optimum of each diversity combining information has been set by the second step; wherein the training signal is composed of a plurality of training sub-signals, and, in the first step, in diversity reception of the plurality of training sub-signals, diversity combining information with respect to each signal of the antennas of the antenna group of the wireless communication devices is sequentially changed, thereafter diversity combining complex weight information that optimizes a receiving state of a diversity-combining received signal at each antenna group is determined based on training reception information showing a receiving state corresponding to each of the diversity combining information, thereafter diversity combining information with respect to each signal of the antennas of each antenna group is updated by the resulting diversity combining complex weight information after diversity reception, thereafter the diversity combining information updated thereby is set, and a training signal is transmitted, thereby determining a set of vectors asymptotically approaching to a set of eigenvectors with respect to a maximum eigenvalue of a correlation matrix of a channel matrix in a transfer between antenna groups of a couple of wireless communication devices that perform transmission and reception as the value optimum of diversity combining information between antenna groups of the couple of wireless communication devices.

Further, the multi-antenna wireless communication device used to perform the multi-antenna wireless communication method according to the above-mentioned first feature, the multi-antenna wireless communication device comprising: a diversity combining information generating unit for generating diversity combining information with respect to each signal of the antennas of each antenna group; a diversity combining information setting unit that controls an amplitude and a phase of each signal of the antennas of each antenna group based on the diversity combining information generated by the diversity combining information generating unit; and a signal distributing/synthesizing unit that performs beam forming transmission and diversity reception at each antenna group in combination with the diversity combining information setting unit; wherein the diversity combining information generating unit comprises: a for-initial-acquisition diversity combining information generating unit for generating diversity combining information for initial acquisition with respect to each signal of the antenna of each antenna group and enabling drawing from an initial state to a value optimum of diversity combining information; a for-training diversity combining information generating unit for sequentially changing and generating diversity combining information with respect to each signal of the antennas of each antenna group during diversity reception in two-way training signal transfer between an opposite wireless communication device disposed on an opposite side of a communication link and a wireless communication device corresponding to this opposite wireless communication device; and a diversity combining information value optimum generating unit for determining diversity combining information that optimizes a receiving state of a diversity-combining received signal based on training reception information showing a receiving state of a training signal received in a diversity reception manner in a state in which each of diversity combining information generated by the training diversity combining information generating unit has been set and for generating a value optimum of diversity combining information used for beam forming and diversity combining for a time of data transmission/reception; wherein, in each diversity reception in one or a plurality of times two-way training signal transfer, diversity combining information that optimizes a diversity reception state is obtained based on training reception information showing a receiving state of a training signal received in a diversity reception manner in a state in which each diversity combining information generated by the diversity combining information generating unit has been set, thereafter diversity combining information is updated by the diversity combining information after diversity reception, thereafter the diversity combining information updated thereby is set, and a training signal is transmitted, thereby determining a set of vectors asymptotically approaching to a set of eigenvectors with respect to a maximum eigenvalue of a correlation matrix of a channel matrix in a transfer between antenna groups of a couple of wireless communication devices that perform transmission and reception as the value optimum of diversity combining information between antenna groups of the couple of wireless communication devices.

Further, the multi-antenna wireless communication device used to perform the multi-antenna wireless communication method according to the above-mentioned second feature, the multi-antenna wireless communication device comprising: a diversity combining information generating unit for generating diversity combining information with respect to each signal of the antennas of each antenna group; a diversity combining information setting unit that controls an amplitude and a phase of each signal of the antennas of each antenna group based on the diversity combining information generated by the diversity combining information generating unit; and a signal distributing/synthesizing unit that performs beam forming transmission and diversity reception at each antenna group in combination with the diversity combining information setting unit; wherein the diversity combining information generating unit comprises: a for-initial-acquisition diversity combining information generating unit for generating diversity combining information for initial acquisition with respect to each signal of the antenna of each antenna group and enabling drawing from an initial state to a value optimum of diversity combining information; a for-training diversity combining information generating unit for sequentially changing and generating diversity combining information with respect to each signal of the antennas of each antenna group during diversity reception in one or a plurality of times two-way training signal transfer between an opposite wireless communication device disposed on an opposite side of a communication link and a wireless communication device corresponding to this opposite wireless communication device; a reception-state determining unit that determines a diversity reception state in each setting based on training reception information showing a receiving state of a training signal received in a diversity reception manner in a state in which each piece of diversity combining information generated by the diversity combining information generating unit has been set; and a diversity combining information value optimum generating unit for determining diversity combining information that optimizes a diversity reception state determined by the reception-state determining unit as a value optimum of the diversity combining information and for generating a value optimum of diversity combining information used for beam forming and diversity combining at a time of data transmission/reception; wherein the training signal is composed of a plurality of training sub-signals, and, in diversity reception of the training sub-signals, one piece of diversity combining information with respect to each signal of the antennas of each antenna group of the wireless communication devices is sequentially changed, and thereafter diversity combining information with respect to each signal of the antennas of each antenna group is updated by diversity combining information having a more excellent receiving state of a diversity-combining received signal before and after a sequential changing operation of the diversity combining information, thereafter the diversity combining information updated thereby is set, and a training signal is transmitted, thereby determining a set of vectors asymptotically approaching to a set of eigenvectors with respect to a maximum eigenvalue of a correlation matrix of a channel matrix in a transfer between antenna groups of a couple of wireless communication devices that perform transmission and reception as the value optimum of diversity combining information between antenna groups of the couple of wireless communication devices.

Further, the multi-antenna wireless communication device used to perform the multi-antenna wireless communication method according to the above-mentioned third feature, the multi-antenna wireless communication device comprising: a diversity combining information generating unit for generating diversity combining information with respect to each signal of the antennas of each antenna group; a diversity combining information setting unit that controls an amplitude and a phase of each signal of the antennas of each antenna group based on the diversity combining information generated by the diversity combining information generating unit; and a signal distributing/synthesizing unit that performs beam forming transmission and diversity reception at each antenna group in combination with the diversity combining information setting unit; wherein the diversity combining information generating unit comprises: a for-initial-acquisition diversity combining information generating unit for generating diversity combining information for initial acquisition with respect to each signal of the antenna of each antenna group and enabling drawing from an initial state to a value optimum of diversity combining information; a for-training diversity combining information generating unit for sequentially changing and generating diversity combining information with respect to each signal of the antennas of each antenna group during diversity reception in one or a plurality of times two-way training signal transfer between an opposite wireless communication device disposed on an opposite side of a communication link and a wireless communication device corresponding to this opposite wireless communication device; a training receiving state holding unit that holds training reception information showing a receiving state of a training signal received in a diversity reception manner in a state in which diversity combining information generated by the diversity combining information generating unit has been set; and a diversity combining information value optimum generating unit for determining diversity combining information that optimizes a diversity reception state based on the training reception information held by the training receiving state holding unit as a value optimum of the diversity combining information and for generating a value optimum of diversity combining information used for beam forming and diversity combining at a time of data transmission/reception; wherein the training signal is composed of a plurality of training sub-signals, and, in diversity reception of the training sub-signals, diversity combining information with respect to each signal of the antennas of each antenna group of the wireless communication devices is sequentially changed, thereafter training reception information corresponding to each piece of diversity combining information is stored in the training reception information holding unit, thereafter diversity combining information that optimizes a receiving state of a diversity-combining received signal is determined based on information held in the training reception information holding unit, thereafter diversity combining information is updated by the diversity combining information, thereafter the diversity combining information updated thereby is set, and a training signal is transmitted, thereby determining a set of vectors asymptotically approaching to a set of eigenvectors with respect to a maximum eigenvalue of a correlation matrix of a channel matrix in a transfer between antenna groups of a couple of wireless communication devices that perform transmission and reception as the value optimum of diversity combining information between antenna groups of the couple of wireless communication devices.

Further, the multi-antenna wireless communication device used to perform the multi-antenna wireless communication method according to the above-mentioned fourth feature, the multi-antenna wireless communication device comprising: a diversity combining information generating unit for generating diversity combining information with respect to each signal of the antennas of each antenna group; a diversity combining information setting unit that controls an amplitude and a phase of each signal of the antennas of each antenna group based on the diversity combining information generated by the diversity combining information generating unit; and a signal distributing/synthesizing unit that performs beam forming transmission and diversity reception at each antenna group in combination with the diversity combining information setting unit; wherein the diversity combining information generating unit comprises: a for-initial-acquisition diversity combining information generating unit for generating diversity combining information for initial acquisition with respect to each signal of the antenna of each antenna group and enabling drawing from an initial state to a value optimum of diversity combining information; a for-training diversity combining information generating unit for sequentially changing and generating diversity combining information with respect to each signal of the antennas of each antenna group during diversity reception in one or a plurality of times two-way training signal transfer between an opposite wireless communication device disposed on an opposite side of a communication link and a wireless communication device corresponding to this opposite wireless communication device; a training reception information holding unit for holding training reception information showing a receiving state of a training signal received in a diversity reception manner in a state in which each piece of diversity combining information generated by the diversity combining information generating unit has been set; and a diversity combining information value optimum generating unit for determining diversity combining complex weight information that optimizes a receiving state of a diversity-combining received signal at each antenna group based on training reception information held by the training reception information holding unit as a value optimum of diversity combining information and for generating a value optimum of diversity combining information used for beam forming and diversity combining at each antenna group for a time of data transmission/reception; wherein the training signal is composed of a plurality of training sub-signals, in each diversity reception in a plurality of times two-way training signal transfer, diversity combining information with respect to each signal of the antennas of each antenna group of the wireless communication devices are sequentially changed, thereafter training reception information corresponding to each diversity combining information is stored in the training reception information holding unit, thereafter diversity combining complex weight information that optimizes a receiving state of a diversity-combining received signal is determined based on information held by the training reception information holding unit, thereafter diversity combining information is updated by diversity combining complex weight information after each diversity reception, thereafter the diversity combining information updated thereby is set, and a training signal is transmitted, thereby determining a set of vectors asymptotically approaching to a set of eigenvectors with respect to a maximum eigenvalue of a correlation matrix of a channel matrix in a transfer between antenna groups of a couple of wireless communication devices that perform transmission and reception as the value optimum of diversity combining information between antenna groups of the couple of wireless communication devices.

Advantageous Effects of Invention

In the present invention, along with the spatial multiplexing, diversity or beam forming of conventional MIMO technology, further beam forming technique using multi-antenna group is put together with these independently, and therefore a spot area where high throughput transmission of 100 Mbps or more using spatial multiplexing can be enlarged to a plane area. The communications area of VoIP system with conventional MIMO technology like diversity is much smaller than that of narrow-band wireless system such as conventional PHS system. On the other hand, the communication area equivalent to narrow-band wireless system such as conventional PHS system can be realized by the use of combination of conventional diversity and the beam forming according to the present invention.

In the present invention, the value optimum of diversity combining information in each wireless communication device is determined through two-way training signal transfer between wireless communication devices that perform transmission and reception, and therefore the value optimum of diversity combining information can be easily calculated, and a large MIMO gain can be obtained by performing data transfer by use of this value optimum of diversity combining information even when the number of antennas of the wireless communication device is large. The performance that is equivalent to that of present invention can be realized by conventional MIMO which uses channel matrix of large order, but from the point of cost, power consumption and the amount of arithmetic processing, the implementation of larger scale MIMO is not practical because enormous circuits including radios and baseband circuit is needed.

Further, the communications area in the conventional MIMO technique can be improved drastically without increasing transmit and receive circuit number if diversity combining in each antenna group is performed in a radio frequency band or without increasing cost and power consumption too much because conventional MIMO technique is just used, and individual antenna is substituted for each antenna group, and inherent beam transmission to the maximum eigenvalue can be implemented every antenna group.

Though in conventional broadband wireless system in which maximum throughput is greater than 100 Mbps, the area where high-throughput transmission of around 100 Mbps can be performed is almost like a spot, it becomes possible to cover whole service area with the area where high-throughput transfer around 100 Mbps can be performed according to the present invention.

Also, it is mandatory to share information about the channel matrix in the eigenbeam transmission of the conventional MIMO technology both in a transmitting side and in a receiving side, and applying this technology in fast fading environment is very difficult. However, according to the present invention, sharing the channel matrix between a transmitter and a receiver is unnecessary and it becomes possible to apply the eigenbeam transfer to the fast fading environment.

FIG. 46 shows a comparison of the reception level distributions at an initial acquisition stage between the conventional MIMO technology and the present invention. Here, it is assumed that wireless transmission line is Rayleigh fading environment, and the number of transmitting/receiving antennas of each wireless communication device is four. Additionally, the reception level distribution of SISO and MIMO with optimum weight is shown for the reference. Referring to FIG. 46, it is found that the improvement of the reception level in the initial acquisition state of the conventional MIMO technology compared with that of SISO is about 16 dB, which is deteriorated 11 dB compared with MIMO transmission gain with the optimum weight. This is because eigenbeam transfer cannot be performed in the initial acquisition state, and in this case, the improvement of the reception level can be obtained by use of transmission gain of 4-branch selection diversity.

On the other hand, in the case that the diversity combining is performed in radio frequency band in the initial acquisition state of the present invention, almost the same transmission gain can be obtained as MIMO transmission gain with optimal weight. Degradation of MIMO transmission gain compared with that of optimum weight is due to the fact that diversity combining is performed by use of phase shifter, not using the complex weight of eigenvectors of the correlation matrix. Thus, though with the conventional MIMO technology, it is difficult to extend communication area by use of full MIMO transmission gain, in the case that diversity combining is performed in radio frequency band with the present invention, communications area can be enlarged by use of full MIMO transmission gain.

BRIEF DESCRIPTION OF DRAWINGS

FIG. 8 is a timing chart showing an example of the operation of the beam forming state weight-generating unit of FIG. 7.

DESCRIPTION OF EMBODIMENTS

Figure 1:
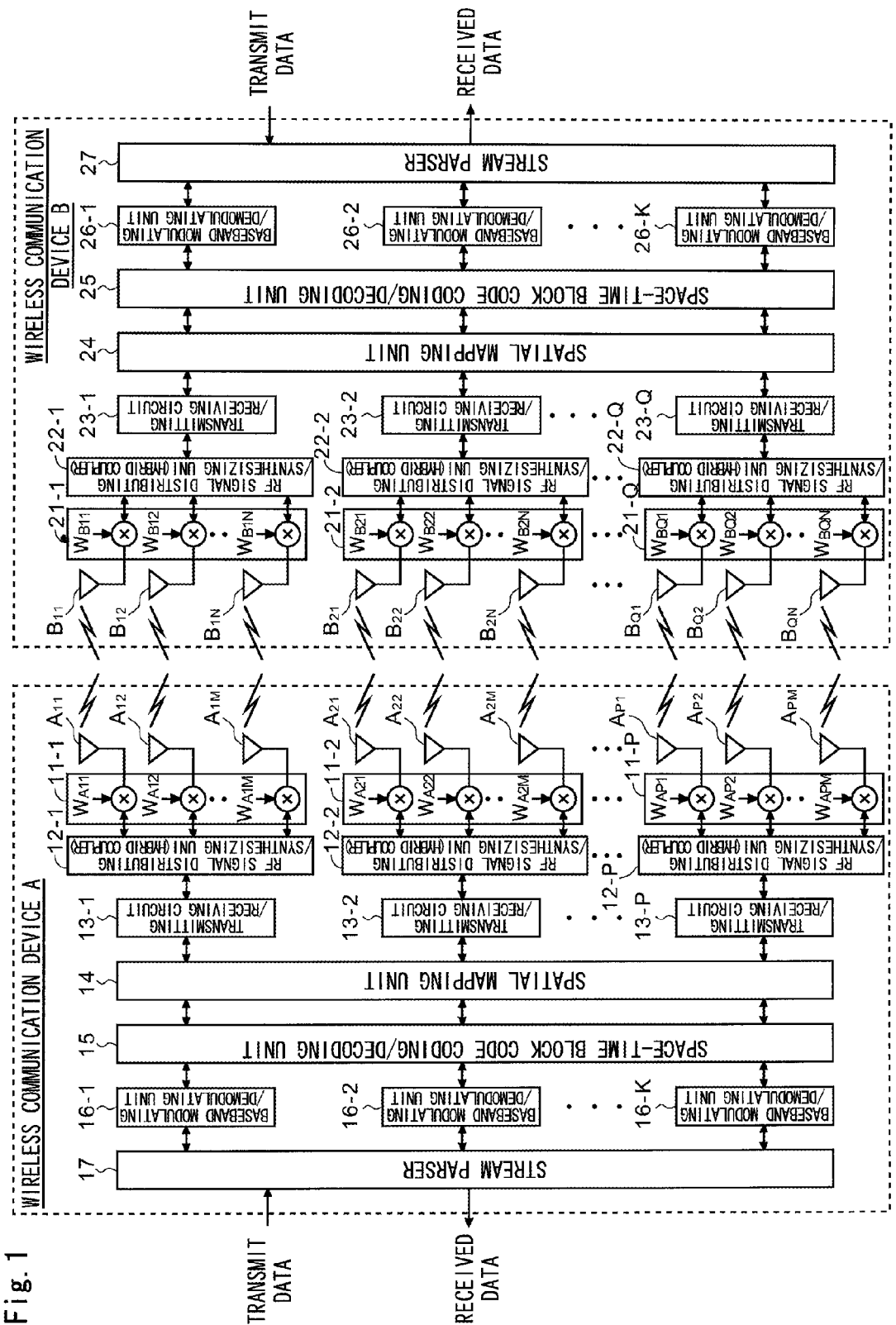
FIG. 1 is a block diagram showing a basic structure of the first embodiment of a wireless communication system according to the present invention.

Hereinafter, the present invention will be described with reference to the drawings. FIG. 1 is a block diagram showing a basic structure of the first embodiment of a wireless communication system according to the present invention. The basic structure in the second and third embodiment is the same as this structure. The present invention can be embodied not only as a wireless communication system but also as a wireless communication method, and is characterized also as a wireless communication device.

The wireless communication system shown in FIG. 1 includes two wireless communication devices A and B that perform two-way wireless communication via wireless transmission line. The wireless communication devices A and B may be two wireless base stations, or may be a wireless base station and a wireless terminal, or may be two wireless terminals.

The wireless communication device A includes P antenna groups A11~A1M, A21~A2M, . . . , AP1~APM, P weight processing units 11-1, 11-2, . . . , 11-P, P RF signal distributing/synthesizing unit 12-1, 12-2, . . . , 12-P, P transmitting/receiving circuits 13-1, 13-2, . . . , 13-P, spatial mapping unit 14, space-time block codes coding/decoding unit 15, K baseband(BB) modulating/demodulating unit 16-1, 16-2, . . . , 16-k and stream parser 17. Here, each antenna group A11~A1M, A21~A2M, . . . , and AP1~APM includes M(M is a integer more than or equal to 2) antennas Ak1, Ak2, . . . , and AkM(k=1, 2, . . . , P), respectively. The number of the antennas of each antenna group may differ from each other. Considering this, M can be determined by the maximum value of the number of antennas in each antenna group.

The wireless communication device B includes Q antenna groups B11~B1N, B21~B2N, . . . , BQ1~BQN, Q weight processing units 21-1, 21-2, . . . , 21-Q, Q RF signal distributing/synthesizing units 22-1, 22-2, . . . , 22-Q, Q transmitting/receiving circuits 23-1, 23-2, . . . , 23-Q, spatial mapping unit 24, space-time block codes coding/decoding unit 25, K baseband modulating/demodulating unit 26-1, 26-2, . . . , 26-k and stream parser 27. Here, each antenna group B11~B1N, B21~B2N, . . . , and BQ1~BQN includes N(N is a integer more than 2 or equal to 2) antennas Bn1, Bn2, . . . , and BnN (n=1, 2, . . . , Q), respectively. The number of the antennas of each antenna group may differ from each other. Considering this, N can be determined by the maximum value of the number of antennas in each antenna group.

In the first embodiment, MIMO technique which uses phase shifters of a simple structure is implemented along with conventional MIMO which is a kind of a smart antenna technology. And therefore, in either of or both of the wireless communication device A and B, a plurality of antenna groups is implemented. In other words, either of or both of P and Q is greater than or equal to 2.

The combination of each weight processing unit 11-1, 11-2, . . . , 11-P and each RF signal distributing/synthesizing unit 12-1, 12-2, . . . , 12-P form P diversity circuits, and the combination of each weight processing unit 21-1, 21-2, . . . , 21-Q and each RF signal distributing/synthesizing unit 22-1, 22-2, . . . , 22-Q form Q diversity circuits, respectively. In this example, although the antennas Ak1, Ak2, . . . , AkM, Bn1, Bn2, . . . , BnN are used both for transmission and for reception, transmitting antennas and receiving antennas may be provided separately from each other.

Additionally, either transmission power amplifier or reception LNA (Low Noise Amplifier), or both of them may be inserted between each RF signal distributing/synthesizing unit 12-1, 12-2, . . . , 12-P and each weight processing unit 11-1, 11-2, . . . , 11-P or between each weight processing unit 11-1, 11-2, . . . , 11-P and each antenna group Ak1~AkM in the wireless communication device A, so as to increase transmitting power or improve reception sensitivity.

Likewise, either transmission power amplifier or reception LNA (Low Noise Amplifier), or both of them may be inserted between each RF signal distributing/synthesizing unit 22-1, 22-2, . . . , 22-Q and each weight processing unit 21-1, 21-2, . . . , 21-Q or between weight processing unit 21-1, 21-2, . . . , 21-Q and each antenna group Bn1~BnN in the wireless communication device B so as to increase transmitting power or improve reception sensitivity.

Each of weight processing unit 11-1, 11-2, . . . , 11-P of the wireless communication device A has a plurality of multipliers, respectively, in each of which received signals from each antenna Ak1, Ak2, . . . , AkM of each antenna group or transmit signals from each RF signal distributing/synthesizing unit 12-1, 12-2, . . . , 12-P are multiplied by diversity combining information (complex weight) WAk1, WAk2, . . . , WAkM.

Each of weight processing unit 21-1, 21-2, . . . , 21-Q of the wireless communication device B also has a plurality of multipliers, respectively, in each of which received signals from each antenna Bn1, Bn2, . . . , BnN of each antenna group Bn1~BnN or transmit signals from each RF signal distributing/synthesizing unit 22-1, 22-2, . . . , 22-Q are multiplied by diversity combining information (complex weight) WBn1, WBn2, . . . , WBnN.

In the following description, diversity combining information WAk1, WAk2, . . . , WAkM and WBn1, WBn2, . . . , WBnN are referred to as the pieces of diversity combining weight information. Each multiplier changes the amplitude and the phase of an input signal in accordance with diversity combining weight information WAk1, WAk2, . . . , WAkM and WBn1, WBn2, . . . , WBnN, respectively, and output the resulting signal. A 1-bit phase shifter can be used as the multiplier. In this case, the pieces of diversity combining weight information is one bit of "0" or "1", and an input signal is output in accordance with, for example, diversity combining weight information "0" or "1" without being changed or after being subjected to phase inversion.

The multiplier of weight processing unit 11-k, 21-n is not limited to a 1-bit phase shifter, and L-bit (L is a natural number more than or equal to 2) phase shifter can be used as a multiplier. As for the case that multipliers of the weight-processing unit 11-k and 21-n are n-bit phase shifters (n is a natural number more than or equal to 2), a description will be given in the explanation of second embodiment.

Figure 2:
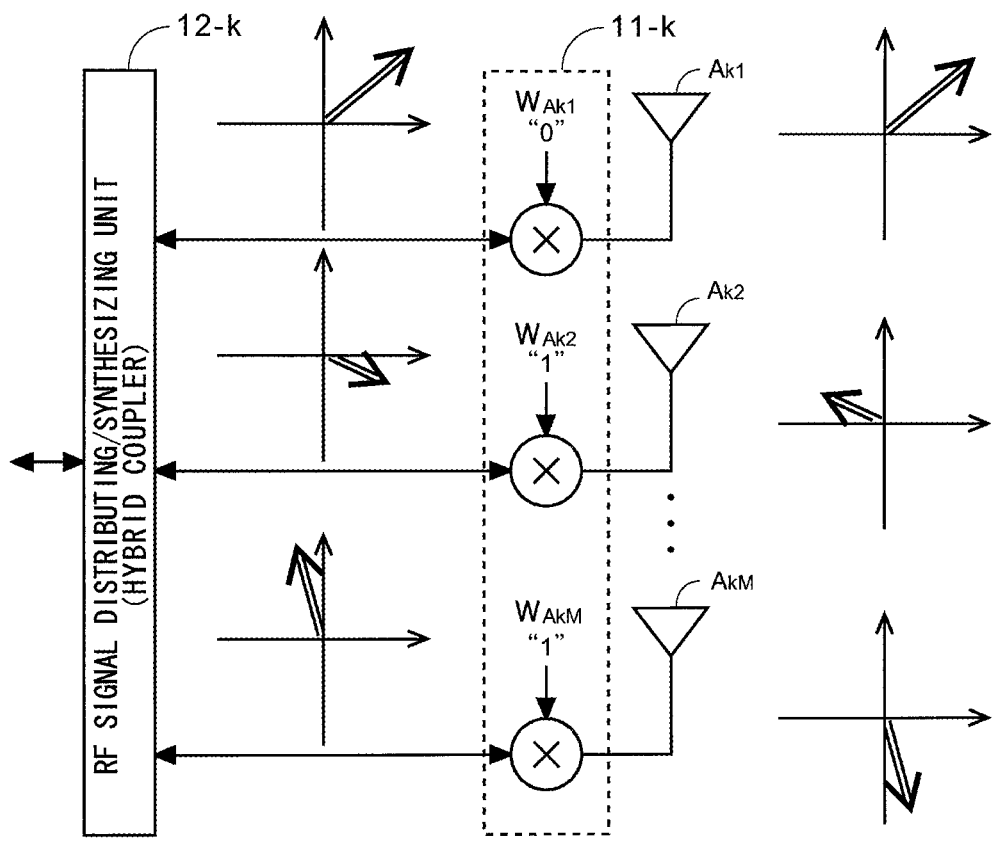
FIG. 2 is a figure conceptually showing the operation performed when a 1-bit phase shifter is used in a weight-processing unit.

FIG. 2 is a view conceptually showing the operation performed when a 1-bit phase shifter is used in the weight processing unit 11-k. Signals from antennas Ak1, Ak2, . . . , AkM in each antenna group or signals from the RF signal distributing/synthesizing unit 12-k are input to the weight processing unit 11-k. The weight processing unit 11-k outputs an input signal without being changed Or after being subjected to phase inversion, depending on whether diversity combining weight information WAk1, WAk2, . . . , WAkM is "0" or "1". FIG. 2 shows a case in which a signal is output without being changed when diversity combining weight information WAk1, WAk2, . . . , WAkM are "0", and a signal is output after being subjected to phase inversion when diversity combining weight information is "1".

Figure 3:
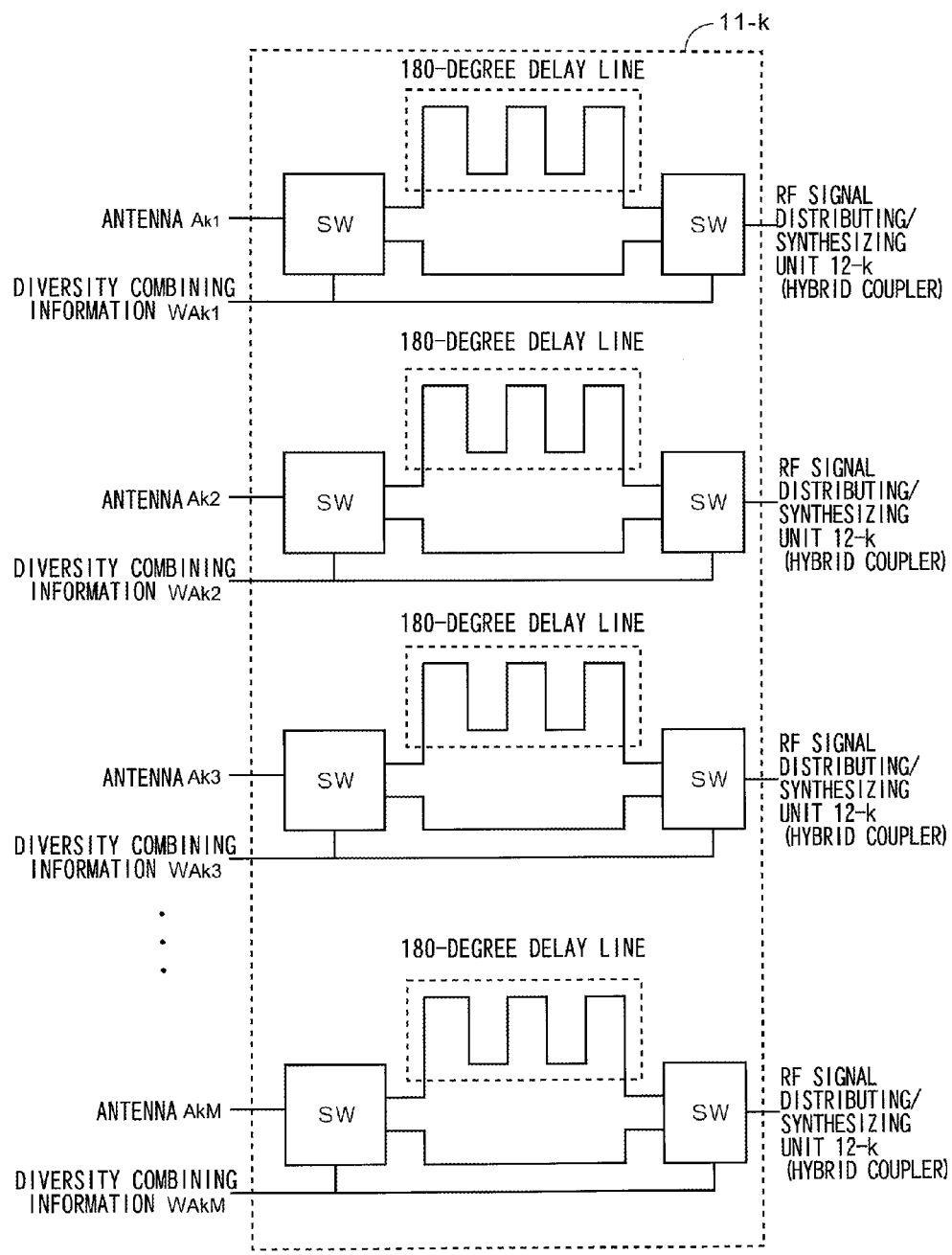
FIG. 3 is a block diagram showing an example of a concrete structure of the weight-processing unit.

FIG. 3 is a block diagram showing an example of a concrete structure of the weight-processing unit 11-k. Each multiplier of the weight-processing unit 11-k is composed of two changeover switches and a 180-degree delay line. The two changeover switches are simultaneously changed over in accordance with diversity combining weight information WAk1, WAk2, . . . , WAkM. Signals from each of the antennas Ak1, Ak2, . . . , AkM in each antenna group or from the RF signal distributing/synthesizing unit 12-k are sent toward the other side without being passed through the 180-degree delay line when diversity combining weight information WAk1, WAk2, . . . , WAkM is "0", whereas signals from there are sent toward the other side through 180-degree delay line when diversity combining weight information WAk1, WAk2, . . . , WAkM is "1".

Referring again to FIG. 1, in case of transmission, P RF signal distributing/synthesizing unit 12-1, 12-2, . . . , 12-P of the wireless communication device A allows transmit signal from P transmitting/receiving circuit 13-1, 13-2, . . . , 13-P to energetically undergo M distributions and outputs the resulting signals to each multiplier of P weight processing unit 11-1, 11-2, . . . , 11-P, whereas, in case of reception, P RF signal distributing/synthesizing unit 12-1, 12-2, . . . , 12-P allows output signals from each multiplier to be synthesized (i.e. be vector-added), and, outputs the resulting signal to the transmitting/receiving circuit 13-1, 13-2, . . . , 13-P as diversity combining received signal.

On the other hand, in case of transmission, Q RF signal distributing/synthesizing unit 22-1, 22-2, . . . , 22-Q of the wireless communication device B allows transmit signal from the transmitting/receiving circuits 23-1, 23-2, . . . , 23-Q to energetically undergo N distributions and outputs the resulting signal to each multiplier of the weight processing unit each 21-1, 21-2, . . . , 21-Q, whereas, at a time of reception, Q RF signal distributing/synthesizing unit 22-1, 22-2, . . . , 22-Q allows output signals from each multiplier to be synthesized (i.e. be vector added), and output the resulting signals to the transmitting/receiving circuit 23-1, 23-2, . . . , 23-Q as diversity combining received signal.

In other words, each of the RF signal distributing/synthesizing unit 12-1, 12-2, . . . , 12-P and 22-1, . . . , 22-Q are two-way hybrid circuit, and acts as a distributor at a time of transmission, and acts as a synthesizer at a time of reception. More specifically, a Wilkinson distributing/synthesizing circuit can be used as each of the RF signal distributing/synthesizing unit 12-1, 12-2, . . . , 12-P and 22-1, . . . , 22-Q.

At the time of the transmission, P baseband modulating signals from the spatial mapping unit 14 are provided to the P transmitting/receiving circuit 13-1, 13-2, . . . , 13-P of the wireless communication device A, each of which up-convert the input signal to RF band and output the resulting signal to the RF signal distributing/synthesizing unit 12-1, 12-2, . . . , 12-P. Also, at the time of reception, P diversity combining received signal are provided to the transmitting/receiving circuit 13-1, 13-2, . . . , 13-P, each of which down-convert the input signal to the baseband signals and output the signal to the spatial mapping unit 14. Note that, in the case that transmit antenna selection diversity is performed at the time of transmission, only a part of transmitting/receiving circuit 13-1, 13-2, . . . , 13-P is used.

At the time of the transmission, Q baseband modulating signal from the spatial mapping unit 24 are provided to the Q transmitting/receiving circuit 23-1, 23-2, . . . , 23-Q, each of which up-convert the input signal to RF band and output the resulting signal to the RF signal distributing/synthesizing unit 22-1, 22-2, . . . , 22-Q. Also, at the time of reception, Q diversity combining received signals are provided to the transmitting/receiving circuit 23-1, 23-2, . . . , 23-Q, each of which down-convert input signal to baseband signals and output the signal to spatial mapping unit 24. Note that, in the case that transmit antenna selection diversity is performed at the time of transmission, only a part of transmitting/receiving circuits 23-1, 23-2, . . . , 23-Q is used.

Spatial mapping unit 14,24 performs spatial mapping or spatial demapping. This processing is the same as is used in a conventional MIMO technology. For example, in wireless communication device A, transmit data is divided in the stream parser 17 into the data series of the number of spatial streams. This divided data series are provided to the baseband modulating/demodulating unit 16-1, 16-2, . . . , 16-k, each of which output K baseband modulating signals.

In the case that space-time coding is used, a coding processing of the space-time code is performed in the space-time block codes coding/decoding unit 15. In the case that space-time coding is not used, no processing is performed in the space-time block codes coding/decoding unit 15.

The output signal from the space-time block codes coding/decoding unit 15 is provided to the spatial mapping unit 14 which performs mapping processing to each of the antenna group Ak1~AkM. In the processing of this mapping, the addition of cyclic prefix, the multiplexing of the steering matrix, direct mapping can be used. A description about mapping processing will be given by non-patent document 1 and non-patent document 2 in detail.

Through 2-way training signal transfer, value optimum of the pieces of diversity combining weight information in each antenna Ak1~AkM, Bn1~BnN of each antenna group are determined in the wireless communication device A and B, and the value optimum of the pieces of diversity combining weight information are set to multipliers of weight processing unit 11-k,21-n which are corresponding to each antennas Ak1~AkM, Bn1~BnN of each antenna group, and perform beam forming at the data transmission and perform diversity combining at the data reception through antennas Ak1~AkM, Bn1~BnN of each antenna group.

As for the training signal, it is used to determine the value optimum of the pieces of diversity combining weight information in each antennas Ak1~AkM, Bn1~BnN of each antenna group in the wireless communication device A and B. A single training signal is composed of a plurality of training sub-signals. Each training sub-signal is received in a state in which pieces of diversity combining weight information which are different from each other, are set in the weight-processing unit 11-k, 21-n, respectively, and the value optimum of the pieces of diversity combining weight information is determined by use of reception level information at this time. Something that can obtain reception level information with respect to an already-known signal can be used as a training signal, and hence an arbitrary frame, a symbol, a subcarrier, a diffusion signal, etc., can be used there as. A concrete example of the training signal will be described in detail later. Here, as for the reception level information, any information can be used with which the comparison of received signal strength of a plurality of training sub-signal can be performed. For example, in the case that a plurality of symbols of the same frame are used as training signals, reception level information can be obtained using baseband reception IQ information.

The weight-processing units 11-k and 21-n equivalently multiply the pieces of diversity combining weight information by use of multipliers. This diversity combining weight information is used both for transmission and for reception. In other words, transmission beam forming is performed by the multiplication of these pieces of diversity combining weight information at the time of transmission, whereas diversity combining is performed by the multiplication of these pieces of diversity combining weight information at a time of the reception.

Figure 4:
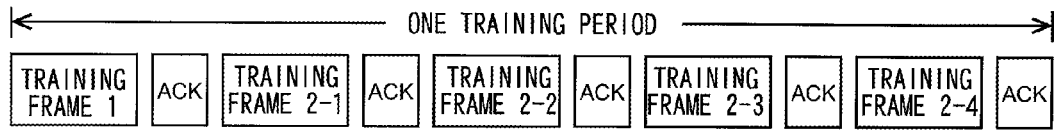
FIG. 4 is a view showing an example of a training signal.

FIG. 4 is a view showing a concrete example of a training signal transmitted and received between the wireless communication devices during one training period. FIG. 4 shows one example of a training signal used when the number of antennas of the receiving-side wireless communication device is four. As shown in FIG. 4, the training signal consists of combination of five training frames bundle 1, 2-1~2-4 and ACK frames (Acknowledgement Frames). A training sub-signal consists of combination of one training frame and an ACK frame relative to this one training frame. When a training frame is received without error in an opposite wireless communication device for which the training frame is destined, an ACK frame is transmitted from the opposite wireless communication device. If a transmission error is detected when the training frame is received in the wireless communication device, the ACK frame is not transmitted, and the training signal is ended at that time. If a transmission error is detected when an ACK frame is received in an initiation wireless communication device, next training frame is not transmitted, and the training signal is ended at that time.

The training signal is used to obtain reception level information of each antenna group when diversity reception is performed by use of current diversity combining weight information, and is used to obtain reception level information of the antenna group when diversity reception is performed while changing the current diversity combining weight information in accordance with a predetermined algorithm. Each wireless communication device receives a training signal in each antenna group for one training period, and as a result, can determine the value optimum of diversity combining weight information by which a diversity reception state is optimized for each antenna group at that time.

The foremost training frame 1 is allowed to contain pieces of information, such as a source address, a destination address and the frame type. Reception level information in each antenna group when diversity reception is performed by current diversity combining weight information is obtained by use of training frame 1. The training frame 2-1-2-4 are used to measure a diversity reception state of each antenna group when diversity reception is performed while changing diversity combining weight information in accordance with a predetermined algorithm.

The training signal is used to obtain reception level information in each antenna group when a training signal transmitted from the opposite wireless communication device is received in a diversity reception manner in each antenna group by use of predetermined diversity combining weight information, and hence is not limited to a signal having a form shown in FIG. 4. The training frames 1, 2-1~2-4 are not necessarily limited to frames specially prepared for training. For example, a plurality of symbols contained in a preamble of a header of a frame may be used as a training signal.

In FIG. 1, for example, when the value optimum of diversity combining weight information WAk1, WAk2, . . . , WAkM which are corresponding to antenna Ak1, Ak2, . . . , AkM of antenna group Ak1~AkM in wireless communication device A are determined, wireless communication device A receives frames 1, 2-1~2-4 transmitted from the wireless communication device B in a diversity reception manner, and returns each ACK frame.

The training frame 1 is received in a diversity reception manner by use of current diversity combining weight information WAk1, WAk2, . . . , WAkM in each antenna group Ak1~AkM, and, the frames 2-1~2-4 are received in a diversity reception manner by use of diversity combining weight information WAk1, WAk2, . . . , WAkM in each antenna group Ak1~AkMw obtained by changing the current diversity combining weight information WAk1, WAk2, . . . , WAkM in each antenna group Ak1 AkM in accordance with a predetermined algorithm.

Based on a diversity reception state in each antenna group Ak1~AkM at this time, the value optimum of the diversity combining weight information WAk1, WAk2, ..., WAkM of antenna group Ak1~AkM is determined. If ACK frame are not returned, training is ended then. The training frames 2-1~2-M that meet the predetermined number M of the antenna may always be transmitted without using ACK Frames. An example in which ACK frames are not used will be described later.

Next, a description will be given of the operation of determining the value optimum of diversity combining weight information in the wireless communication system of FIG. 1. Herein, a description will be given of a case in which the value optimum of diversity combining weight information WAk1, WAk2, ..., WAkM corresponding to the signal of antenna Ak1, Ak2, ..., AkM comprising each antenna group Ak1~AkM in wireless communication device A is determined by use of a training signal having a form shown in FIG. 4. Additionally, herein, diversity combining is assumed to be performed by equal gain combining by use of 1-bit phase shifters for the weight-processing unit 11-k.

An arbitrary combining method, such as highly accurate equal gain combining or maximum ratio combining, can also be used as diversity combining.

First, the Wireless communication device B transmits a training signal from each of antenna Bn1, Bn2, ..., BnN comprising each antenna group Bn1~BnN by use of substantially optimal diversity combining weight information WBn1, WBn2, ..., WBnN in each antenna group Bn1~BnN acquired obtained by the nearest past training The diversity combining weight information WBn1, WBn2, ..., WBnN in each antenna group Bn1~BnN of this wireless communication device B is assumed to be fixed during one training period during which the wireless communication device A updates it to the value optimum of diversity combining weight information at that time.

If communication between the wireless communication device A and B is performed from a complete initial state, the wireless communication device A and B transmit and receive a training signal to and from each other so that drawing into the value optimum of diversity combining weight information WAk1, WAk2, ..., WAkM and WBn1, WBn2, ..., WBnN can be performed, as described later.

First, the wireless communication device A receives the first training frame 1 transmitted from each of the antennas Bn1~BnN of Q antenna groups of the wireless communication device B through the M antennas Ak1~AkM of P antenna groups of the wireless communication device A, and returns an ACK frame relative to the training frame 1. Each of Q antenna groups in the wireless communication device B includes N antennas of Bn1~BnN, and N signals are transmitted from N antennas of Bn1~BnN in each antenna group, respectively. Likewise, each of P antenna groups in the wireless communication device A includes M antennas of Ak1~AkM, and M signals are transmitted from N antennas of Ak1~AkM in each antenna group, respectively.

Between each antenna group Ak1~AkM and each antenna group Bn1~BnN, a eigenbeam transfer are performed each other independently. Each multiplier of each weight processing unit 11-1, 11-2, ..., 11-P of the wireless communication device A multiplies each received signal from the antennas Ak1~AkM of each antenna group by diversity combining weight information WAk1, WAk2, ..., WAkM. If the diversity combining weight information is "0", each multiplier outputs an input signal without change, and, if diversity combining weight information is "1", each multiplier allows an input signal to undergo phase inversion, and outputs the resulting signal.

Information obtained by the nearest past training is used as the diversity combining weight information WAk1, WAk2, ..., WAkM when the first training frame 1 is received. The diversity combining weight information WAk1, WAk2, ..., WAkM of each antenna Ak1~AkM in each antenna group can be regarded as a substantially value optimum even under the current state. However, the diversity combining weight information WAk1, WAk2, ..., WAkM used at this time can be arbitrarily set. As described later, the diversity combining weight information WAk1, WAk2, ..., WAkM of antennas Ak1~AkM in each antenna group is further updated to a value optimum through the diversity reception of a plurality of subsequent training frames 2-1~2-4.

Each RF signal distributing/synthesizing unit 12-1, 12-2, ..., 12-P of the wireless communication device A adds received signals multiplied by the diversity combining weight information WAk1, WAk2, ..., WAkM by the weight processing unit 11-1, 11-2, ..., 11-P so as to generate received signal.

Thereafter, only the diversity combining weight information WAk1 in each antenna group with respect to a signal of one antenna in each antenna group, e.g. with respect to a signal of the antenna Ak1 is inverted (0⇔1) from the value optimum WAk1 of the preceding diversity combining weight information. The subsequent training frame 2-1 is received in a diversity reception manner by use of this new diversity combining weight information WAk1, WAk2, ..., WAkM of antennas Ak1~AkM in each antenna group, and an examination is made of whether the receiving state at this time has been made better than when the value used in each antenna group.

If the receiving state at this time has not been made better than when the value optimum WAk1, WAk2, ..., WAkM of the preceding diversity combining weight information are used, the value optimum WAk1, WAk2, ..., WAkM of the preceding diversity weight combining information are held without change, and, if the receiving state at this time has been made better, the value optimums WAk1, WAk2, ..., WAkM of the diversity combining weight information are updated to have the value obtained this time and are held in each antenna group. Accordingly, the value optimum WAk1 of the diversity combining weight information with respect to the signal of the antenna Ak1 in each antenna group is determined.

Whether the receiving state has been improved can be determined by reception level information in each antenna group, such as a level of received signal of diversity combining of antennas Ak1~AkM in each antenna group, a gain of an AGC amplifier of transmitting/receiving circuit 13-1, 13-2, ..., 13-P, or a level obtained by converting them into level information, which serves as an indicators. Although, the reception level information is not necessarily required to be proportional to the level of a received signal level of diversity combining of antennas Ak1~AkM in each antenna group or its logarithm, the reception level information is required to have a monotone increasing relationship or monotone decreasing relationship with the level of received signal. In case of that a plurality of symbols of the same frame are used as a training signal, reception level information can be obtained by use of baseband reception IQ information.

Thereafter, an ACK frame with respect to the training frame 2-1 is returned, and then diversity combining weight information WAk1 with respect to the signal of the antenna Ak1 in each antenna group determined above is allowed to remain without changes, and only the diversity combining weight information WAk2 with respect to a signal of any antenna excluding the antenna Ak1, e.g. with respect to a signal of the Ak2 in each antenna group is inverted from the value optimum WAk2 of the preceding diversity combining weight information (0↔1).

The subsequent training frame 2-2 is received in a diversity reception manner by use of this new diversity combining weight information WAk1, WAk2, ..., WAkM of antennas Ak1~AkM in each antenna group, and an examination is made of whether the receiving state at this time has been made better than when the value optimum WAk1, WAk2, ..., WAkM of the preceding diversity combining weight information are used.

If the receiving state at this time has not been made better than when the value optimum WAk1, WAk2, ..., WAkM of the preceding diversity combining weight information of antennas Ak1~AkM in each antenna group are used, the value optimum WAk1, WAk2, ..., WAkM of the preceding diversity combining weight information is held without changes, and, if the receiving state at this time has been made better, the value optimum WAk1, WAk2, ..., WAkM of the diversity combining weight information of antennas Ak1~AkM of each antenna group are updated to have the value obtained this time and are held. Accordingly, the value optimum WAk2 of the diversity combining weight information with respect to the signal of antenna Ak2 in each antenna group is determined.

Likewise, the training frame 2-3, 2-4 are sequentially received, and, based on reception level information received at this time, the value optimum WAk3, WAk4 of diversity combining weight information with respect to the signals of the antennas Ak3 and Ak4 in each antenna group are sequentially determined, respectively.

In more detail, the training frame 2-3 transmitted from each of the antennas Bn1, Bn2, ..., BnN comprising Q antenna groups of the wireless communication device B is received, and the value optimum WAk3 of diversity combining weight information with respect to the signal of the antenna Ak3 in each antenna group is determined from a receiving state obtained at this time. Thereafter, the training frame 2-4 is received, and the value optimum WAk4 of diversity combining weight information with respect to the signal of the antenna Ak4 in each antenna group is determined from a receiving state obtained at this time.

Every time the training frames 1, 2-1~2-M are sequentially received in this way, and ACK frames relative thereto are returned, the pieces of diversity combining weight information WAk1, WAk2, ..., WAkM with respect to the signals of the antennas Ak1, Ak2, ..., AkM in each antenna group are sequentially changed (inverted) one by one. Receiving state at this time is determined, and the value optimums WAk1, WAk2, ..., WAkM of diversity combining weight information of antennas Ak1~AkM in each antenna group are sequentially determined.

According to this, the value optimum WAk1, WAk2, ..., WAkM of diversity combining weight information with respect to the signals of all antennas Ak1, Ak2, ..., AkM in each antenna group can be determined by frame reception operation performed (the number of M of antennas in each antenna group +1) times. Accordingly, in the wireless communication device A, the value optimum WAk1, WAk2, ..., WAkM of diversity combining weight information with respect to the signals of the antennas Ak1, Ak2, ..., AkM of each antenna group can be determined.

Then, wireless communication device A transmits training frame 1, 2-1~2-N to wireless communication device B using value optimum WAk1, WAk2, ..., WAkM of this pieces of diversity combining weight information in each antennas Ak1~AkM of each antenna group.

The wireless communication device B receives training frame 1, 2-1~2-N transmitted from antennas Ak1~AkM of each antenna group of the wireless communication device A, and the wireless communication device B determines the value optimum of diversity combining weight information WBn1, WBn2, ..., WBnN corresponding to the antennas Bn1, Bn2, ..., BnN of each antenna group of the wireless communication device B sequentially at this time.

The operation procedure of the wireless communication device B is the same as wireless communication device A. Therefore the description of the operation procedure of the wireless communication device B is omitted. Additionally, a 2-way training signal transfer is performed between wireless communication device A and B, and each antenna group Ak1~AkM, value optimum WAk1, WAk2, ..., WAkM of the pieces of diversity combining weight information in Bn1~BnN and WBn1, WBn2, ..., WBnN can be optimized more.

The wireless communication device A and B perform beam forming and diversity combining using each antenna of Ak1~AkM and Bn1~BnN at the time of transmission/reception of data frames by use of the value optimum of the diversity combining weight information WAk1, WAk2, ..., WakM and WBn1, WBn2, ..., WBn which are determined according to above mentioned procedure.

Figure 5:
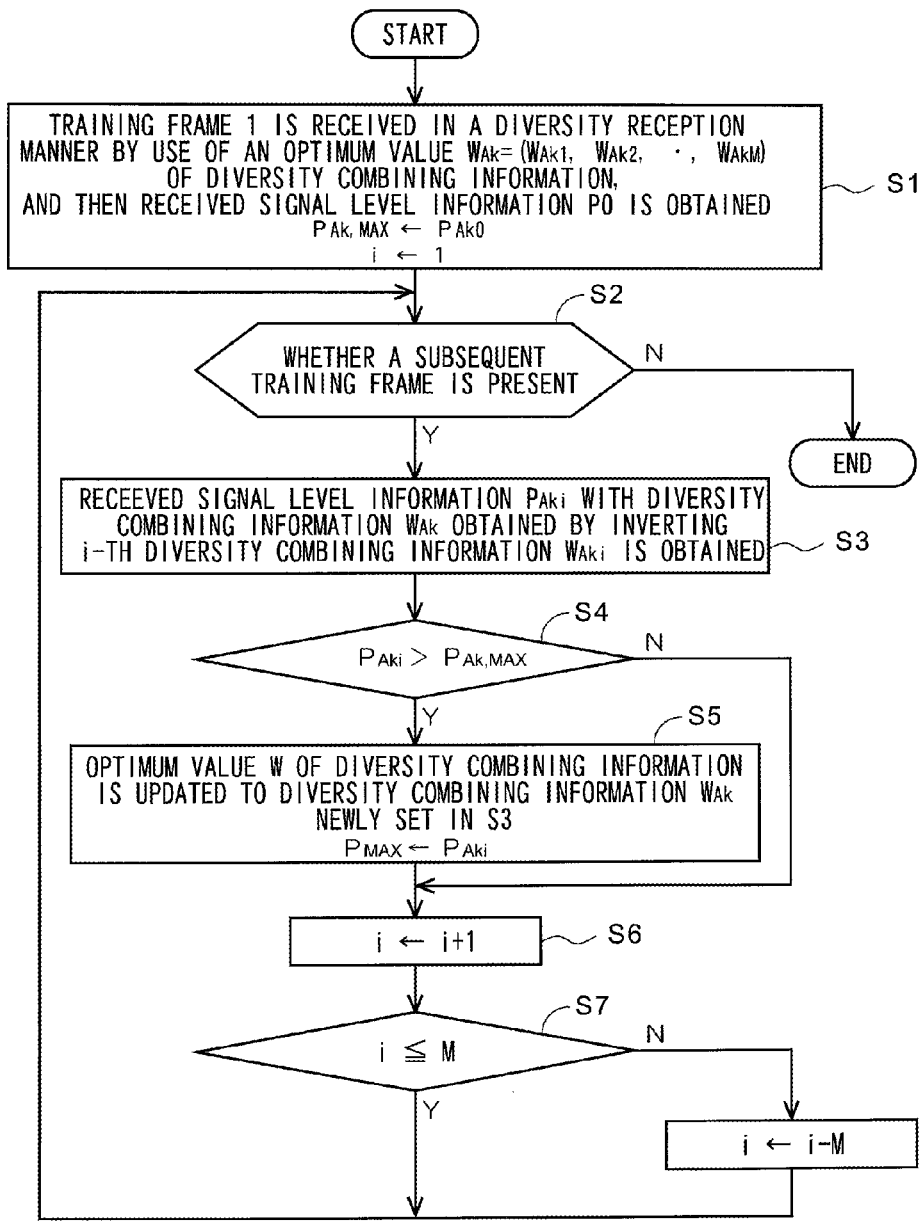
FIG. 5 is a flowchart showing a process of determining a value optimum of diversity combining weight information (complex weight) in a first embodiment.

FIG. 5 is a flow chart which showing the procedure of determining the value optimum of pieces of diversity combining weight information in wireless communication device A in the first embodiment. Herein, it is assumed that the number of antennas in each antenna group is M, and 1-bit phase shifter is used as multiplier in each weight-processing unit 11-1, 11-2, ..., 11-P.

First, the foremost training frame 1 is received in a diversity reception manner by use of the value optimum WAk=(WAk1, WAk2, ..., WAkM) of the pieces of diversity combining weight information in each antennas Ak1~AkM of each antenna group, and then reception level information PAk0 in each antenna group is obtained, and this information PAk0 is held as the maximum value PAk, MAX of the reception level information in each antenna group. Additionally, 1 is substituted for variables i (i←1)(S1). Variables i prescribes that a loop consisting of the following steps is performed M times that correspond to the number of antennas in each antenna group.

Note that, WAk=(WAk1, WAk2, ..., WAkM) here is an initial value optimum of pieces of diversity combining weight information WAk1, WAk2, ..., WAkM in each antenna group, respectively. Here, WAk1, WAk2, ..., WAkM of the pieces of diversity combining weight information is 1 bit because each multiplier in each weight processing unit 11-1, 11-2, ..., 11-P is assumed that it is a 1 bit phase shifter ("zero" or "1").

Then, it is determined whether a subsequent training frame is present (S2). If it is determined that there is next training frame bundle in S2, it advances to S3, but if it is judged that there is not, training is finished. In each antenna group Ak1~AkM, training frame is received in pieces of diversity combining weight information WAk which reversed i-th pieces of diversity combining weight information WAki, and, in S3, reception level information PAki at that time is acquired.

Then, reception level information PAki is compared with maximum PAk,MAX of the conventional reception level information (S4), and value optimum WAk of the pieces of diversity combining weight information in antenna group Ak1~AkM is updated in pieces of diversity combining weight information WAk set newly in S3 if it is PAki>PAk, MAX. At the same time, maximum PAk of the reception level information in antenna group Ak1~AkM,MAX is updated in PAki (S5). Then, it advances to S6.

It keeps updating value optimum WAk of the pieces of diversity combining weight information if a comparison result in S4 is not Pki>Pk, MAX to increment variables i only as for 1 in S6 (i←i+1) and then to determine whether variables i is number of the antenna M or less in S7. After having done assignment (i←i−M) namely variables i with 1 again in i−M in variables i if it comes back to S2, and it is judged not to be antenna number M or less by a process repeatedly variables i if judged to be number of the antenna M or less in S7 variables i, it comes back to S2, and a process is repeated.

By the above-mentioned flow, each diversity combining weight information WAk1, WAk2, ..., WAkM to the signal of each antenna Ak1, Ak2, ..., AkM comprising each antenna group Ak1~AkM is optimized one by one by reception training frames bundle after first training frame bundle 1. Thus, in the case of M, the number of the antenna can optimize pieces of diversity combining weight information WAk=(WAk1, WAk2, ..., WAkM) in each antenna group Ak1~AkM by diversity reception of at least (M+1) training frames bundle. Note that, vectorial direction of the signal of each antenna Ak1, Ak2, ..., AkM comprising each antenna group Ak1~AkM by the above-mentioned flow can be optimized in total, but, only in this, diversity reception cannot put vectorial direction of done received signal together in each antenna county. After the dispersion of the vectorial direction in baseband reception IQ information output by transmitting/receiving circuit 13-1~13-P was compensated for in spatial demapping unit 14 just after, and, in the reception in wireless communication device A, was prepared to identification, is done diversity combining. However, because vectorial sending signal for identification is applied in the transmission from wireless communication device A in transmitting/receiving circuit 13-1~13-P, in the reception in wireless communication device B, signal from each antenna group of wireless communication device A is not necessarily synthesized in phase. Thus, even more particularly, diversity reception may work to be able to put vectorial direction of received signal considered to be together in each antenna county. For example, when a plurality of symbols of the same frame bundle are used as training signals, baseband reception IQ information output by transmitting/receiving circuit 13-1~13-P may process the curl to the diversity combining weight information of the antenna county so that it is with the right half plane (area of I>0). Specifically, the baseband reception IQ information in the antenna county to training frame bundle 1 just uses the diversity combining weight information of M unit found by the above-mentioned flow in case in the right half plane, and the thing that each phase reversed the diversity combining weight information of the M unit when there is in the left half plane may be used as complex waits.

Pieces of diversity combining weight information WBn1, WBn2, ..., WBnN to the signal of each antenna Bn1, Bn2, ..., BnN of each antenna group Bn1~BnN of wireless communication device B is optimized by diversity reception of at least (N+1) training frame bundle according to the similar flow.

Thus, in the wireless communication system of the present invention, value optimum of the pieces of diversity combining weight information to each signal of a plurality of antenna comprising each antenna group through 2-way training signal transmission between the binary wireless communication device is determined, and, using the pieces of diversity combining weight information that it is thereby determined, beam forming in the data transmit and receive and diversity combining are performed.

Note that, first training frame bundle 1 in the training can be received in approximately optimum diversity combining, but because pieces of diversity combining weight information is approximately moved from value optimum by the reception of ensuing training frame bundle 2-1 after in it knowingly, reception level may go low. Particularly, in the penumbra of the communications area which can barely communicate by optimum diversity combining reception, the case which cannot mainly receive training frame bundle 2-1 after produces.

In this case, as shown in FIG. 4, the training finishes with only 1 frame bundle, that is training frame bundle 1 if ACK is replied to each training frame bundle. However, in this case, training is enabled in the penumbra of the communications area if training is started from the next antenna of the antenna which trained in each antenna group in the last time without fixing antenna of each antenna group to optimize by reception of first training frame bundle 2-1 in the first antenna.

However, in this case, training at least antenna number or more is necessary not to be able to optimize pieces of diversity combining weight information by one time training in each antenna group. When training frame bundle for established antenna several minutes is always transmitted following training frame bundle 1 or when the symbol for antenna several minutes when the escape preamble of the header of the data frame was soaked is used without using ACK, in the reasonable communications area penumbra, optimization in the training signal of one is possible.

Because it is optimized through the 2-way training signal transmission between them, respectively, all energy is concentrated on inherent transmission path corresponding to the maximum eigenvalue of the channel matrix comprising transfer functions between a plurality of antenna which include bilateral antenna group between each antenna group of the binary wireless communication device by performing beam forming and diversity combining using pieces of diversity combining weight information in this each antenna group on the occasion of data transmit and receive, and the pieces of diversity combining weight information in each antenna group on transmitted and received wireless communication device can transmit data, and big MIMO transmission gain can be obtained.

Thus, not only, in spatial multiplexing by MIMO, a service area of the communication can be enlarged by diversity communication or beam forming, but also quality of the communication can be improved in the bi-direction real time such as the call. Note that, the MIMO transmission gain includes transmission antenna gain, receiving antenna transmission gain and diversity gain.

The effect like the present invention can be implemented in a wireless communication in theory by performing MIMO transfer of (M×P)×(N×Q). However, it is by cost considerations difficult to include the transceiver of M×P unit or the N×Q factor unit from face of the power consumption. Also, there is the problem that quantity of arithmetic and operation time grows big in the highly advanced MIMO transmission. Also, it is necessary to share information of the channel matrix in transmit and receive to perform beam forming, but when overhead in the feedback is considered, the implementation of highly advanced MIMO is very difficult under high-speed fading environment.

However, according to the present invention, communication quality between each antenna group in the MIMO communication can be improved without numerical increase of arithmetic quantity to determine value optimum of the pieces of diversity combining weight information and information transmission to communalize the channel information in bilateral wireless communication device in computing speed and the big transmitting/receiving circuit of the power consumption by a large value optimum of the pieces of diversity combining weight information in each antenna group is determined through 2-way training signal transmission without operating an eigenvector corresponding to the maximum eigenvalue of a correlation matrix and the correlation matrix of the channel matrix in each antenna group performing MIMO transfer. Thereby, because a limit of the number of the antenna in the improvement of the communication quality by MIMO is relaxed by a large margin, MIMO transmission gain in the radio transmission between each antenna group can be increased easily.

Figure 6:
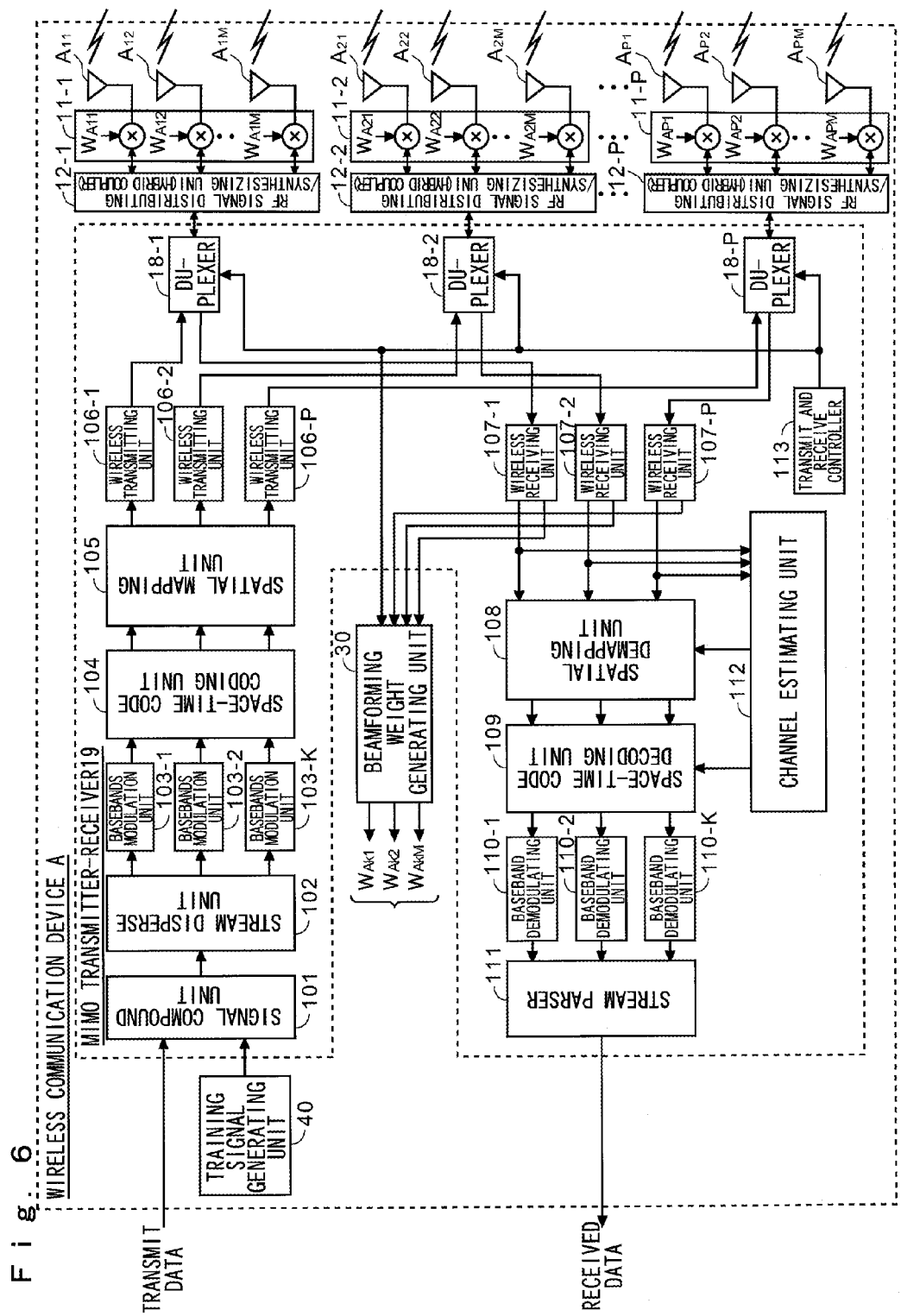
FIG. 6 is a block diagram showing a structure of the first embodiment of a wireless communication device according to the present invention.

FIG. 6 is a block diagram which shows structure of the first embodiment of the wireless communication device according to the present invention. Note that, in FIG. 6, the same number is referred to a same or equal part as FIG. 1, and wireless communication device A of FIG. 1 is referred here, but wireless communication device B is as well. Also, FIG. 6 shows an embodiment when a multiplier of weight processing unit 11-k of the wireless communication device is a 1-bit phase shifter. When, in the case of natural numbers) 2 or more, a multiplier of weight processing unit 11-k attacks n binary digit phase shifter (m, it is described as second embodiment.

Wireless communication device A of the present embodiment includes P antenna group Ak1~AkM each of which comprising antennas Ak1, Ak2, . . . , AkM~AkM (k is a integer and 1≤k≤P, M is a integer more than or equal to 2), P diversity circuitry comprising weight processing unit 11-1, 11-2, . . . , 11-P and RF signal distributing/synthesizing unit 12-1, 12-2, 12-P and MIMO transmitter-receiver 19. MIMO transmitter-receiver 19 is equivalent to transmitting/receiving circuit 13-1, 13-2, . . . , 13-P~stream parser 17 of FIG. 1.

MIMO transmitter-receiver 19 includes transmit and receive controller 113 for switching control of signal compound unit 101, stream disperse unit 102, baseband modulation unit 103-1, 103-2, . . . , 103-k, space-time coding unit 104, spatial mapping unit 105, wireless transmitting unit 106-1, 106-2, . . . , 106-P, wireless receiving unit 107-1, 107-2, . . . , 107-P, spatial demapping unit 108, space-time decoding unit 109, baseband demodulating unit 110-1, 110-2, . . . , 110-k, stream parser 111, duplexer 18-1, 18-2, . . . , 18-P, channel estimating unit 112 and the transmit and receive. Most blocks depicted in FIG. 6 are the same which include general wireless communication devices of MIMO transmission. When a sign between the space-time is not used, it is preferable without a code/coding unit between the space-time and a space-time code coding/decoding unit.

In MIMO transmitter-receiver 19, the transmitted data is input into stream disperse unit 102 through signal compound unit 101, and it is divided radio transmission in data series of done stream number. This signal is input into baseband modulation units 103-1, 103-2, . . . , 103-k which are isomerous with number of the streams k performed radio transmission.

In each baseband modulation unit 103-1, 103-2, . . . , 103-k, baseband modulation is performed based on input data series. For example, when OFDM modulation is used, after serial-to-parallel conversion was considered to be, QAM mapping is performed based on the data corresponding to each subcarrier, and each data series is converted into time sequence more by an inverse Fourier transform, and it is with a complex baseband modulating signal.

When a sign between the space-time is used, the complex baseband modulating signal is encoded using a space-time code coding unit 104 between the space-time, and the numerical time sequence which responded to a space-time code is output. When a sign between the space-time is not used, the complex baseband modulating signal is just output from the space-time code coding unit 104 between the space-time. The output signal from the space-time code coding unit 104 is input into spatial mapping unit 105.

With spatial mapping unit 105, a process in MIMO, e.g., the process that responded to spatial multiplexing, coding between the space-time, transmitting antenna selection diversity, beam forming is performed. A process to obtain sending signal to send out from each antenna group is carried out with spatial mapping unit 105, but for more information about this process, is described in non-patent document 1 or non-patent document 2 in detail.

The complex transmission IQ signal of P unit output from spatial mapping unit 105 is input into supporting wireless transmitting unit 106-1, 106-2, . . . , 106-P. For example, from wireless transmitting unit 106-1, 106-2, . . . , 106-P, the RF transmit signal that it is at right angles, and is modulated with this signal is output. Each RF transmit signal output by wireless transmitting unit 106-1, 106-2, . . . , 106-P is input into each duplexer 18-1, 18-2, . . . , 18-P.

Duplexer 18-1, 18-2, . . . , 18-P change reception of an RF transmission signalization and the RF received signal in terms of time. For example, It becomes "1" from transmit and receive controller 113 during a transmission period, and "zero" and the transmission/reception switching information that it is are received during a reception period, and RF transmit signal from each wireless transmitting unit 106-1, 106-2, . . . , 106-P are output in RF signal distributing/synthesizing unit 12-1, 12-2, . . . , 12-P when transmission/reception switching information "is 1", and RF received signal from RF signal distributing/synthesizing unit 12-1, 12-2, . . . , 12-P are output in wireless receiving unit 107-1, 107-2, . . . , 107-P when transmission/reception switching information "is zero". For duplexer 18-1, 18-2, . . . , 18-P, a directional coupler, high frequency switch can be used.

Output signal from duplexer 18-1, 18-2, . . . , 18-P are input into diversity circuitry comprising RF signal division/synthesizer 12-1, 12-2, . . . , 12-P and weight processing unit 11-1, 11-2, . . . , 11-P, respectively. The diversity circuitry of the P unit is connected to antenna Ak1, Ak2, . . . , AkM of the M unit, respectively, and RF transmit signal is sent out to the radio propagation street by (P×M) antennas.

On the other hand, the RF received signal received in antenna Ak1, Ak2, . . . , AkM of the M unit to include the antenna group of the P unit is synthesized in the diversity circuitry of the P unit, and the output signal is input into duplexer 18-1, 18-2, . . . , 18-P, respectively. Output signal of duplexer 18-1, 18-2, . . . , 18-P are input into wireless receiving unit 107-1, 107-2, . . . , 107-P, respectively, and complex reception IQ signal is output.

The P complex reception IQ signal of are provided to the spatial demapping unit 108, and a processing of MIMO technology, e.g., the processing corresponding to spatial multiplexing, space-time coding, reception diversity is performed. The complex IQ signal output from spatial demapping unit 108 is provided to the space-time code coding/decoding unit 109.

In the case that a space-time code is used, the decoding processing of the space-time code is performed, and the resulting signal is output from space-time code coding/decoding unit 109. In the case that space-time code is not used, the input complex IQ signal to the space-time code coding/decoding unit 109 is just output.

One or more output signals from space-time code coding/decoding unit 109 are provided to the baseband demodulating unit 110-1, 110-2, ..., 110-k, each of which perform the decoding processing. In the case that OFDM modulation is used, input complex IQ signal is divided into a plurality of symbols, and Fourier-convert is performed to each symbol. The received data series is obtained by Parallel-serial converting the QAM demodulated data of each frequency component obtained by Fourier transform.

The series of received data output by baseband demodulating unit 110-1, 110-2, ..., 110-k is synthesized in stream parser 111 by a series of one received data. Note that, it is common to use error correcting coding and an interleave process, and in this case, in the OFDM modulation, decoding processing to the error correcting code and interleave process are performed to above-mentioned synthesized received data.

The complex reception IQ signal output by P wireless receiving unit 107-1, 107-2, ..., 107-P is input into channel estimating unit 112, and, for example, the estimation of the channel matrix between each antenna group in the transmitting side and each antenna group in the receiving side is performed using the preamble that is well known series included in each frame bundle of the RF received signal. This estimated channel matrix is used for a process in spatial demapping unit 108 and space-time code coding/decoding unit 109.

From wireless receiving unit 107-1, 107-2, ..., 107-P, reception level information on each frame bundle of the each RF received signal is output besides above-mentioned complex reception IQ signal. This reception level information is input into beam forming state weight generating unit 30. If reception level information is information associated with the reception level on each frame bundle of the diversity combining received signal, for example, even what kind of thing can well use the information which converted RSSI (Received Signal Strength Information) information or information which converted it into level, transmission gain of the AGC amplifier which wireless receiving unit includes or it into level. Note that, because reception level information can be acquired using baseband reception IQ information when a plurality of symbols of the same frame bundle are used as training signaling, the reception level information except the complex reception IQ signal does not need to output.

Receive controller 113 is the part of the Fixed Wireless Access controller that is a required element of the wireless communication device, and, for example, it outputs a transmission/reception control signal with "1" during a transmission period and "zero" during a reception period to duplexer 18-1, 18-2, ..., 18-P and beam forming state weight generating unit 30.

Beam forming state weight generating unit 30 holds value optimum WAk1, WAk2, ..., WAkM of the pieces of diversity weight combining information to each antenna group, and, based on transmission/reception switching information output from transmit and receive controller 113, different pieces of diversity combining weight information WAk1, WAk2, ..., WAkM is generated to each frame bundle of the training signal to each antenna group Ak1~AkM. Herein, k is integer numbers P or less more than 1. Beam forming state weight generating unit 30 determines value optimum WAk1, WAk2, ..., WAkM of the pieces of diversity combining weight information to each antenna group based on the reception level information which is further output by P wireless receiving units 107-1, 107-2, ..., 107-P.

Each multiplier of weight processing unit 11-k to antenna group Ak1~AkM is given value optimum WAk1, WAk2, ..., WAkM of the pieces of diversity combining weight information every generated antenna group Ak1~AkM. The elaboration of beam forming state weight generating unit 30 is described below. Beam forming state weight generating unit 30 functions as "a diversity combining information generating unit", and it includes "a diversity combining information generating unit for initial acquisition", "a diversity combining information generating unit for training", "reception state judgment unit" and "a diversity combining information value optimum generating unit".

It makes training performed, and training signal section 40 generates the training signal that it is necessary because counterpart wireless communication device does beam forming. The generated training signal is data series for training, and, for example, it may include the information such as PLCP header, the MAC header. The transmitted data for training output from training signal section 40 is input into signal compound unit 101 with transmitted data.

Signal compound unit 101 synthesizes transmitted data and transmitted data for training from training signal section 40 in terms of time, and it is output. When signal compound unit 101 outputs this data in stream disperse unit 102 when transmitted data is given, and transmitted data for training is output from training signal section 40, this is output in stream disperse unit 102.

Weight processing unit 11-k puts a weight process for RF received signal of each antenna group and RF transmit signal according to value optimum WAk1, WAk2, ..., WAkM of pieces of diversity combining weight information given from beam forming state weight generating unit 30. In other words, each weight processing unit 11-k puts a weight processing for RF received signal of each antenna Ak1, Ak2, ..., AkM comprising each antenna group Ak1~AkM, and it is output in RF signal distributing/synthesizing unit 12-k, and it is output in each antenna Ak1, Ak2, ..., AkM which a weight processing is put for RF transmit signal from also RF signal distributing/synthesizing unit 12-k, and includes each antenna group.

The weight processing in the weight processing unit 11-k can be performed by the phase shifting process of 0 degree or 180 degree by use of a 1-bit phase shifter. Weight processing unit 11-k functions as "a diversity combining information setting unit".

RF signal distributing/synthesizing unit 12-k performs distributing/synthesizing processing of the RF transmission/reception signal in each antenna Ak1~AkM of each antenna group. In other words, M RF received signal from each weight processing unit 11-k are provided to the RF signal distributing/synthesizing unit 12-k which outputs the synthesized signal to the duplexer 18-k, and RF transmit signal from the duplexer 18-k is divided into M signals which are provided to each of the weight processing unit 11-k.

Note that, it is in $1/\sqrt{M}$ of the level of the RF received signal which the level of the RF received signal which it is synthesized in RF signal distributing/synthesizing unit 12-k, and is output by duplexer 18-k is caused by impedance transformation, and is input by weight processing unit 11-k. Likewise, as for the level of the RF transmit signal that it is disposed for M, and is output by weight processing unit 11-k, it is to level of RF transmit signal input by duplexer 18-k in $1/\sqrt{M}$. RF signal distributing/synthesizing unit 12-k functions as "signal distributing/synthesizing unit".

Figure 7:
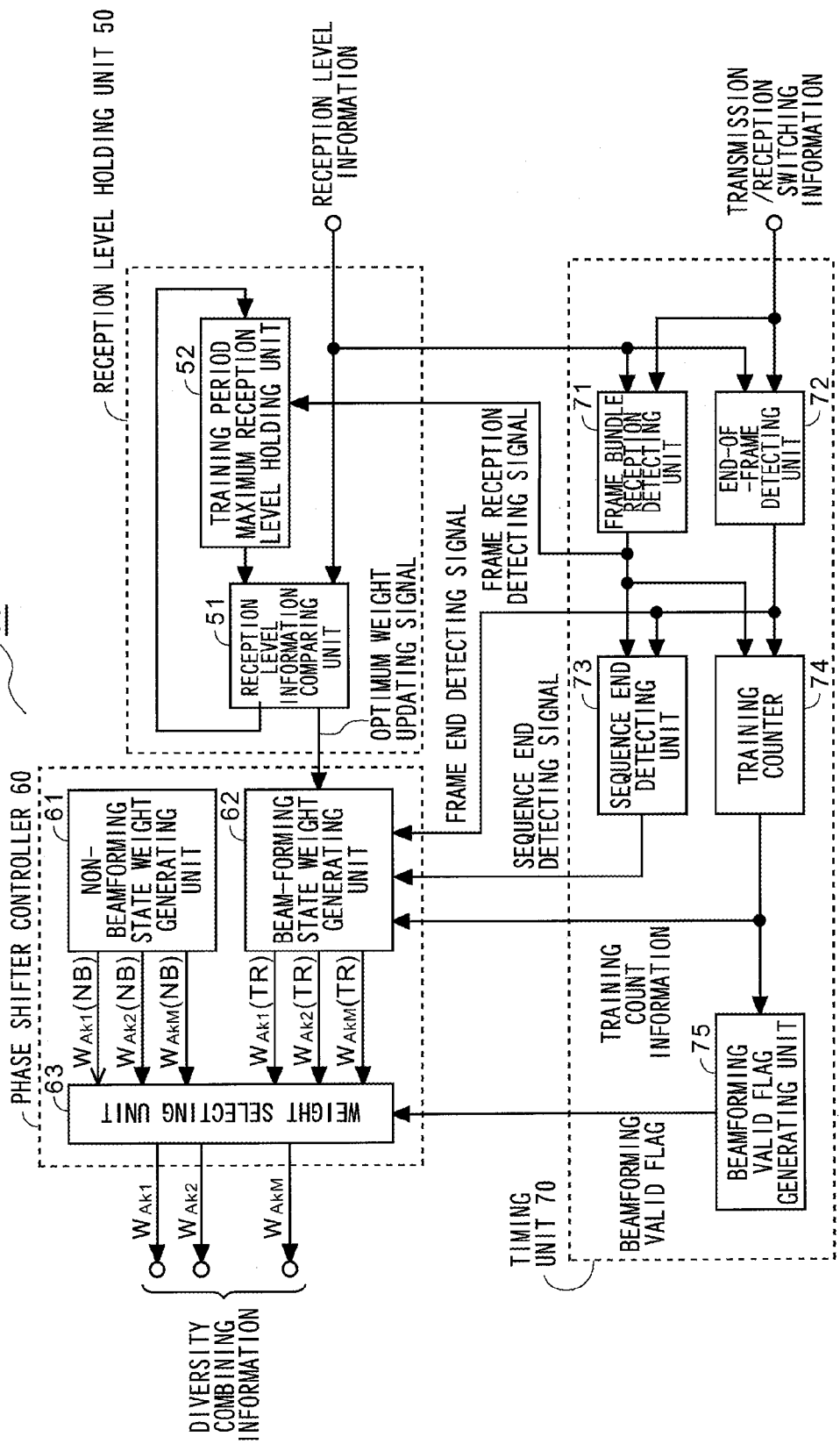
FIG. 7 is a block diagram showing a concrete structure of a beam forming state weight-generating unit of FIG. 6.

FIG. 7 is a block diagram which shows concrete structure of beam forming state weight generating unit 30. Beam forming state weight generating unit 30 works for independence basically every antenna group Ak1~AkM. Herein, configuration of one of that and operation are described.

Really, P unit includes the block construct which is the same as FIG. 7 to beam forming state weight generating unit 30. In other words, beam forming state weight generating unit 30 includes reception level receiving portion 50 of the P unit, phase shifter controller 60 of the P unit and timeliness unit 70, and, through 2-way training signal transmission, value optimum of the pieces of diversity combining weight information for beam forming and diversity combining is determined every antenna group Ak1~AkM.

Reception level receiving portion 50 includes reception level information comparing unit 51 for the antenna group and maximum reception level holding unit 52 in 1 training period. Reception level receiving portion 50 functions as "reception state judgment unit".

Reception level information comparing unit 51 compares the reception level information in each antenna group on each frame bundle of the training signal with the reception level information which the maximum reception level holding unit in 1 training period maintains. And, if reception level information input newly is bigger, the reception level information which maximum reception level holding unit 52 in 1 training period maintains is updated in the said reception level information, and optimum weight updating signal is output to beam forming state weight generating unit 62 of phase shifter controller 60. Note that, for initial value when the biggest reception level information is found in each antenna group, reception level information of the top frame bundle of the training signal is used.

The reception level information which maximum reception level holding unit 52 in 1 training period holds is updated every antenna group sequentially to big reception level information, and, by the training end of time, it is with the greatest reception level information in each antenna group.

Each phase shifter controller 60 includes non-beam forming state weight generating unit 61, beam forming state weight generating unit 62 and weight selecting unit 63. Non-beam forming state weight generating unit 61, beam forming state weight generating unit 62 function as "a for-initial-acquisition diversity combining information generating unit", "a for-training diversity combining information generating unit", respectively, and beam forming state weight generating unit 62 is put together with reception level information comparing unit 51, and it functions as "a diversity combining information value optimum generating unit".

First of all, for gaining to value optimum of the diversity combining weight information from initial state, it is necessary to receive training signal including the frame bundle of (number of antennas of antenna group +1) or more from counterpart wireless communication device. However, the training signal which communications partner and wireless communication device to do transmit from the first may not be received. Thus, even real initial state allows counterpart wireless communication device B to receive at least one training signal (the frame bundle of number of antennas +1) which own wireless communication device A transmits. This transmits a plurality of training signal using different pieces of diversity combining weight information WAk1, WAk2, ..., WAkM, and counterpart wireless communication device B can be implemented by what can receive either training signal. Herein, k is integer numbers P or less more than 1.

Non-beam forming state weight generating unit 61 generates pieces of diversity combining weight information WAk1 (NB), WAk2(NB), . . . , WAkM(NB) in such a non-beam forming state every antenna group Ak1~AkM. In each antenna group Ak1~AkM, pieces of diversity combining weight information WAk1, WAk2, . . . , WAkM when this training signal is transmitted is arbitrary, but it is desirable to change into every training signalization. In the CSMA (Carrier Sense Multiple Access) system, pieces of diversity combining weight information WAk1, WAk2, . . . , WAkM of the non-beam forming state of each antenna group Ak1~AkM is changed in terms of time at random, and pieces of diversity combining weight information WAk1, WAk2, . . . , WAkM in the training signalization start can be used in the training signalization. Specifically, in the case of M, the number of the antenna operates a megabit counter with a self-run clock, and the counter value of the M unit can be used as each pieces of diversity combining weight information WAk1, WAk2, . . . , WAkM. The time interval of this random phase change should set, for example, to 1 μs extent.

If counterpart wireless communication device B receives either training signal, and it is determined, and the value optimum is set, and beam forming does training signal from each antenna county Bn1~BnN, and value optimum of the pieces of diversity combining weight information in each antenna group Bn1~BnN is transmitted, own wireless communication device A can receive the training signal. Note that, if either training signal transmitted using pieces of diversity combining weight information changed at random every antenna group Bn1~BnN like from counterpart wireless communication device B can be received, gaining over to value optimum of the pieces of diversity combining weight information in each antenna group Ak1~AkM is just performed in own wireless communication device A.

The beam forming state weight generating unit 62 changes WAki(TR) among the pieces of diversity combining weight information WAk1(TR), WAk2(TR), . . . , WAkM(TR) corresponding to antennas Ak1~AkM of each antenna group according to training counter information from training counter 74 frame by frame sequentially, and beam forming state weight generating unit 62 holds each pieces of diversity combining weight information WAki(TR) when the reception level information comparing unit 51 output the optimum weight updating signal corresponding to the antennas Ak1~AkM of each antenna group. Note that, it is preferable for it to be assumed that the early value optimum of pieces of diversity combining weight information WAk1(TR), WAk2 (TR), . . . , WAkM(TR) was provided by the nearest past training. The reason is because it is thought that the pieces of diversity combining weight information becomes approximately optimum.

Weight selecting unit 63 selects output pieces of diversity combining weight information WAk1(TR), WAk2(TR), . . . , WAkM(TR) from pieces of diversity combining weight information WAk1(NB), WAk2(NB), . . . , WAkM(NB) output from non-beam forming state weight generating unit 61 or beam forming state weight generating unit 62 based on beam forming valid flag, and it is output as pieces of diversity combining weight information WAk1, WAk2, . . . , WAkM in each antenna group Ak1~AkM.

The beam forming valid flag is "invalidity" in initial state (e.g., "zero"), but it is with "significance" (e.g., "1") by reception of the frame bundle of predetermined number of times, e.g., (number of the antenna +1) the turn. Also, when frame bundles cannot be received enough (e.g., (more than number of the antenna +1) turn) between during a scheduled period, e.g., 100 ms, it is preferable as "invalidity" in beam forming valid flag.

As a result, weight selecting unit 63 of each antenna group Ak1~AkM selects pieces of diversity combining weight information WAk1(NB), WAk2(NB), . . . , WAkM(NB) until frame bundle of the predetermined number of times is received, and, after it, pieces of diversity combining weight information WAk1(TR), WAk2(TR), . . . , WAkM(TR) is selected.

Timeliness unit 70 includes frame bundle reception detecting unit 71, end-of-frame detecting unit 72, sequence end detecting unit 73, training counter 74 and beam forming valid flag generating unit 75.

Transmit and receive control information and reception level information are input into frame bundle reception detecting unit 71 and frame bundle reception detecting unit 71 outputs frame reception detecting signal. For example, the transmission/reception switching information becomes "1" during the period when wireless transmitting unit 106-1, 106-2, ..., 106-P (FIG. 6) become enable and becomes "zero" during the period when wireless transmitting unit 107-1, 107-2, ..., 107-P (FIG. 6) become enable. The reception level information is RSSI (Received Signal Strength Information) information or information such as the transmission gain of the AGC amplifier which P wireless receiving unit 107-1, 107-2, ..., 107P include, respectively. Frame bundle reception detecting unit 71 generates frame reception detecting signal based on detection of the increase of the reception level during the enable period of wireless receiving unit 107-1, 107-2, ..., 107-P. The signal that is obtained by logical addition of reception detection signals in antenna groups as a reception detection signal may be used.

The above-mentioned frame reception detecting signal is given to maximum reception level holding unit 52 in 1 training period of each antenna group Ak1~AkM, sequence end detecting unit 73 and training counter 74. Predetermined width (e.g., it is the signal that logical or did a pulse of 1 μs).) that generated reception initiation timeliness of each frame bundle which frame reception detecting signal was signal showing the reception initiation of each frame bundle, and was detected, for example, based on enhancement of the reception level information in each antenna group Ak~AkM as trigger.

Reception level information of transmission/reception switching information and each antenna group Ak1~AkM is done with input, and end-of-frame detecting unit 72 outputs frame end detecting unit to beam forming state weight generating unit 62, sequence end detecting unit 73 and training counter 74. Predetermined width (e.g., it is the signal that logical or did a pulse of 1 μs).) that generated reception end timeliness of each frame bundle which frame end detecting unit was signal showing the reception end of each frame bundle, and was detected, for example, based on decreasing of the reception level information in each antenna group as trigger. Also, when ACK is used in a training sequence, transmission completion of the ACK is detected by transmission/reception switching information, and a pulse of the predetermined width as trigger may be generated in this.

A send state, reception are in a state, and a transmission/reception switching information is information representing state of wireless communication device such as the power save state. As for frame bundle reception detecting unit 71 and end-of-frame detecting unit 72, transmission/reception switching information can detect a reception end of reception initiation of the frame bundle and the frame bundle using reception level information when it is in reception state.

Sequence end detecting unit 72 outputs a sequence end detecting signal to beam forming state weight generating unit 62 every antenna group. After a sequence end detecting signal is signaling showing the ends of the training, and, for example, a pulse of the frame end detecting unit occurred, for a certain period of time (e.g., e.g., predetermined width (generated by timeliness at the time point when that a pulse of the frame reception detecting signal does not occur in all antenna group in 30 μs) is detected is a pulse of 1 μs).) When ACK is used in a training sequence, transmission completion of the ACK is detected by transmission/reception switching information, and a pulse of the predetermined width as trigger may be generated in this.

When failure occurs in received frame bundle, and it does not reply in ACK to this when it shall reply in ACK to each frame bundle like example shown in FIG. 4, thereat, the training is finished. When transmission/reception switching information is reception state, and it does not change in a send state in response to this even if it is a reply timing of the ACK in all antenna group Ak1~AkM, the pulse of the sequence end detecting signal may be generated.

Training counter 74 outputs training count information to beam forming state weight generating unit 62 every antenna group Ak1~AkM and beam forming valid flag section 75. It is count information of the number of the frame bundle in the training signal, and, for example, as for by 1, the counting value of the counter is incremented by frame end detecting unit, and the training count information is generated by clearing the counting value of the said count "zero" by a sequence end detecting signal.

Beam forming valid flag section 75 outputs the beam forming valid flag showing frame bundle of the predetermined number of times being received every antenna group Ak1~AkM to weight selecting unit 63. The above-mentioned beam forming valid flag is generated based on training count information from training counter 74. As for weight selecting unit 63, in the case of invalidity, beam forming valid flag selects pieces of diversity combining weight information WAk1(NB), WAk2(NB), ..., WAkM(NB) from non-beam forming state weight generating unit 61 of each antenna group Ak1~AkM, and, in the case of significance, beam forming valid flag selects pieces of diversity combining weight information WAk1(TR), WAk2(TR), ..., WAkM(TR) from beam forming state weight generating unit 62 of each antenna group.

Phase shifter controller 60 every antenna group Ak1~AkM works basically to find out pieces of diversity combining weight information WAk1(TR), WAk2(TR), ..., WAkM(TR) where reception level information becomes greatest through training. In other words, in wireless communication device A of the receiving side, each pieces of diversity combining weight information WAki(TR) of pieces of diversity combining weight information WAk1(TR), WAk2(TR), ..., WAkM (TR) of each antenna group Ak1~AkM is changed every frame bundle, and pieces of diversity combining weight information WAk1(TR), WAk2(TR), ..., WAkM(TR) when reception level information grew big in the process every antenna group Ak1~AkM is maintained.

When training sequence is completed, pieces of diversity combining weight information of each antenna group Ak1~AkM are set to WAk1(TR), WAk2(TR), ..., WAkM (TR) which are the are equal to when reception level information became maximum is held in each set of antenna Ak1~AkM. In the 2-way transmission of the data following training, pieces of diversity combining weight information WAk1(TR), WAk2(TR), ..., WAkM(TR) maintained every antenna group Ak1~AkM is read, and it is provided in weight processing unit 11-k.

FIG. 8 is timing chart which shows an example of the operation of beam forming state weight generating unit 30 of FIG. 7. Herein, operation of antenna group Ak1~AkM is shown. Similar operation performed in the other antenna group independently.

Signal A1, A2, A3, A4 of antenna Ak1, Ak2, Ak3, Ak4 where FIGS. 9A, 9B, 9C, 9D and 9E include one antenna group Ak1~AkM are the FIG. showing the state that diversity combining (addition of vector) is considered to be, and diversity combining received signal in antenna group Ak1~AkM is generated. Herein, the number of antenna comprising one antenna group Ak1~AkM is 4, and pieces of diversity combining weight information to the signal of each antenna Ak1, Ak2, Ak3, Ak4 is done with WAk1, WAk2, WAk3, WAk4 in antenna group Ak1~AkM of one, and, in wireless communication device A, they assume the case which is 1 bit. Also it is assumed that, the value of the reception level information become larger when reception level is higher. In this case, weight processing unit 11-k is included of the 1 bit phase shifter of antenna several minutes, and, for example, each phase shifter is controlled depending on pieces of diversity combining weight information WAk1, WAk2, WAk3, WAk4 of for each 1 bit by a phase shift quantity straight angle when it "is phase shift quantity zero degree, 1" when pieces of diversity combining weight information "is zero".

In wireless communication device A, diversity receives training frame bundle 1 from wireless communication device B of the communications partner using present pieces of diversity combining weight information WAk1,WAk2, WAk3,WAk4, and sequential diversity reception does a plurality of training frame bundle 2-1~2-4 while changing each pieces of diversity combining weight information WAki of pieces of diversity combining weight information WAk1, WAk2,WAk3,WAk4. And, the value optimums of the pieces of diversity combining weight information WAk1, WAk2, WAk3, WAk4 at that time are determined based on reception level information. And, these value optimum of determined pieces of diversity combining weight information WAk1, WAk2, WAk3, WAk4 are used for beam forming when transmitting data packets and diversity combining when receiving data packets.

After it is really the top frame bundle that training is performed, and training frame bundle 1 received this, training is started, and reception level information at that time is measured. Training frame bundle 1 can be soaked with information such as a source address, a destination address and the frame bundle classification, and reception level information when diversity reception was done in the pieces of diversity combining weight information of the present conditions using this is acquired. It is used to measure reception level information when following training frame bundle 2-1~2-4 change the diversity combining weight information by a predetermined algorithm, and diversity reception was done.

When, as for the reception level information, is started a sensitivity control in an AGC amplifier of the wireless receiving unit, usually for relatively short time (e.g., it changes in 10 μs).) The sensitivity control of the AGC amplifier occurs in reception initiation of the training frame bundle or the reception end, but, for example, as well as it, it may occur under the influence of noise. Also, when it fails in the reception of the frame header after the sensitivity control of the AGC amplifier was started by reception initiation of the training frame bundle, the sensitivity control of the AGC amplifier may be started several times in the said frame bundle reception period. By the measurement of the reception level information, these points are considered.

First of all, beam forming state weight generating unit 62 generates pieces of diversity combining weight information 0 (WAk1=1, WAk2=0, WAk3=1, WAk4=1) while training count information is "0", and diversity reception of training frame bundle 1 from counterpart wireless communication device B is performed by using the pieces of diversity combining weight information 0. For example, it is desirable that the diversity combining weight information 0 is one which is obtained by the nearest past training and used at the reception of the data frame in front. The reason is because it is thought that the diversity combining weight information in the past beam forming becomes approximately optimum at this time. Any the diversity combining weight information can be used if beam forming has not be made yet. Reception level information(100) of this time is held with for-1 training period maximum reception level holding unit 52.

Figure 9A:
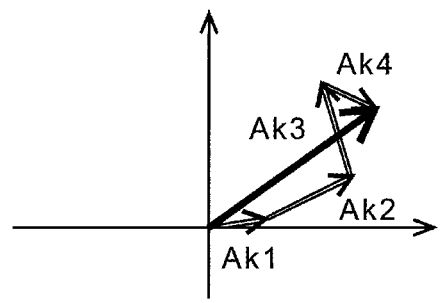
FIG. 9A is a view showing the circumstances in which a diversity combining received signal is generated in the first embodiment.

FIG. 9A shows diversity combining (addition of vector) of the received signal of each antenna Ak1, Ak2, Ak3, Ak4 of this time. Note that, the reception level information before receiving training frame bundle 1 is "5". This may correspond to a thermal noise level. Also, after receiving training frame bundle 1, the reception level information of the period before receiving next frame bundle 2-1 falls to "3". This may correspond to a thermal noise level, too. Likewise, the reception of thermal noise may occur between the receptions of the training frames.

Then, when end-of-frame of frame bundle 1 is detected, and training count information becomes "1", the beam forming state weight generating unit generates diversity combining weight information 1 (WAk1=0, WAk2=0, WAk3=1, WAk4=1). Among the diversity combining weight information 1, only diversity combining weight information WAk1 is inverted. The reception level information(88) of training frame 2-1 is obtained using diversity combining weight information 1 is smaller than the reception level information(100) which is obtained using diversity combining weight information 0.

Figure 9B:
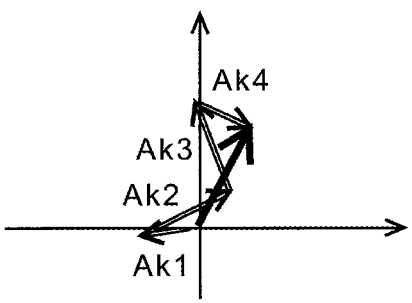
FIG. 9B is a view showing the circumstances in which a diversity combining received signal is generated in the first embodiment.

FIG. 9B shows the diversity combining of the received signals of each antenna Ak1, Ak2, Ak3, Ak4 at this time. The change of this reception level information does not depend on the change of channel matrix, but it depends on the change of diversity combining weight information. Because the reception level information(88) which is obtained using diversity combining weight information 1 is smaller than the reception level information(100) which is obtained using diversity combining weight information 0, diversity combining weight information WAk1 is determined to be "1". In this case, the reception level information(100) held in the maximum reception level holding unit in 1-training period is not updated.

Next, when training count information becomes "2", the beam forming state weight generating unit generates diversity combining weight information 2(WAk1=1, WAk2=1, WAk3=1, WAk4=1). As for diversity combining weight information 2, only diversity combining weight information WAk2 is inverted among the pieces of diversity combining weight information 0. The reception level information(70) of training frame 2-2 which is obtained using diversity combining weight information 2 is smaller than the reception level information(100) which is obtained using diversity combining weight information 0.

Figure 9C:
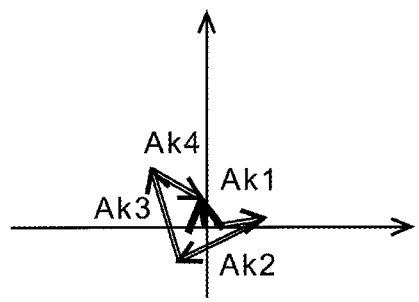
FIG. 9C is a view showing the circumstances in which a diversity combining received signal is generated in the first embodiment.

FIG. 9C shows the diversity combining of the received signals of each antenna Ak1, Ak2, Ak3, Ak4 at this time. Because the reception level information(70) which is obtained using diversity combining weight information 2 is smaller than reception level information(100) which is obtained using diversity combining weight information 0, diversity combining weight information WAk2 is determined to "0". The reception level information(100) held in the maximum reception level holding unit in 1-training period is not updated.

Then, when training count weight information becomes "3", the beam forming state weight generating unit generates diversity combining weight information 3(WAk1=1, WAk2=0, WAk3=0, WAk4=1). In the diversity combining weight information 3, only pieces of diversity combining weight information WAk3 is inverted compared with diversity combining weight information 0. The reception level information of training frame 2-3 which is obtained using diversity combining weight information 3 is 102, which is greater than that of diversity combining weight information 0(100).

Figure 9D:
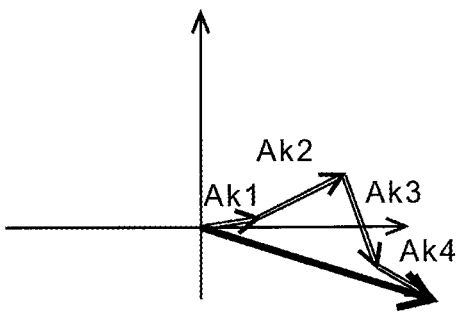
FIG. 9D is a view showing the circumstances in which a diversity combining received signal is generated in the first embodiment.

FIG. 9D shows the diversity combining of the received signals of each antenna A$k1$, A$k2$, A$k3$, A$k4$ at this time. Because the reception level information of diversity combining weight information 3(102) is greater than that of diversity combining weight information 0(100), the pieces of diversity combining weight information WA$k3$ is determined to "0". The reception level information held in the maximum reception level holding unit in 1-training period is updated to "102". Also, optimum weight updating signal becomes "1" at the time when the reception level information of the training frame exceed the maximum reception level information after the output of frame reception detecting signal. Because optimum weight updating signal is output during reception of training frame 2-3 by reception level information comparing unit, the beam forming state weight generating unit holds diversity combining weight information 3(WA$k1$=1, WA$k2$=0, WA$k3$=0, WA$k4$=1).

Then, when training count weight information becomes "4", the beam forming state weight generating unit generates diversity combining weight information 4(WA$k1$=1, WA$k2$=0, WA$k3$=0, WA$k4$=0). In diversity combining weight information 4, only diversity combining weight information WA$k4$ is inverted compared with diversity combining weight information 3. The reception level information(90) of training frame 2-4 which is obtained using diversity combining weight information 4 is 90, which is smaller than that of frame 2-3 which is obtained using diversity combining weight information 3(102).

Figure 9E:
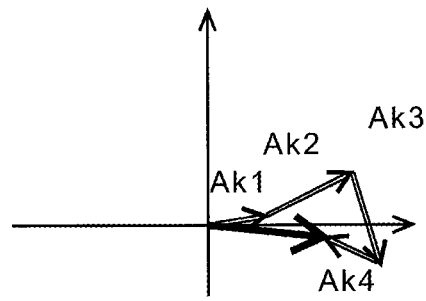
FIG. 9E is a view showing the circumstances in which a diversity combining received signal is generated in the first embodiment.

FIG. 9E shows the diversity combining using the received signals of each antenna A$k1$, A$k2$, A$k3$, A$k4$ at this time. Because the reception level information of diversity combining weight information 4(102) is smaller than that of diversity combining weight information 3(90), so diversity combining weight information WA$k4$ is determined to "1". And the reception level information (102) held in the maximum reception level holding unit in 1-training period is not updated.

When frame end detecting unit to training frame 2-4 is output, training count information becomes "5", and it is included for the reception of the next training frame, and only pieces of diversity combining weight information WA$k1$ is inverted among the pieces of diversity combining weight information 3. And diversity combining weight information is set as WA$k1$=0, WA$k2$=0, WA$k3$=0, WA$k4$=1. Because there is no training frame just after the training frame 2-4 and a sequence end detecting signal becomes "1", diversity combining weight information is set to the optimal value of WA$k1$=1, WA$k2$=0, WA$k3$=0, WA$k4$=1, which will be used on the transmission of the next data frame or on the reception of next data frame.

As a result of above-mentioned training procedure, it is found that the reception level information becomes maximum value, when using diversity combining weight information 3(WA$k1$=1, WA$k2$=0, WA$k3$=0, WA$k4$=1), that is to say, diversity combining weight information 3 is the value optimum of the diversity combining weight information at this time. And this optimal diversity combining weight information 3(WA$k1$=1, WA$k2$=0, WA$k3$=0, WA$k4$=1) is provided to weight processing unit. As a result, beam forming and diversity combining is performed using optimal combining weight information 3.

As channel matrix changes with time to time, it is necessary to keep optimizing the pieces of diversity combining weight information WA$k1$, WA$k2$, WA$k3$, WA$k4$. As described above, when receiving plural training frames, if greater reception level information than before is found, the pieces of diversity combining weight information used on receiving that training frame is set to optimum pieces of diversity combining weight information.

Thus, during the reception of training sequence, pieces of diversity combining weight information of each antenna is changed sequentially, and value optimum of the pieces of diversity combining weight information is found out according to an algorithm to examine reception level information at that time, and this is used for value optimum of the pieces of diversity combining weight information on beam forming and diversity combining. According to this procedure, value optimum of the pieces of diversity combining weight information to the signal received on each antenna can be determined using (number of antennas in an antenna group +1) training frames in the shortest case.

Hereinafter, second embodiment of the wireless communication system according to the present invention will be described below. In the first embodiment, a description on the determining procedure of the value optimum of the pieces of diversity combining weight information in the case that multipliers of weight processing unit 11-k are 1-bit phase shifters and diversity combining is performed using equal gain combining method is provided.

The multiplier of weight processing unit 11-k is not limited to 1 bit phase shifter, and, n-bit phase shifter (n is a natural number more than or equal to 2) is can be used. For example, in case of n=2, the pieces of diversity combining weight information take four values of two bits as "00" ("0"), "01" ("1"), "10" ("2"), "11" ("3"), and, the weight processing unit, for example, output an input signal without being changed or after being subjected to phase rotation of +90 degree or +180 degree (phase inversion) or −90 degree depending on the pieces of diversity combining weight information "00", "01", "10", "11".

In the case that n-bit phase shifters (n is a natural number more than or equal to 2) are used, according to the algorithm in which the pieces of diversity combining weight information are changed sequentially and the reception level information is obtained at that time, the value optimum of the pieces of diversity combining weight information can be obtained, and these value optimum of the pieces of diversity combining weight information can be used in the data transmission and data reception like first embodiment.

In the second embodiment described below, n binary digit phase shifter (n uses natural numbers) 2 or more to a multiplier of weight processing unit 11-k, and value optimum of the pieces of diversity combining weight information when diversity combining is performed by an equal transmission gain compound is determined.

As mentioned earlier, when natural number) that 2 is provided or more n binary digit phase shifter (n is used for a multiplier of weight processing unit 11-k, pieces of diversity combining weight information is changed sequentially, and value optimum of the pieces of diversity combining weight information can be always found out according to an algorithm to examine reception level information at that time. However, it allows value optimum of diversity combining weight information to each signal of a multiple antennas comprising each radio antenna group by training sub-signal of the unit (number of the radio antennas +1) to be determined in the second embodiment.

Figure 10:
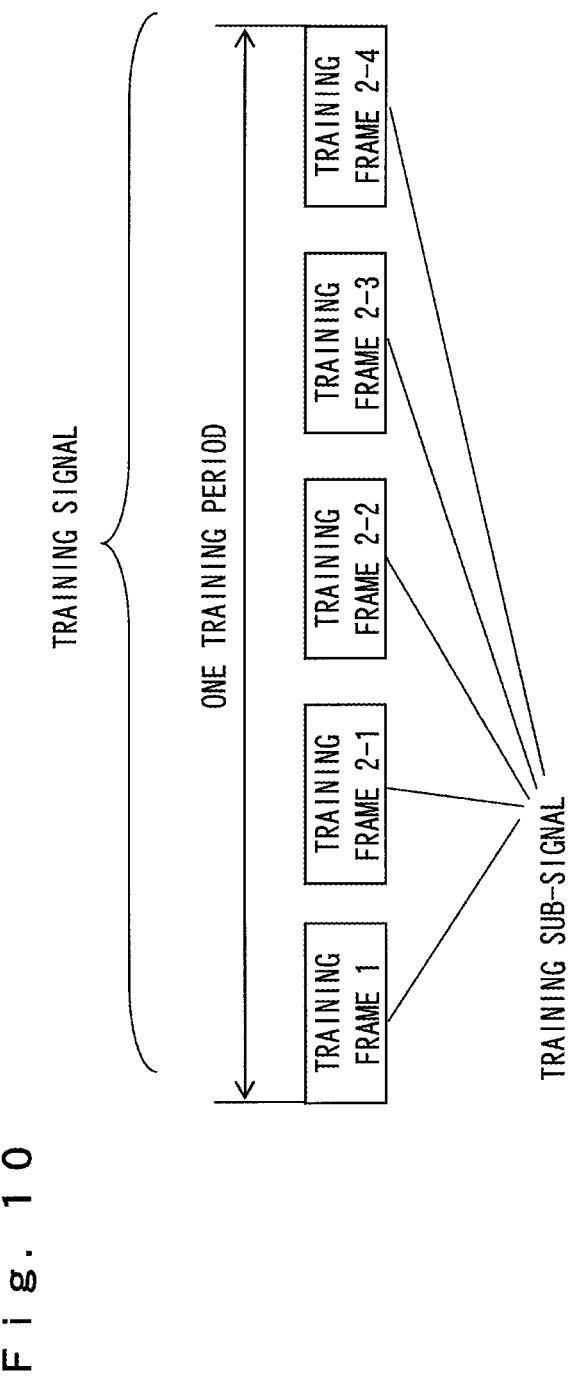
FIG. 10 is a view showing another example of the training signal.

The value optimum decision operation of the pieces of diversity combining weight information does not depend on value of n, but it is assumed simply n=2 for, and training signal shown in FIG. 10 shall be used. It is used to obtain both baseband reception IQ information every antenna group when the training signal changes both and the present pieces of diversity combining weight information of baseband reception IQ information every antenna group when diversity reception was done in the present pieces of diversity combining weight information or baseband reception IQ information and the reception level information by a predetermined algorithm, and diversity reception was done or baseband reception IQ information and reception level information.

Here, baseband reception IQ information is complex transfer functions between baseband transmission IQ signal and the baseband reception IQ signal and the information that it is, and, for example, it is baseband reception IQ signal itself corresponding to the preamble included in each training frame. As discussed below, Replacing with baseband reception IQ signal, correlation information of baseband reception IQ signal and the predetermined specific information series can be used.

Each radio communication device can determine value optimum of diversity combining weight information to make diversity reception state every radio antenna configuration group by the time point best by receiving the training signal in 1 training period.

The training signaling (FIG. 10) of this example includes a plurality of training frame 1, 2-1~2-4 within 1 training period. In this case, training sub-signal is each training frame.

For an embodiment of such a signal, there is an antenna numerical signal in IEEE802.11n (Draft 5.0), and such a signal can be used as training signal. The ACK frame bundle is not used in the training signaling of this case, and training frame of the units is always (number of the radio antennas +1 of the radio communication device of the receiving side) transmitted intermittently.

Top training frame 1 can be soaked with information such as a source address, a destination address and the frame bundle classification. Using this training frame 1, baseband reception IQ information when diversity reception was done in the present pieces of diversity combining weight information or both of baseband reception IQ information and reception level information are acquired.

It is a thing to acquire both baseband reception IQ information every antenna group when training frame 2-1~2-4 changes pieces of diversity combining weight information by a predetermined algorithm, and diversity reception was done or baseband reception IQ information and reception level information.

In the following, both baseband reception IQ information and reception level information are acquired, and when it is determined, it is available, and value optimum of the pieces of diversity combining weight information is described.

Because it is the same as FIG. 1, the basic structure of the wireless communication system of the second embodiment describes the operation with reference to FIG. 1. In FIG. 1, for example, in radio communication device A, diversity reception does training frame 1, 2-1~2-4 which radio communication device B transmits when value optimum of diversity combining weight information in radio communication device A is determined. Leave the diversity reception using present pieces of diversity combining weight information WAk1, WAk2, . . . , WAkM, and, as for training frame 1, as for training frame 2-1~2-4, it is done diversity reception using pieces of diversity combining weight information WAk1, WAk2, . . . , WAkM which changed present pieces of diversity combining weight information WAk1, WAk2, . . . , WAkM by a predetermined algorithm every antenna group by every antenna group. Pieces of diversity combining weight information WAk1, WAk2, . . . , value optimum of WAkM are determined based on both provided in these diversity reception baseband reception IQ information and reception level information.

Also, radio communication device B transmits training signal using the approximately most suitable diversity combining weight information acquired by the nearest past training from each radio antenna Bn1, Bn2, . . . , BnN of each radio antenna group. Radio communication device A does the diversity combining weight information of this radio communication device B with settlement of 1 training period to update to value optimum of diversity combining weight information by the time point. Note that, when communication between radio communication device A, B is from real initial state, training signal is transmitted and received each other, and radio communication device A, B enables gaining over to value optimum of diversity combining weight information to be described below.

At first radio communication device A receives in radio antenna Ak1, Ak2, . . . , AkM of the M book which radio antenna configuration group Ak1~AkM (k=1~P) includes first training frame 1 transmitted by radio antenna group Bn1~BnN (n=1~Q) included by radio communication device B. Each multiplier of weight processing unit 11-k every antenna group multiplies pieces of diversity combining weight information WAk1, WAk2, . . . , WAkM every antenna group by each received signal from each antenna Ak1, Ak2, . . . , AkM of each antenna group.

If each multiplier just outputs an input signal if pieces of diversity combining weight information is "00", and pieces of diversity combining weight information is "01", an input signal is rotated +90 degree, and it is output. Also, an input signal is each rotated phase inversion, −90 degrees, and it is output when pieces of diversity combining weight information is "10" or "11". For pieces of diversity combining weight information WAk1, WAk2, . . . , WAkM when first training frame 1 is received, a thing acquired by the nearest past training is used. It is thought that this pieces of diversity combining weight information WAk1, WAk2, . . . , WAkM almost becomes the value optimum under the present conditions. However, at this time, pieces of diversity combining weight information WAk1, WAk2, . . . , WAkM to use can be set optionally. Pieces of diversity combining weight information WA1, WA2, . . . , WAM are further updated after diversity reception of continuing a plurality of training frame 2-1~2-4 to an optimum value to be described below.

RF signal distributing/synthesizing unit 12-k every antenna group adds the received signal which pieces of diversity combining weight information WAk1, WAk2, . . . , WAkM is multiplied by weight processing unit 11-k every antenna group, and diversity combining received signal RA every antenna group is generated.

Then, every antenna group, a phase reverses only pieces of diversity combining weight information WAk1 to the signal of one antenna, e.g., antenna Ak1 from value optimum WAk1 of the former pieces of diversity combining weight information. Using this new pieces of diversity combining weight information WAk1, WAk2, . . . , WAkM, diversity receives lasting training frame 2-1, and both baseband reception IQ information and reception level information of this time are acquired.

Then, a phase reverses only pieces of diversity combining weight information WAk2 to the signal of one antenna except antenna Ak1, e.g., antenna Ak2 from value optimum WAk2 of the former pieces of diversity combining weight information. Using this new pieces of diversity combining weight information WAk1, WAk2, . . . , WAkM, diversity receives lasting training frame 2-2, and both baseband reception IQ information and reception level information of this time are acquired.

Likewise, each training frame bundle 2-3, 2-4 is received sequentially, and both baseband reception IQ information and reception level information of this time are acquired.

Thus, training frame 2-1~2-M is received sequentially, and, to the frequency, sequential modification (phase inversion) does pieces of diversity combining weight information WAk1, WAk2, ..., WAkM to the signal of antenna Ak1, Ak2, ..., AkM every antenna group one by one, and both baseband reception IQ information and reception level information at this time are acquired every antenna group.

Figure 11:
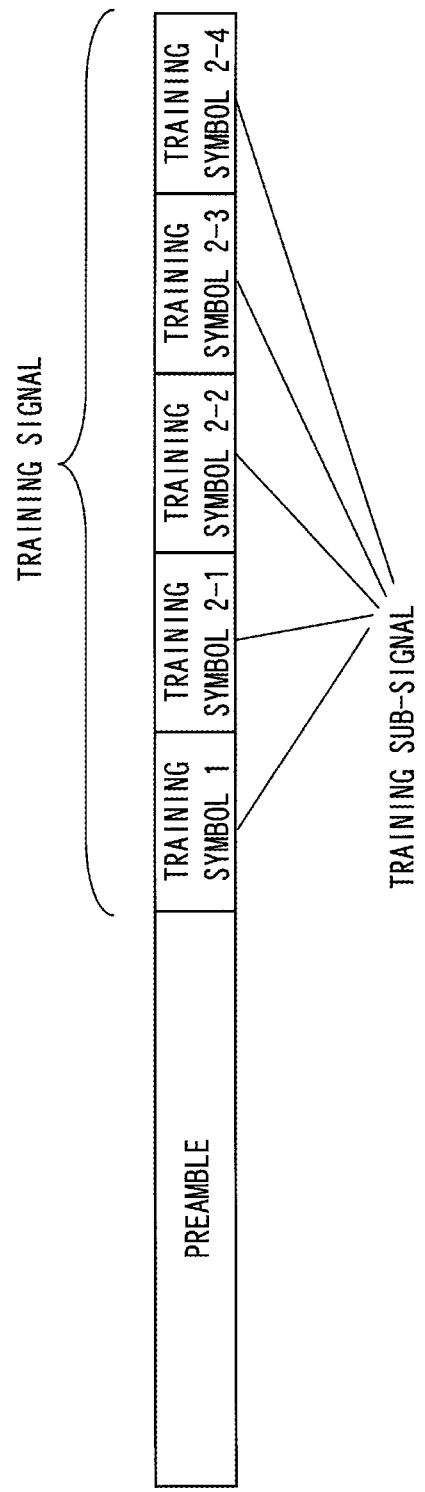
FIG. 11 is a view showing still another example of the training signal.

When a plurality of training frame was used as training signaling in the above, it was accompanied, and it was described. However, as training signaling, both baseband reception IQ information and reception level information should be able to be acquired therewith, and frame bundle, symbol, a subcarrier, scattering signal can be used at will. FIG. 11 shows example of the training signal comprising a plurality of training symbols. In this case, the training sub-signal is each training symbol, and those symbols are known in a receiving side. In this case, using training symbol 1, both baseband reception IQ information and reception level information when diversity reception was done in the present pieces of diversity combining weight information are acquired. Also, using training symbol 2-1~2-4, both baseband reception IQ information and reception level information when pieces of diversity combining weight information is changed by a predetermined algorithm, and diversity reception was done are acquired.

FIGS. 12A, 12B, 12C, 12D and 12E represented receipt information every antenna group in the receiving side when baseband transmission IQ information "1" was transmitted from the transmitting side typically. Herein, a radio antenna comprising one radio antenna group in radio communication device is assumed four of them of Ak1, Ak2, ..., Ak4, and receipt information of each radio antenna Ak1, Ak2, ..., Ak4 is transcribed with A1, A2, ..., A4. This is similar to FIGS. 9A, 9B, 9C, 9D and 9E.

Figure above (a) is an example of receipt information rA1 to training frame 1, and figure above (b)~(e) are examples of receipt information rA2-1, rA2-2, ..., rA2-4 of training frame 2-1~2-4. Receipt information rA1, rA2-1, rA2-2, ..., rA2-4 can be obtained from baseband reception IQ signal to the known pattern such as preambles included in each training frame. Also, reception level information of each frame bundle that is the magnitude of receipt information rA1, rA2-1, rA2-2, ..., rA2-4 can be obtained using information of the AGC transmission gain in each frame bundle reception.

With training frame 1, the thing which performed vector addition of received signal A1, A2, ..., A4 is received. The thing which performed vector addition of received signal −A1 (inversion vectoring of A1), A2, ..., A4 is received with training frame 2-1. The thing which performed vector addition of received signal A1, −A2 (inversion vectoring of A2), ..., A4 is received with training frame 2-2. It is similar about training frame 2-3, 2-4. In radio communication device A, value optimum WAk1, WAk2, ..., WAkM of diversity combining weight information to the signal of each radio antenna Ak1, Ak2, ..., AkM of every radio antenna configuration group is determined using both baseband reception IQ information and reception level information to each training frame of the training signal. It is described below about the decision technique.

Then, radio communication device A transmits training frame 1, 2-1~2-4 to radio communication device B using value optimum WAk1, WAk2, ..., WAkM of diversity combining weight information every this radio antenna group. Radio communication device B receives training frame 1, 2-1~2-4 transmitted by radio antenna group Ak1~AkM (k=1~P) of the P unit of radio communication device A, and value optimum WBn1, WBn2, ..., WBnN of diversity combining weight information to the signal of each radio antenna Bn1, Bn2, ..., BnN (n=1~Q) of every radio antenna configuration group is determined this time. The operation is the same as the operation of wireless communication device A. Further, by performing two-way training signal transfer between wireless communication device A and B, the value optimum of the diversity combining weight information WAk1, WAk2, ..., WAkM and WBn1, WBn2, ..., WBnN can be optimized in each antenna group.

The wireless communication device A and B perform beam forming and diversity reception on transmitting data or on receiving data using the value optimum of diversity combining weight information WAk1, WAk2, ..., WAk4 and WBn1, WBn2, ..., WBn4 of each antenna group which are determined as mentioned above.

Using both baseband reception IQ information and reception level information which are obtained as mentioned above, the value optimum of the pieces of diversity combining weight information corresponding to each antenna Ak1, Ak2, ..., AkM of each antenna group WAk1, WAk2, ..., WAkM can be determined as follows.

Baseband reception IQ information rA1 of any antenna group on the reception of training frame 1 is expressed by numerical expression (2).

[EQUATION 2]

$$r_{A1} = (A1 + A2 + A3 + A4)/C_1 \qquad (2)$$

Herein, C1 is the gain in the receiver of the antenna group of the wireless communication device A on the reception of training frame 1. With the standardization using C1, baseband reception IQ information rA1 takes almost the same value not depending on the reception level.

On the other hand, baseband reception IQ information rA2-1, rA2-2, ..., rA2-4 of the antenna group on the reception of training frames 2-1~2-4 are expressed by numerical expression (3).

[EQUATION 3]

$$r_{A2-1} = (-A1 + A2 + A3 + A4)/C_{2-1}$$

$$r_{A2-2} = (A1 - A2 + A3 + A4)/C_{2-2}$$

$$r_{A2-3} = (A1 + A2 - A3 + A4)/C_{2-3}$$

$$r_{A2-4} = (A1 + A2 + A3 - A4)/C_{2-4} \qquad (3)$$

Herein, C2-1, C2-2, ..., C2-4 is the gain in the receiver of the antenna group of the wireless communication device A on the reception of training frames 2-1~2-4. With the standardization using C2-1, C2-2, ..., C2-4, baseband reception IQ information rA2-1, rA2-2, ..., rA2-4, take almost the same value with each other not depending on reception level.

The gain CX in the receiver of the antenna group can be obtained by numerical expression (4) using the reception level information PX of the antenna group.

[EQUATION 4]

$$C_X = k/P_X \qquad (4)$$

Herein, k is a constant. Numerical expression (5) is obtained by substituting numerical expression (4) for expression (2), (3).

[EQUATION 5]

$$r_{A1} = P_1 \times (A1+A2+A3+A4)/k$$
$$r_{A2-1} = P_{2-1} \times (-A1+A2+A3+A4)/k$$
$$r_{A2-2} = P_{2-2} \times (A1-A2+A3A4)/k$$
$$r_{A2-3} = P_{2-3} \times (A1+A2-A3+A4)/k$$
$$r_{A2-4} = P_{2-4} \times (A1+A2+A3-A4)/k \quad (5)$$

Numerical expression (6) is provided than numerical expression (5).

[EQUATION 6]

$$A1 = k \times (r_{A1}/P_1 - r_{A2-1}/P_{2-1})/2$$
$$A2 = k \times (r_{A1}/P_1 - r_{A2-2}/P_{2-2})/2$$
$$A3 = k \times (r_{A1}/P_1 - r_{A2-3}/P_{2-3})/2$$
$$A4 = k \times (r_{A1}/P_1 - r_{A2-4}/P_{2-4})/2 \quad (6)$$

Herein, A1, A2, ..., A4 is complex vector, and the phases of these vectors are denoted by θ1, θ2, ..., θ4, respectively.

The pieces of diversity combining weight information WAk1, WA2, ..., WAk4 can be optimized by updating the pieces of diversity combining weight information WAk1, WAk2, ..., WAk4 so as to the phases of four vectoring A1, A2, ..., A4 become the same direction.

For example, the pieces of diversity combining weight information WAk1, WAk2, ..., WAk4 can be optimized by putting these four vectorial direction together with the reception information rA1 of training frame 1 of the antenna group. In this case, using a phase of receipt information rA1 θ0, pieces of diversity combining weight information WAk1, WAk2, ..., WAk4 can be updated by numerical expression (7).

[EQUATION 7]

$$W'_{A1} = W_{A1} \times \exp j(\theta 0 - \theta 1)$$
$$W'_{A2} = W_{A2} \times \exp j(\theta 0 - \theta 2)$$
$$W'_{A3} = W_{A3} \times \exp j(\theta 0 - \theta 3)$$
$$W'_{A4} = W_{A4} \times \exp j(\theta 0 - \theta 4) \quad (7)$$

θ0, θ1, θ2, ..., θ4 are given by numerical expression (8). Practically, the quantized phase with four-bit of θ0, θ1, θ2, ..., θ4 is used as the pieces of diversity combining weight information.

[EQUATION 8]

$$\theta 0 = \arg(r_{A1})$$
$$\theta 1 = \arg(r_{A1}/P_1 - r_{A2-1}/P_{2-1})$$
$$\theta 2 = \arg(r_{A1}/P_1 - r_{A2-2}/P_{2-2})$$
$$\theta 3 = \arg(r_{A1}/P_1 - r_{A2-3}/P_{2-3})$$
$$\theta 4 = \arg(r_{A1}/P_1 - r_{A2-4}/P_{2-4}) \quad (8)$$

In the explanation mentioned above, both of baseband reception IQ information and reception level information are used to determine value optimum WAk1, WAk2, ..., WAkM of the pieces of diversity combining weight information, but even if reception level information is not obtained, value optimum WAk1, WAk2, ..., WAkM of the pieces of diversity combining weight information can be determined. For example, in the case that the training signal of FIG. 11 is used, the AGC gain of the reception of each training signal is almost the same value (C1=C2-1=C2-2=C2-3=C2-4) because the operation of the reception AGC completes using a part of the training field of the head of the first training frame. Baseband reception IQ information rA1, rA2-1, rA2-2, ..., rA2-4 on the reception of training symbol 1, 2-1~2-4 is expressed by numerical expression (9), and relative received signal of each antenna can be demanded from only baseband reception IQ information rA1, rA2-1, rA2-2, ..., rA2-4.

[EQUATION 9]

$$r_{A1} = (A1+A2+A3+A4)/C_1$$
$$r_{A2-1} = (-A1+A2+A3+A4)/C_1$$
$$r_{A2-2} = (A1-A2+A3+A4)/C_1$$
$$r_{A2-3} = (A1+A2-A3+A4)/C_1$$
$$r_{A2-4} = (A1+A2+A3-A4)/C_1 \quad (9)$$

Note that, when diversity combining weight information to be found by numerical expression (7) are used, it works so that vectorial direction of the received signal in each antenna of the antenna group coincides with received information rA1 of training frame 1 in the antenna group. Generally, the vectorial direction of receipt information rA1 in training frame 1 is different every antenna group. After the dispersion of the vectorial direction in receipt information rA1 output by wireless receiving unit 107-1~107-P was compensated for in spatial demapping unit 108 just after, and, in the reception in wireless communication device A, was prepared to identification, is done diversity combining. However, signal from each antenna group of wireless communication device A is not necessarily synthesized in the reception in wireless communication device B in phase this time because vectorial sending signal for identification is applied in the transmission from wireless communication device A in wireless transmitting unit 106-1~106-P. Thus, for example, vectoring of the received signal with training frame 1 may use the thing which rotated complex waits-type, to be found more as diversity combining weight information to enter the first quadrant (7). For example, when and received signal vector of training frame 1 is with the second quadrant (7) pieces of diversity combining weight information which-type, is found supposes pieces of diversity combining weight information with each "11", "00", "01", "10" when it is with each "00", "01", "10", "11", it is preferable.

Also, value optimum WA1, WA2, ..., WAM of the pieces of diversity combining weight information can be determined based on both correlative information of diversity combining received signal and the series of predetermined information or said correlation information and reception level information.

For example, when training signal of FIG. 10 is used, value optimum WAk1, WAk2, ..., WAkM of the pieces of diversity combining weight information can be determined using both correlation information and reception level information of diversity combining received signal and the predetermined information series.

Figure 13:
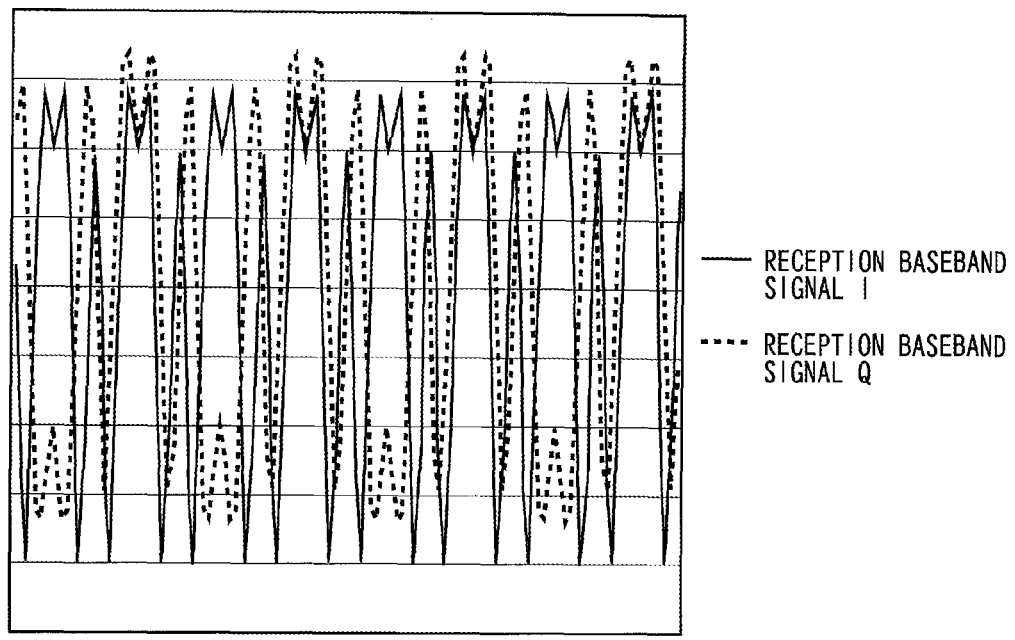
FIG. 13 is a view showing a baseband IQ signal in a preamble for burst detection, AGC operation and timing synchronization that are used in a wireless LAN.
Figure 14:
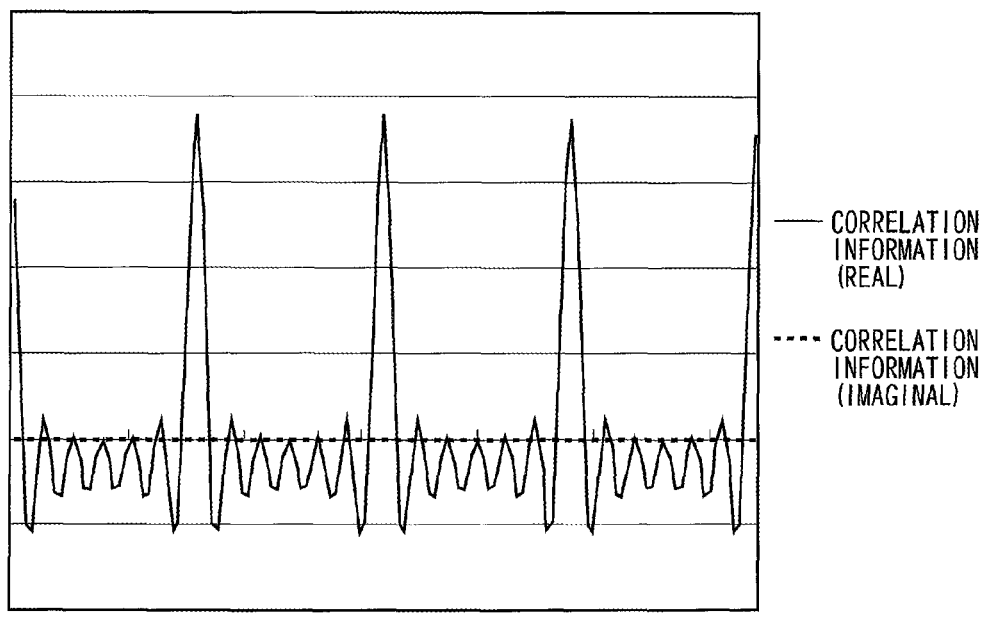
FIG. 14 is a view showing an output signal of a correlation arithmetic operation when no multi-path wave exists.

FIG. 13 shows burst detection to be used in a wireless LAN, AGC operation and the baseband IQ signal in the preamble for timeliness synchronization. Here, approximately four periods of minute of the basic pattern is illustrated, but ten periods of minute of the basic pattern is transmitted as a preamble in the wireless LAN. On the receiving end, first of all, after burst detection, AGC operation is performed. Also, for timeliness synchronism, correlation with the signal that it is a complex conjugate of baseband reception IQ signal and the basic pattern is operated. FIG. 14 shows an output signal of the correlative arithmetic when multi-path wave does not exist.

For example, when training signal of FIG. 10 is used, an output signal of the correlation arithmetic by the timeliness of the correlation peak can be used as a substitute for a thing of baseband reception IQ information rA1, rA2-1, rA2-2, ..., rA2-4 in the expression (6).

When an output signal of the correlative arithmetic by the timeliness of the correlative peak is done with rA1, rA2-1, rA2-2, ..., rA2-4, and a phase of output signal rA1 is done with 0 zero, even this case should update pieces of diversity combining weight information WAk1, WAk2, ..., WAk4 by numerical expression (7).

Also, for example, the reception AGC operation is completed using part of the training field of the frame bundle top when training signal of FIG. 11 is used. Hence, the transmission gain at the time of 1, 2-1~2-4 training symbol reception becomes same (C1=C2-1=C2-2=C2-3=C2-4). Thus, relative received signal of each antenna can be demanded from output signal rA1, rA2-1, rA2-2, ..., rA2-4 of the above correlation arithmetic by the timeliness of the correlative peak in 1, 2-1~2-4 training symbol reception.

While the output signal of the correlative arithmetic by the timeliness of the correlative peak is information integrated in terms of time, and reducing influence of thermal noise or the interference signal by using this, value optimum WAk1, WAk2, ..., WAkM of the pieces of diversity combining weight information can be determined.

Figure 15:
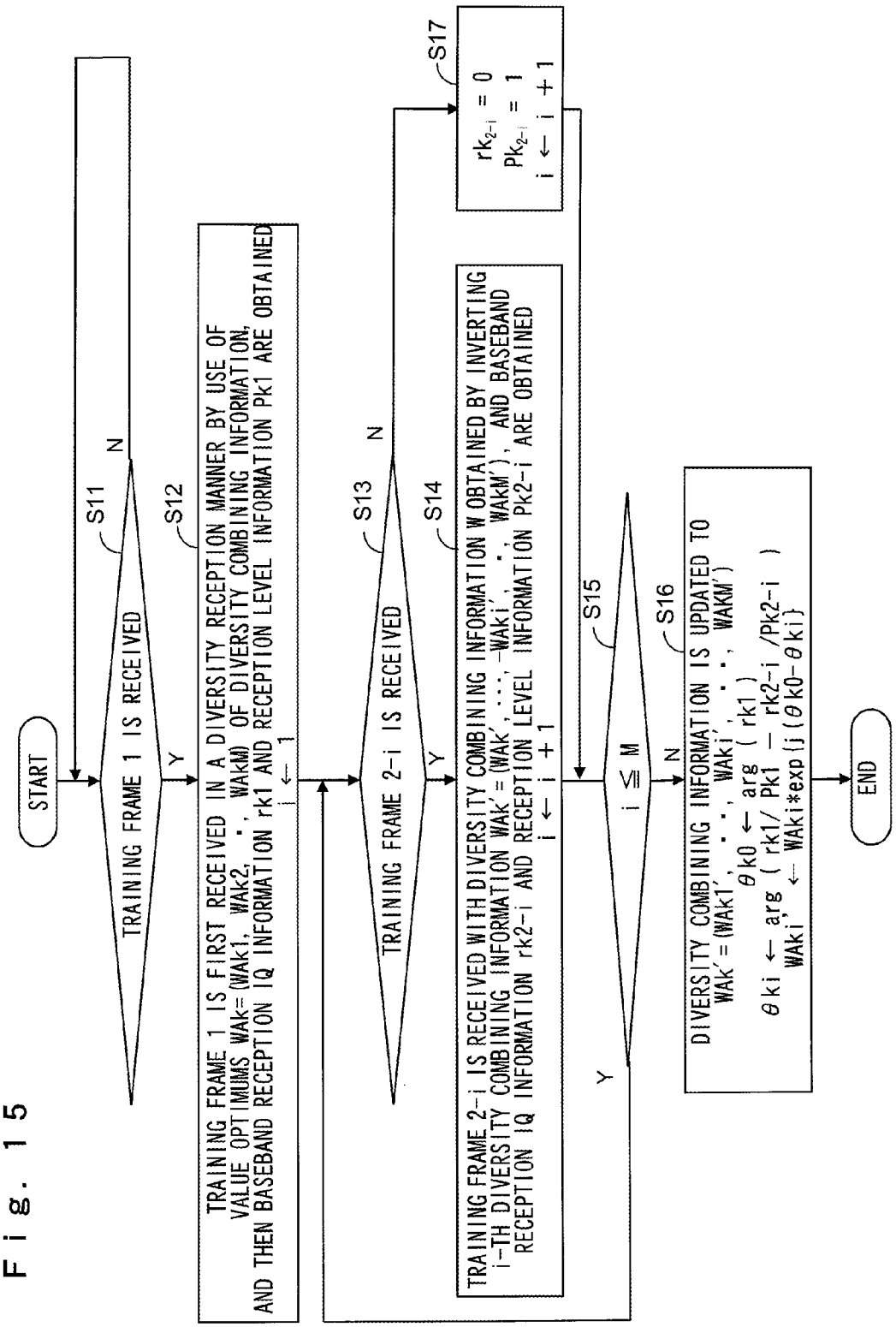
FIG. 15 is a flow-chart which showing a process of determining a value optimum of diversity combining weight information in a second embodiment.

FIG. 15 is a flow chart which shows value optimum decision handling of pieces of diversity combining weight information every antenna group in wireless communication device A of the second embodiment. Herein, antenna comprising one antenna group Ak1~AkM is assumed M book of Ak1, Ak2, ..., AkM, and n (n shows a flow when natural number) binary digit phase shifters 2 or more were used as a multiplier of weight processing unit 11-k.

When top training frame 1 is received (S11), diversity reception of top training frame 1 is performed using value optimum WAk=(WAk1, WAk2, ..., WAkM) of the pieces of diversity combining weight information of the antenna group), and baseband reception IQ information r1 and reception level information P1 are acquired. Also, assignment (i←1) in variables i is done in S12. Variables i prescribes that it makes only antenna number M turn performed by the loop comprising the following steps. Note that, WAk=(WAk1, WAk2, ..., WAkM) are initial value of the pieces of diversity combining weight information of the antenna group, respectively. Here, each of pieces of diversity combining weight information WAk1, WAk2, ..., WAkM is n bit information because a multiplier of weight processing unit 11-k assumes the case which is n binary digit phase shifter.

Then, when training frame 2-i is received (S13), i-th piece of diversity combining weight information WAki is reversed and generated pieces of diversity combining weight information WAk', and acquires baseband reception IQ information r2-i and reception level information P2-I (S14). Also, increment of variables i only as for 1 (i←i+1) is done in S14. Then, determination whether variables i is number of the antenna M or less is done in S15. If variables i is number of the antenna M or less, the process returns to S13, but variables i is not number of the antenna M or less, pieces of diversity combining weight information are updated using baseband reception IQ information r1, r2-1, r2-2, ..., r2-4 and reception level information P1, P2-1, Pr2-2, ..., P2-4 acquired by S12 and S14 (S16). If training frame 2-i is not received, baseband reception IQ information r2-i is set to zero and reception level information P2-i is set to 1, and assignment (i←i+1) also does 1+1 in variables i.

By the above-mentioned flow, pieces of diversity combining weight information W1, W2, W3, ..., WM to the signal of each antenna Ak1, Ak2, ..., AkM of the antenna group can be optimized. Thus, when the number of the antenna uses the natural number) binary digit phase shifter that 2 is provided or more n (n in the case of M, pieces of diversity combining weight information WAk=(WAk1, WAk2, ..., WAkM) can be optimized by diversity reception of the (M+1) frame bundle.

Figure 16:
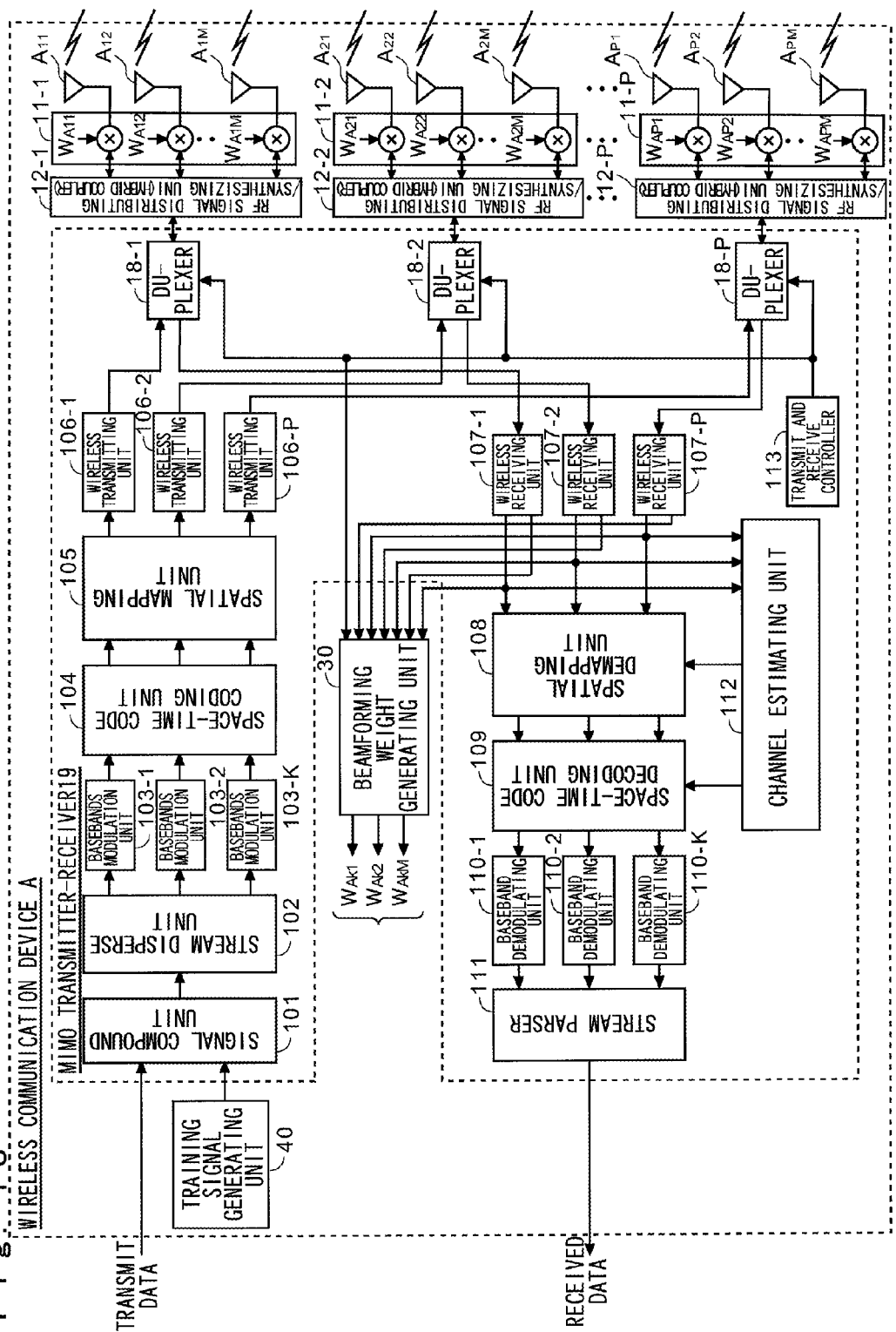
FIG. 16 is a block diagram showing a structure of the second embodiment of a wireless communication device according to the present invention.

FIG. 16 is a block diagram which shows structure of the second embodiment of the wireless communication device according to the present invention. Note that, in FIG. 16, the same sign is referred to a same as FIGS. 1 and 6 or equal part, and wireless communication device A of FIG. 1 is shown here, but wireless communication device B is similar, too. Also, FIG. 16 shows an embodiment when a multiplier of weight processing unit 11-k of the wireless communication device is n binary digit phase shifter (the natural number that 2 is provided or more n).

Wireless communication device A of the second embodiment includes P antenna group Ak1~AkM each of which comprising antennas Ak1, Ak2, ..., AkM~AkM (k is a integer and 1≤k≤P, M is a integer more than or equal to 2), P diversity circuitry comprising weight processing unit 11-1, 11-2, ..., 11-P and RF signal distributing/synthesizing unit 12-1, 12-2, ..., 12-P, and MIMO transmitter-receiver 19. The P diversity circuitry perform beam forming and diversity combining in antenna group Ak1~AkM using value optimum of the pieces of diversity combining weight information, and training signal and the data are transmitted and received. MIMO transmitter-receiver 19 is equivalent to transmitting/receiving circuit 13-1, 13-2, ..., 13-P~stream parser 17 of FIG. 1

MIMO transmitter-receiver 19 includes transmit and receive controller 113 for switching control of signal compound unit 101, stream disperse unit 102, baseband modulation unit 103-1, 103-2, ..., 103-k, space-time coding unit 104, spatial mapping unit 105, wireless transmitting unit 106-1, 106-2, ..., 106-P, wireless receiving unit 107-1, 107-2, ..., 107-P, spatial demapping unit 108, space-time decoding unit 109, baseband demodulating unit 110-1, 110-2, ..., 110-k, stream parser 111, duplexer 18-1, 18-2, ..., 18-P, channel estimating unit 112 and the transmit and receive controller 113. When a sign between the space-time is not used, space-time coding unit 104 and space-time decoding unit 109 are unnecessary. Herein, the said diversity circuitry is operated in an RF zone, and transmitting/receiving circuit 13-1, 13-2, ..., 13-P are finished by merely one to each antenna group. In other words, wireless communication device A performs beam forming in the multiantenna type and diversity reception only using transmit and receive circuit only for one to each antenna group. Among the all units, units except weight processing unit 11 and beam forming state weight generating unit 30 are included in common wireless communication device.

In MIMO transmitter-receiver 19, the transmitted data is input into stream disperse unit 102 through signal compound unit 101, and it is divided radio transmission in data series of done stream number. This signal is input into baseband modulation unit 103-1, 103-2, ..., 103-k. Here, k is equal with number of the streams of radio transmission.

In each baseband modulation unit 103-k, baseband modulation is performed based on input data series. For example, when OFDM modulation is used, after serial-to-parallel conversion was considered to be, QAM mapping is performed based on the data corresponding to each subcarrier, and each data series is converted into time sequence more by an inverse Fourier transform, and it is with a complex baseband modulating signal.

When a sign between the space-time is used, the complex baseband modulating signal is encoded using a space-time code coding unit 104 between the space-time, and the numerical time sequence which responded to a space-time code is output. When a sign between the space-time is not used, the complex baseband modulating signal is just output from the space-time code coding unit 104 between the space-time. The output signal from the space-time code coding unit 104 is input into spatial mapping unit 105.

With spatial mapping unit 105, a process in MIMO, e.g., the process that responded to spatial multiplexing, coding between the space-time, transmitting antenna selection diversity, beam forming is performed. A process to obtain sending signal to send out from each antenna group is carried out with spatial mapping unit 105, but for more information about this process, is described in non-patent document 1 or non-patent document 2 in detail.

The complex transmission IQ signal of P unit output from spatial mapping unit 105 is input into supporting wireless transmitting unit 106-1, 106-2, . . . , 106-P. For example, from wireless transmitting unit 106-1, 106-2, . . . , 106-P, the RF transmit signal that it is at right angles, and is modulated with this signal is output. Each RF transmit signal output by wireless transmitting unit 106-1, 106-2, . . . , 106-P is input into each duplexer 18-1, 18-2, . . . , 18-P.

Duplexer 18-1, 18-2, . . . , 18-P change reception of an RF transmission signalization and the RF received signal in terms of time. For example, it becomes "1" from transmit and receive controller 113 during a transmission period, and "zero" and the transmission/reception switching information that it is are received during a reception period, and RF transmit signal from each wireless transmitting unit 106-1, 106-2, . . . , 106-P are output in RF signal distributing/synthesizing unit 12-1, 12-2, . . . , 12-P when transmission/reception switching information "is 1", and RF received signal from RF signal distributing/synthesizing unit 12-1, 12-2, . . . , 12-P are output in wireless receiving unit 107-1, 107-2, . . . , 107-P when transmission/reception switching information "is zero". For duplexer 18-1, 18-2, . . . , 18-P, a directional coupler, high frequency switch can be used.

Output signal from duplexer 18-1, 18-2, . . . , 18-P are input into RF signal division/synthesizer 12-1, 12-2, . . . , 12-P and diversity circuitry comprising weight processing unit 11-1, 11-2, . . . , 11-P, respectively. The diversity circuitry of the P unit is connected to antenna Ak1, Ak2, . . . , AkM of the M unit, respectively, and RF transmit signal is sent out to the radio propagation street by (P×M) antennas.

On the other hand, the RF received signal received in antenna Ak1, Ak2, . . . , AkM of the M unit to include antenna group Ak1~AkM of the P unit is synthesized in the diversity circuitry of the P unit, and the output signal is input into duplexer 18-1, 18-2, . . . , 18-P, respectively. Output signal of duplexer 18-1, 18-2, . . . , 18-P are input into wireless receiving unit 107-1, 107-2, . . . , 107-P, respectively, and complex reception IQ signal is output. Here, Not only RF received signal is demodulated in complex reception IQ signal, but also wireless receiving unit 107-1, 107-2, . . . , 107-P acquire each reception level information from each training frame of the training signal.

The complex reception IQ signal of these P units is input into both of spatial demapping unit 108 and beam forming state weight generating unit 30. On the other hand, the reception level information is input into beam forming state weight generating unit 30. If reception level information is information associated with the reception level on each training frame of the diversity combining received signal, for example, even what kind of thing can well use the information which converted RSSI (Received Signal Strength Information) information or information which converted it into level, transmission gain of the AGC amplifier which wireless receiving unit 36 includes or it into level. However, when a plurality of training symbols of the same frame bundle are used as training signaling, the reception level information is the same in a plurality of training symbols. Hence, only the complex reception IQ signal of the P unit can be used without using reception level information. With spatial demapping unit 108, a process in MIMO, e.g., the process that responded to spatial multiplexing, coding between the space-time, reception diversity is performed. The complex IQs signal output from spatial demapping unit 108 is input into space-time code coding/decoding unit 109.

When a sign between the space-time is used, the decoding processing to the code between the space-time is performed, and the resulting signal is output from space-time space-time code coding/decoding unit 109. When a sign between the space-time is not used, complex IQs signal input into space-time code coding/decoding unit 109 is just output.

One or more output signals from space-time code coding/decoding unit 109 are input into baseband demodulating unit 110-1, 110-2, . . . , 110-k, respectively, and it is processed the recovery. When OFDM modulation is used, input complex IQ signal is divided every symbol, and Fourier converts each. Parallel-serial conversion does the data that QAM demodulated each frequency component found by Fourier transform, and received data series is obtained.

The series of received data output by baseband demodulating unit 110-1, 110-2, . . . , 110-k is synthesized in stream parser 111 by a series of one received data. Note that, it is common to use error correcting coding and an interleave process, and in this case, in the OFDM modulation, decoding processing to the error correcting code and interleave process are performed to above-mentioned synthesized received data.

The complex reception IQ signal output by wireless receiving unit 107-1, 107-2, . . . , 107-P of the P unit is input into channel estimating unit 112, and, for example, the estimation of the channel matrix between each antenna group in the transmitting side and each antenna group in the receiving side is performed using the preamble that is well known series included in each frame bundle of the RF received signal. This estimated channel matrix is used for a process in spatial demapping unit 108 and space-time code coding/decoding unit 109.

From wireless receiving unit 107-1, 107-2, . . . , 107-P, reception level information on each frame bundle of the each RF received signal is output besides above-mentioned complex reception IQ signal. This reception level information is input into beam forming state weight generating unit 30. If reception level information is information associated with the reception level on each frame bundle of the diversity combining received signal, for example, even what kind of thing can well use the information which converted RSSI (Received Signal Strength Information) information or information which converted it into level, transmission gain of the AGC amplifier which wireless receiving unit includes or it into level.

Receive controller 113 is the part of the Fixed Wireless Access control part that is a required element of the wireless communication device and it outputs the transmission/reception switching information that, for example, it is with "1"

during a transmission period and "zero" during a reception period to duplexer 18-1, 18-2, . . . , 18-P and beam forming state weight generating unit 30.

Beam forming state weight generating unit 30 maintains an optimum value of pieces of diversity combining weight information WAk1, WAk2, . . . , WAkM to each antenna group Ak1~AkM every antenna group, and, based on transmission/reception switching information output from transmit and receive controller 113 and reception level information, different pieces of diversity combining weight information WAk1, WAk2, . . . , WAkM is generated to each training sub signal of the training signal to each antenna group Ak1~AkM, and value optimum WAk1, WAk2, . . . , WAkM of the pieces of diversity combining weight information is determined based on reception level information output by each wireless receiving unit 107-k. Value optimum WAk1, WAk2, . . . , WAkM of generated pieces of diversity combining weight information is given to each multiplier of weight processing unit 11-k. The elaboration of beam forming state weight generating unit 30 is described below. Beam forming state weight generating unit 30 functions as "a diversity combining information generating unit", and it includes "a diversity combining information generating unit for initial acquisition", "a diversity combining information generating unit for training", "training receipt information holding unit" and "a diversity combining information value optimum generating unit".

It makes training performed every antenna group, and training signal section 40 generates the training signal that it is necessary because counterpart wireless communication device does beam forming. The generated training signal is data series for training, and, for example, it may include the information such as PLCP header, the MAC header. The transmitted data for training output from training signal section 40 is input into signal compound unit 101 every antenna group with transmitted data.

Signal compound unit 101 synthesizes transmitted data and transmitted data for training from training signal section 40 in terms of time, and it is output. When signal compound unit 101 outputs this data in stream disperse unit 102 when transmitted data is given, and transmitted data for training is output from training signal section 40, this is output in stream disperse unit 102.

Weight processing unit 11-k puts a weight process for RF received signal of each antenna group Ak1~AkM and RF transmit signal according to value optimum WAk1, WAk2, . . . , WAkM of the pieces of diversity combining weight information every antenna group given from beam forming state weight generating unit 30. In other words, each weight processing unit 11-k puts a weight process for RF received signal of each antenna Ak1, Ak2, . . . , AkM comprising each antenna group Ak1~AkM, and it is output in RF signal distributing/synthesizing unit 12-k, and it is output in each antenna Ak1, Ak2, . . . , AkM which a weight process is put for RF transmit signal from also RF signal distributing/synthesizing unit 12-k, and includes each antenna group Ak1~AkM.

The weight process in weight processing unit 11-k every antenna group can be implemented by the phase shift process with the n binary digit phase shifter. For example, the weight process in case of n=2 can be implemented in zero degree, right angle, a straight angle or phase shift disposal of 270 degrees. Weight processing units 11-1, 11-2, . . . , 11-P function as "a diversity combining information setting unit" in wireless communication device of the second embodiment.

The RF signal distributing/synthesizing unit 12-k of each antenna group distributes and synthesizes RF transmit/received signals in each antenna group. In more detail, the RF signal distributing/synthesizing unit 12-k receives the input of M RF received signals from the weight processing unit 11-k, and outputs a signal obtained by synthesizing these signals to the duplexer 18-k, whereas the RF signal distributing/synthesizing unit 12-k of each antenna group receives the input of an RF transmit signal from the duplexer 18-k, and outputs M distributions of the signal to the weight processing unit 11-k in each antenna group.

Note that, the level of the RF received signal, which is synthesized by the RF signal distributing/synthesizing unit 12-k and is then output to the duplexer 18-k in each antenna group, becomes $1/\sqrt{M}$ by impedance conversion in the weight processing unit 11-k. Likewise, the level of the RF transmit signal which undergoes M distributions and is then output to the weight processing unit 11-k in each antenna group, becomes $1/\sqrt{M}$ with respect to the level of the RF transmit signal emitted from the duplexer 18-k. These RF signal distributing/synthesizing units 12-k in each antenna group function as "signal distributing/synthesizing unit" in the wireless communication device of the present invention.

Figure 17:
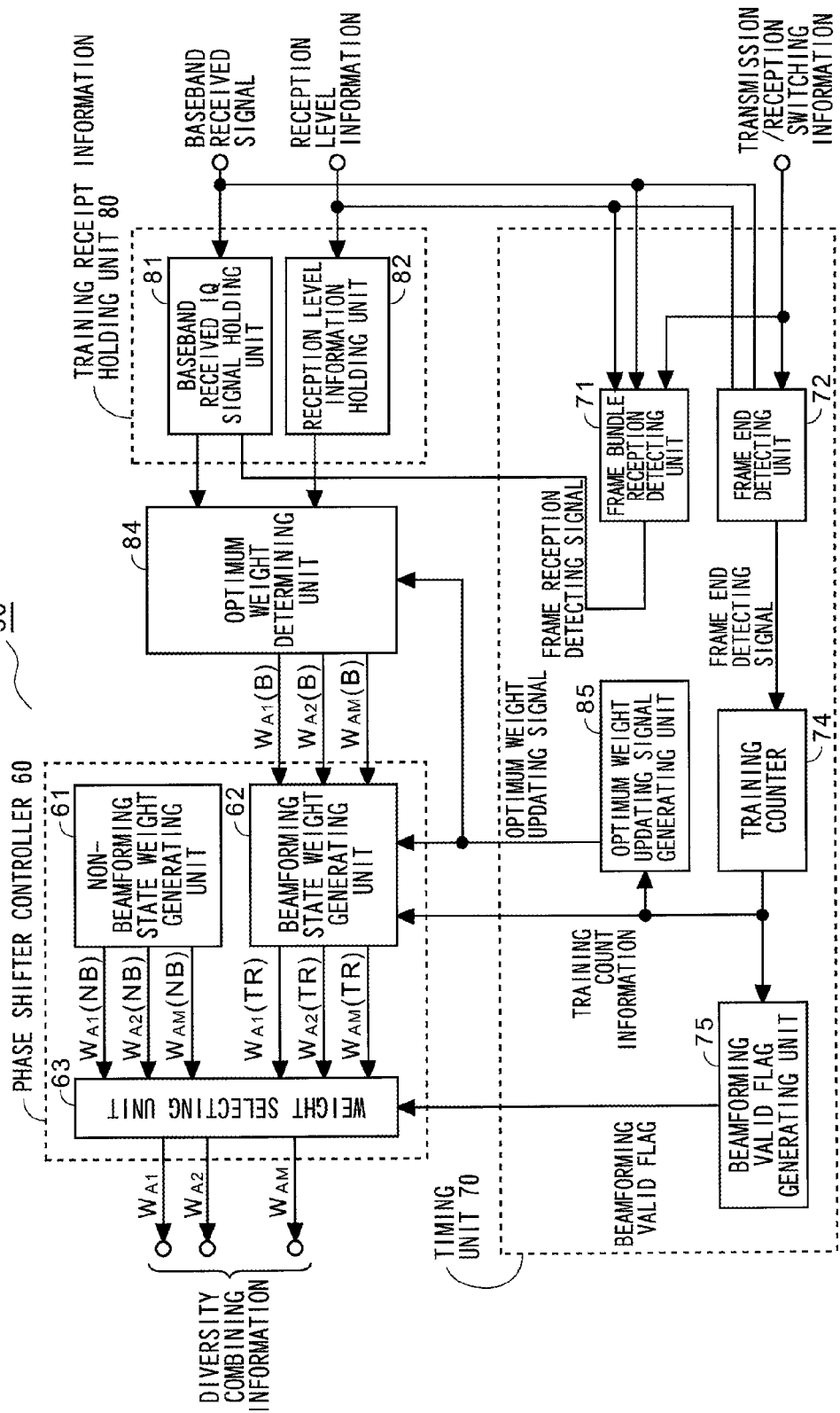
FIG. 17 is a block diagram showing a concrete structure of a beam forming state weight-generating unit of FIG. 16.

FIG. 17 is a block diagram showing a concrete structure of the beam forming weight generating unit 30 of FIG. 16. Note that, in FIG. 17, the same unit or functionally equal part is referred to the same signs as in FIG. 7. The beam forming weight generating unit 30 in each antenna group operates independently from each other basically. Herein, the description on one of the beam forming weight generating unit 30 will be given below.

Practically, beam forming state weight generating unit 30 includes P block structures which are shown in FIG. 17. In other words, the beam forming state weight generating unit 30 includes P reception level information holding units, P optimum weight determining units 84, P phase shifter controllers 60 and a timing unit 70, and determines the value optimum of diversity combining weight information for beam forming and diversity combining through a two-way training signal transfer.

The training reception level information holding unit 80 includes a baseband received IQ signal holding unit 81 and reception level information holding unit 82. The training reception level information holding unit 80 functions as "training reception information holding unit".

The baseband received IQ signal holding unit 81 holds the baseband reception IQ signal corresponding to the known pattern which is included in each training frame on the reception of the training sequence.

For example, assuming that the baseband reception signal corresponding to a transmit signal of "1" is held in the baseband received IQ signal holding unit 81, the baseband reception IQ signal held in the baseband received IQ signal holding unit 81 is corresponding to a complex transfer function (denoted as a vector) which express the phase rotation between transmission baseband unit and reception baseband unit.

For example, LTF (Long Training Field) which is defined in IEEE802.11n can be used as a known pattern and by use of correlation output of the received baseband signal and the complex pattern of "LTF" as a baseband reception IQ signal, the influence of noise in estimating the complex transfer function can be reduced. If a known pattern is included in all training frames of the training sequence, the complex transfer function which corresponds to an estimation of the complex transfer function can be obtained by use of the known pattern. The known pattern included in each training frame may be the same with each other, or may be different from each other.

To achieve this, the baseband reception signal and frame reception detecting signal from the timing unit 70 are provided to the baseband reception IQ signal holding unit 81. For example, on the occasion of frame reception, the signal that is a pulse when a header portion includes the information element showing the frame bundle being training frame and "zero" when it is other than it, is can be used as frame reception detecting signal. The information element of the header portion can be used for discriminant of the training frame. Alternatively, when time interval of the frame reception detecting signal is a predetermined value or less, the frame bundle can be determined with training frame.

On the other hand, reception level information receiving portion 82 maintains reception level information corresponding to the known pattern included in each training frame on the occasion of the reception of the training sequence. When an RSSI level is used as reception level information, RSSI value corresponding to the known pattern may be maintained, for example, as reception level information. Alternatively, reception AGC transmission gain when this was received may be used as reception level information because generally top frame bundle is known pattern.

From the information of complex transfer functions, magnitude information is lost by a work of the reception AGC. This magnitude information is restored by using reception level information, and it is not only phase information, and the information of true complex transfer functions can be obtained.

The frame reception detecting signal is output by every training frame, and baseband reception IQ signal in each training frame and reception level information are maintained in training receipt information receiving portion 80. This information is applied to optimum weight determining unit 84. Optimum pieces of diversity combining weight information WAk1(B), WAk2(B), ..., WAkM(B) is calculated based on numerical expression (6), and optimum weight determining unit 84 outputs to beam forming state weight generating unit 62. Note that, the listing of optimum pieces of diversity combining weight information WAk1(B), WAk2(B), ..., WAkM(B) from optimum weight determining unit 84 is performed by timeliness shown in optimum weight updating signal from timeliness unit 70. A pulse is output right after training sequence reception was finished and is preferable as optimum weight updating signal in signal becoming "zero" other than it.

Phase shifter controller 60 includes non-beam forming state weight generating unit 61, beam forming state weight generating unit 62 and weight selecting unit 63. Non-beam forming state weight generating unit 61, beam forming state weight generating unit 62 function as "a for-initial-acquisition diversity combining information generating unit", "a for training diversity combining information generating unit", respectively, and beam forming state weight generating unit 62 is put together with optimum weight determining unit 84, and it functions as "a diversity combining information value optimum generating unit".

In order to perform drawing from a complete initial state to the value optimum of diversity combining weight information, it is necessary to first receive a training signal containing at least (the number of antennas +1) training frames from an opposite wireless communication device disposed on an opposite side of a communication link. However, a training signal transmitted by the opposite wireless communication device cannot be received from the first. Therefore, the opposite wireless communication device is contrived to be able to receive at least one training signal ((the number of antennas +1) training frames) transmitted by an own wireless communication device even in a complete initial state. This transmits a plurality of training signal using different pieces of diversity combining weight information WAk1, WAk2, ..., WAkM, and counterpart wireless communication device can be implemented by what can receive either training signal.

The non-beam forming state weight generating unit 61 generates diversity combining weight information WAk1(NB), WAk2(NB), ..., WakM(NB) for such a time of non-beam forming. Preferably, the pieces of diversity combining weight information WAk1, WAk2, ..., WAkM are changed each time training signals are transmitted although the pieces of diversity combining weight information WAk1, WAk2, ..., WAkM are arbitrary when the training signals are transmitted. In a CSMA (Carrier Sense Multiple Access) system, pieces of diversity combining weight information WAk1, WAk2, ..., WAkM for a time of non-beam forming and for a time of non-transmission/reception are temporally changed at random, and these pieces of diversity combining weight information WAk1, WAk2, ..., WAkM at the transmission start time of a training signal can be used in transmitting this training signal.

More specifically, if the number of antennas is M, an M-bit counter is operated by a free-running clock, and M count values can be used as pieces of diversity combining weight information WAk1, WAk2, ..., WAkM, respectively. It is recommended to set a time interval for this random change at, for example, about 1 μs.

The opposite wireless communication device receives any one of the training signals, then determines the value optimum of diversity combining weight information, then sets this value optimum, then subjects the training signal to beam forming, and outputs the resulting signal, thus enabling the own wireless communication device to receive the training signal. If it is possible to receive any one of the training signals transmitted by use of diversity combining weight information that has been changed at random in the same way from the opposite wireless communication device, the drawing into the value optimum of diversity combining weight information without changes is performed in the own wireless communication device.

The beam forming state weight generating unit 62 sequentially changes each information of WAki(TR) of the diversity combining weight information WAk1(TR), WAk2(TR), ..., WAkM(TR) for each frame in accordance with training count information emitted from a training counter 74, and holds each diversity combining weight information WAki(TR) when an optimum weight updating signal is output from the optimum weight updating signal generating unit 85. Preferably, an initial value optimum of the diversity combining weight information WA1(TR), WA2(TR), ..., WAM(TR) is set as a value obtained by the nearest past training. The reason is that its diversity combining weight information is considered to be substantially optimal.

The weight selecting unit 63 selects diversity combining weight information WAk1(NB), WAk2(NB), ..., WAkM(NB) output from non-beam forming state weight generating unit 61 or diversity combining weight information WAk1(TR), WAk2(TR), ..., WAkM(TR) output from the beam forming state weight generating unit 62 based on beam forming valid flag, and outputs the information as diversity combining weight information WAk1, WAk2, ..., WAkM.

Although the beam forming valid flag is "invalid" (e.g., "0") in an initial state, the beam forming valid flag becomes "valid" (e.g., "1") by receiving a training frame a predetermined number of times, e.g., (the number of antennas +1) times. If training frames cannot be received sufficiently (e.g., (the number of antennas +1) times or more) during predetermined period, e.g., during a period of 100 ms, the beam forming valid flag may be set "invalid".

As a result, the weight selecting unit 63 selects diversity combining weight information WAk1(NB), WAk2(NB), ..., WAkM(NB) until a training frame is received a predetermined number of times, and after that, selects diversity combining weight information WAk1(TR), WAk2(TR), ..., WAkM(TR).

The timing unit 70 includes a frame reception detecting unit 71, a frame end detecting unit 72, a optimum weight updating signal generating unit 85, training counter 74 and beam forming valid flag generating unit 75.

The frame reception detecting unit 71 receives the input of transmission/reception switching information, baseband reception IQ signal and reception level information, and outputs a frame reception detecting frame. The transmission/reception switching information is a signal that becomes "1", for example, during a period during which the wireless transmitting unit 106-1, ..., 106-P (FIG. 16) become "enabled", and that becomes "0" during a period during which the wireless receiving unit 107-1, ..., 107-P (FIG. 16) become "enabled". And the reception level information is RSSI (Received Signal Strength Information) information, or is information about, for example, a gain of AGC amplifier of the wireless receiving unit 107-1, ..., 107-P. And frame reception detecting unit 71 generates a frame reception detecting signal when wireless receiving unit 107-1, ..., 107-P detect the change of reception level information or amplitude change in baseband received signal or known preamble pattern such as LTF, and determine that the frame under reception is a training frame during the wireless receiving unit 107-1, ..., 107-P are enabled. That is to say, the update of the optimum weight should be performed in the case of training sequence reception only.

For example, although the frame reception detecting signal is generated not only training frames but also other frames, the updating of the value optimum can be performed only when the frame is determined to be a training signal. Further, it may happen that reception level change, amplitude change of the baseband received signal and known pattern of preamble are not detected, because generally diversity combining weight information in the reception of the training frame 2-M (M is the number of antennas of the wireless communication device) is not optimal. In this case when a reception level change, amplitude change of the baseband received signal, none of the implicit preamble pattern can be detected when it is possessed, and the frame bundle is judged to be training frame by header information, a pulse may be generated by predetermined timeliness. Additionally, it is preferable to set the complex transfer function corresponding to the training frame which is not detected as "0".

The frame reception detecting signal is provided both to the baseband received IQ signal holding unit 81 and to reception level information holding unit 82 is given. The frame reception detecting signal showing the start timing of the reception of each training frame may be pulses of predetermined width (for example, 1 μs) which are generated on detecting the reception level change or amplitude change of the baseband received signal or preamble including known fixed during the wireless receiving unit 107-1, ..., 107-P are "enabled".

Transmit and receive control information, baseband reception IQ signal and reception level information are input into end-of-frame detecting unit 72, and end-of-frame detecting unit 72 outputs frame end detecting signal to training counter 74. The frame detecting signal is showing the reception end of each frame bundle and, for example, it is predetermined width pulse (e.g., it is a pulse of 1 μs).) that is generated at reception end timeliness of each frame bundle based on the detection of reception level change or the amplitude change of baseband received signal in the period when wireless receiving unit 107-1, ..., 107-P became the enable. Also, because generally pieces of diversity combining weight information in training frame 2-M (in M the number of the antenna of the wireless communication device) is not optimal magnitude, there is a possibility that a reception level change, amplitude change of the baseband received signal, none of the implicit preamble pattern can be detected. In this case when a reception level change, amplitude change of the baseband received signal, none of the implicit preamble pattern can be detected when it is possessed, and the frame bundle is judged to be training frame by header information, a pulse may be generated by predetermined timeliness.

A send state, reception are in a state, and a transmission/reception switching information is information representing state of wireless communication device such as the power save state. As for frame bundle reception detecting unit 71 and end-of-frame detecting unit 72, transmission/reception switching information can detect a reception end of reception initiation of the frame bundle and the frame bundle using reception level information when it is in reception state.

Optimum weight updating signal section 85 outputs optimum weight updating signal to beam forming state weight generating unit 62. After optimum weight updating signal is timing signal to set optimum pieces of diversity combining weight information determined by the training sequence reception after training sequence reception complete newly, and, for example, a pulse of the frame end detecting unit of the last resort frame bundle of the training sequence occurred, for a certain period of time (e.g., it is a pulse of predetermined width (generated after 3 μs), e.g., 1 μs).)

Training counter 74 outputs training count information to beam forming state weight generating unit 62, optimum weight updating signal section 85 and beam forming valid flag section 75. It is count information of the number of the frame bundle in the training sequence, and, for example, as for by 1, the counting value of the counter is incremented by frame end detecting unit, and the training count information is generated by clearing the counting value of the said count "zero" by optimum weight updating signal.

Beam forming valid flag section 75 outputs the beam forming valid flag showing frame bundle of the predetermined number of times being received to weight selecting unit 63. The beam forming valid flag is generated based on training count information from training counter 74. As for weight selecting unit 63, in the case of invalidity, beam forming valid flag selects pieces of diversity combining weight information WAk1(NB), WAk2(NB), ..., WAkM(NB) from non-beam forming state weight generating unit 61, and, in the case of significance, beam forming valid flag selects pieces of diversity combining weight information WAk1(TR), WAk2(TR), ..., WAkM(TR) from beam forming state weight generating unit 62.

Phase shifter controller 60 works basically to find out pieces of diversity combining weight information WAk1(TR), WAk2(TR), ..., WAkM(TR) where reception level information becomes maximum through training. In other words, in the wireless communication device of the receiving side, each pieces of diversity combining weight information WAki(TR) of pieces of diversity combining weight information WAk1(TR), WAk2(TR), ..., WAkM(TR) is changed every frame bundle, and baseband reception IQ signal in each pieces of diversity combining weight information WAki(TR) and reception level information are maintained. From these hold information, the pieces of diversity combining weight information is updated based on numerical expression (7) in search of optimum pieces of diversity combining weight information WAk1, WAk2, . . . , WkAM.

In the 2-way transmission of the data following training, maintained pieces of diversity combining weight information WAk1(TR), WAk2(TR), . . . , WAkM(TR) is read, and it is provided in weight processing unit 11-k.

Figure 18:
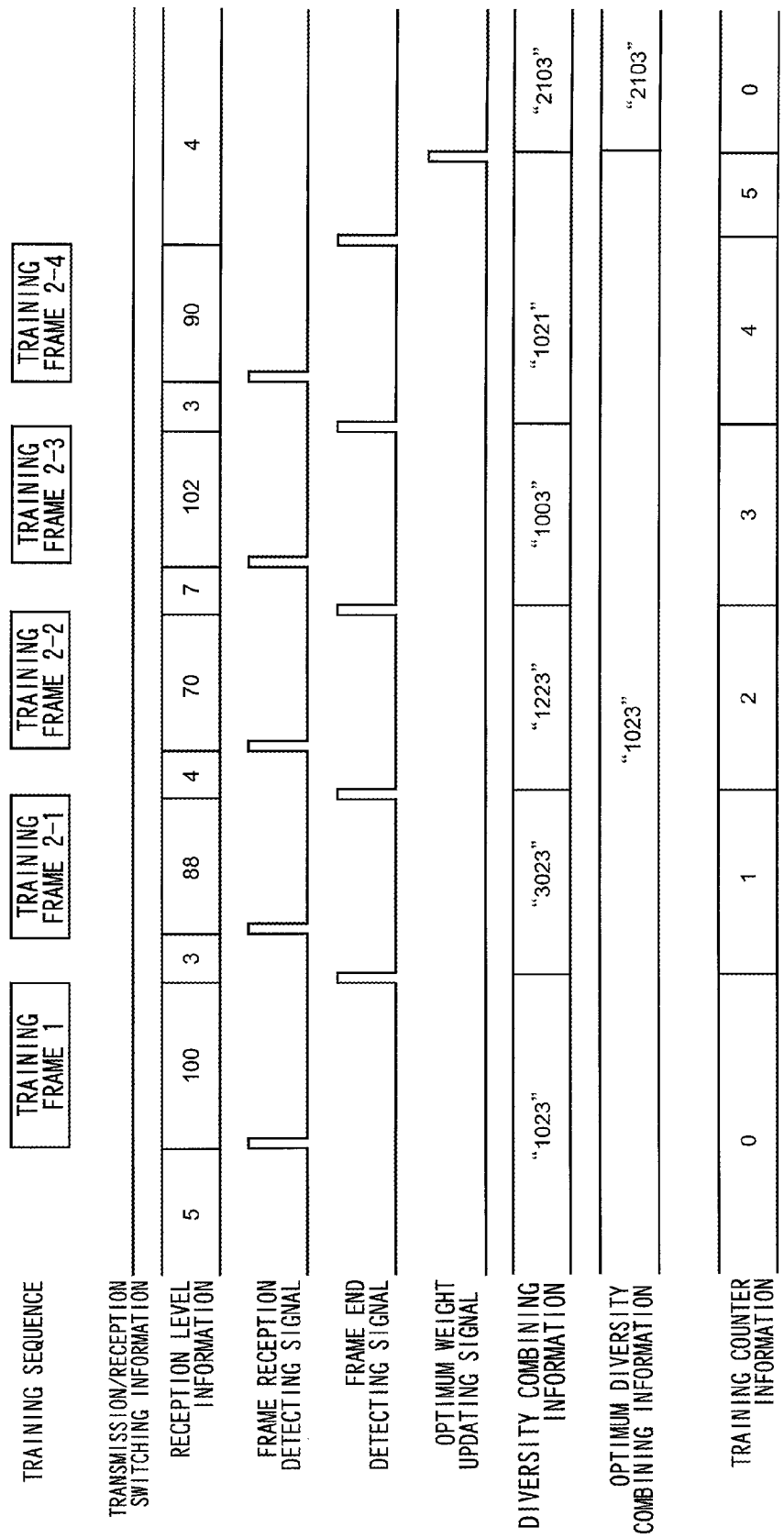
FIG. 18 is a timing chart showing an example of the operation of the beam forming state weight-generating unit of FIG. 17.

FIG. 18 is timing chart which shows an example of the operation of beam forming state weight generating unit 30 of FIG. 17. Signal A1,A2,A3,A4 of each antenna Ak1,Ak2,Ak3, Ak4 (k=1~P) every antenna group is shown in the state that diversity combining (addition of vector) is considered to be, and diversity combining received signal is generated in FIGS. 12A, 12B, 12C, 12D and 12E. Herein, the number of antenna of each antenna group Ak1~AkM every antenna group of wireless communication device A is 4, and pieces of diversity combining weight information WAk1, WAk2, WAk3, WAk4 to the signal of each antenna Ak1, Ak2, Ak3, Ak4 assumes the case which is n binary digit (the natural number that 2 is provided or more n). Also, when value of the reception level information grows big so that reception level is big, it is done. In this case, weight processing unit 11-k is included of the n binary digit phase shifter of antenna several minutes, and each phase shifter is controlled depending on pieces of diversity combining weight information WAk1, WAk2, WAk3, WAk4 of each n binary digit. In case of n=2, phase shift quantity is controlled to 0 degree when diversity combining weight information is "0", 180 degree when diversity combining weight information is "2" and 270 degree when diversity combining weight information is "3".

The wireless communication device performs diversity reception of training frame 1 from the wireless communication device of the communications partner using present pieces of diversity combining weight information WAk1, WAk2,WAk3,WAk4, and sequential performs diversity reception of a plurality of training frame 2-1~2-4 while changing each pieces of diversity combining weight information WAki of pieces of diversity combining weight information WAk1,WAk2,WAk3,WAk4. And, provided reception level information and baseband reception IQ signal are held, and, after training sequence reception, value optimum WAk1, WAk2, WAk3, WAk4 of the pieces of diversity combining weight information is determined for last resort based on the maintained information of these. Thereby, value optimum WAk1, WAk2, WAk3, WAk4 of determined pieces of diversity combining weight information is used for beam forming in the data transmit and receive and diversity combining.

After it is really the top frame bundle that training is performed, and training frame 1 received this, training is started, and reception level information at that time and baseband reception IQ signal are measured. For example, when antenna selection sequence of IEEE802.11n is used as a training sequence, the MAC header of the reception frame bundle is analyzed, and training may be started when the reception frame bundle is antenna selection sequence. For baseband reception IQ signal, a baseband reception IQ corresponding to the known pattern included in the PLCP (Physical Layer Convergence Protocol) header can be used. For example, in the case of IEEE802.11n, a baseband reception IQ of LTF (Long Training Field) included in the PLCP header can be used as baseband reception IQ signal. In this case, the baseband reception IQ signal represents the transfer function between a baseband transmission IQ of the sending wireless communication device and baseband reception IQs of the receiving side wireless communication device.

Training frame bundle 1 can be soaked with information such as a source address, a destination address and the frame bundle classification. Using training frame 1, reception level information when diversity reception was done in the present pieces of diversity combining weight information is acquired. It is used to measure following baseband reception IQ signal when training frame 2-1~2-4 changes pieces of diversity combining weight information by a predetermined algorithm, and diversity reception was done and reception level information.

When, as for the reception level information, is started a sensitivity control in an AGC amplifier of the wireless receiving unit, usually for relatively short time (e.g., it changes in 10 µs).) The sensitivity control of the AGC amplifier occurs in reception initiation of the training frame or the reception end, but, for example, as well as it, it may occur under the influence of noise. Also, when it fails in the reception of the frame header after the sensitivity control of the AGC amplifier was started by reception initiation of the training frame, the sensitivity control of the AGC amplifier may be started several times in the said frame bundle reception period. By the measurement of the reception level information, these points are considered.

Figure 12A:
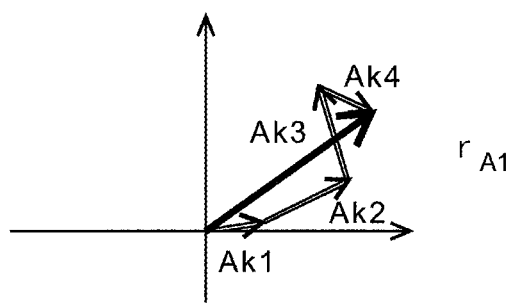
FIG. 12A is a view that schematically shows the reception information on the receiving side when baseband transmission IQ information "1" is transmitted from the transmitting side.

First of all, for beam forming state weight generating unit 52 generates pieces of diversity combining weight information 0(WAk1="01", WAk2="00", WAk3="10", WAk4="11") while the training count information is "zero", and diversity reception of training frame 1 from the counterpart wireless communication device is performed by using this pieces of diversity combining weight information zero. For example, it is desirable that diversity combining weight information 0 is one which is obtained by the nearest past training and used at the time of the reception of the data frame in front. The reason is because it is thought that the pieces of diversity combining weight information at that time becomes approximately optimum this time in the past when beam forming is made. Any pieces of diversity combining weight information can be used in the past when beam forming is not made. Baseband reception IQ signal and reception level information(100) at this time are maintained in greatest reception level information holding unit 42 in 1 training period. FIG. 12A shows diversity combining (addition of vector) of the received signal of each antenna Ak1, Ak2, Ak3, Ak4 of this time. Note that, reception level information before receiving training frame 1 is "5". This is worth a thermal noise level. Also, after receiving training frame 1, the reception level information of the period before receiving next training frame 2-1 falls to "3". This is worth a thermal noise level, too. Like the following, thermal noise occurs between receptions of the training frame.

Figure 12B:
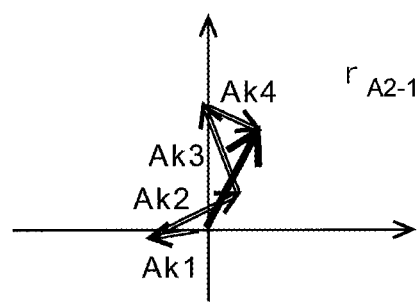
FIG. 12B is a view that schematically shows the reception information on the receiving side when baseband transmission IQ information "1" is transmitted from the transmitting side.

Then, when end-of-frame of training frame 1 is detected, and training count information becomes "1", beam forming state weight generating unit 52 generates pieces of diversity combining weight information 1(WAk1="11", WAk2="00", WAk3="10", WAk4="11"). As for pieces of diversity combining weight information 1, only pieces of diversity combining weight information WAk1 is reversed. The reception level information(88) when training frame 2-1 was received using pieces of diversity combining weight information 1 falls than reception level information(100) at the age of pieces of diversity weight combining information 0. FIG. 12B shows diversity combining of the received signal of each antenna Ak1, Ak2, Ak3, Ak4 at this time. The change of this reception level information does not depend on a change of the transmission path, and it depends on having changed pieces of diversity combining weight information.

Figure 12C:
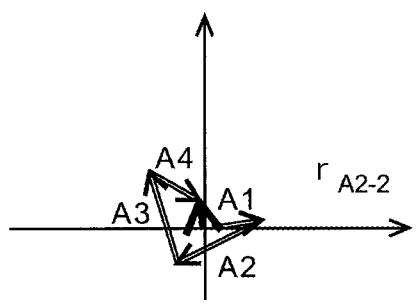
FIG. 12C is a view that schematically shows the reception information on the receiving side when baseband transmission IQ information "1" is transmitted from the transmitting side.

Then, when training count information becomes "2", beam forming state weight generating unit 52 generates pieces of diversity combining weight information 2(WAk1="01", WAk2="10", WAk3="10", WAk4="11"). As for pieces of diversity combining weight information 2, only pieces of diversity combining weight information WAk2 is reversed in pieces of diversity combining weight information 0. Baseband reception IQ signal when training frame 2-2 was received using pieces of diversity combining weight information 2 and reception level information(70) are acquired, and it is maintained. Note that, the reception level of this time decreases than reception level information(100) at the age of pieces of diversity combining weight information 0. FIG. 12C shows diversity combining of the received signal of each antenna Ak1, Ak2, Ak3, Ak4 at this time.

Figure 12D:
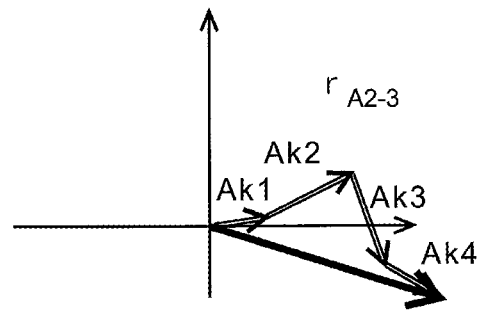
FIG. 12D is a view that schematically shows the reception information on the receiving side when baseband transmission IQ information "1" is transmitted from the transmitting side.

Then, when training count information becomes "3", beam forming state weight generating unit 52 generates pieces of diversity combining weight information 3(WAk1="01", WAk2="00", WAk3="00", WAk4="11"). As for pieces of diversity combining weight information 3, only pieces of diversity combining weight information WAk3 is reversed in pieces of diversity combining weight information 0. Baseband reception IQ signal when training frame 2-3 was received using pieces of diversity combining weight information 3 and reception level information(102) are acquired, and it is maintained. Note that, the reception level of this time increases than reception level information(100) at the age of pieces of diversity combining weight information 0. FIG. 12D shows diversity combining of the received signal of each antenna Ak1, Ak2, Ak3, Ak4 at this time.

Figure 12E:
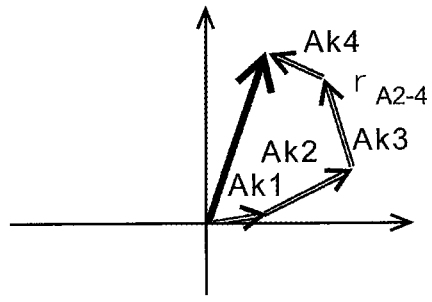
FIG. 12E is a view that schematically shows the reception information on the receiving side when baseband transmission IQ information "1" is transmitted from the transmitting side.

Then, when training count information becomes "4", for training weight generating unit 62 generates 00 pieces of diversity combining weight information 4(WAk1="01", WAk2="00", WAk3="10", WAk4="11"). As for pieces of diversity combining weight information 4, only pieces of diversity combining weight information WAk4 is reversed in pieces of diversity combining weight information 0. Baseband reception IQ signal when training frame 2-4 was received using pieces of diversity combining weight information 4 and reception level information(90) are acquired, and it is maintained. Note that, the reception level of this time decreases than reception level information(100) at the age of pieces of diversity combining weight information 0. FIG. 12E shows diversity combining of the received signal of each antenna Ak1, Ak2, Ak3, Ak4 at this time.

Of baseband reception IQ signal when training frame 2-4 was received using pieces of diversity combining weight information 4 and the reception level information(90) after it is acquired, and having maintained, it is determined for last resort based on the maintained information of these in value optimum WAk1, WAk2, WAk3, WAk4 of the pieces of diversity combining weight information.

Value optimum WAk1, WAk2, WAk3, WAk4 of new pieces of diversity combining weight information is determined based on numerical expression (6). In numerical expression (6), WAk1, WAk2, WAk3, WAk4 represents value optimum of the pieces of diversity combining weight information before the training signal reception, and WAk1', WAk2', WAk3', WAk4' represents value optimum of pieces of diversity combining weight information determined newly after the training signal reception.

After frame end detecting unit to training frame 2-4 was output, it is included for the transmission of the next data frame and the reception, and value optimum WAk1', WAk2', WAk3', WAk4' of pieces of diversity combining weight information determined newly is set.

Then, operation of the wireless communication system of the present invention when transmission of broadcast frame bundle or the multicast frame bundle was included is described.

Figure 19:
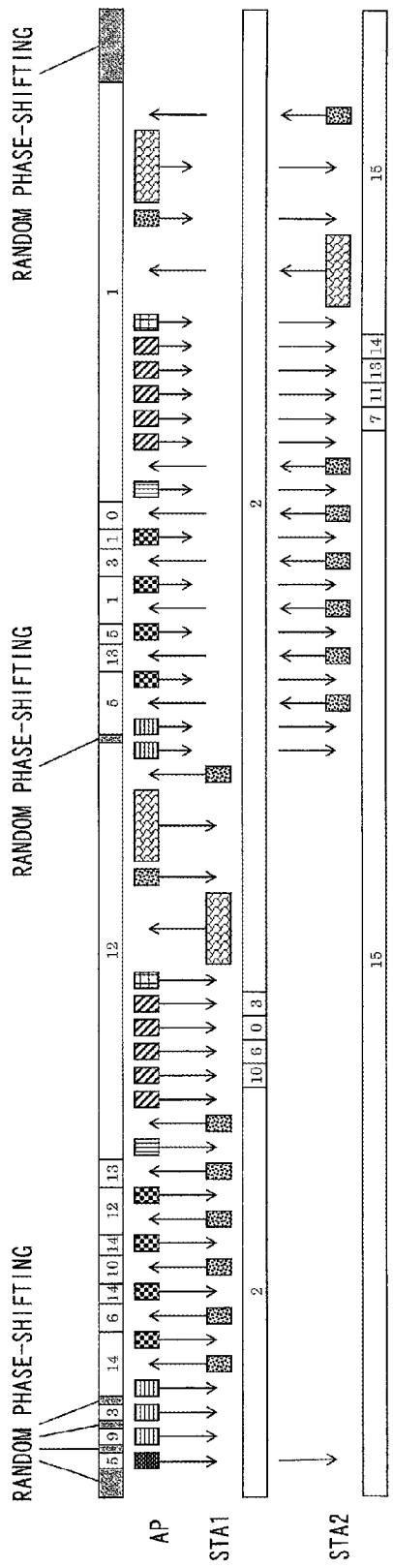
FIG. 19 is a view showing an example of the operation of the wireless communication system of the present invention when transfer of a broadcast frame or a multicast frame is included.

FIG. 19 is fig which shows operation example at the time of training between AP of this case and a plurality of STA and the data transmission. The figure above shows radio frame bundle transmitted between AP-STA and the operation of the phase shifter of AP at that time and the STA. Note that, herein, operation on the antenna group of one when each antenna group of AP and the STA includes four antenna, respectively, and it was done when a phase shifter of each 1 bit is connected to those radio antennas is shown. Also, state of the phase shifter setting to four antennas is represented with integer numbers from zero to 15. For example, because this is binary representation, and, in the case of 5, phase shifter setting is "0101", phase shifter setting to antenna 1 and antenna 3 represents that phase shifter setting to antenna 2 which is "zero degree" and antenna 4 is "straight angle".

AP transmits a beacon every in constant cycle, e.g., 100 ms, and the presence of the wireless network is alarmed in the circumference. The phase shifter setting in AP at the time of the beacon transmission is determined from 0~15 at random. In this case, as for the phase shifter setting, distinct probability is big every transmission of the beacon.

When an idle state namely wireless installation performs neither the transmission nor the reception, for example, wireless installation changes phase shifter setting every 1 us, and, in CSMA/CA system, there are the phase shifter setting in the start of the transmit and receive and method to do at the time of frame bundle transmission or frame bundle reception as one method determining phase shifter setting at random.

The transmission of the beacon is followed, and AP transmits training initiation frame bundle to STA1. As for the phase shifter setting in AP at the time of this training initiation frame bundle transmission, it is determined from 0~15 at random. If STA1 can receive training initiation frame bundle normally because it may not be optimum, the phase shifter setting of this time may not be so. When STA1 receives training initiation frame bundle normally, ACK frame bundle is transmitted to AP by STA1. When STA1 does not receive training initiation frame bundle normally, ACK frame bundle is not transmitted to AP by STA1. In this case, AP retransmits training initiation frame bundle to STA1 using different phase shifter setting some time ago. The re-transmission of this training initiation frame bundle is repeated until ACK frame bundle is transmitted to AP basically by STA1.

Figure 20:
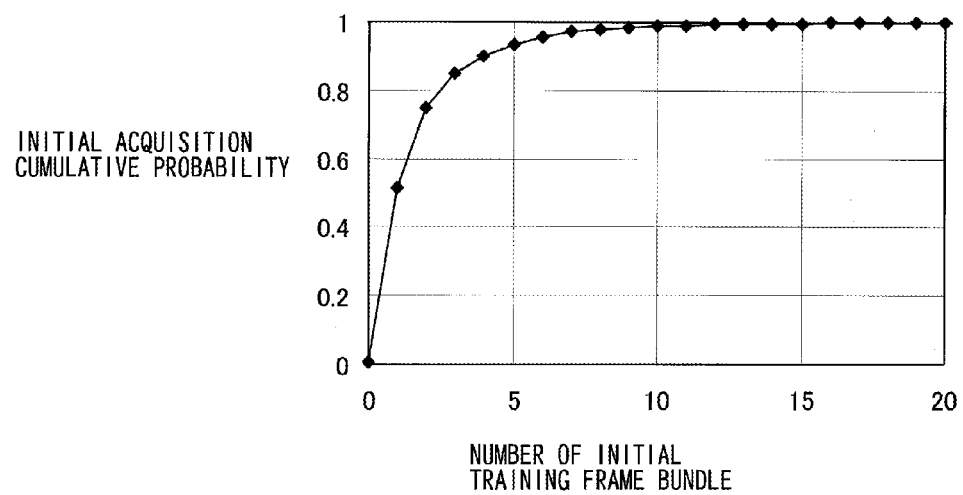
FIG. 20 is a view showing a relationship between the number of transmission by which a training start frame is retransmitted and the probability of transmission of an ACK frame (when the optimal setting of the phase shifter is already known on the STA side).
Figure 21:
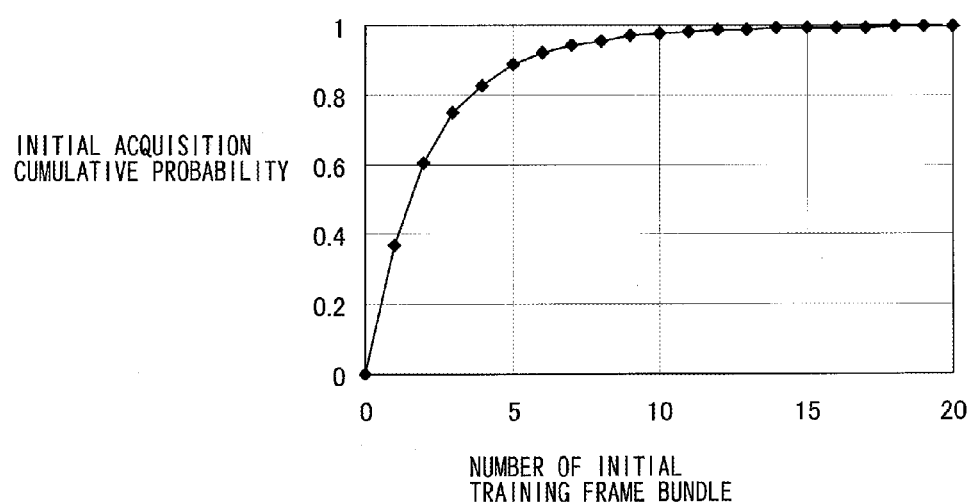
FIG. 21 is a view showing a relationship between the number of transmission times by which a training start frame is retransmitted and the probability of transmission of an ACK frame (when the optimal setting of the phase shifter is unknown on the STA side).

FIG. 20 and FIG. 21 show concern of the probability (an initial acquisition cumulative probability) that transmission number of times of the training initiation frame bundle including re-transmission and the ACK frame bundle to this are transmitted to. When the optimum setting of the phase shifter is known in the STA side, as for FIG. 20, as for FIG. 21, the optimum setting of the phase shifter is unknown in the STA side. Referring now to FIG. 20, mean value of the transmission number of times of the training initiation frame bundle including re-transmission is 2.3, and it is found that ACK frame bundle to the training initiation frame bundle is transmitted with 99.9% probability or more if it is transmitted to up to ten frame bundle in total. Also, referring now to FIG. 21, it is found that ACK frame bundle to the training initiation frame bundle is transmitted with 99.9% probability or more if mean value of the transmission number of times of the training initiation frame bundle including re-transmission is 2.9, and it is transmitted to up to 20 frame bundle in total. Really, depending on situation of the fading, FIG. 20, FIG. 21 or the middle situation occurs.

When AP receives ACK to the training initiation frame bundle to STA1, a 2-way training signal transmission to STA1 is started. First of all training signal is transmitted from the STA1 side, and, in the example of FIG. 19, phase shifter setting of the AP side is optimized. Then, training signal is transmitted from the AP side, and phase shifter setting of the STA side is optimized. In the optimization of the phase shifter setting of the AP side, it trains as initial value by phase shifter setting of the AP side when ACK frame bundle from STA 1 to the training initiation frame bundle was received.

In the example of FIG. 19, AP does not receive the ACK frame bundle to the first and second training initiation frame bundle. Thus, AP makes phase shifter setting random phase shift. Then, AP receives ACK frame bundle to the third training initiation frame bundle. AP does phase shifter setting 14("1110") at the time of the third training initiation frame bundle transmission with training initial value.

In this example, AP transmits Null Data (frame bundle of data length 0 of the payload) to STA1, and ACK frame bundle from STA1 to this is received by phase shifter setting for training, and optimum phase shifter setting of the AP side is demanded from reception level at that time.

Specifically, first of all, as shown in FIG. 19, AP maintains a reception level of the ACK frame bundle to the training initiation frame bundle as reception level by training default setting 14("1110").

Then, after AP does the phase shifter setting as 14("1110"), and having transmitted Null Data to STA1, phase shifter setting is changed for training. AP changes, for example, phase shifter setting to antenna 1 to 6("0110") that inverted, and ACK frame bundle is received, and the reception level is examined In this case, phase shifter setting is that 14("1110") case is higher in the reception level, and AP returns phase shifter setting to 14("1110"), and Null Data is further transmitted. Then, AP changes phase shifter setting to antenna 2 to 10("1010") that inverted, and ACK frame bundle is received, and the reception level is examined. In this case, phase shifter setting is that 14("1110") case is higher in the reception level, and AP returns phase shifter setting to 14("1110"), and Null Data is further transmitted. After this, AP further changes phase shifter setting to antenna 3 to 12("1100") that inverted, and ACK frame bundle is received, and the reception level is examined. Because it is big, phase shifter setting does phase shifter setting with 12("1100") than 14("1110"), and the reception level of this case transmits next Null Data by this phase shifter setting. After this, AP changes phase shifter setting to antenna 4 to 13("1101") that inverted, and ACK frame bundle is received, and the reception level is examined Phase shifter setting is that 12("1100") time reception level is biggest, and, in this example, AP transmits and receives the next training transmission of signals and the data using phase shifter setting 12("1100").

When optimization of the phase shifter setting to four antenna of the AP side completes, AP transmits training signal to STA1 using optimized phase shifter setting 12("1100") this time. Herein, Null Data frame bundle of No-Ack is used for training. In STA1, the optimum phase shifter establishment acquired in past training is maintained, and this phase shifter setting is used in not only data transmission just after but also the next training transmission. The optimum phase shifter setting changes by fading every hour, but it can be determined by the phase shifter setting that even this case is optimum for in a short time by training as initial value by optimum phase shifter setting acquired before.

In FIG. 19, STA1 maintains optimum phase shifter establishment 2("0010") acquired before, but training signal from AP side is further received, and phase shifter setting is updated more ideally. First of all Null Data frame bundle of first No-Ack is received using former phase shifter setting 2("0010"), and STA1 acquires reception level by phase shifter setting 2("0010"). When the training for own terminals is started, it is determined, and STA1 receives Null Data frame bundle of subsequent No-Ack using phase shifter setting changed for training by receiving Null Data frame bundle of No-Ack to the own terminal, and the reception level is examined.

Specifically, STA1 changes phase shifter setting to antenna 1 to 10("1010") that inverted after reception of the Null Data frame bundle of first No-Ack, and Null Data frame bundle of next No-Ack is received, and the reception level is examined. Then, STA1 changes phase shifter setting to antenna 2 to 6("0110") that inverted after reception of the Null Data frame bundle of the second No-Ack, and Null Data frame bundle of next No-Ack is received, and the reception level is examined. Then, STA1 changes phase shifter setting to antenna 3 in zero("0000") that inverted after reception of the Null Data frame bundle of the third No-Ack, and Null Data frame bundle of next No-Ack is received, and the reception level is examined. Even more particularly, STA1 changes phase shifter setting to antenna 4 to 3("0011") that inverted after reception of the Null Data frame bundle of the fourth No-Ack, and Null Data frame bundle of next No-Ack is received, and the reception level is examined. In this example, STA1 transmits and receives the subsequent data using phase shifter setting 2("0010") because time reception level of phase shifter setting 2("0010") is biggest.

Note that, training prevents it from working to prevent it trains even if other STA (STA except STA1) receives training signal and from working even if an own terminal receives the frame bundle which is not addressed. It prevents it trains even if Media Access Control Address receives the frame bundle that an own terminal is not addressed as for the STA as for this and from working or ACK frame bundle is transmitted only to the frame bundle to the own terminal, and it can be implemented because training works only in a fixed period of time after the ACK frame bundle transmission.

After phase shifter setting of the AP side is optimized to 12("1100") by the above-mentioned operation, and phase shifter setting of the STA1 side was done to 2("0010") ideally, AP and 2-way data transmission between STA1 are performed by these phase shifter setting.

Also, in the example of FIG. 19, AP transmits training initiation frame bundle to STA2 using phase shifter setting 12("1100") to STA1 after data transmission with STA1. Because the phase shifter setting of the AP side of this time may not be optimum to STA2, STA2 may not be so if it is right, and training initiation frame bundle can be received. When this training initiation frame bundle is received definitely, STA2 transmits ACK frame bundle to AP. When training initiation frame bundle is not received definitely, in STA2, STA2 does not transmit ACK frame bundle to AP. In this case, AP retransmits training initiation frame bundle to STA2 using different phase shifter setting some time ago. The re-transmission of this training initiation frame bundle is repeated until ACK frame bundle is transmitted to AP by STA2. Note that, by the re-transmission of this training initiation frame bundle, random phase shifter setting is used.

In this example, STA2 transmits ACK frame bundle to the second training initiation frame bundle. For example, it may be done for random phase shifter setting from following frame bundle to do with random phase shifter setting in the first transmission to STA2 after the beacon when the Media Access Control Address of the destination changes in AP side. Alternatively, it may be done for random phase shifter setting from following frame bundle when the inherent pattern is transmitted before initiation of the transmission to each STA in the beacon back, and this inherent pattern was detected.

In this example, AP receives ACK frame bundle to the second training initiation frame bundle. Thus, phase shifter setting 5("0101") used by transmission of the second training initiation frame bundle is done with training initial value of the phase shifter setting of the AP side. AP transmits Null Data (frame bundle of data length 0 of the payload) to STA2, and ACK frame bundle from STA2 to this is received by phase shifter setting for training, and phase shifter setting of the AP side is optimized by examining the reception level.

Specifically, first of all AP maintains a reception level of the ACK frame bundle to the training initiation frame bundle as reception level by training default setting 5("0101"). Then, AP transmits Null Data to STA2 with assuming phase shifter setting 5("0101"), and then phase shifter setting is changed for training.

For example, AP changes phase shifter setting to antenna 1 to 13("1101") that inverted, and ACK frame bundle is received, and the reception level is examined. The reception level at phase shifter setting in 5("0101") case is higher, then AP returns phase shifter setting to 5("0101"), and Null Data is further transmitted. After this, AP changes phase shifter setting to antenna 2 to 1("0001") that inverted, and ACK frame bundle is received, and the reception level is examined. Because it is big, phase shifter setting does phase shifter setting with 1("0001") than 5("0101"), and the reception level of this time transmits next Null Data by this phase shifter setting. After this, AP changes phase shifter setting to antenna 3 to 3("0011") that inverted, and ACK frame bundle is received, and the reception level is examined Phase shifter setting is that 1("0001") case is higher in the reception level, and phase shifter setting is returned to 1("0001"), and Null Data is further transmitted. After this, AP changes of a phase shifter to antenna 4 to zero("0000") that inverted, and ACK frame bundle is received, and the reception level is examined. In this example, reception level in case of phase shifter setting 1("0001") is maximum, AP transmit and receive subsequent training transmission of signals and the data using phase shifter setting 1("0001").

When optimization of the phase shifter setting to four antenna of the AP side completes, AP transmits training signal to STA2 using the optimized phase shifter setting 1("0001"). Herein, as training signaling, Null Data frame bundle of No-Ack is used. In STA2, the optimum phase shifter establishment acquired in past training is maintained, and this phase shifter setting is used in not only data transmission just after but also the next training transmission. The optimum phase shifter setting changes by fading every hour, but it can be determined by the phase shifter setting that even this case is optimum for in a short time by training as initial value by optimum phase shifter setting acquired before.

In FIG. 19, STA2 maintains optimum phase shifter establishment 15("1111") acquired before, but training signal from AP side is further received, and phase shifter setting is further optimized. First of all Null Data frame bundle of first No-Ack is received using former phase shifter setting 15("1111"), and STA2 acquires reception level by phase shifter setting 15("1111"). When the training for own terminals is started, it is determined, and STA2 receives Null Data frame bundle of subsequent No-Ack using phase shifter setting changed for training by receiving Null Data frame bundle of No-Ack to the own terminal, and the reception level is examined.

Specifically, STA2 changes phase shifter setting to antenna 1 to 7("0111") that inverted after reception of the Null Data frame bundle of first No-Ack, and Null Data frame bundle of next No-Ack is received, and the reception level is examined. Then, STA2 changes phase shifter setting to antenna 2 to 11("1011") that inverted after reception of the Null Data frame bundle of the second No-Ack, and Null Data frame bundle of next No-Ack is received, and the reception level is examined. Then, STA2 changes phase shifter setting to antenna 3 to 13("1101") that inverted after reception of the Null Data frame bundle of the third No-Ack, and Null Data frame bundle of next No-Ack is received, and the reception level is examined. Even more particularly, STA2 changes phase shifter setting to antenna 4 to 14 ("1110") that inverted after reception of the Null Data frame bundle of the fourth No-Ack, and Null Data frame bundle of next No-Ack is received, and the reception level is examined. In this example, when phase shifter setting is 15("1111"), reception level is biggest, and STA2 transmits and receives subsequent data using phase shifter setting 15("1111").

After, in the example of FIG. 19, data transmission with STA2 is finished, and radio shifted to an idle state, when during some period of time passed, phase shifter setting of each antenna of the AP side is done for random phase shift.

Note that, in this example, at the time of the transmission of the beacon, the phase shifter setting of each STA is not optimized, but because is transmitted using random phase shifter setting every beacon, the beacon can receive part of the beacon frame bundle or more in each STA, and the connection confirm to a wireless network can be thereby performed.

Figure 22:
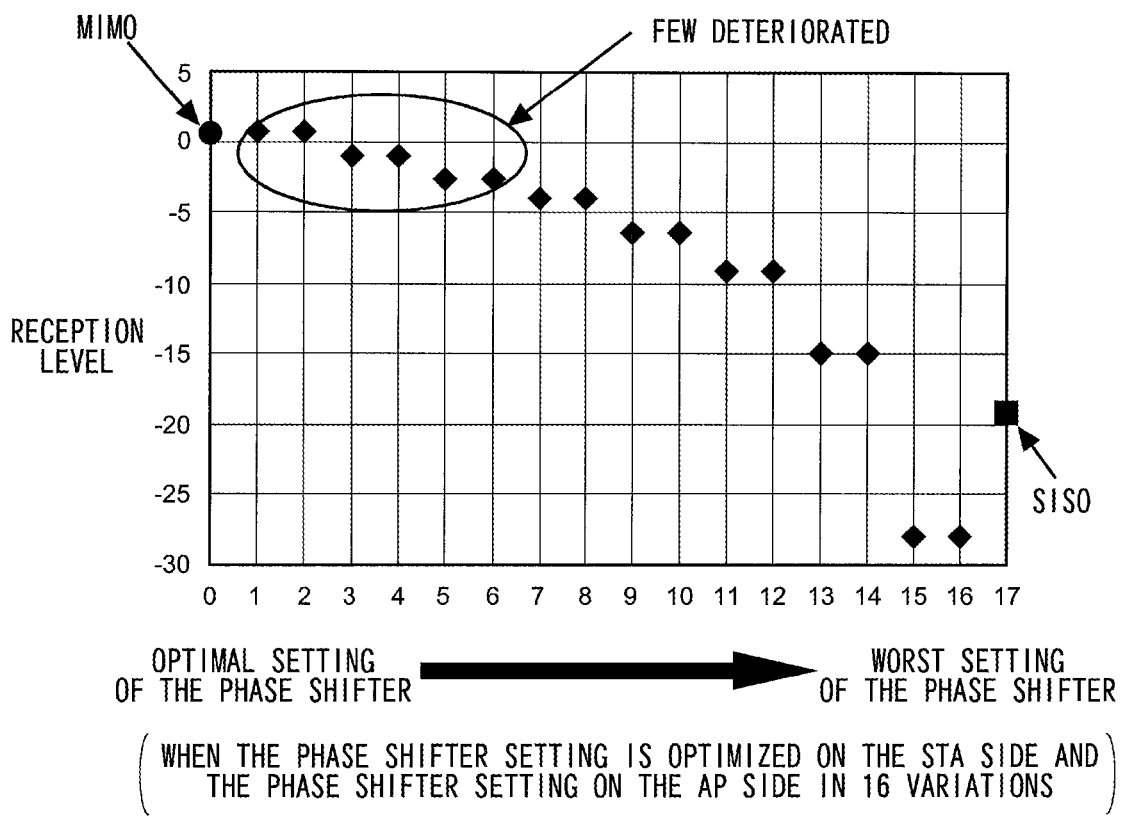
FIG. 22 is a view showing a relationship between the phase shifter setting on the AP side and the reception level obtained by being set in that way when the phase shifter setting is optimized on the STA side.

FIG. 22 shows phase shifter setting of the AP side when phase shifter setting is optimized in the STA side and concern with the reception level at that time. When optimized phase shifter setting is used, referring to the figure above, it is found MIMO transmission gain of about 20 dB being provided, the probability that MIMO transmission gain of 20 dB is provided when phase shifter setting is done randomly being ⅛ and that MIMO transmission gain 15 dB or more is provided with the probability of approximately 50% when phase shifter setting is done with a random. In other words, it is found that a beacon can be received with probability ⅛ or more in the area penumbra when area design was performed in consideration of MIMO transmission gain of 20 dB.

Really, as a reception level decreases, the reception probability of the beacon deteriorates slowly. When this point is considered, as for the reception probability of the beacon in the area penumbra, it is in value bigger than ⅛. The beacon frame bundle does not have to necessarily receive all beacon frame bundle in being used for the connection confirm to a wireless network, and the reception probability of the beacon does not have any problem with this extent. Also, not low radio transmission velocity, more high-speed radio transmission velocity is assumed, and the area may be designed to raise throughput in the communications area in the wireless communication system selecting radio transmission velocity for application depending on radio environment. In this case, in the area penumbra, beacon frame bundle can be received with higher reception probability.

As mentioned earlier, first of all, to each STA, it is necessary to perform access control of the radio transmission by the convergence control an 2-way training transfer is performed, and this is followed, and to perform data transmission with the STA. In the wireless system which adopted TDMA (Time Division Multiple Access) method, this can be implemented using the function of the scheduler in the TDMA system. On the other hand, for example, in the wireless system adopting the distributed control such as the CSMA/CA (Carrier Sense Multiple Access/Collision Avoidance) method, the sequence of the single string can be implemented by using PCF (Point Coordination Function) function. It is example when PCF function was used in CSMA/CA method, and FIG. 19 performs 2-way training transmission to each STA and data transmission in CFP (Contention Free Period) period declared in beacon frame bundle.

When training transmission with each STA and data transmission were performed sequentially after having transmitted a beacon in the above-mentioned illustration, it was available, and it was described, but such a training transmission and the data transmission can be implemented using a technique as referred to as imagination AP. One AP transmits a beacon including a plurality of different network information for the hardware, and virtual AP is a technique to enable the accommodation of the network of the plural using AP of the one by behaving as if logically a plurality of AP exists.

Figure 23:
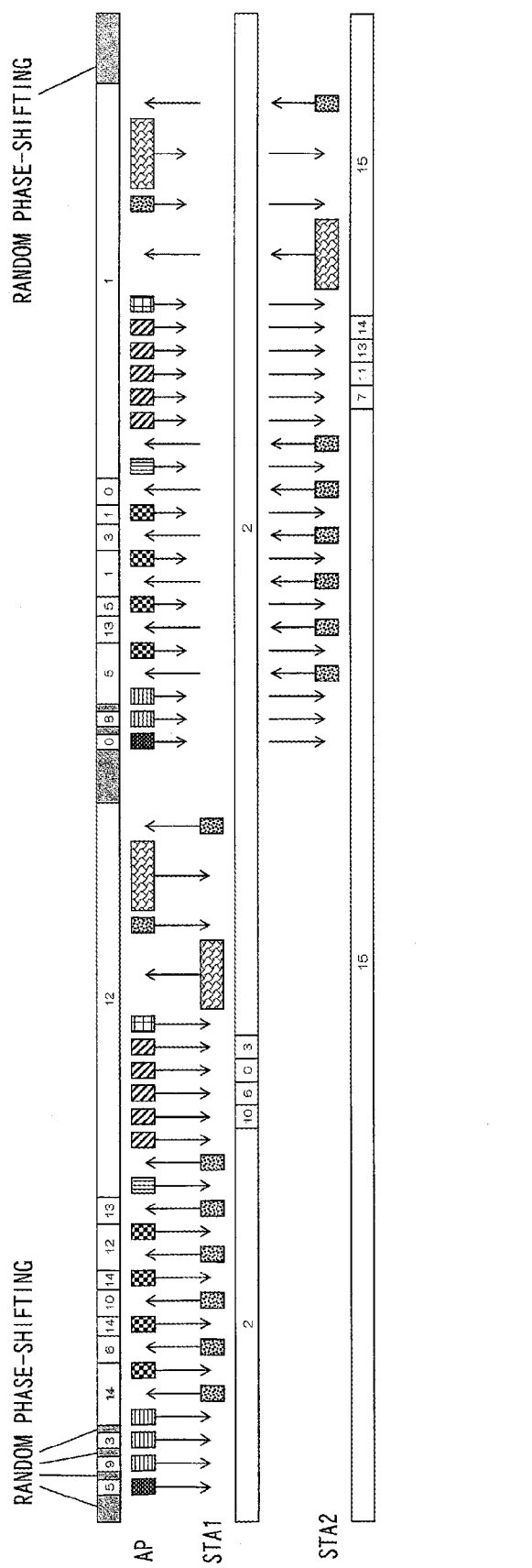
FIG. 23 is a view showing an operation example of the wireless communication system of the present invention when virtual AP technology is employed.

In the following, operation of the wireless communication system of the present invention when a virtual AP technology was used is described. FIG. 23 is a figure which shows operation example at the time of training between AP of this case and a plurality of STA and the data transmission.

The operation of this case is approximately similar to operation shown in FIG. 19, but point using a separate beacon to each STA is different. In other words, AP does phase shifter setting after training transmission to STA1 and data transmission at random, and, after the transmission of the next beacon, training transmission to STA2 and data transmission are performed. AP does phase shifter setting after training transmission to STA2 and data transmission at random again. When the number of STA is 3 or more, beacons three or more for each STA may be transmitted. Also, a beacon for STA of the single antenna may be transmitted to take the STA that does not include multiantenna type namely STA of the single antenna in a system. In FIG. 23, when one or a plurality of STA performs power save operation, a power save can make work using a beacon every STA.

Figure 24:
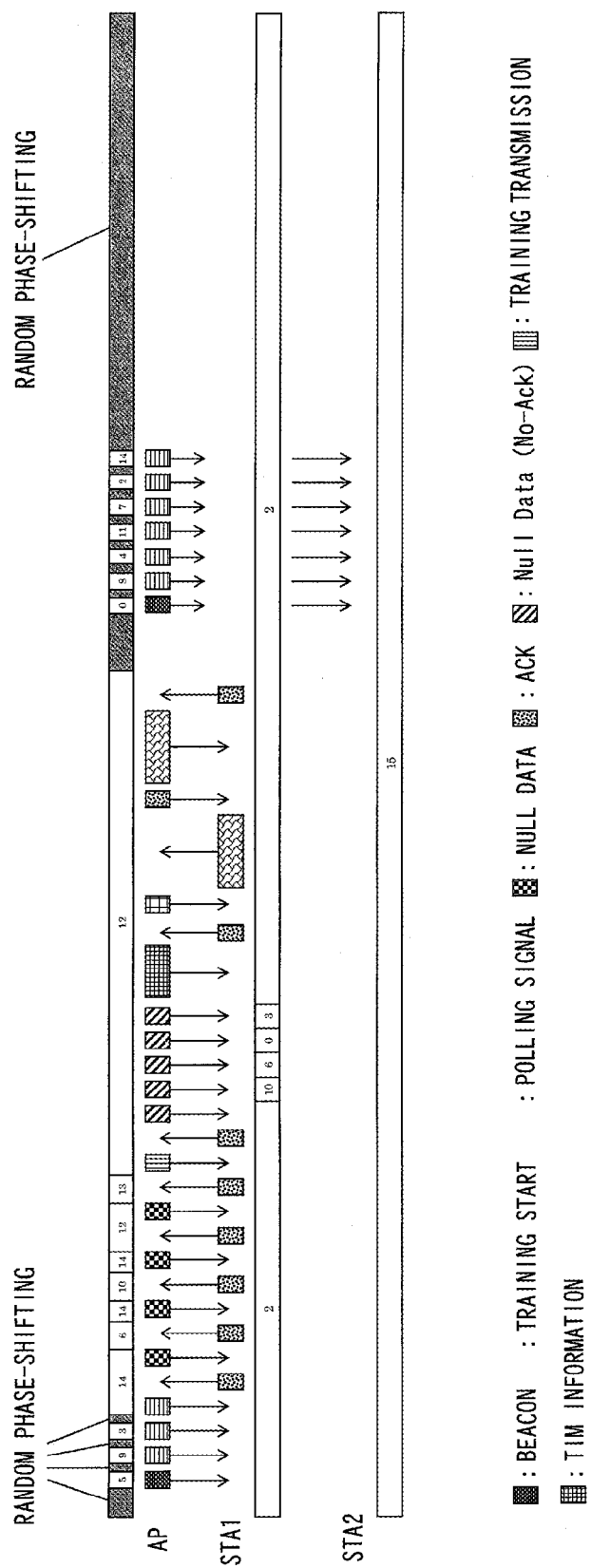
FIG. 24 is a view showing an operation example when STA performs a power save operation.

FIG. 24 shows operation example when both STA1 and STA2 perform power save operation. The power save working STA receives reception or a beacon every k unit (the integer number that 2 is provided or more k) with each beacon, and it is with a sleep mode during the period except it. Usually, the spacing that a beacon is transmitted to is approximately constant. The STA becomes the sleep mode until just before the beacon which plans reception next after having received a beacon. When there is the STA that AP performs power save operation to the subordinates, it is maintained, and the traffic (frame bundle) to the STA notifies an internal memory of there being traffic to the STA using the TIM (Traffic Indication Map) information included in the beacon beforehand once. AP receives an answer from the STA, and frame bundle to the STA is transmitted on radio transmission path for the first time.

As for FIG. 24, STA1 receives a beacon, but STA2 is example when a beacon is not received in a sleep mode. The operation of this case is the same as FIG. 23 after training transmission except that AP transmits TIM information before initiation of the data transmission to STA1.

Because it is transmitted a message before training transmission, as for the beacon frame bundle, the TIM information to include in this may not be received in STA side. Thus, in this example, TIM information is retransmitted after training transmission. Note that, as for the normal beacon, what is transmitted with lowest radio transmission velocity is common to be able to receive in all STA, but it is not had to do with necessarily lowest radio transmission velocity in the re-transmission of this TIM information, and more high-speed transmission speed can be used.

In FIG. 24, STA2 is in a sleep mode and does not receive a beacon. In this case, because it does not reply to a training start signal from AP, in STA2, the training sequence is finished here, and the data transmission is not performed.

Figure 25:
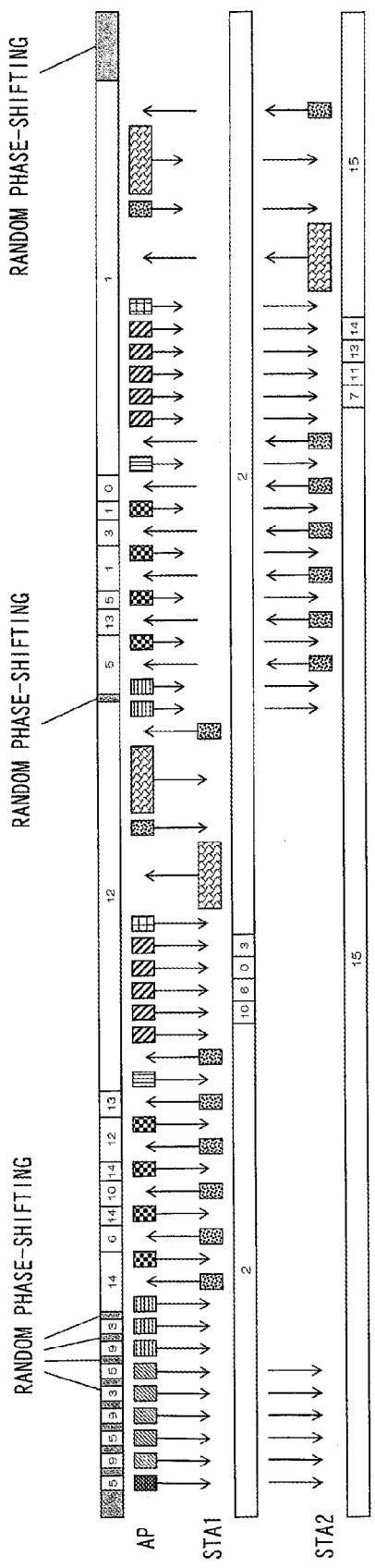
FIG. 25 is a view showing an operation example of the wireless communication system of the present invention when multicast frames and broadcast frames are transmitted from AP to STA.

FIG. 25 is figure which shows the operation example of the unrelated communication system of the present invention when multicast frame bundle from AP to STA, broadcast frame bundle are transmitted. As shown in the figure above, multicast frame bundle from AP, broadcast frame bundle or both are transmitted using different phase shifter setting several times right after a beacon was transmitted. When phase shifter setting of the STA side is optimized as had already described, multicast frame bundle or broadcast frame bundle can be transmitted to each STA with around 99.9% of probability because AP retransmits around ten times using different phase shifter setting.

Not low radio transmission velocity, more high-speed radio transmission velocity is assumed, and the area may be designed to raise throughput in the communications area in the wireless communication system selecting radio transmission velocity for application depending on radio environment. In this case, when re-transmission number of times of multicast frame bundle or the broadcast frame bundle is reduced, these frames can raise probability transmitted to each STA definitely richly.

After having transmitted training signal to each STA and before, for example, for method transmitting multicast frame bundle from AP to STA, broadcast frame bundle, transmitting data as well as the method, there is method performing transmission of multicast frame bundle and the broadcast frame bundle using optimum phase shifter setting provided in training each.

Figure 26:
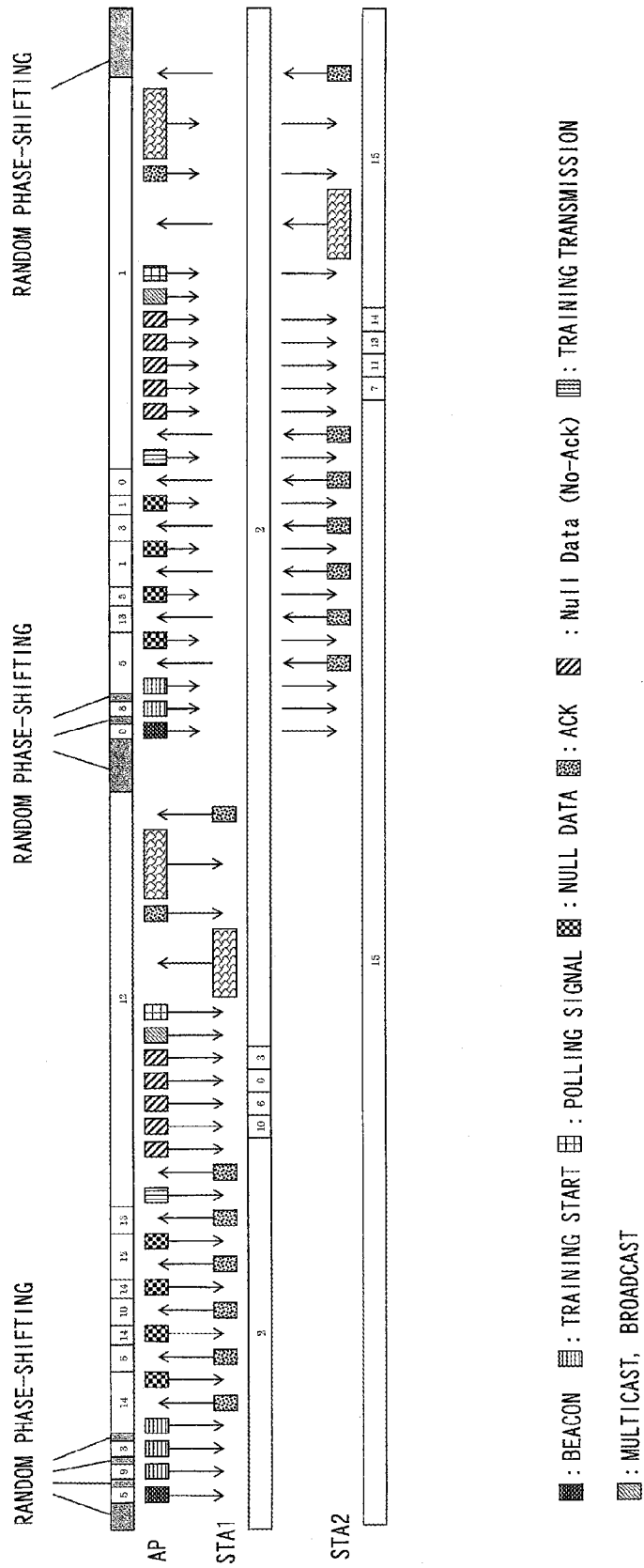
FIG. 26 is a view showing an operation example of the wireless communication system of the present invention when multicast frames and broadcast frames are transmitted.

FIG. 26 shows multicast frame bundle from AP of this case to STA, transmission of the broadcast frame bundle. In this example, using a virtual AP technology, an individual beacon is used to each STA. Also, after having transmitted training signal to each STA, multicast frame bundle of the identification, broadcast frame bundle are transmitted using the setting of an optimum phase shifter to the STA provided in training.

Then, third embodiment of the wireless communication system according to the present invention is described. In the first and second embodiment, 1 bit phase shifter or n binary digit phase shifter (n did a multiplier of weight processing unit 11-k with natural numbers) 2 or more, and value optimum decision operation of the pieces of diversity combining weight information when diversity combining was performed by an equal transmission gain compound was described.

However, it is not limited to a phase shifter, and the multiplier of weight processing unit 11-k further generalizes, and a complex multiplier can be used. In this case, the pieces of diversity combining weight information become the complex number, and, in weight processing unit 11-k, the multiplication with the complex number is carried out. In the third embodiment, diversity receives training signal, and optimum pieces of diversity combining weight information is obtained by updating pieces of diversity combining weight information in the diversity combining complex weight information of the verge. Thereby, the group of the eigenvector to the maximum eigenvalue of the correlation matrix of the channel matrix in the transmission between each antenna group of one set of wireless communication device can set a group of the asymptotic する vectoring. For example, for the specific implementation of the complex multiplier, an orthogonal modulator may be used. When I, Q components of the modulating signal of the orthogonal modulator are represented with I(t), Q(t), respectively and in equivalence low domain, input radio signal of the orthogonal modulator is represented with Z(t), output signal U(t) of the orthogonal modulator is expressed by numerical expression (10).

[EQUATION 10]

$$U(t)=Z(t)\cdot\{I(t)+j\cdot Q(t)\} \qquad (10)$$

When a complex multiplier is used, pieces of diversity combining weight information is changed like first embodiment sequentially, and value optimum of the pieces of diversity combining weight information is found out according to an algorithm to examine reception baseband information at that time, and this can be done with value optimum of the pieces of diversity combining weight information in the data transmit and receive.

In the third embodiment described below, a complex multiplier is used for a multiplier of weight processing unit 11-k every antenna group, and value optimum of the pieces of diversity combining weight information when maximum ratio performs diversity combining by a transmission gain compound is determined.

As mentioned above, when a complex multiplier is used for a multiplier of weight processing unit 11-k, pieces of diversity combining weight information is changed sequentially, and value optimum of the pieces of diversity combining weight information can be found out according to an algorithm to examine reception baseband information at that time. However, it allows value optimum of the pieces of diversity combining weight information to the signal of each antenna to be determined by training sub-signal of the unit in the third embodiment described below (the number of the antenna).

In the following, operation in the wireless communication system of the third embodiment when training signal shown in FIG. 11 for one was used is described. In the reception of each training sub-signal, acquisition of the baseband reception IQ information when baseband reception IQ information when diversity reception was done in the present pieces of diversity combining weight information in each antenna group and the present pieces of diversity combining weight information are changed by a predetermined algorithm, and diversity reception was done is performed.

Here, baseband reception IQ information is complex transfer functions between baseband transmission IQ signal and the baseband reception IQ signal and the information that it is, and, for example, it is baseband reception IQ signal itself corresponding to the preamble included in each training frame. As discussed below, replacing with baseband reception IQ signal, correlation of baseband reception IQ signal and series of predetermined specific information can be used.

Each wireless communication device can determine value optimum of the pieces of diversity combining weight information which makes diversity reception state every antenna group by the time point best by receiving the training signal in 1 training period.

The training signaling (FIG. 11) of this case is located just after the training field of the preamble. One training signaling includes a plurality of training symbols 1, 2-1~2-3. In this case, the training sub-signal is each training symbol.

It is a thing to acquire baseband reception IQ information when training symbol 2-1~2-3 changes pieces of diversity combining weight information by a predetermined algorithm, and diversity reception was done.

Because it is the same as FIG. 1, the basic structure of the wireless communication system of the third embodiment describes the operation with reference to FIG. 1. In FIG. 1, for example, in wireless communication device A, diversity reception does training signal (including training symbol 1, 2-1~2-3) transmitted by Q antenna group Bn1~BnN (n=1~Q) of wireless communication device B in each antenna group Ak1~AkM (k=1~P) when value optimum of the pieces of diversity combining weight information in wireless communication device A is determined. As for training symbol 1, it is done diversity reception using present pieces of diversity weight combining information WAk1, WAk2, . . . , WAkM of the antenna group. On the other hand, as for training symbol 2-1~2-3, it is done diversity reception using pieces of diversity combining weight information WAk1, WAk2, . . . , WAkM which changed present pieces of diversity weight combining information WAk1, WAk2, . . . , WAkM of the antenna group by a predetermined algorithm. Specifically, when a dot product of the second line—the fourth line of column vector and the fourth Hadamard matrix comprising the present pieces of diversity combining weight information and each component of the vectoring that it is are supposed with each pieces of diversity combining weight information for training symbol 2-1~2-3, it is preferable. More specifically, while the present pieces of diversity combining weight information of the antenna group are WAk1, WAk2, . . . , WAk4, the pieces of diversity combining weight information to training symbol 1, 2-1~2-3 are shown as follows.

Training symbol 1: WAk1, WAk2, WAk3, WAk4
Training symbol 2-1: WAk1, −WAk2, WAk3, −WAk4
Training symbol 2-2: WAk1, WAk2, −WAk3, −WAk4
Training symbol 2-3: WAk1, −WAk2, −WAk3, WAk4
Value optimum of WAk1, WAk2, . . . , WAk4 in each antenna group Ak1~AkM are determined based on baseband reception IQ information provided in the diversity reception Also, wireless communication device B transmits training signal using approximately optimum pieces of diversity combining weight information of the antenna group acquired by the nearest past training from antenna Bn1, Bn2, . . . of antenna group configuration group Bn1~BnN. Wireless communication device A does the pieces of diversity combining weight information every antenna group of this wireless communication device B with settlement of 1 training period to update to value optimum of the pieces of diversity combining weight information by the time point. Note that, when communication between wireless communication device A, B is from real initial state, training signal is transmitted and received each other, and wireless communication device A, B enables gaining over to value optimum of the pieces of diversity combining weight information to be described below.

First of all wireless communication device A receives first training symbol 1 transmitted by antenna Bn1, Bn2, . . . , BnN of antenna group Bn1~BnN of wireless communication device B in antenna Ak1, Ak2, . . . , AkM of the M book of each antenna group Ak1~AkM. Each multiplier of weight processing unit 11-k every antenna group multiplies pieces of diversity combining weight information WAk1, WAk2, . . . , WAkM by each received signal from each antenna Ak1, Ak2, . . . , AkM of antenna group Ak1~AkM.

As for each multiplier, it is with multiplication of complex number expression of the pieces of diversity combining weight information and the expression with the equivalence low domain stem of the input signal, it supplies a signal. For pieces of diversity combining weight information WAk1, WAk2, . . . , WAkM every antenna group when first training frame 1 is received, a thing acquired by the nearest past training is used. It is thought that this pieces of diversity combining weight information WAk1, WAk2, . . . , WAkM almost becomes the value optimum under the present conditions. However, at this time, pieces of diversity combining weight information WAk1, WAk2, . . . , WAkM to use can be set optionally. Pieces of diversity combining weight information WAk1, WAk2, . . . , WAkM every this antenna group is further updated after diversity reception of following a plurality of training symbols 2-1~2-4 to an optimum value to be described below.

RF signal distributing/synthesizing unit 12-k every antenna group adds the received signal which pieces of diversity combining weight information WAk1, WAk2, . . . , WAkM is multiplied by weight processing unit 11-k, and diversity combining received signal RA every antenna group is generated.

Then, each component of the vectoring that it is a dot product with the second line of column vector and the fourth Hadamard matrix comprising the present pieces of diversity combining weight information every antenna group is done with each pieces of diversity combining weight information. Using this new pieces of diversity combining weight information WAk1, −WAk2, WAk3, −WAk4, diversity receives training symbol 2-1 to last, and baseband reception IQ information of this time is acquired.

Then, each component of vectoring becoming the dot product with the third line of column vector and the fourth Hadamard matrix comprising the present pieces of diversity combining weight information is done with each pieces of diversity combining weight information. Using this new pieces of diversity combining weight information WAk1, WAk2, −WAk3, −WAk4, diversity receives training symbol 2-2 to last, and baseband reception IQ information of this time is acquired.

Likewise, training symbol 2-3 is received sequentially, and baseband reception IQ information of this time is acquired.

Thus, training symbol 1, 2-1~2-3 is received sequentially, and a dot product with the third line of column vector and the fourth Hadamard matrix comprising the present pieces of diversity combining weight information and each component of the vectoring that it is are done with each pieces of diversity combining weight information in each of these, and baseband reception IQ information at this time is acquired.

By the way, using the baseband reception IQ information which value optimum WAk1, WAk2, . . . , WAkM of the pieces of diversity combining weight information to the signal of each antenna Ak1, Ak2, . . . , AkM every antenna group is done as above, and was provided, it is done as follows, and it can be determined.

Baseband reception IQ information rA1 of any antenna group in the reception of training symbol 1, 2-1~2-3 is represented by numerical expression (11).

[EQUATION 11]

$$r_{A1}=(A1+A2+A3+A4)/C_0$$

$$r_{A2\text{-}1}=(A1-A2+A3-A4)/C_0$$

$$r_{A2\text{-}2}=(A1+A2-A3-A4)/C_0$$

$$r_{A2\text{-}3}=(A1-A2-A3+A4)/C_0 \quad (11)$$

Herein, C0 is transmission gain in the receiving system of the antenna group of wireless communication device A in the reception of the preamble to precede training frame 2-1~2-3.

Numerical expression (12) is obtained from numerical expression (11).

[EQUATION 12]

$$A1=C_0 \cdot (r_{A1}+r_{A2\text{-}1}+r_{A2\text{-}2}+r_{A2\text{-}3})/4$$

$$A2=C_0 \cdot (r_{A1}-r_{A2\text{-}1}+r_{A2\text{-}2}-r_{A2\text{-}3})/4$$

$$A3=C_0 \cdot (r_{A1}+r_{A2\text{-}1}-r_{A2\text{-}2}-r_{A2\text{-}3})/4$$

$$A4=C_0 \cdot (r_{A1}-r_{A2\text{-}1}-r_{A2\text{-}2}+r_{A2\text{-}3})/4 \quad (12)$$

Herein, A1, A2, . . . , A4 is complex vector.

Pieces of diversity combining weight information WAk1, WAk2, . . . , WAk4 in the antenna group can be optimized by updating pieces of diversity combining weight information WAk1, WAk2, . . . , WAk4 to be each proportional to a complex conjugate of four vectoring A1, A2, . . . , A4. In other words, numerical expression (13) is provided.

[EQUATION 13]

$$W_{A1}=A1^* / \sqrt{|A1|^2+|A2|^2+|A3|^2+|A4|^2}$$

$$W_{A2}=A2^* / \sqrt{|A1|^2+|A2|^2+|A3|^2+|A4|^2}$$

$$W_{A3}=A3^* / \sqrt{|A1|^2+|A2|^2+|A3|^2+|A4|^2}$$

$$W_{A4}=A4^* / \sqrt{|A1|^2+|A2|^2+|A3|^2+|A4|^2}$$

Because in reception of the training signal of FIG. 11, reception AGC operation is completed by using a part of the training field of the frame bundle top, gains are same when training symbol 1, 2-1-2-3 are received (C1=C2-1=C2-2=C2-3=C2-4). Thus, relative received signal of each antenna can be demanded from output signal rA1, rA2-1, rA2-2, . . . , rA2-4 of the above correlation arithmetic by the timeliness of the correlative peak in 1, 2-1~2-4 training symbol reception.

While the output signal of the correlative arithmetic by the timeliness of the correlative peak is information integrated in terms of time, and reducing influence of thermal noise or the interference signal by using this, value optimum WAk1, WAk2, . . . , WAkM of the pieces of diversity combining weight information can be determined.

Figure 27:
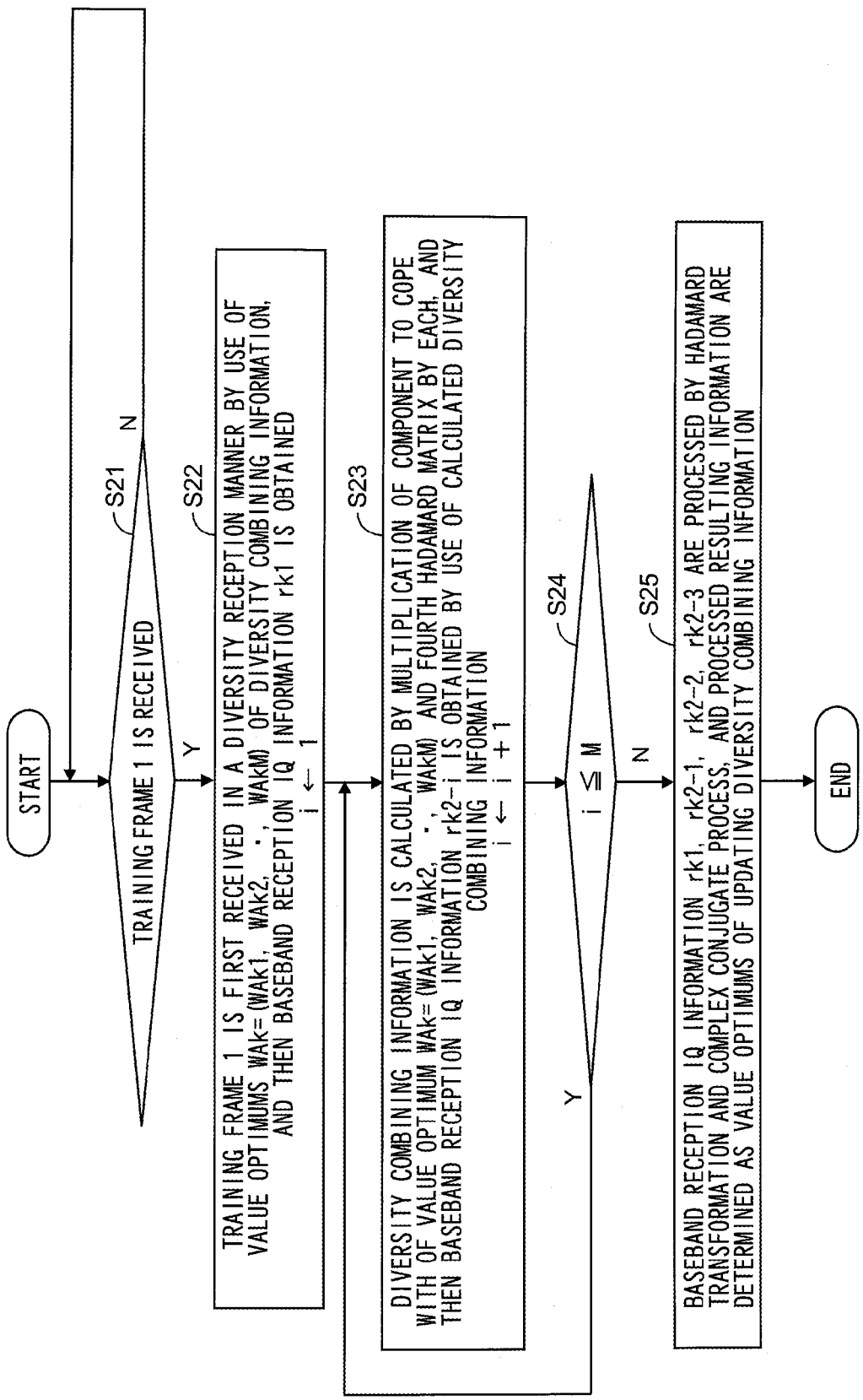
FIG. 27 is a flow chart showing a process of determining a value optimum of diversity combining weight information (complex weight) in the wireless communication device by the reception of training signal shown in FIG. 11.

FIG. 27 is a flow chart showing a process of determining the value optimum of diversity combining weight information in the wireless communication device A by the reception of training signal shown in FIG. 11. Herein, a flow is shown in a case in which the number of antennas in each antenna group is M, and in which a complex multiplier is used as a multiplier of the weight processing unit 11.

First, the foremost training field is received (S21), and then baseband reception IQ information r1 is obtained through diversity reception of training symbol 1 at the head of the training signal using optimal diversity combining weight information WAk=(WAk1, WAk2, . . . , WAkM). Additionally, 1 is substituted for variables i (i←1) (S22). Variables i prescribes that a loop consisting of the following steps is performed M times that correspond to the number M of antennas. WAk=(WAk1, WAk2, . . . , WAkM) are initial value of diversity combining weight information of the antenna group, respectively. Herein, it is supposed that the multipliers of the weight processing unit 11-k of each antenna group Ak1~AkM are complex multipliers, and hence each WAk1, WAk2, . . . , WAkM of diversity combining weight information is complex information.

Thereafter, diversity reception does training symbol 2-i using the pieces of diversity combining weight information which is obtained by multiplication of the component to cope with of the (i+1) sequence of value optimum WAk=(WAk1, WAk2, . . . , WAk4) of the pieces of diversity combining weight information of the antenna group and the fourth Hadamard matrix by each (S23). Further, in S23, an increment of 11 s given to variables i (i←i+1). Thereafter, it is determined whether variables i is the number M of antennas or smaller (S24). If variables i is the number M of antennas or smaller, the process returns to S23, but variables i is not the number M of antennas or smaller, pieces of diversity combining weight information WAk1, WAk2, . . . , WAk4 are updated by using baseband reception IQ information r1, r2-1, r2-2, . . . , r2-4 acquired in S22 and S23 (S25).

By the above-mentioned flow, pieces of diversity combining weight information WAk2, WAk3, . . . , WAkM to the signal of each antenna Ak1, Ak2, . . . , AkM of each antenna group Ak1~AkM (k=1~P) can be optimized. Thus, when the number of the antenna of each antenna group Ak1~AkM (k=1~—P) uses a complex multiplier as a multiplier in the case of M, pieces of diversity combining weight information WAk=(WAk1, WAk2, . . . , WAkM) of the antenna group can be optimized by the diversity reception of the symbol of the total (M+1) unit.

Figure 28:
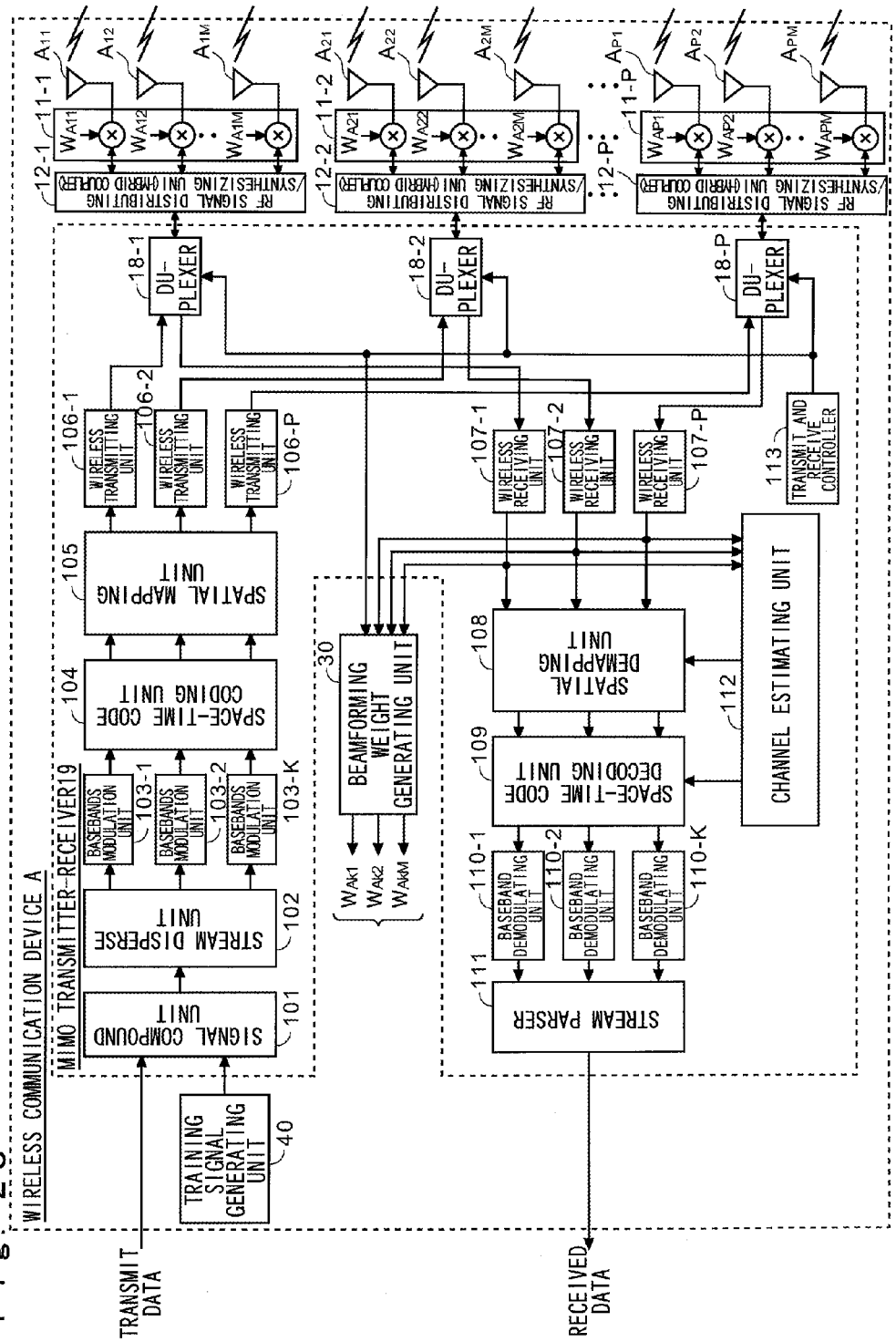
FIG. 28 is a block diagram showing a structure of the third embodiment of a wireless communication device according to the present invention.

FIG. 28 is a block diagram which shows structure of the third embodiment of the wireless communication device according to the present invention. Note that, in FIG. 28, the same sign is referred to a same as FIGS. 1 and 6 or equal part, and wireless communication device A of FIG. 1 is shown here, but wireless communication device B is similar, too. Also, FIG. 28 shows an embodiment when a multiplier of weight processing unit 11-k is a complex multiplier. The block construct of the third embodiment is the almost same as block construct of the second embodiment, but the point that only reception baseband IQ information is output is different without reception level information being output by each wireless receiving unit 107-k. The reception baseband IQ information from each wireless receiving unit 107-k is applied to both of spatial demapping unit 108 and beam forming state weight generating unit 30. In the third embodiment, beam forming state weight generating unit 30 controls the phase shifter only based on reception baseband IQ information.

Figure 29:
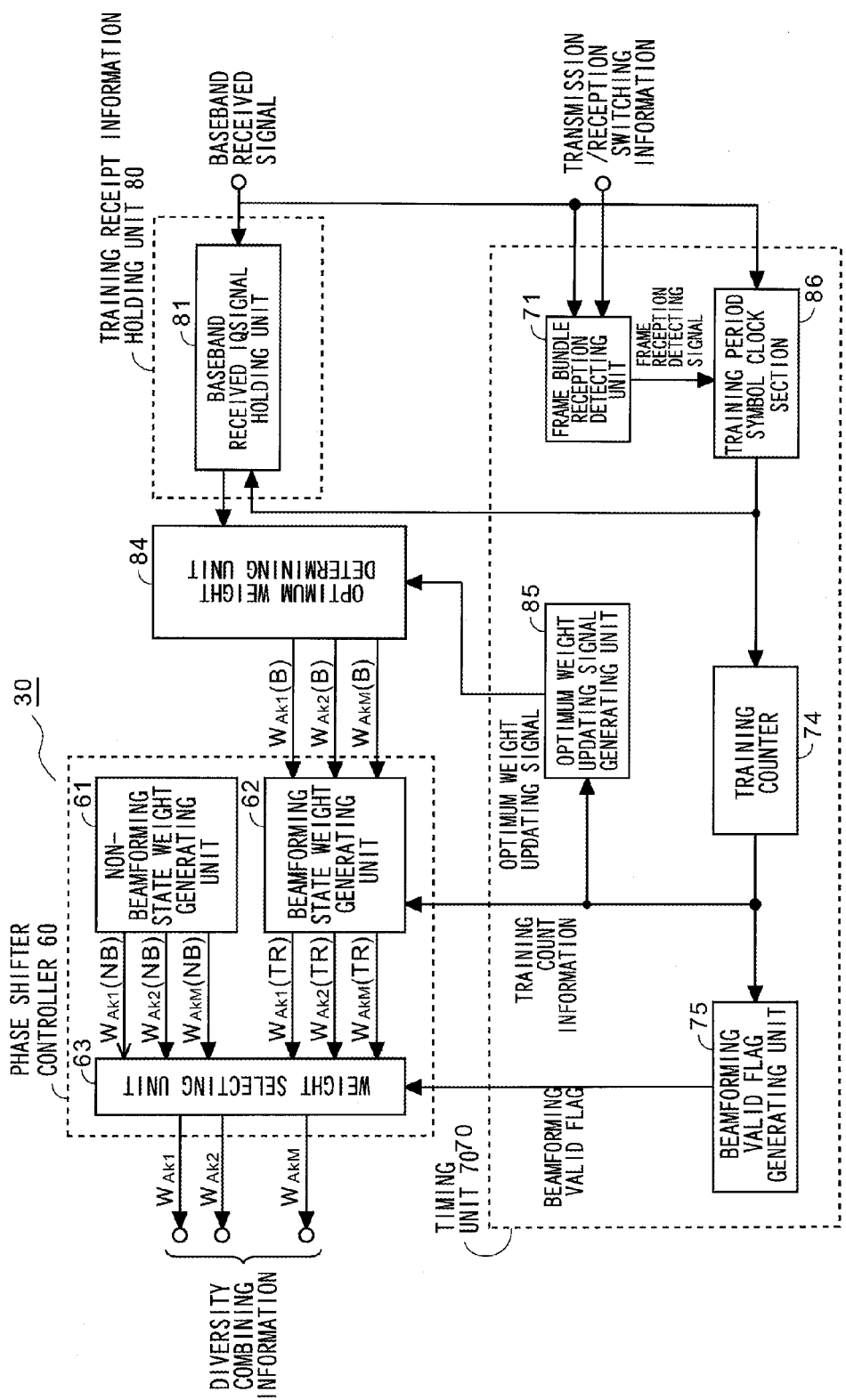
FIG. 29 is a block diagram showing a concrete structure of the beam forming state weight-generating unit of FIG. 28.

FIG. 29 is a block diagram which shows concrete structure of beam forming state weight generating unit 30 of FIG. 28. Note that, in FIG. 29, it is referred the same sign to a same as FIG. 7 or equal part. Beam forming state weight generating unit 30 functions as "a diversity combining information generating unit", and it includes "a diversity combining information generating unit for initial acquisition", "a diversity combining information generating unit for training", "training receipt information holding unit" and "a diversity combining information value optimum generating unit".

Beam forming state weight generating unit 30 includes training receipt information receiving portion 80, optimum weight determining unit 84, phase shifter controller 60 and timeliness unit 70, and, through 2-way training signal transmission, value optimum of the pieces of diversity combining weight information for beam forming and diversity combining is determined.

Reception level information holding unit 80 includes baseband received IQ signal holding unit 81. Reception level information holding unit 80 functions as "training receipt information holding unit".

Baseband received IQ signal holding unit 81 maintains the baseband reception IQ signal which is baseband received signal corresponding to the known pattern included in each training frame on the occasion of training sequence reception.

Specifically, when baseband received signal corresponding to known pattern "1" (a complex number) shall be held, as for the baseband reception IQ signal, it is with complex transfer functions (vectoring) to represent phase rotation so as to be able to put between transmission baseband unit and reception baseband unit.

As known pattern, influence of the noise in the estimation of complex transfer functions can be reduced, for example, using LTF in 802.11n by doing correlative arithmetic listing with baseband reception signal and LTF corresponding to this with baseband reception IQ signal. If known pattern is included in all training frame of the training sequence, the estimate of complex transfer functions and the baseband reception IQ signal that it is can be demanded therewith. The known pattern included in each training frame may be all the identification, and all may be different each other. The baseband received signal is applied to frame bundle reception detecting unit 71 and for-training period symbol clock generating unit 86.

The transmission/reception switching information is applied to frame bundle reception detecting unit 71, too. A send state, reception are in a state, and a transmission/reception switching information is information representing state of wireless communication device such as the power save state. Transmit and receive control information generates frame reception detecting signal showing the initiation timeliness of the training symbol using baseband reception IQ signal when it is in reception state, and frame bundle reception detecting unit 71 outputs. For example, symbol timeliness is extracted using a preamble header portion, and frame reception detecting signal showing the initiation timeliness of the training symbol is thereby generated, and frame bundle reception detecting unit 71 outputs on the occasion of frame bundle reception. The frame reception detecting signal is applied to symbol clock section 86 during a training period. Symbol clock section 86 generates a clock signal for training corresponding to each training symbol during a training period. The clock signal for training is applied to baseband received IQ signal holding unit 81, and baseband received IQ signal holding unit 81 maintains the estimate of complex transfer functions and information of the baseband reception IQ signal that it is using a clock signal for training. The clock signal for training is applied to training counter 74, and, from training counter 74, the training count information which is counting value of received training symbol number is output.

The training count information is applied to optimum weight updating signal section 85. When a count value reached, for example, a maximum of the number of the antenna of each antenna group, it is with "1" only between predetermined time, e.g., 1 us, and optimum weight updating signal section 66 outputs the optimum weight updating signal which is "zero" and the pulse signal that it is other than it. The optimum weight updating signal is applied to optimum weight determining unit 84. The baseband reception IQ signal held with baseband received IQ signal holding unit 81 is applied to optimum weight determining unit 84. As for optimum weight determining unit 84, Hadamard transformation does, for example, baseband reception IQ signal by the timing of the pulse signal of the optimum weight updating signal, and optimum piece of diversity combining weight information is demanded by putting the process of the complex conjugate more, and it is determined. These optimum pieces of diversity combining weight information WAk1(B), WAk2(B), . . . , WAkM(B) are output to beam forming state weight generating unit 62. Training count information from training counter is applied to beam forming state weight generating unit 62. When it is shown that training count information is training, beam forming state weight generating unit 62 outputs the thing which multiplied each component of the predetermined column vector of Hadamard matrix fixed at optimum pieces of diversity combining weight information WAk1(B), WAk2(B), . . . , each of WAkM(B) in training count information by as each WAki(TR) of pieces of diversity combining weight information WAk1(TR), WAk2(TR), . . . , WAkM(TR) for training. When it is not shown that training count information is training, optimum pieces of diversity combining weight information WAk1(B), WAk2(B), . . . , WAkM(B) are output as each WAki(TR) of pieces of diversity combining weight information WAk1(TR), WAk2(TR), . . . , WAkM(TR) for training. This is because it is thought that the pieces of diversity combining weight information provided by the nearest past training becomes approximately optimum.

Phase shifter controller 60 includes non-beam forming state weight generating unit 61, beam forming state weight generating unit 62 and weight selecting unit 63. Non-beam forming state weight generating unit 61, beam forming state weight generating unit 62 function as "a for-initial-acquisition diversity combining information generating unit", "a for training diversity combining information generating unit", respectively, and beam forming state weight generating unit 62 is put together with optimum weight determining unit 84, and it functions as "a diversity combining information value optimum generating unit".

First of all, for gaining over from real initial state to value optimum of the pieces of diversity combining weight information, it is necessary to receive frame bundle including the training signal from counterpart wireless communication device. However, frame bundle including the training signal which counterpart wireless communication device transmits from the first may not be received. Thus, even real initial state allows counterpart wireless communication device to receive frame bundle including the training signal which own wireless communication device transmits. This sets pieces of diversity combining weight information WAk1, WAk2, ..., WAkM in each training symbol each other to be different, and training signal is transmitted, and counterpart wireless communication device can be implemented by what can receive either training symbol.

Non-beam forming state weight generating unit 61 generates pieces of diversity combining weight information WAk1(NB), WAk2(NB), ..., WAkM(NB) of such a non-beam forming state. Pieces of diversity combining weight information WAk1, WAk2, ..., WAkM when this training signal is transmitted is arbitrary, but it is desirable to change into every training symbol.

Specifically, in the case of M, the number of antenna comprising one antenna group Ak1~AkM operates a megabit counter with a symbol clock, and the count value of the M unit may be used as each pieces of diversity combining weight information WAk1, WAk2, ..., WAkM. For example, if any M unit in the count information of the 2M period was used in reception of the frame bundle which there is, different pieces of diversity combining weight information WAk1, WAk2, ..., WAkM can be used every frame bundle by using the count information of the M unit of the continuance in the reception of the next frame bundle, and the initial beam formation can be performed surely.

Beam forming valid flag section 75 receives a training symbol of the predetermined number, and the beam forming valid flag showing optimum diversity combining weight information being determined is output to weight selecting unit 63. The beam forming valid flag is generated based on training count information from training counter 74.

Beam forming valid flag is "invalidity" in the initial state (e.g., "zero"), but it is with "significance" (e.g., "1") by reception of the frame bundle of predetermined number of times, e.g., several times of antenna. Also, when frame bundle cannot be received between during a scheduled period, e.g., 100 ms, it is preferable as "invalidity" in beam forming valid flag. As for weight selecting unit 63, in the case of invalidity, beam forming valid flag selects pieces of diversity combining weight information WAk1(NB), WAk2(NB), ..., WAkM (NB) from non-beam forming state weight generating unit 61, and, in the case of significance, beam forming valid flag selects pieces of diversity combining weight information WAk1(TR), WAk2(TR), ..., WAkM(TR) from beam forming state weight generating unit 62.

As a result, weight selecting unit 63 selects pieces of diversity combining weight information WAk1(NB), WAk2(NB), ..., WAkM(NB) until frame bundle of the predetermined number of times is received, and, after it, pieces of diversity combining weight information WAk1(TR), WAk2(TR), ..., WAkM(TR) is selected.

In the 2-way transmission of the data following training, maintained pieces of diversity combining weight information WAk1(TR), WAk2(TR), ..., WAkM(TR) is read, and it is provided in weight processing unit. Then, in third embodiment of the present invention, it is explained in detail about training operation when the training signal comprising training symbols is used.

Figure 30:
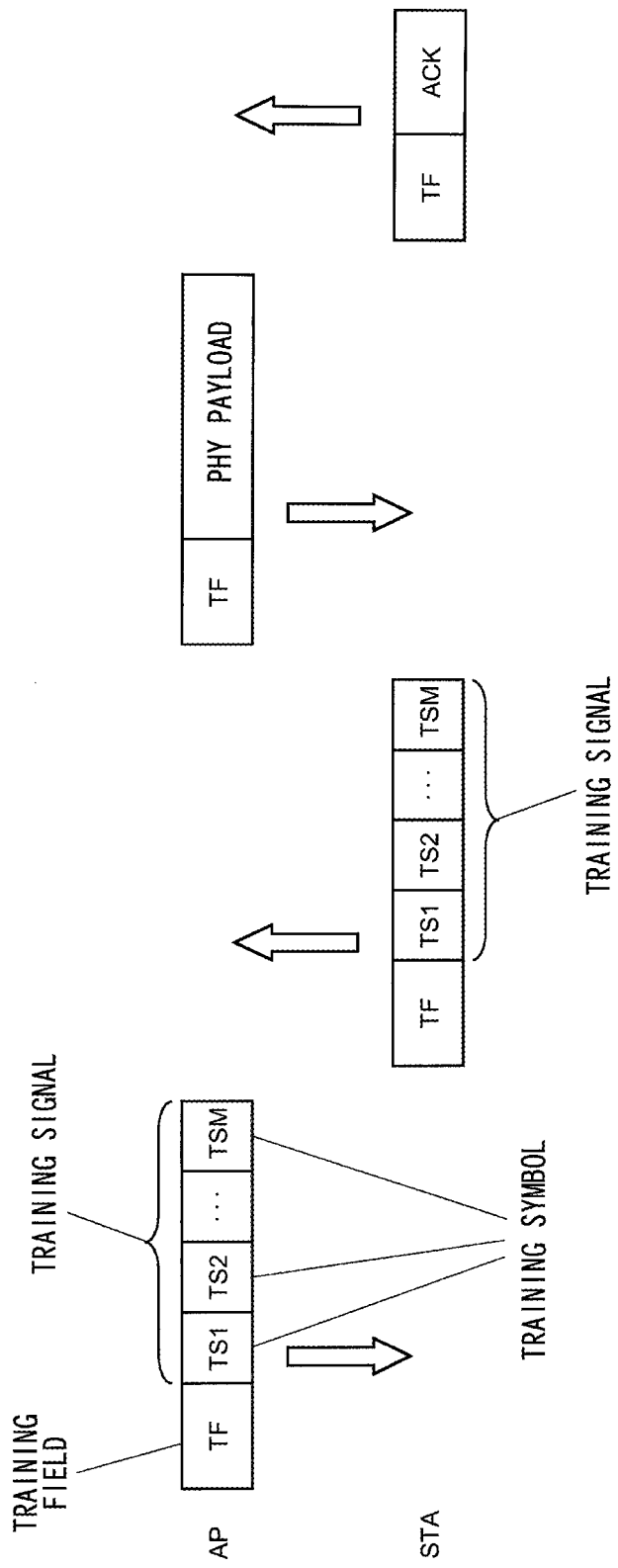
FIG. 30 is a view showing an example of a training sequence when two-way transfer of training signal is performed using training symbols.

FIG. 30 is an example of the transmission sequence including the bi-direction training at being like this. In FIG. 30, a packet for first training is transmitted from base station(AP) side. The packet for this training includes training field TF and training signal comprising a plurality of training symbol TS1~TSM. The training field TF is used in common radio packet transmission, and it is included of known signal pattern. On the receiving end, using this, operation such as AGC operation, timeliness synchronization and the compensation of the carrier frequency offset are performed. This training field TF is followed, and training signal comprising the training symbol TS1~TSM of the number corresponding to the numerical maximum of the antenna of each antenna group of the terminal(STA) side is transmitted. The STA that received a packet for this training transmits a packet for training just after that to AP. Things number 100 us or less are desirable for the time interval of a packet for this first training and the packet for the second training. For example, when this technique is applied to wireless system such as IEEE 802.11, the collection of a series of 2-way transfers is done with single sequence, and it is desirable to do all packet spacing with SIFS. In reception in the STA of the packet for first training, the pieces of diversity combining weight information to each antenna of each antenna of the STA side is approximately optimized. Also, in reception in AP of the packet for the second training, the pieces of diversity combining weight information to each antenna of each antenna of the AP side is approximately optimized.

Then PHY payload transmission from AP to STA is performed, and, in the example shown in FIG. 30, an ACK packet is transmitted last to AP by STA. Such a transmission sequence can be implemented in transmission sequence using RTS/CTS in IEEE 802.11 by adding training signal comprising a plurality of training symbol TS1~TSM to RTS and CTS. When STA moves fast, and radio wave propagation environment fluctuates because it is usually several millimeters of second base or less, the conventional fading frequency is number 10 Hz or less, and, as for the time length of such a series of transmission sequences, the fluctuation of the radio wave propagation environment in a series of transmission sequence can implement approximately optimum radio transmission path because it can be ignored.

Figure 31:
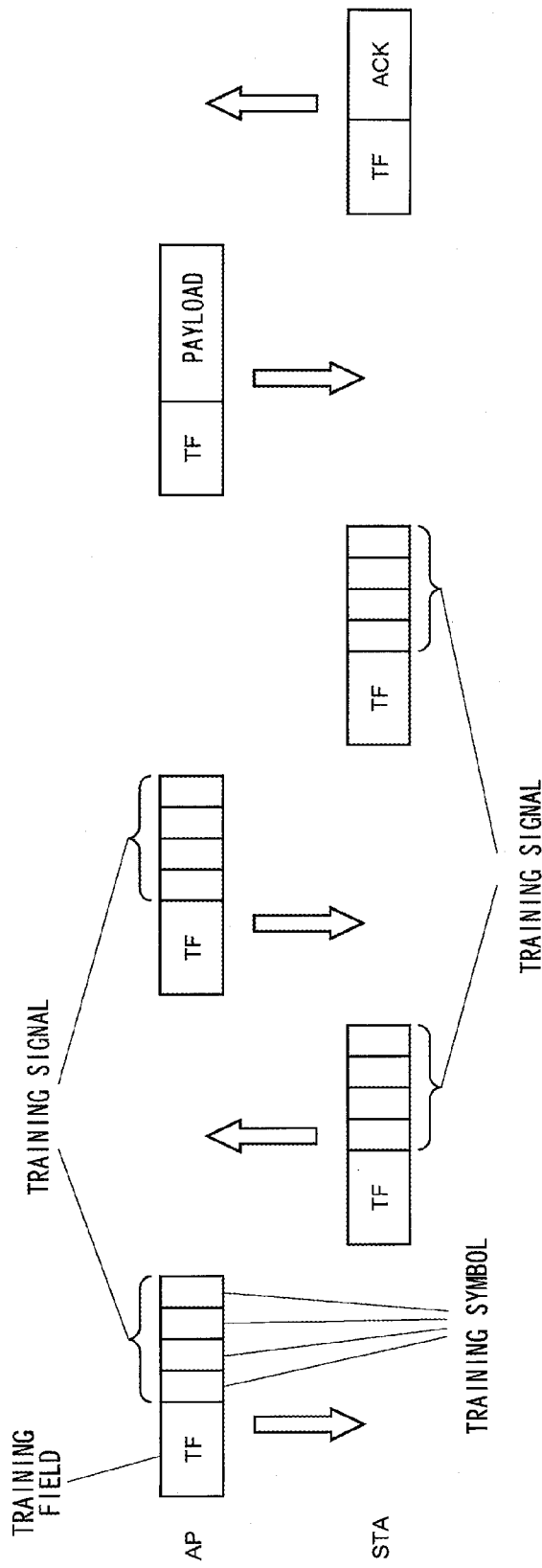
FIG. 31 is a view showing an example of the transfer sequence when a plurality of two-way transfer of training signal is performed.

In FIG. 30, a transfer of the training signal is only 1 coming and going. Even this can generally form optimum radio transmission path, but the 2-way training signal transmission of multiple times as shown in FIG. 31 may be performed to optimize transmission path more. When failure occurs in either packet reception of AP or the STA like transmission sequence using RTS/CTS in IEEE 802.11, in FIG. 30 or FIG. 31, transmission sequence may be stopped by the reception of the packet. Also, for example, after AP changed phase shift setting in each antenna of each antenna group when failure occurs in reception in the STA of the packet for first training, the said packet may be retransmitted. Note that, the training using such a transmission sequence is applicable in not only the third embodiment of the present invention but also first embodiment of the present invention and the second embodiment.

Next, a description will be given of a state in which diversity combining weight information becomes optimum. First, let it be supposed that the wireless communication device A and B include only one antenna group, respectively, and each antenna group include two antennas. And let it be supposed that the pieces of diversity combining weight information which are multiplied with signal of each antenna A1, A2, B1, B2 is expressed WA1, WA2, WB1, WB2, respectively.

Figure 32:
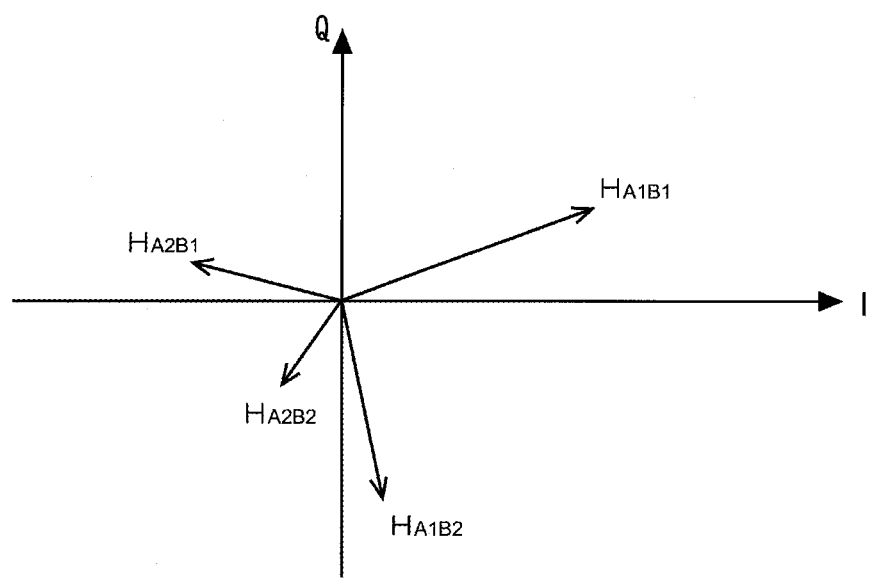
FIG. 32 is a view showing an example of a transfer function between antennas.

Further, let it be supposed that transfer functions between antenna A1, A2 and antenna B1, B2 are HA1B1, HA1B2, HA2B1, HA2B2, respectively, and let it be supposed that a wireless transmission line between the wireless communication device A and the wireless communication device B is a flat fading environment. Under these suppositions, transfer functions HA1B1, HA1B2, HA2B1 and HA2B2 become complex numbers, and can be expressed as vectors. FIG. 32 shows an example of transfer function HA1B1, HA1B2, HA2B1 and HA2B2.

A multiplier connected to each of the antennas A1, A2, B1 and B2 multiplies a received signal from each of the antennas A1, A2, B1 and B2 by diversity combining weight information WA1, WA2, WB1 and WB2, respectively. Diversity combining weight information by which a transmit signal is multiplied at a time of transmission is basically the same as diversity combining weight information by which a received signal is multiplied at a time of reception. However, strictly, a correction which results from the fact that a transmission system and a reception system in a two-way transfer are different from each other, is required.

The signal distributing/synthesizing units output signals obtained by energetically distributing transmit signal SA and SB into two parts at a time of transmission to two multipliers, whereas the signal distributing/synthesizing unit output signals obtained by synthesizing (i.e. vector-adding) output signals from two multiplier as received signal RA, RB at a time of reception.

On the supposition that transmission is being performed from the wireless communication device A to the wireless communication device B, SA·WA1/√2 and SA·WA2/√2 are transmitted from antennas A1 and A2 of the wireless communication device A, respectively. These signals are received by the antennas B1 and B2 of the wireless communication device B. The received signals of the antennas B1 and B2 are SA·(WA1·HA1B1+WA2·HA2B1)/√2 and SA·(WA1·HA1B2+WA2·HA2B2)/√2, respectively. These signals are multiplied by diversity combining weight information, and are added together, and as a result, a received signal RB is generated. The received signal RB is expressed by numerical expression (14).

[EQUATION 14]

$$R_B = S_A \cdot (W_{A1} \cdot H_{A1B1} \cdot W_{B1} + W_{A2} \cdot H_{A2B1} \cdot W_{B1} + W_{A1} \cdot H_{A1B2} \cdot W_{B2} + W_{A2} \cdot H_{A2B2} \cdot W_{B2})/2 \quad (14)$$

Next, let it be supposed that transmission is being performed from the wireless communication device B to the wireless communication device A, SB·WB1/√2 and SB·WB2/√2 are transmitted from the antenna B1 and B2 of the wireless communication device B, respectively. These signal are received by the antennas A1 and A2 of the wireless communication device A, respectively. The received signals of the antenna A1 and A2 are SB·(WB1·HA1B1+WB2·HA1B2)/√2 and SB·(WB1·HA2B1+WB2·HA2B2)/√2, respectively, respectively. These signals are multiplied by diversity combining weight information, and are added together, and as a result, a received signal RA is generated. The received signal RA is expressed by numerical expression (15), which is the same as the received signal RB.

[EQUATION 15]

$$R_A = S_B \cdot (W_{A1} \cdot H_{A1B1} \cdot W_{B1} + W_{A2} \cdot H_{A2B1} \cdot W_{B1} + W_{A1} \cdot H_{A1B2} \cdot W_{B2} + W_{A2} \cdot H_{A2B2} \cdot W_{B2})/2 \quad (15)$$

A state in which pieces of diversity combining weight information WA1, WA2, WB1 and WB2 are optimum denotes a state in which the level of received signal RA and RB is maximum and in which MIMO transmission gain is maximum. When the amplitude of each of the pieces of diversity combining weight information WA1, WA2, WB1 and WB2 is made proportionate to the amplitude of the received signal of each antenna, maximum ratio combining is reached, and, when the amplitude of each of diversity combining weight information WA1, WA2, WB1 and WB2 fixed at a constant value, e.g., at 1, equal gain combining is reached.

Generally, received signal RA and RB contain (M×N) WA i·HA i B j·W B j components in which M is the number of the antennas of the wireless communication device A, and N is the number of antennas of the wireless communication device B. Here, each of these components is referred to as an "elementary wave SAiBj". Each elementary wave SAiBj is expressed by the product of three complex numbers, i.e., a transfer function HAiBj between a transmitting antenna Ai and a receiving antenna Bj, diversity combining weight information WAi with respect to the transmitting antenna Ai, and diversity combining weight information WBj with respect to the receiving antenna Bj.

Each elementary wave SAiBj is vector quantity. The level of received signals RA and RB can be maximized by allowing the direction (M×N) elementary waves SAiBj to coincide with each other, and the pieces of diversity combining weight information WA1, WA2, WB1 and WB2 reach the optimum at that time.

Figure 33A:
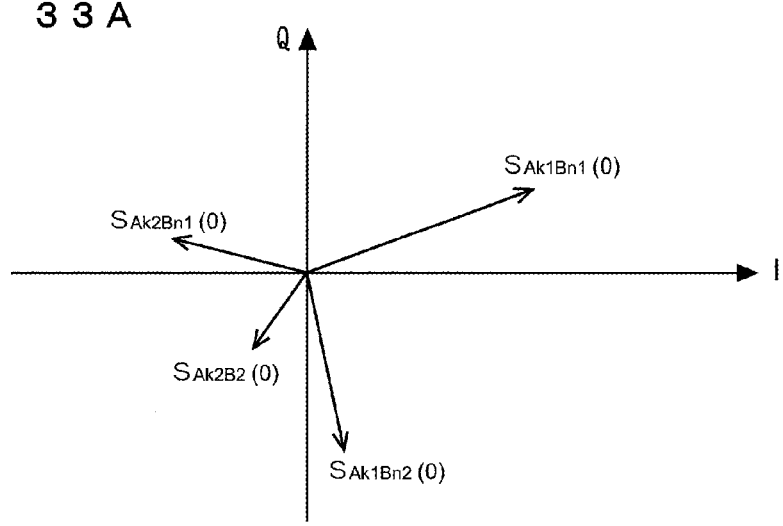
FIG. 33A is an explanatory view showing an example of the updating of diversity combining weight information (complex weight)(elementary wave SAiBj) in the present invention.
Figure 33B:
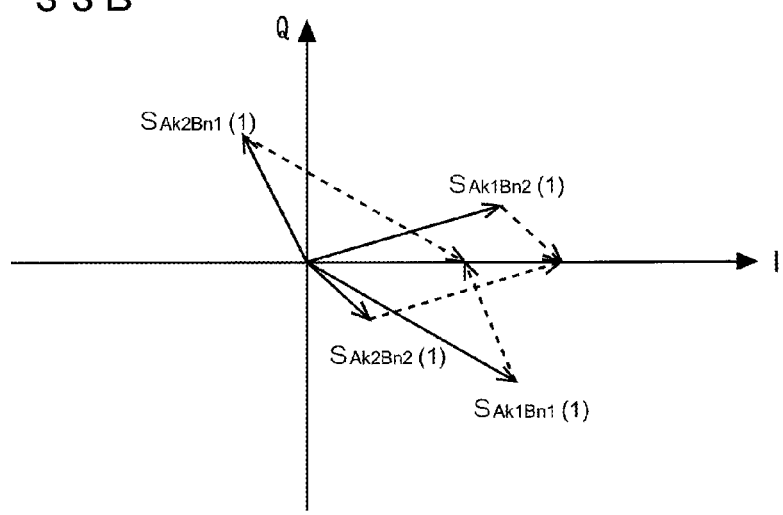
FIG. 33B is an explanatory view showing an example of the updating of diversity combining weight information (complex weight)(elementary wave SAiBj) in the present invention
Figure 33C:
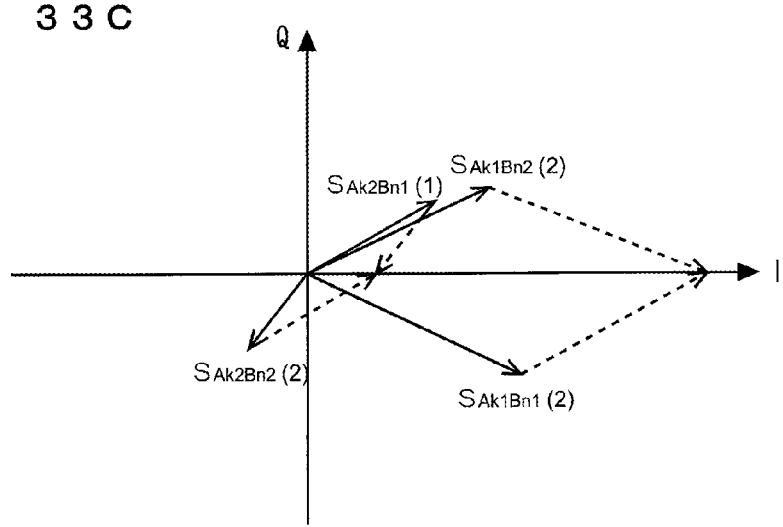
FIG. 33C is an explanatory view showing an example of the updating of diversity combining weight information (complex weight)(elementary wave SAiBj) in the present invention.
Figure 34A:
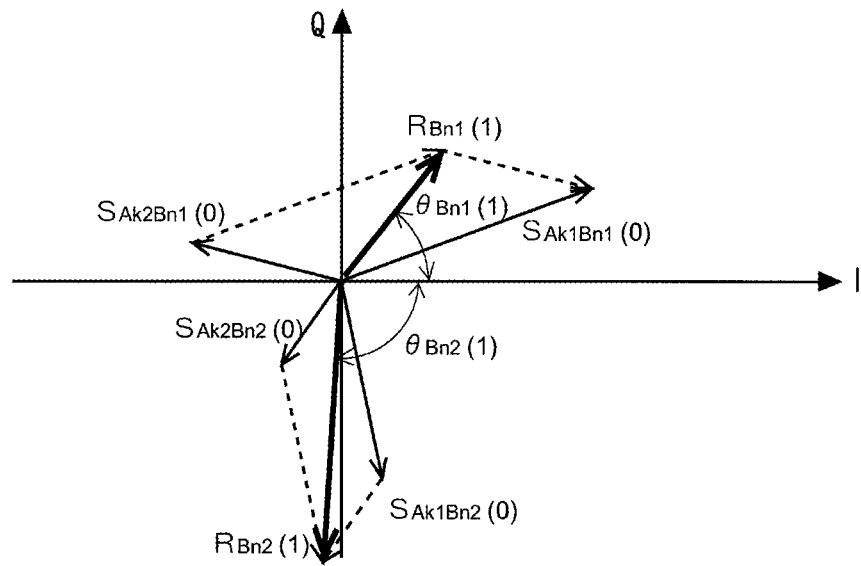
FIG. 34A is an explanatory view showing an example of the updating of diversity combining weight information (complex weight) (received signal RX) in the present invention.
Figure 34B:
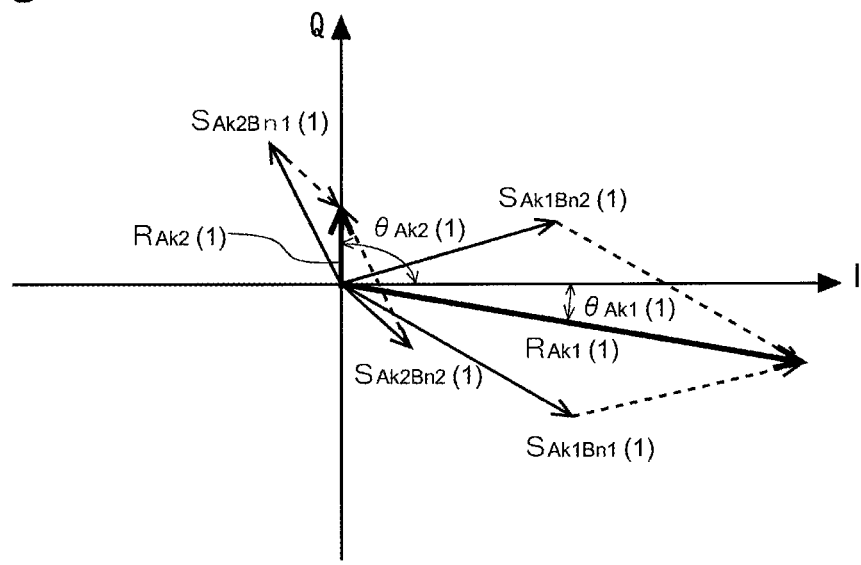
FIG. 34B is an explanatory view showing an example of the updating of diversity combining weight information (complex weight) (received signal RX) in the present invention.

FIGS. 33A, 33B, 33C and FIGS. 34A, 34B are explanatory views showing one example of the operation performed when the directions of elementary waves SaiBj (i=1,2, j=1,2) are arranged to coincide with the I-axis direction through a transfer between the two wireless communication devices A and B. FIGS. 33A, 33B and 33C show the update of an elementary wave SAiBj, and FIGS. 34A and 34B show the update of a received signal RX. In FIGS. 34A and 34B, the phase of a received signal RX of each antenna is shown by θX. For convenience of a simple description, hereinafter, a transfer function HAiBj is assumed to be always constant, and to be not changed with the lapse of time.

An elementary wave SAiBj being in an initial state is represented as SaiBj(0), and SAiBj in which diversity combining weight information has been already updated k times (k is an integer of 1 or greater) is represented as SaiBj(k). Additionally, a received signal RX being in an initial state is represented as Rx(0), and a received signal RX in which diversity combining weight information has been already updated k times (k is an integer of 1 or greater) is represented as Rx(k). Although, the update of diversity combining weight information is performed only on the receiving side, an elementary wave SAiBj contains diversity combining weight information WA1, WA2, WB1 and WB2 of both of the wireless communication devices A and B, and therefore the elementary wave SAiBj does not depend on the direction of transfer, and is updated whenever a transfer is performed. The received signal RA and RB are signals obtained by allowing received signals from two antennas of the receiving-side wireless communication device to undergo diversity combining, and received signals RA1, RA2, RB1 and RB2 of the antennas A1, A2, B1 and B2 are also updated whenever the elementary wave SAiBj is updated. So, the value of k shall be updated whenever a transfer is performed.

FIG. 33A shows an elementary wave SaiBj(0) in an initial state. The pieces of diversity combining weight information WA1, WA2, WB1 and WB2 in an initial state are all fixed at 1, and therefore the elementary wave SaiBj(0) coincides with the transfer function HAiBj of FIG. 32.

When the transmission from the wireless communication device A to the wireless communication device B is performed in an initial state, the diversity combining weight information of the wireless communication device B is updated. FIG. 34A shows received signal RB1(0), RB2(0) by antenna B1 and B2 of the wireless communication device B when the transmission from the wireless communication device A to the wireless communication device B is performed in an initial state.

The received signal RB1(0) by the antenna B1 is a synthetic signal of two elementary waves SA1B1(0) and SA2B1(0), and the received signal RB2(0) by the antenna B2 is a synthetic signal of two elementary waves SA1B2(0) and SA2B2(0). In the wireless communication device B, diversity combining is performed by applying phase-shifting processing to the two received signals RB1(0) and RB2(0) so that the direction of vectors of these received signals coincide with that of the I-axis. In other words, diversity combining is performed such that the vector of the received signal RB1(0) is rotated by $-\theta B1(0)$ ($\theta B1(0)$ is positive) whereas the vector of the received signal RB2(0) is rotated by $-\theta B2(0)$ ($\theta B2(0)$ is negative). This processing corresponds to fixing the pieces of diversity combining weight information WB1 and WB2 at exp$\{-j\theta B1(0)\}$ and exp$\{-j\theta B2(0)\}$, respectively. Accordingly, the elementary waves SA1B1(0) and SA2B1(0) are rotated by $-\theta B1(0)$ whereas the elementary waves SA1B2(0) and SA2B2(0) are rotated by $-\theta B2(0)$. FIG. 33B shows these circumstances.

The diversity combining weight information of the wireless communication device A is updated when the transmission from the wireless communication device B to the wireless communication device A is performed subsequently to the transmission from the wireless communication device A to the wireless communication device B. The elementary wave SAiBj has been updated to an elementary wave SAiBj(1) (see FIG. 33B) after the pieces of diversity combining weight information WA1, WA2, WB1 and WB2 are updated by the transmission from the wireless communication device A to the wireless communication device B. The transmission from the wireless communication device B to the wireless communication device A is performed by use of the elementary wave SAiBj(1). FIG. 34B shows received signals RA1(1) and RA2(1) by the antenna A1 and A2 of the wireless communication device A at this time. The received signal RA1(1) by the antenna A1 is a synthetic signal of two elementary waves SA1B1(1) and SA1B2(1), and the received signal RA2(1) by the antenna A2 is a synthetic signal of two elementary waves SA2B1(1) and SA2B2(1).

In the wireless communication device A, diversity combining is performed by applying phase-shifting processing to the two received signals RA1(1) and RA2(1) so that the directions of vectors of these received signals coincide with that of I-axis. In other words, diversity combining is performed such that the vector of the received signal RA1(1) is rotated by $-\theta A1(1)$ whereas the vector of the received signal RA2(1) is rotated by $-\theta A2(1)$. This processing corresponds to fixing the pieces of diversity combining weight information WA1 and WA2 at exp$\{-j\theta A1(1)\}$ and exp$\{-j\theta A2(1)\}$, respectively.

Accordingly, the elementary waves SA1B1(1) and SA1B2(1) are rotated by $-\theta A1(2)$ whereas the elementary waves SA2B1(1) and SA2B2(1) are rotated by $-\theta A2(2)$. FIG. 33C shows these circumstances.

From FIGS. 33A, 33B and 33C, it is understood that each elementary wave SAiBj is arranged to have its direction approximating the direction of the I-axis by updating the diversity combining weight information WA1, WA2, WB1 and WB2 while once performing transmission in one direction and once performing transmission in the other direction of the two-way-transfer directions. If diversity combining weight information is successively updated while repeatedly performing the two-way transfer, the direction of each elementary wave SAiBj can be brought closer to the direction of the I-axis. However, the number of controllable phases is only (M+N) with respect to (M×N) elementary waves SAiBj, and therefore, generally, all elementary waves SAiBj cannot be arranged to completely coincide with the direction of the I-axis. In the present invention, as a result, a state in which the directions of elementary waves SAiBj coincide with each other or approximate each other is obtained through two-way training.

It is known that a desirable method for maximizing the level of the received signal RA and RB is to use an eigenvector having a maximum eigenvalue in the correlation matrix of the channel matrix as diversity combining weight information. However, as described above, the calculation amount is problematic to calculate diversity combining weight information that maximizes a received signal when the number of antennas is large. Hence, in the present invention, the value optimum of diversity combining weight information is found as a result through a two-way training signal transfer. Reception level information is used as an indicator at this time. However, the number of controllable phase-shifting amounts is only (M+N) in spite of the fact that (M×N) elementary waves exist, and therefore, actually, cases in which the directions of all vectors can be arranged to coincide with each other are restricted to a special case in which channel matrix satisfies a specific condition.

In the following, the explanation that the value optimum of the pieces of diversity combining weight information can be obtained in wireless communication device A and B through 2-way transmission of training sequence based on reception level information, respectively is given using numerical expressions. Herein, generalization is made on the structure of wireless communication device, and the wireless communication device A includes M antennas, and the wireless communication device B includes N antennas.

First, the electric power (reception level information) of the received signal in the transfer between wireless communication device A and B is calculated from numerical expressions. A channel matrix HAB in the transfer from the wireless communication device A to the wireless communication device B is expressed by numerical expression (16).

[EQUATION 16]

$$H_{AB} = \begin{bmatrix} h_{1,1} & h_{1,2} & \ldots & h_{1,M} \\ h_{2,1} & h_{2,2} & \ldots & h_{2,M} \\ \vdots & & & \\ h_{N,1} & h_{N,2} & \ldots & h_{N,M} \end{bmatrix} \quad (16)$$

Herein, $h_{i,j}$ are complex numbers and represent transfer function between an antenna Aj of the wireless communication device A and an antenna Bi of the wireless communication device B. Pieces of diversity combining weight information WA and WB in the wireless communication device A and B are expressed by numerical expression (17) and (18), respectively. And XT represents the transposed matrix of matrix X.

[EQUATION 17]
$$W_A = \{w_{A1}\ w_{A2} \ldots w_{AM}\}^T \tag{17}$$

[EQUATION 18]
$$W_B = \{w_{B1}\ w_{B2} \ldots w_{BN}\}^T \tag{18}$$

When transmission from the wireless communication device A to the wireless communication device B is performed, numerical expression (19) is formulated in which SAB is a transmit signal that is input to the signal distributing/synthesizing unit of the wireless communication device A, and RAB is a received signal that is output from the signal distributing/synthesizing unit 22 of the wireless communication device B. NB represents a thermal noise in each of the antenna B1 to BN of the wireless communication device B.

[EQUATION 19]
$$R_{AB} = W_B^T \cdot [H_{AB} \cdot W_A \cdot S_{AB} + N_B] \tag{19}$$

Mean received signal power PB in the wireless communication device B at this time is expressed by numerical expression (20). And E[X] represents the ensemble average of X.

[EQUATION 20]
$$P_B = E[|R_{AB}|^2] \tag{20}$$

Numerical expression (21) can be obtained by substituting numerical expression (19) for numerical expression (20). XH represents the complex conjugate transposition of X.

[EQUATION 21]
$$P_B = |W_B^T \cdot H_{AB} \cdot W_A|^2 \cdot P_S + W_B^T \cdot B_B^H \cdot P_N \tag{21}$$

Herein, PS is mean transmitting power in the wireless communication device A, and is expressed by numerical expression (22). Additionally, mean noise power in each of the antenna B1 to BN of the wireless communication device B is assumed to be the same, and is represented as PN. In other words, numerical expression (23) is assumed to be formulated. IN represents a N-dimensional unit matrix.

[EQUATION 22]
$$P_S = E[|S_{AB}|^2] \tag{22}$$

[EQUATION 23]
$$N_B \cdot N_B^T = P_N \cdot I_N \tag{23}$$

On the other hand, when the transmission from the wireless communication device B to the wireless communication device A is performed, numerical expression (24) is formulated in which SBA is a transmit signal that is input to the signal distributing/synthesizing unit of the wireless communication device B, and RBA is a received signal that is output from the distributing/synthesizing unit of the wireless communication device A. NA represents a thermal noise in each of antenna A1 to AM of the wireless communication device A.

[EQUATION 24]
$$R_{BA} = W_A^T \cdot [H_{BA} \cdot W_B \cdot S_{BA} + N_A] \tag{24}$$

Mean received signal power PA in the wireless communication device A at this time is expressed by numerical expression (25).

[EQUATION 25]
$$P_A = |W_A^T \cdot H_{AB}^T \cdot W_B|^2 \cdot P_S + W_A^T \cdot W_A^H \cdot P_N \tag{25}$$

Herein, the mean transmitting power in the wireless communication device B is assumed to be the same as the mean transmitting power PS in the wireless communication device A. Likewise, the mean noise power in each of the antenna A1 to AM of the wireless communication device A is assumed to be the same as mean noise power PN in each of the antenna B1 to BN of the wireless communication device B.

As mentioned above, mean received signal power PA and PB in the wireless communication device A and B are expressed by numerical expression (25) and (21), respectively.

Thereafter, a condition for maximizing the electric power (numerical expression (25) and (21)) of the received signals RA and RB is calculated. Generality will not be lost even if the sizes of the pieces of diversity combining weight information WA and WB are both fixed at 1, and therefore numerical expression (21) and (25) can be consolidated into numerical expression (27) by applying numerical expression (26).

[EQUATION 26]
$$\lambda = |W_B^T \cdot H_{AB} \cdot W_A|^2 = |W_A^T \cdot H_{AB}^T \cdot W_B|^2 \tag{26}$$

[EQUATION 27]
$$P = \lambda \cdot P_S + P_N \tag{27}$$

A condition for maximizing P of numerical expression (27) can be calculated by use of Lagrange's method of undetermined multipliers. In more detail, a condition in which lambda reaches the maximum under the condition that the sizes of the pieces of diversity combining weight information WA and WB are both 1 can be calculated by use of Lagrange's method of undetermined multipliers.

Function U(WA,WB,λA,λB) is defined by numerical expression (28) now. X* represents the complex conjugate of X.

[EQUATION 28]
$$U(W_A, W_B, \lambda_A, \lambda_B) = \lambda - \lambda_A \cdot (W_A^T \cdot W_A^H - 1) - \lambda_B \cdot (W_B^T \cdot W_B^* - 1) \tag{28}$$

The condition in which lambda reaches the maximum is expressed by numerical expression (29).

[EQUATION 29]
$$\frac{\partial U}{\partial W_A} = \frac{\partial U}{\partial W_B} = \frac{\partial U}{\partial \lambda_A} = \frac{\partial U}{\partial \lambda_B} = 0 \tag{29}$$

The latter two conditions in numerical expression (29) are conditions allowing that the sizes of the pieces of diversity combining weight information WA and WB are 1. On the other hand, numerical expressions (30) and (31) can be obtained by arranging the former two conditions in numerical expression (29).

[EQUATION 30]
$$[H_{AB}^T \cdot W_B \cdot W_B^H \cdot H_{AB}^*] \cdot W_A^* = \lambda_A \cdot W_A^* \tag{30}$$

[EQUATION 31]
$$[H_{AB} \cdot W_A \cdot W_A^H \cdot H_{AB}^H] \cdot W_B^* = \lambda_B \cdot W_B^* \tag{31}$$

Numerical expression (32) can be obtained by substituting numerical expression (30) and (31) for numerical expression (26). λA and λB are equal to each other, and hence λA and λB are both written as lambda hereinafter.

[EQUATION 32]
$$\lambda_A = \lambda_B = \lambda \tag{32}$$

By the way, RB0 is expressed by numerical expression (33) in which RB0 are vectors of received signal by N antennas B1 to BN of the wireless communication device B when a transmit signal SAB is 1 in the transmission from the wireless communication device A to the wireless communication device B.

[EQUATION 33]

$$R_{B0}=H_{AB} \cdot W_A \quad (33)$$

Numerical expression (34) can be obtained by substituting numerical expression (33) for numerical expression (31).

[EQUATION 34]

$$[R_{B0} \cdot R_{B0}{}^H] \cdot W_B{}^* = \lambda_B \cdot W_B{}^* \quad (34)$$

Numerical expression (34) is formulated when a maximum-ratio-combining diversity operation is performed in the wireless communication device B, i.e. when pieces of diversity combining weight information WB becomes WB=RB0*/$\sqrt{\lambda}$.

Likewise, RA0 is expressed by numerical expression (35) in which RA0 are vectors of received signals by M antennas A1 to AM of the wireless communication device A when a transmit signal SBA is 1 in the transmission from wireless the communication device B to the wireless communication device A.

[EQUATION 35]

$$R_{A0}=H_{AB}{}^T \cdot W_B \quad (35)$$

Numerical expression (36) can be obtained by substituting numerical expression (35) for numerical expression (30).

[EQUATION 36]

$$[R_{A0} \cdot R_{A0}{}^H] \cdot W_A{}^* = \lambda_A \cdot W_A{}^* \quad (36)$$

Numerical expression (36) is formulated when a maximum-ratio-combining diversity operation is performed in wireless the communication device A, i.e. when pieces of diversity combining weight information WA becomes WA=RA0*/$\sqrt{\lambda}$.

As mentioned above, in the MIMO transfer, WA=RA0*/$\sqrt{\lambda}$ and WB=RB0*/$\sqrt{\lambda}$ are formulated When pieces of diversity combining weight information of transmission/reception is set so that the mean received signal power reaches the maximum. This shows that the pieces of diversity combining weight information under the condition that the mean received signal power reaches the maximum coincides with the pieces of diversity combining weight information of the maximum ratio combined diversity. That is to say, it can be understood that a set of eigenvectors which correspond to the maximum eigenvalue of correlation matrix of the channel matrix in the transmission between a set of wireless devices can be obtained by updating the pieces of diversity combining weight information using diversity combining complex weight information of diversity reception during training procedure, iteratively.

An algorithm according to which pieces of diversity combining weight information converges through a two-way transfer between the wireless communication device A and B can be expressed by numerical expression (37) and (38) using mathematical expressions.

[EQUATION 37]

$$[H_{AB} \cdot W_A(k_A) \cdot W_A{}^H(k_A) \cdot H_{AB}{}^H] \cdot W_B{}^*(k_B+1) = \lambda \cdot W_B{}^*(k_B+1) \quad (37)$$

[EQUATION 38]

$$[H_{AB}{}^T \cdot W_B(k_B) \cdot W_B{}^H(k_B) \cdot H_{AB}{}^*] \cdot W_A{}^*(k_A+1) = \lambda \cdot W_A{}^*(k_A+1) \quad (38)$$

In numerical expression (37) and (38), WX(k) (X is A or B) designates pieces of diversity combining weight information obtained when the number of updating times of the diversity combining weight information is k in a wireless communication device X. Numerical expression (37) expresses an updating operation of the pieces of diversity combining weight information in the wireless communication device B in the transmission from the wireless communication device A to the wireless communication device B, whereas numerical expression (38) expresses an updating operation of the pieces of diversity combining weight information in wireless communication device A in the transmission from wireless communication device B to the wireless communication device A.

Note that, updating operation of the value of k in numerical expression (37) is performed in the transmission from the wireless communication device A to the wireless communication device B. And, updating operation of the value of k in numerical expression (38) is performed in the transmission from the wireless communication device B to the wireless communication device A.

Expression (37), (38) represent an absolute maximum ratio compound and the operation which update pieces of diversity combining weight information sequentially so that it is in the wireless communication device of the receiving side to received signal when the symbols which sending signal SAB, the frame bundle that SBA is 1 or escape preamble was soaked with are received in antenna A1~AM, B1~BN.

For example, vectors, in which all components are equal in magnitude to each other and in which all components are directed in the direction of 1-axis, expressed by numerical expression (39) and (40) can be used as an initial value of diversity combining weight information.

[EQUATION 39]

$$W_A(0)=\{1 \ldots 1 \ldots 1\}^T \quad (39)$$

[EQUATION 40]

$$W_B(0)=\{1 \ldots 1 \ldots 1\}^T \quad (40)$$

Finally, a description will be given on the fact that pieces of diversity combining weight information that satisfies numerical expressions (30) and (31) can be found by applying the algorithm expressed by numerical expression (37) and (38).

Numerical expression (30) expresses that the eigenvector of a M-th order square matrix[HABT·WB·WBH·HAB*] is WA*. On the other hand, numerical expression (31) expresses that the eigenvector of N-th order square matrix [HAB·WA·WAH·HABH] is WB*. These eigenvectors can be expressed by numerical expressions (41) and (42), respectively.

[EQUATION 41]

$$W_A{}^*=H_{AB}{}^T \cdot W_B/\sqrt{\lambda} \quad (41)$$

[EQUATION 42]

$$W_B{}^*=H_{AB} \cdot W_A/\sqrt{\lambda} \quad (42)$$

The algorithms of numerical expressions (37) and (38) can be expressed by numerical expressions (43) and (44) when numerical expressions (43) and (44) are used.

[EQUATION 43]

$$W_A{}^*(k_A+1)=H_{AB}{}^T \cdot W_B(k_B)/\sqrt{\lambda} \quad (43)$$

[EQUATION 44]

$$W_B{}^*(k_B)=H_{AB} \cdot W_A(k_A)/\sqrt{\lambda} \quad (44)$$

A recurrence formula relative to the pieces of diversity combining weight information WA and WB can be obtained from numerical expressions (33) and (44). This recurrence formula is expressed by numerical expressions (45) and (46).
[EQUATION 45]

$$W_A(k_A1) = H_{AB}{}^H \cdot W_{AB} \cdot W_A(k_A)/\lambda \quad (45)$$

[EQUATION 46]

$$W_B(k_B+1) = H_{AB}{}^* \cdot H_{AB}{}^T \cdot W_B(k_B)/\lambda \quad (46)$$

From numerical expressions (45) and (46), algorithms for calculating the pieces of diversity combining weight information WA and WB are expressed by numerical expressions (47) and (48).
[EQUATION 47]

$$W_A(k_A) = [H_{AB}{}^H \cdot H_{AB}/\lambda]^{k_A} \cdot W_A(0) \quad (47)$$

[EQUATION 48]

$$W_B(k_B) = [H_{AB}{}^H \cdot H_{AB}{}^T/\lambda]^{k_B} \cdot W_B(0) \quad (48)$$

From numerical expressions (41) and (42), numerical expressions (49) and (50) are formulated.
[EQUATION 49]

$$[H_{AB}{}^H \cdot H_{AB}] \cdot W_A = \lambda_A \cdot W_A \quad (49)$$

[EQUATION 50]

$$[H_{AB}{}^* \cdot H^T] \cdot W_B = \lambda \cdot W_B \quad (50)$$

It is understood from numerical expressions (49) and (50) that the pieces of diversity combining weight information WA and WB are eigenvectors of correlation matrix[HABH·HAB] and[HAB*·HABT], respectively. Additionally, it is understood that the pieces of diversity combining weight information WA and WB satisfy the condition of numerical expression (25), and hence are eigenvectors with respect to the maximum eigenvalue. In other word, the maximum numbers of eigenvectors that satisfy numerical expressions (49) and (50) are M and N, respectively, and it is understood that the pieces of diversity combining weight information WA and WB expressed by numerical expressions (47) and (48) are eigenvectors with respect to maximum eigenvalues, and [HABH·HAB]k·WA(0) and [HAB*·HABT]k·WB(0) converge on eigenvectors with respect to maximum eigenvalues in proportion to the increase of k.

Therefore, it is understood that the optimum pieces of diversity combining weight information WA and WB can be calculated according to an asymptotic algorithm that determines the pieces of diversity combining weight information of the receiving side so that mean received power reaches maximum.

In the above, it was described using thing numerical expression (16) ... (50) which could find out value optimum of the pieces of diversity combining weight information to the signal of each antenna of wireless communication device A, B in the model building, but it is as follows, and that value optimum of the pieces of diversity combining weight information to the signal of each antenna can be found out even if conventional MIMO technique is used together is described using numerical expression.

Figure 35:
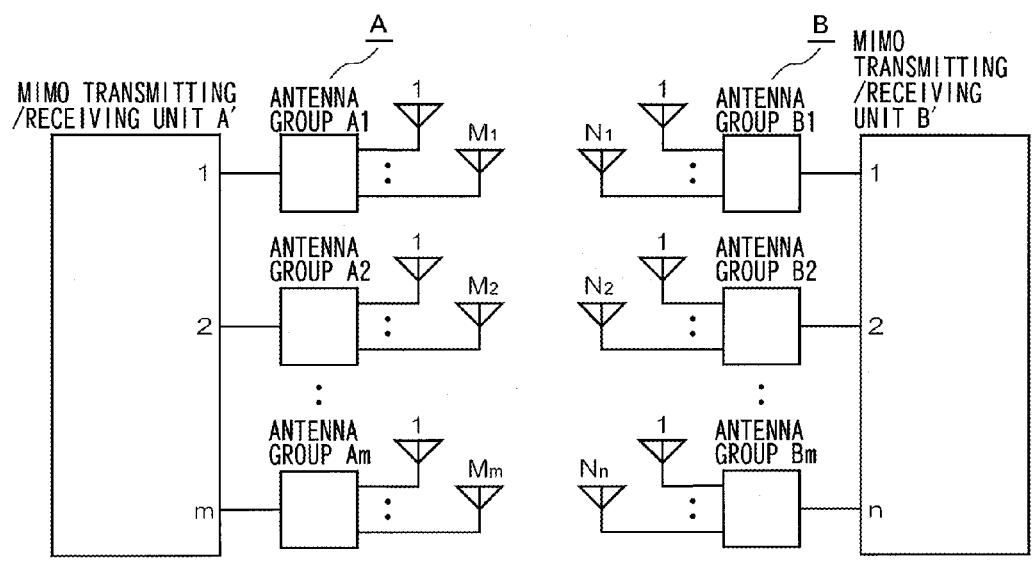
FIG. 35 is a block diagram showing a structure of the wireless communication system including a plurality of antenna groups.

FIG. 35 is a block diagram which shows the structure of the wireless communication system with a plurality of antenna group. In the following, the conditions where pieces of diversity combining weight information becomes optimum are described in this structure. The wireless communication device A includes antenna group A1, A2, ..., Am, and each antenna group A1, A2, ..., Am includes a plurality of antennas, and the number of antennas in each antenna group is M1, M2, ..., Mm, respectively. And, the Wireless communication device B includes antenna group B1, B2, ..., Bn, and each antenna group B1, B2, ..., Bn includes a plurality of antennas, and the number of antenna in each antenna group is N1, N2, ..., Nn, respectively.

MIMO transmitting/receiving unit A' and B' perform a weight procedure to the signal of each antenna in each antenna group, and the weight procedure of each antenna in each antenna group is performed independently in each antenna of each antenna group shown in the diagram. Optimization of the pieces of diversity combining weight information is performed in each antenna group independently. Hierarchization MIMO is implemented by the use of these weight procedure.

Now, we assume the channel matrix of the transmission from the wireless communication device A to the wireless communication device B is HAB which is expressed by numerical expression (51). Herein, Hj,k (j=1, 2, ..., n, k=1, 2, ..., m) is an element of channel matrix of the transmission from antenna group Ak to antenna group Bj. Additionally, numerical expressions M=M1+M2+ ... +Mm and N=N1+N2+ ... +Nn are formulated.

[EQUATION 51]

$$H_{AB} = \begin{bmatrix} h_{1,1} & h_{1,2} & \ldots & h_{1,M} \\ h_{2,1} & h_{2,2} & \ldots & h_{2,M} \\ \vdots & & & \\ h_{N,1} & h_{N,2} & \ldots & h_{N,M} \end{bmatrix} = \begin{bmatrix} H_{1,1} & H_{1,2} & \ldots & H_{1,m} \\ H_{2,1} & H_{2,2} & \ldots & H_{2,m} \\ \vdots & & & \\ H_{n,1} & H_{n,2} & \ldots & H_{n,m} \end{bmatrix} \quad (51)$$

The pieces of diversity combining weight information VA and VB in MIMO transmitting/receiving unit A' and B' are expressed by numerical expressions (52) and (53), respectively, and these depend on the transmission scheme of MIMO technology.
[EQUATION 52]

$$V_A = \{v_{A1}\, v_{A2} \ldots v_{Am}\}^T \quad (52)$$

[EQUATION 53]

$$V_B = \{v_{Ba}\, v_{B2} \ldots v_{Bm}\}^T \quad (53)$$

The pieces of diversity combining weight information VA,VB in the wireless transmission from the wireless communication device A to the wireless communication device B can be determined like following example, (example 1)~(example 3).

EXAMPLE 1

Multi-stream Transmission without Channel Matrix Information in the Transmitting Side (Direct Mapping)

In this case, a baseband modulating signal which correspond to different data series with each other is input into each transmitter, respectively, and converted into RF signal, and transmitted from each antenna group. In other word, assuming the pieces of diversity combining weight information VA is expressed by numerical expression (54).
[EQUATION 54]

$$V_A = \{1 \ldots 1 \ldots 1\}^T \quad (54)$$

On the receiving side, channel matrix Hn,m is estimated through training procedure, and the pieces of diversity combining weight information VBp (p is a natural number less than or equal to P) for each data series is calculated by numerical expression (55) using the result of the estimation.
[EQUATION 55]

$$V_{Bp}=\{v_{Bp1}\ v_{Bp2}\ldots v_{Bpn}\}^T \qquad (55)$$

EXAMPLE 2

The Multi-stream Transmission Using Eigenbeam Transmission with Channel Matrix Information in a Transmitting Side In the transmitting side, P-th order eigenvectors (P is the number of spatial streams) calculated using channel matrix are set as the pieces of diversity combining weight information Vap (p is a natural number less than or equal to P) of each baseband modulation signal corresponding to each data series. In other word, the pieces of diversity combining weight information VAp are determined using numerical expression (56).
[EQUATION 56]

$$V_{Ap}=\{v_{Ap1}\ v_{Ap2}\ldots v_{Apm}\}^T \qquad (56)$$

Likewise, in the receiving side, P-th order eigenvectors calculated using channel matrix are set as the pieces of diversity combining weight information VBp of each baseband received signal. In other word, the pieces of diversity combining weight information VBp can be obtained using numerical expression (57).
[EQUATION 57]

$$V_{Bp}=\{v_{Bp1}\ v_{Bp2}\ldots v_{Bpn}\}^T \qquad (57)$$

EXAMPLE 3

Transmission Diversity Using Space-time Code with Channel Matrix in a Transmitting Side In the transmitting side, distinct a plurality of baseband modulating signals made block code using a code between the space-time are input into a just corresponding transmitter, and it is converted into RF signal, and it is transmitted (direct mapping). In other word, the pieces of diversity combining weight information VA are expressed by numerical expression (58).
[EQUATION 58]

$$V_A=\{1\ldots 1\ldots 1\}^T \qquad (58)$$

On the receiving side, channel matrix Hn,m is estimated through training procedure, and the pieces of diversity combining weight information VBqr (q is a natural number less than or equal to Q, Q is the number of the spatial mapping, and r is a natural number less than or equal to R) for each data series is calculated by numerical expression (59) using the result of the estimation. R demands code length) of the block code by numerical expression (59).
[EQUATION 59]

$$V_{Bqr}=\{v_{Bqr1}\ v_{Bqr2}\ldots v_{Bqrn}\}^T \qquad (59)$$

On the other hand, in hierarchization MIMO, the pieces of diversity combining weight information WAk in each antenna of antenna group Ak and the pieces of diversity combining weight information WBj in each antenna of antenna group Bj is expressed by numerical expressions (60) and (61).
[EQUATION 60]

$$W_{Ak}=\{w_{Ak,1}\ w_{Ak,2}\ldots w_{Ak,Mk}\}^T \qquad (60)$$

[EQUATION 61]

$$W_{Bj}=\{w_{Bj,1}\ w_{Bj,2}\ldots w_{Bj,Nj}\}^T \qquad (61)$$

Herein, it is assumed that the size of any pieces of diversity combining weight information VA, VB, WAk and WBj shall be 1. In other word, it is assumed that numerical expression (62) is formulated. Herein, XT and X* represent a transposed matrix of matrix X and a complex conjugate matrix of matrix X, respectively.
[EQUATION 62]

$$V_A^T \cdot V_A^* = 1$$

$$V_B^T \cdot V_B^* = 1$$

$$V_{Ak}^T \cdot V_{Ak}^* = 1$$

$$V_{Bj}^T \cdot V_{Bj}^* = 1 \qquad (62)$$

Then, in hierarchization MIMO, the explanation that the optimum pieces of diversity combining weight information can be obtained during the training procedure will be given below. It is assumed that direct mapping shall be performed at MIMO transmitting/receiving unit A' and B' in training procedure. In other word, expression (63), (64) shall be formulated.
[EQUATION 63]

$$V_A=\{1\ldots 1\ldots 1\}^T \qquad (63)$$

[EQUATION 64]

$$V_B=\{1\ldots 1\ldots\}^T \qquad (64)$$

And, it is assumed that a transmit signal SAk from antenna group Ak and a transmission signal SBj from antenna group Bj shall be 1 for any value of k and for any value of j.

And, numerical expression (65) shall be formulated, where RB is received signal after synthesis the wireless communication device B.

[EQUATION 65]

$$R_B = [\ v_{B1}*W_{B1}^T \quad v_{B2}*W_{B2}^T \quad \ldots \quad v_{Bn}*W_{Bn}^T\ ] \cdot \left\{ \begin{bmatrix} H_{1,1} & H_{1,2} & \ldots & H_{1,m} \\ H_{2,1} & H_{2,2} & \ldots & H_{2,m} \\ \vdots & & & \vdots \\ H_{n,1} & H_{n,2} & \ldots & H_{n,m} \end{bmatrix} \cdot \begin{bmatrix} v_{A1}*W_{A1} \\ v_{A2}*W_{A2} \\ \vdots \\ v_{Am}*W_{Am} \end{bmatrix} + \begin{bmatrix} N_{B1} \\ N_{B2} \\ \vdots \\ N_{Bn} \end{bmatrix} \right\} \qquad (65)$$

Herein, NBj is the column vector of Nj-th order which represents the thermal noise in each of antenna group Bj, and NBj is expressed by numerical expression (66).
[EQUATION 66]

$$N_{Bj}=\{n_{Bj,1}\ n_{Bj,2}\ldots n_{Bj,Nj}\}^T \qquad (66)$$

Numerical expression (67) can be obtained by substituting numerical expressions (63) and (64) for numerical expression (65).

[EQUATION 67]

$$R_B = [W_{B1}^T \ W_{B2}^T \ \ldots \ W_{Bn}^T] \cdot \left\{ \begin{bmatrix} H_{1,1} & H_{1,2} & \ldots & H_{1,m} \\ H_{2,1} & H_{2,2} & \ldots & H_{2,m} \\ \vdots & & & \\ H_{n,1} & H_{n,2} & \ldots & H_{n,m} \end{bmatrix} \cdot \begin{bmatrix} W_{A1} \\ W_{A2} \\ \vdots \\ W_{Am} \end{bmatrix} + \begin{bmatrix} N_{B1} \\ N_{B2} \\ \vdots \\ N_{Bn} \end{bmatrix} \right\} \quad (67)$$

$$= \sum_{j=1}^{n} \sum_{k=1}^{m} W_{Bj}^T \cdot \{H_{j,k} \cdot W_{Ak} + N_{Bj}\}$$

Now, using RAkBj which is the Nj-th order column vector representing a received signal in each antenna of antenna group Bj which is transmitted from antenna group Ak, numerical expression (68) is formulated.

[EQUATION 68]

$$R_{AkBj} = H_{j,k} \cdot W_{Ak} + N_{Bj} \quad (68)$$

Numerical expression (69) is formulated by substituting numerical expression (68) for numerical expression (67).

[EQUATION 69]

$$R_B = \sum_{j=1}^{n} \sum_{k=1}^{m} W_{Bj}^T \cdot R_{AkBj} \quad (69)$$

Herein, synthesized received signal RBj in antenna group Bj is expressed by numerical expression (70).

[EQUATION 70]

$$R_{Bj} = \sum_{k=1}^{m} W_{Bj}^T \cdot [H_{j,k} \cdot W_{Ak} + N_{Bj}] \quad (70)$$

$$= \sum_{k=1}^{m} W_{Bj}^T \cdot R_{AkBj}$$

Likewise, as for synthesized received signal RA in the wireless communication device A, numerical expression (71) is formulated.

[EQUATION 71]

$$R_A = \sum_{k=1}^{m} \sum_{j=1}^{n} W_{Ak}^T \cdot \{H_{j,k}^T \cdot W_{Bj} + N_{Ak}\} \quad (71)$$

Herein, using RBjAk which is the Nk-th order column vector representing a received signal in each antenna of antenna group Ak which is transmitted from antenna group Bj, numerical expression (72) is formulated.

[EQUATION 72]

$$(72) \quad R_{BjAk} = H_{j,k}^T \cdot W_{Bj} + N_{Ak}$$

Numerical expression (73) is obtained by substituting numerical expression (72) for numerical expression (71).

[EQUATION 73]

$$R_A = \sum_{k=1}^{m} \sum_{j=1}^{n} W_{Ak}^T \cdot R_{BjAk} \quad (73)$$

And, synthesized received signal RAk in antenna group Ak is represented by numerical expression (74).

[EQUATION 74]

$$R_{Ak} = \sum_{j=1}^{n} W_{Ak}^T \cdot [H_{j,k}^T \cdot W_{Bj} + N_{Ak}] \quad (74)$$

$$= \sum_{j=1}^{n} W_{Ak}^T \cdot R_{BjAk}$$

During training procedure, the transmission of training signals between the wireless communication devices A and B is performed alternately. Through 2-way transmission of the training signals, the pieces of diversity combining weight information WAk in each antenna of antenna group Ak and the pieces of diversity combining weight information WBj in each antenna of antenna group Bj are updated sequentially, and as a result, they are optimized. This sequential optimization of the pieces of diversity combining weight information is performed in the wireless communication device in the receiving side of the training signal, and updated pieces of diversity combining weight information is used at the transmission after that.

Hereinafter, initial value of the pieces of diversity combining weight information WAk in each antenna of antenna group Ak is represented by WAk(1), and the pieces of diversity combining weight information WAk updated for u-times is expressed as WAk(u+1) (u is a natural number), and likewise, initial value of the pieces of diversity combining weight information WBj is represented by VBj(1), and the pieces of diversity combining weight information updated for u-times is expressed as WBj(u+1). Also, received signal in the training signal transmission of u-times is represented as RAkBj(u) and RBjAk(u).

During a training procedure of hierarchization MIMO, training signals are transmitted from all antennas in any antenna group of the transmitting side. On the other hand, in the receiving side, the pieces of diversity combining weight information of each antenna of each antenna group is determined to maximize the reception level of each antenna group.

Generally, it is known that the pieces of diversity combining weight information which maximize the reception level, in other words, the pieces of diversity combining weight information of the maximum ratio combining are the complex conjugate of the received signal in each antenna of each antenna group or its multiple of some complex constant when transmitting a signal corresponding to "1" on the IQ-plane. It is assumed that the noise power in each antenna of each antenna group is all the same.

It is assumed that any transmit signal SAk from antenna group Ak and any transmit signal SBj from antenna group Bj are 1 during training procedure. Therefore, the pieces of diversity combining weight information with which the reception level reaches maximum is the complex conjugate of the received signal of each antenna in each antenna group during training procedure or its multiple of some complex constant. Considering the circumstances mentioned above, numerical expressions (75) and (76) are formulated. Herein, cBj and cAk represent any complex constants, and k=1, 2, ..., m and j=1, 2, ..., n. And here, u represents a natural number.

[EQUATION 75]

$$W_{Bj}(u_B+1)=c_{Bj} \cdot R_{AkBj}{}^*(u_A) \quad (75)$$

[EQUATION 76]

$$W_{Ak}(u_A+1)=c_{Ak} \cdot R_{BjAk}{}^*(u_B) \quad (76)$$

Next, a description will be given that the pieces of diversity combining weight information WBj(u) and WAk(u) which can be obtained by recurrence formula of numerical expression (75) and (76) converge in the optimum pieces of diversity combining weight information.

Figure 36:
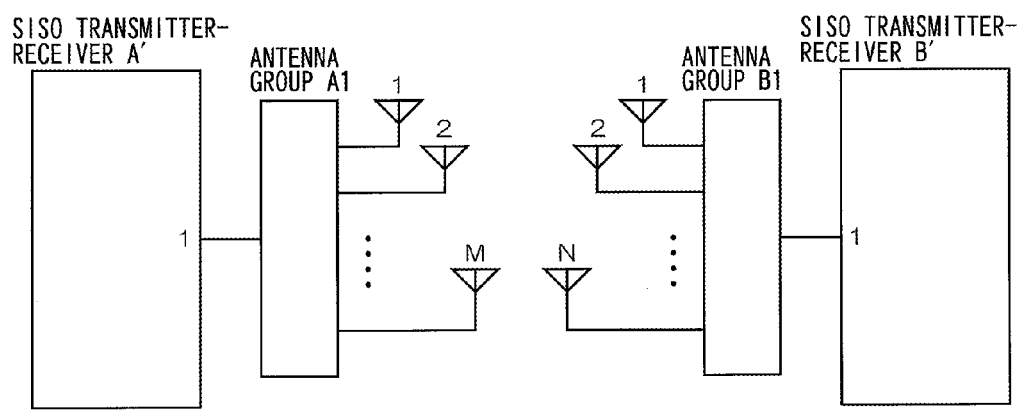
FIG. 36 is a block diagram showing a structure of the wireless communication system including only one antenna group both in transmitting side and receiving side.

As shown in FIG. 36, let it be supposed that the number of antenna group in the wireless communication device A and the wireless communication device B is both 1, and the number of antenna of each antenna group is M and N, respectively. This is the special case that the number of antenna group is 1. First of all, in this case, it will be shown that the pieces of diversity combining weight information WBj(u) and WAk(u) converge in optimum diversity combining weight information through training operation, and as a result, the reception level which correspond to the maximum eigenvalue of the channel matrix of M×N order. After that, it will be shown that the pieces of diversity combining weight information WBj(u) and WAk(u) converges in the same optimum diversity combining weight information WBj(u) and WAk(u) mentioned above through training operation in hierarchization MIMO where the number of antenna group in the wireless communication device A and the wireless communication device B is m and n, respectively.

When the number of antenna that the number of antenna group as shown in FIG. 36 includes 1, antenna group is M and N, respectively, direct mapping shall be performed at the time of the training in SISO transmitter-receiver A', B' as had described earlier. In other word, numerical expression (77) shall be formulated.

[EQUATION 77]

$$V_A = V_B = 1 \quad (77)$$

Using RB which is the synthesized received signal in the wireless communication device B, numerical expression (78) is formulated.

[EQUATION 78]

$$R_B = W_{B1}{}^T \cdot \{H_{1,1} \cdot W_{A1} + N_{B1}\} \quad (78)$$

Mean received signal power PB in the wireless communication device B of this time is expressed by numerical expression (79). Herein, E[X] represents an ensemble average of X.

[EQUATION 79]

$$P_B = [|R_B|^2] \quad (79)$$

Numerical expression (80) is obtained by substituting numerical expression (78) for numerical expression (79).

[EQUATION 80]

$$P_B = |W_{B1}^T \cdot H_{1,1} \cdot W_{A1}|^2 + W_{B1}^T \cdot W_{B1}^* \cdot P_{N\_B1}$$
$$= |W_{B1}^T \cdot H_{1,1} \cdot W_{A1}|^2 + P_{N\_B1} \quad (80)$$

Herein, it is supposed that the mean noise power in each antenna of wireless communication device B is the same, and this mean noise power is represented as PN. In other word, numerical expression (81) is formulated. Herein, IN is a unit matrix of N-th order.

[EQUATION 81]

$$E[N_B \cdot N_B{}^T] = P_N I_N \quad (80)$$

On the other hand, using RA which represents the synthesized received signal in the wireless communication device A in the transmission from the wireless communication device B to the wireless communication device A, numerical expression (82) is formulated. Herein, NA represents thermal noise power in each antenna of wireless communication device A.

[EQUATION 82]

$$R_A = W_{A1}{}^T \cdot \{H_{1,1}{}^T \cdot W_{B1} + N_{A1}\} \quad (82)$$

The mean received signal power in the wireless communication device A is expressed by numerical expression (83) in this case. Herein, it is assumed that mean noise power in each antenna of wireless communication device A is the same as mean noise power PN in each antenna of wireless communication device B.

[EQUATION 83]

$$P_A = |W_{A1}^T \cdot H_{1,1}^T \cdot W_{B1}|^2 + W_{A1}^T \cdot W_{A1}^* \cdot P_{N\_A1}$$
$$= |W_{A1}^T \cdot H_{1,1}^T \cdot W_{B1}|^2 + P_{N\_A1} \quad (83)$$

In the following, pieces of diversity combining weight information WA1 found by an elementary action in the present invention and WB1 describe that PB found by numerical expression (80) and numerical expression (83) and process automation are maximized at the same time.

Numerical expression (85) can gather expression (84) distance and expression (80), (83) now.

[EQUATION 84]

$$\lambda_{1,1} = |W_{B1}{}^T \cdot H_{1,1} \cdot W_{A1}|^2 = |W_{A1}{}^T \cdot H_{1,1}{}^T \cdot W_{B1}|^2 \quad (84)$$

[EQUATION 85]

$$P = \lambda_{1,1} + P_N \quad (85)$$

About the condition to maximize P of the expression (85), it can be demanded using Lagrange's method of undetermined multiplier. In other words, the condition that $\lambda 1,1$ becomes maximum can demand using Lagrange's method of undetermined multiplier under the condition that dimension of WA1 and WB1 is 1 together.

Function U(WA1,WB1,$\lambda$A_1,1,$\lambda$B_1,1) is determined by numerical expression (86) now.

[EQUATION 86]

$$U(W_{A1}, W_{B1}, \lambda_{A\_1,1}, \lambda_{B\_1,1}) = \lambda_{1,1} - \lambda_{A\_1,1} \cdot (W_{A1}{}^T W_{A1}{}^* - 1) - \lambda_{B\_1,1} \cdot (W_{B1}{}^T \cdot W_{B1}{}^* - 1) \quad (86)$$

Then, the condition that $\lambda 1,1$ becomes maximum is represented by numerical expression (87).

[EQUATION 87]

$$\frac{\partial U}{\partial W_{A1}} = \frac{\partial U}{\partial W_{B1}} = \frac{\partial U}{\partial \lambda_{A\_1,1}} = \frac{\partial U}{\partial \lambda_{B\_1,1}} = 0 \quad (87)$$

The binary condition of the last half in the expression (87) is a condition for dimension of WA1 and WB1 to be 1. On the other hand, when a binary condition of the first half is paid off, expression (88), (89) are provided.

[EQUATION 88]

$$[H_{1,1}{}^T \cdot W_{B1} \cdot W_{B1}{}^H \cdot H_{1,1}{}^*] \cdot W_{A1}{}^* = \lambda_{A\_1,1} \cdot W_{A1}{}^* \quad (88)$$

[EQUATION 89]

$$[H_{1,1} \cdot W_{A1} \cdot W_{A1}{}^H \cdot H_{1,1}{}^*] \cdot W_{B1}{}^* = \lambda_{B\_1,1} \cdot W_{B1}{}^* \quad (89)$$

Numerical expression (90) is provided by substituting expression (88), (89) for numerical expression (85). Thus, in the following, it is decided to transcribe λA_1,1 and λB_1,1 into λ1,1 together.

[EQUATION 90]

$$\lambda_{A_{1,1}} = \lambda_{B\_1,1} = \lambda_{1,1} \quad (90)$$

Now, when vectoring comprising the received signal in each antenna of N book included by wireless communication device B is done in transmission of training signal from wireless communication device A to wireless communication device B with RB0, RB0 is represented by numerical expression (91).

[EQUATION 91]

$$R_{B0} = H_{1,1} \cdot W_{A1} \quad (91)$$

Numerical expression (92) can be obtained by substituting numerical expression (91) for numerical expression (90).

[EQUATION 92]

$$[R_{B0} \cdot R_{B0}{}^H] \cdot W_{B1}{}^* = \lambda_{1,1} \cdot W_{B1}{}^* \quad (92)$$

Numerical expression (92) will be formulated when maximum-ratio-combining diversity operation is performed in the wireless communication device B, which is correspond to the case that the pieces of diversity combining weight information is set as WB1=RB0*/√λ1,1.

Likewise, when vectoring comprising the received signal in each antenna of M book included by wireless communication device A is done in training signal transmission from wireless communication device B to wireless communication device A with RA0, RA0 is represented by numerical expression (93).

[EQUATION 93]

$$R_{A0} = H_{1,1}{}^T \cdot W_{B1} \quad (93)$$

Numerical expression (94) can be obtained by substituting numerical expression (93) for numerical expression (88).

[EQUATION 94]

$$[R_{A0} \cdot R_{A0}{}^H] \cdot W_{A1}{}^* = \lambda_{1,1} \cdot W_{A1}{}^* \quad (94)$$

Numerical expression (94) will be formulated when maximum-ratio-combining diversity operation is performed in the wireless communication device A, which is correspond to the case that the pieces of diversity combining weight information is set as WA1=RA0*/√λ1,1.

Therefore, it can be understood that the maximum ratio combining diversity can be implemented by receiving synthetic signal using the pieces of diversity combining weight information which maximize λ1,1 in a receiving side when transmit signal is "1". The basic operation in training procedure mentioned above is expressed mathematically by numerical expressions (95) and (96).

[EQUATION 95]

$$[H_{1,1} \cdot W_{A1}(u_A) \cdot W_{A1}{}^H(u_A) \cdot H_{1,1}{}^H] \cdot W_{B1}{}^*(u_B+1) = \lambda_{1,1} \cdot W_{B1}{}^*(u_B+1) \quad (95)$$

[EQUATION 96]

$$[H_{1,1}{}^T \cdot W_{B1}(u_B) \cdot W_{B1}{}^H(u_B) \cdot H_{1,1}{}^*] \cdot W_{A1}{}^*(u_A+1) = \lambda_{1,1} \cdot W_{A1}{}^*(u_A+1) \quad (96)$$

In numerical expression (95) and (96), Vx(u) (x is A or B) represent the pieces of diversity combining weight information which the number of updates on the pieces of diversity combining weight information in wireless communication device X is u. The expression (95) represents update operation of the pieces of diversity combining weight information in wireless communication device B in training signal transmission from wireless communication device A to wireless communication device B, and the expression (96) represents update operation of the pieces of diversity combining weight information in wireless communication device A in training signal transmission from wireless communication device B to wireless communication device A.

Expression (95), (96) represent an absolute maximum ratio compound and the operation which update sequential pieces of diversity combining weight information so that it is in the wireless communication device of the receiving side to received signal in each antenna of the training series which the preambles of a packet for training that sending signal becomes 1 or the packet include.

For example, for initial value of the pieces of diversity combining weight information, vectoring represented with expression (82), (83) can be used. Expression (97), (98) are equal in the dimension of all elements and all elements represent the vectoring which turned to I axis orientation.

[EQUATION 97]

$$W_{A1}(1) = \{1 \ldots 1 \ldots 1\}^T \quad (97)$$

[EQUATION 98]

$$W_{B1}(1) = \{1 \ldots 1 \ldots 1\}^T \quad (98)$$

Finally, the explanation that the pieces of diversity combining weight information satisfying numerical expressions (88) and (89) can be obtained using the algorithm expressed by numerical expressions (95) and (96) is given below.

The expression (88) represents that eigenvector of M next square matrix[H1,1T·WB1·WB1H·H1,1*] is WA1*, and the expression (89) represents that an eigenvector of N next square matrix[H1,1·WA1·WA1H·H1,1H] is WB1*. These eigenvectors are expressed by numerical expressions (99) and (100).

[EQUATION 99]

$$W_{A1}{}^* = H_{1,1}{}^T \cdot W_{B1} / \sqrt{\lambda_{1,1}} \quad (99)$$

[EQUATION 100]

$$W_{B1}{}^* = H_{1,1} \cdot W_{A1} / \sqrt{\lambda_{1,1}} \quad (100)$$

Using numerical expressions (99) and (100), the algorithm expressed by numerical expressions (95) and (96) can be expressed by numerical expressions (101) and (102).

[EQUATION 101]

$$W_{A1}{}^*(u_A+1) = H_{1,1}{}^T \cdot W_{B1}(u_B) / \sqrt{\lambda_{1,1}} \quad (101)$$

[EQUATION 102]

$$W_{B1}{}^*(u_B+1) = H_{1,1} \cdot W_{A1}(u_A) / \sqrt{\lambda_{1,1}} \quad (102)$$

Using numerical expressions (101) and (102), the recurrence formulas regarding the pieces of diversity combining weight information WA1 and WB1 can be obtained. That is to say, the recurrence formulas regarding the pieces of diversity combining weight information WA1 and WB1 are expressed by expressions (103) and (104).

[EQUATION 103]

$$W_{A1}(u_A+1) = H_{1,1}{}^H \cdot W_{1,1} \cdot W_{A1}(u_A) / \lambda_{1,1} \quad (103)$$

[EQUATION 104]

$$W_{B1}(u_B+1) = H_{1,1}{}^* \cdot H_{1,1}{}^T \cdot W_{B1}(u_B) / \lambda_{1,1} \quad (104)$$

Using numerical expressions (103) and (104), the pieces of diversity combining weight information WA1 and WB1 are expressed by numerical expressions (105) and (106).

[EQUATION 105]

$$W_{A1}(u_A) = [H_{1,1}{}^H \cdot H_{1,1}/\lambda_{1,1}]^{u_A-1} \cdot W_{A1}(1) \quad (105)$$

[EQUATION 106]

$$W_{B1}(u_B) = [H_{1,1}{}^* \cdot H_{1,1}{}^T/\lambda_{1,1}]^{u_B-1} \cdot W_{B1}(1) \quad (106)$$

Numerical expressions (107) and (108) are formulated using numerical expressions (99) and (100).

[EQUATION 107]

$$[H_{1,1}{}^H \cdot H_{1,1}] \cdot W_{A1} = \lambda_{1,1} \cdot W_{A1} \quad (107)$$

[EQUATION 108]

$$[H_{1,1}{}^* \cdot H_{1,1}{}^T] \cdot W = \lambda_{1,1} \cdot W_{B1} \quad (108)$$

It can be understood using numerical expressions (107) and (108) that the pieces of diversity combining weight information WA1 and WB1 are eigenvectors of correlation matrix [H1,1H·H1,1] and [H1,1*·H1,1T], respectively. Additionally, the pieces of diversity combining weight information WA1 and WB satisfy the condition of numerical expression (87). Therefore, it can be understood that the pieces of diversity combining weight information WA1 and WB1 are eigenvector correspond to the maximum eigenvalue. In other words, the eigenvector to satisfy expression (107), (108) is M unit and N unit at the maximum, respectively, but the pieces of diversity combining weight information represented with expression (105), (106) is an eigenvector to the maximum eigenvalue of the inside. Thus, as u is made big, in [H1, 1H·H1,1/λ1,1]u-1·WA1(1) and [H1,1*·H1,1T/λ1,1]u-1·WB1(1), it is found that it converges in an eigenvector corresponding to the maximum eigenvalue.

In other words, if pieces of diversity combining weight information WB1(u) found in training operation and WA1(u) converging in optimum pieces of diversity combining weight information and this optimum pieces of diversity combining weight information are used in the special case that the number of antenna group is 1, it is found that the reception level that is equal to maximum eigenvalue of the channel matrix of the M×N next can be implemented.

Then subsequently, even if m and n (m and n are natural numbers, and the number of antenna group in wireless communication device A and wireless communication device B at least puts either more than 2 in the case of hierarchization MIMO which is), respectively, number of the antenna group of the transmit and receive shows that same optimum pieces of diversity combining weight information WB1(u) and WA1(u) are found in training operation like the case which is 1 together.

Numerical expressions (109) and (110) can be obtained by substituting numerical expressions (91) and (92) for numerical expressions (102) and (101), respectively.

[EQUATION 109]

$$W_{A1}{}^*(u_A+1) = R_{A0}(u_B)/\sqrt{\lambda_{1,1}} \quad (109)$$

[EQUATION 110]

$$W_{B1}{}^*(u_B+1) = R_{B0}(u_A)/\sqrt{\lambda_{1,1}} \quad (110)$$

When numerical expression (111), (112) condition are concluded when expression (109), (110) are compared with expression (75), (76), it is found that it is provided when the pieces of diversity combining weight information which is the same as optimum pieces of diversity combining weight information when number of the transmit and receive antenna group is 1 together does by M×N structure by M×N structure with hierarchization MIMO.

[EQUATION 111]

$$c_{Bj} = 1/\sqrt{\lambda_{1,1}} \; (j=1,2,\ldots,n) \quad (111)$$

[EQUATION 112]

$$c_{Ak} = 1/\sqrt{\lambda_{1,1}} \; (k=1,2,\ldots,m) \quad (112)$$

It can be understood that cBj and cAk are the constants which do not depend on antenna group by use of numerical expression (111) and (112).

When it is assumed hierarchization MIMO using M×N antenna configuration than the above, it is found that the reception level that is equal to maximum eigenvalue of the channel matrix of the M×N next can be implemented like the case which assumed number of the antenna group of the transmit and receive 1 together.

That peculiar beam transmission corresponding to the maximum eigenvalue of the channel matrix could be implemented in hierarchization MIMO was already described. In the following, in the multi-stream transmission by MIMO, that inherent beam transmission corresponding to the maximum eigenvalue can be implemented every antenna group by assuming hierarchization MIMO is shown.

When synthesized received signal in wireless communication device B is assumed RB in packet transmission from wireless communication device A to wireless communication device B, equation (113) consists. Herein, RAkBj is column vector of Nj next representing a receiving wave component in each antenna when sending signal from antenna group Ak was received in antenna group Bj.

[EQUATION 113]

$$R_B = \sum_{j=1}^{n} \sum_{k=1}^{m} W_{Bj}^T \cdot R_{AkBj} \quad (113)$$

In numerical expression (113), WBjT·RAkBj represents the synthetic signal of Nj received signal in any antennas of antenna group Bj. And, the pieces of diversity combining weight information which are determined during training sequence is expressed by numerical expression (114).

[EQUATION 114]

$$W_{Bj} = c_{Bj} \cdot R_{AkBj}{}^T \quad (114)$$

This means that a synthesizing of Nj received signals in antenna group Bj is performed based on maximum ratio combining scheme. In other words, it can be understood that the eigenbeam transmission corresponding to the maximum eigenvalue can be implemented in each antenna group in hierarchization MIMO.

In a case in which optimum diversity combining weight information can be obtained in one of the wireless communication device, whereas optimum diversity combining weight information can not be obtained in the other wireless communication device, the number of times a training signal required to form an optimum eigenbeam is not constant, depending on whether a first training sequence is transmitted from one of the wireless communication device or from the other wireless communication device.

Figure 37:
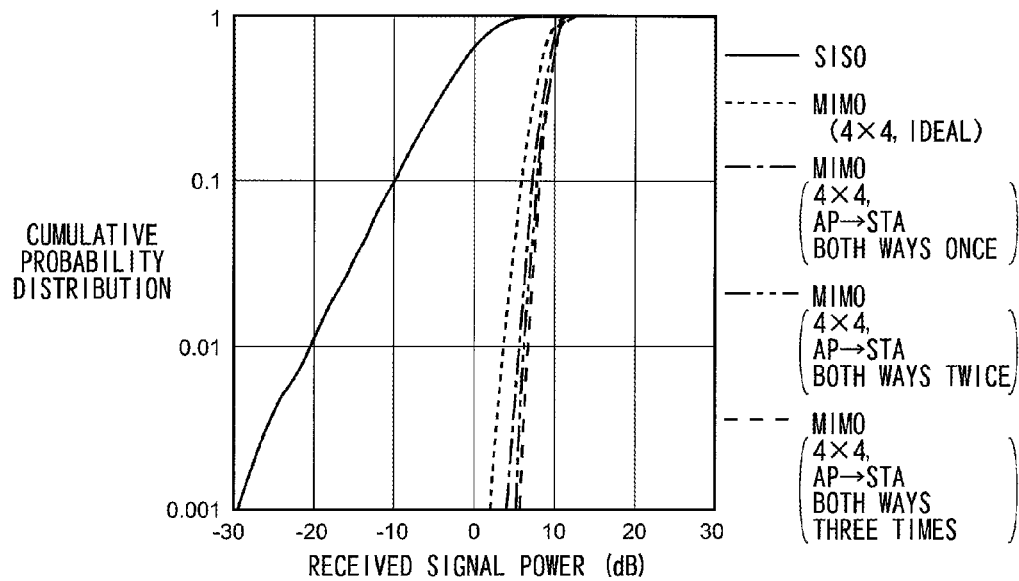
FIG. 37 is a view showing a relationship between the probability distribution of the reception level of a training signal and the number of updating times of diversity combining information in the case that the base station side performs the first training signal transfer.

FIG. 37 shows the number of training-signal-transfer times and an improvement in reception level distribution when the side of the base station(AP) performs a first training signal transfer in a case in which optimum diversity combining weight information cannot be obtained in a wireless communication device disposed on the side of the base station(AP) whereas optimum diversity combining weight information can be obtained in a wireless communication device disposed on the side of the terminal(STA). It is understood that, when the number of training-signal-transfer times is 1, i.e., when the to-and-from transfer of a training signal is performed once, a deterioration of about 4 dB occurs in comparison with an optimum eigenbeam transfer, and, when the training signal transfer is performed four times, a substantially optimal eigenbeam transfer can be realized.

Figure 38:
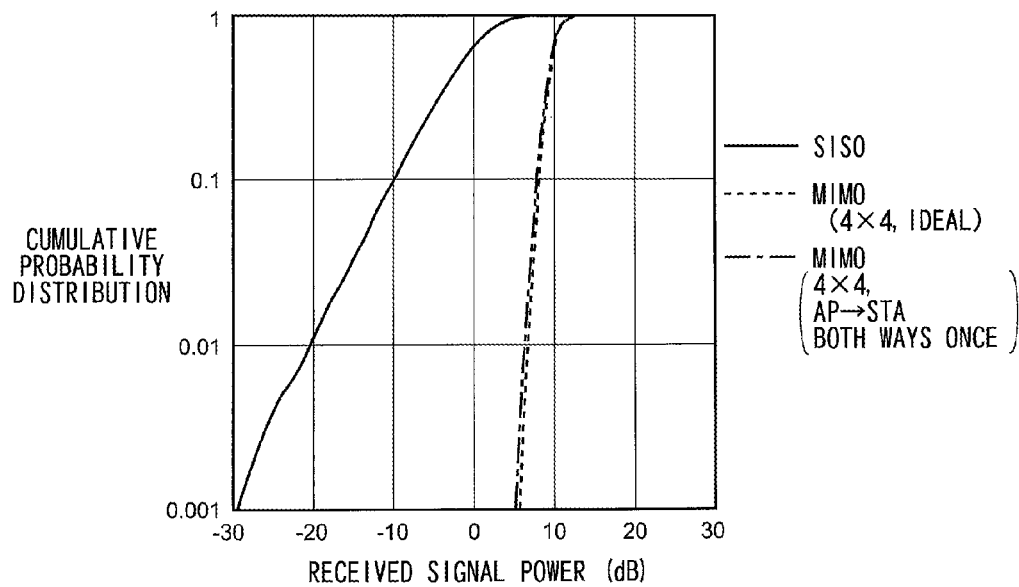
FIG. 38 is a view showing a relationship between the probability distribution of the reception level of a training signal and the number of updating times of diversity combining information in the case that the STA side performs the first training signal transfer.

FIG. 38 shows the number of training-signal-transfer times and an improvement in reception level distribution when the side of the terminal(STA) performs a first training signal transfer. In this case, it is understood that a substantially optimum eigenbeam transfer can be realized when the number of training-signal-transfer times is 1, i.e., when the to-and-from transfer of a training signal is performed going once.

In other words, in the present invention, if a wireless communication device that is obtaining optimum diversity combining weight information, e.g., the side of the terminal(STA) is allowed to perform a first training signal transfer, a substantially optimum eigenbeam transfer can be realized by the single to-and-from transfer of a training signal. Therefore, according to the present invention, a substantially optimum eigenbeam transfer can be realized by a training signal transfer performed in an extremely short time, and therefore the communications area can be greatly widened even in a high-speed multi-path fading environment.

In the present invention, an eigenbeam transfer corresponding to the maximum eigenvalue can be performed and can be realized by RF band processing merely by optimizing the receiving state of a signal obtained by synthesizing received signals transmitted from a plurality of antennas in a training signal transfer without calculating information relative to a channel matrix. On the other hand, in a general eigenbeam transfer, the receiving side has a receiver for each antenna, and received signals are synthesized together in a baseband processing. Therefore, each antenna does not have a satisfactorily high reception level, and hence there is a case in which burst detection cannot be performed, i.e., the arrival of received signals cannot be detected in the periphery of a communication area.

Figure 39:
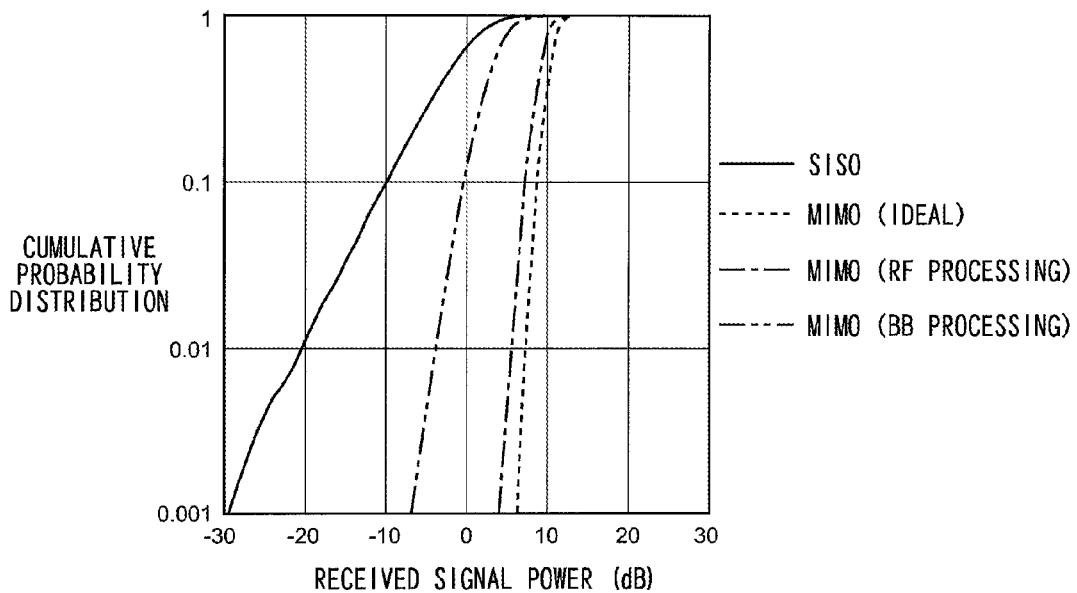
FIG. 39 is a view showing the comparison of an improvement in the reception level in the burst detection between a case in which received signals are combined together by baseband processing and a case in which received signals are combined together by RF band processing.

FIG. 39 shows a comparison of an improvement in the reception level in burst detection between a case in which received signals are synthesized together by baseband processing as is used in a general eigenbeam transfer and a case in which received signals are synthesized together by RF band processing.

In an eigenbeam transfer in baseband processing, an improvement in the reception level in burst detection undergoes a deterioration of about 12 dB in comparison with an ideal MIMO transfer. On the other hand, when the present invention is embodied by RF band processing, the deterioration is about 2 dB worse than such an ideal MIMO transfer. This 2 dB deterioration results from the fact that complex weight processing is performed by the use of phase shifters. As described above, in the method or device for realizing an eigenbeam transfer through conventional baseband processing, a large MIMO gain can be obtained in an area in which burst detection can be performed, and accordingly, a high-speed transfer can be performed by use of, for example, multi-valued QAM. However, the communication area itself is limited to an area in which burst detection can be performed, and therefore, the improvement amount in the communication area becomes smaller by about 12 dB than the MIMO gain. On the other hand, when the present invention is embodied by RF band processing, the improvement amount in the communication area is equal to the MIMO gain. In other words, according to the present invention, a great by the MIMO gain in the communications area can be achieved.

Although the embodiment has been described as above, the present invention is not limited to the above-mentioned embodiment, and can be modified variously. For example, the multiplier of the weight processing unit is not limited to 1-bit phase shifters, and may be a device that performs a weighting operation when diversity combining is performed, and therefore, for example, a phase shifter of 2-bit or more can be used. If the 2-bit phase shifters are used, phase shifting or a complex weight with respect to a signal of each antenna can be given while being changed in a four-fold manner by use of diversity combining weight information "00", "01", "10" and "11", and therefore more detailed diversity control can be performed.

Additionally, the training signal is used to measure reception level information, and any type of training signal can be used as long as the training signal can be used to measure reception level information obtained when diversity reception is performed. For example, only a preamble in a header of a data frame or a plurality of symbols contained in an extended preamble can be used as the training signal, and these signals are not necessarily required to be specially prepared for training. However, the situation of a transmission line is regarded as being substantially constant during training procedure, and therefore it is preferable to set its time length at a shorter length.

If a plurality of symbols are used as the training signal, the value optimum of diversity combining weight information with respect to a signal of each antenna can be determined by (the number of antennas of the own wireless communication device+1) symbols at the shortest. Additionally, reception level information can be obtained at a stage when a RF training signal is allowed to undergo frequency conversion into an IF signal.

Figure 40:
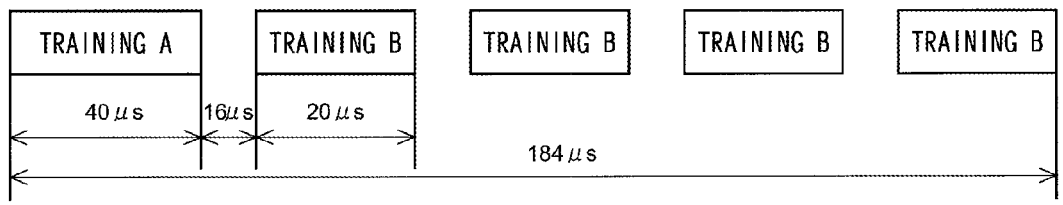
FIG. 40 is a view showing a training sequence for antenna selection of IEEE802.11n.
Figure 41:
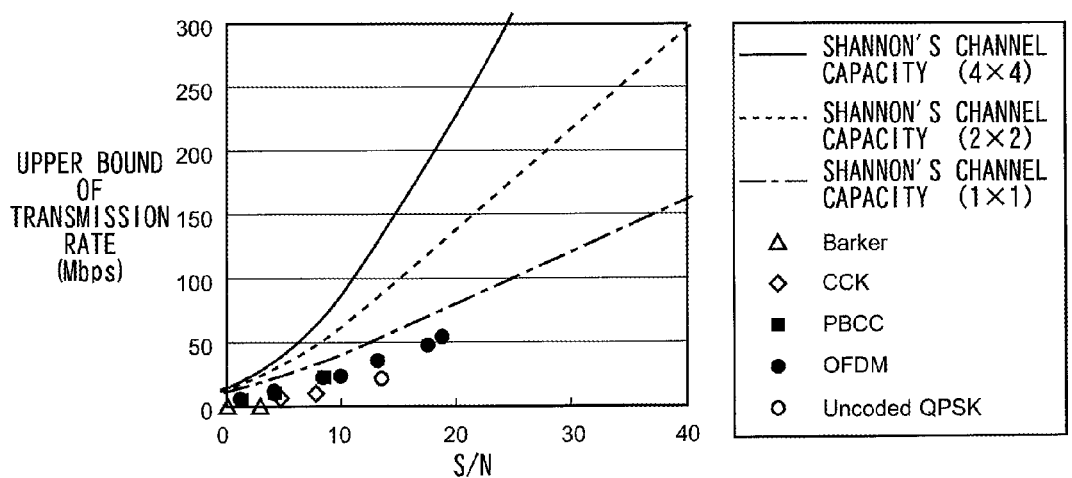
FIG. 41 is a view showing the enhancement of communication capacity using MIMO transmission.
Figure 42:
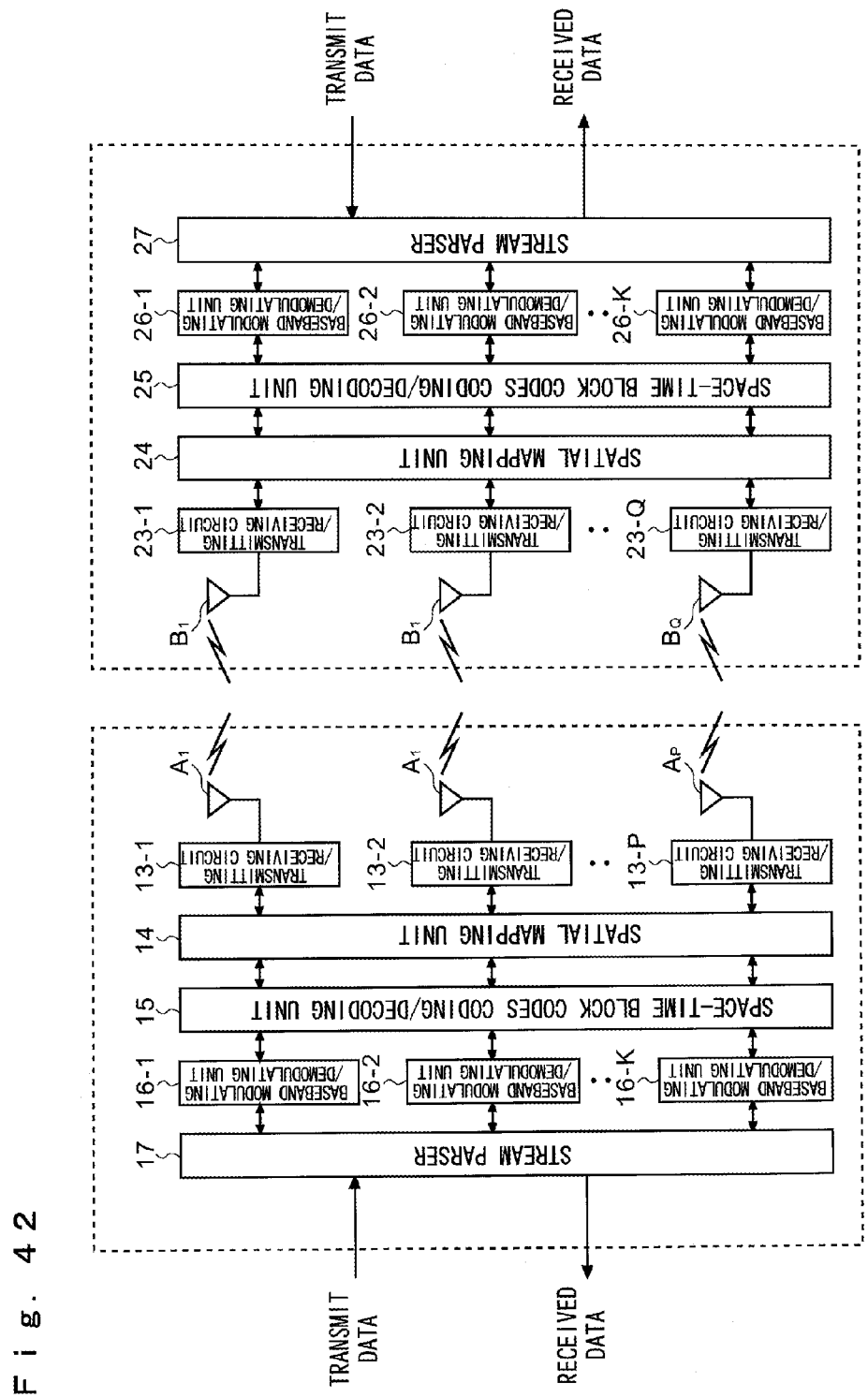
FIG. 42 is a block diagram showing a structure of the wireless communication system according to conventional MIMO technology.
Figure 43:
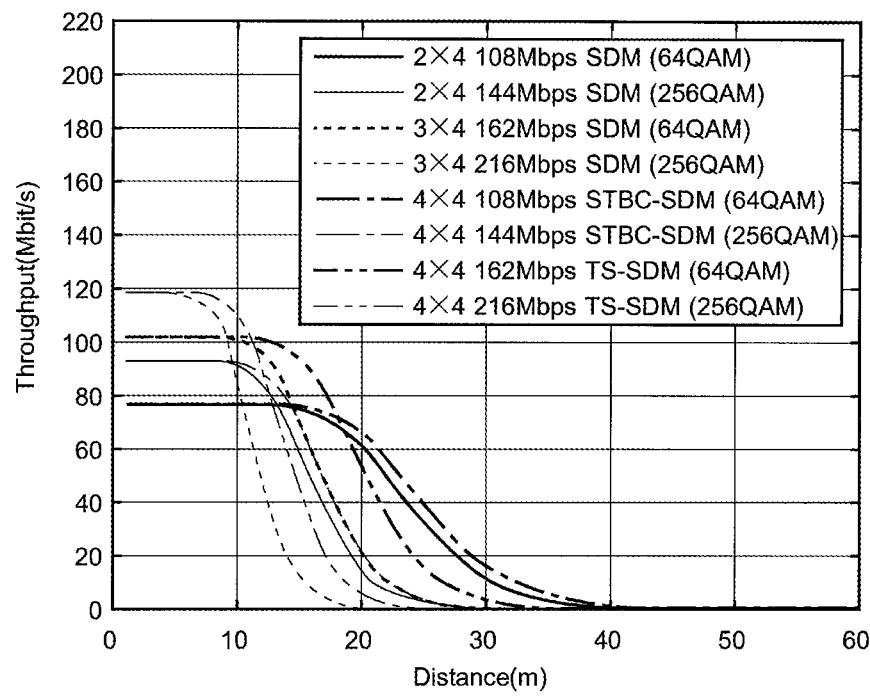
FIG. 43 is a view showing a relationship between wireless-base-station-to-wireless-terminal distance and throughput in the IEEE802.11n system.
Figure 44:
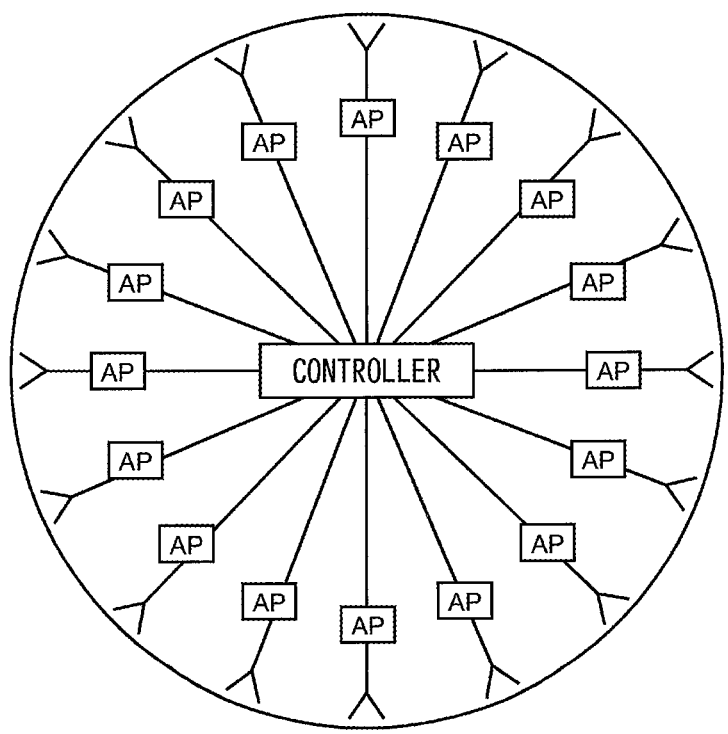
FIG. 44 is a block diagram showing a structure of the wireless base station according to conventional technology.
Figure 45:
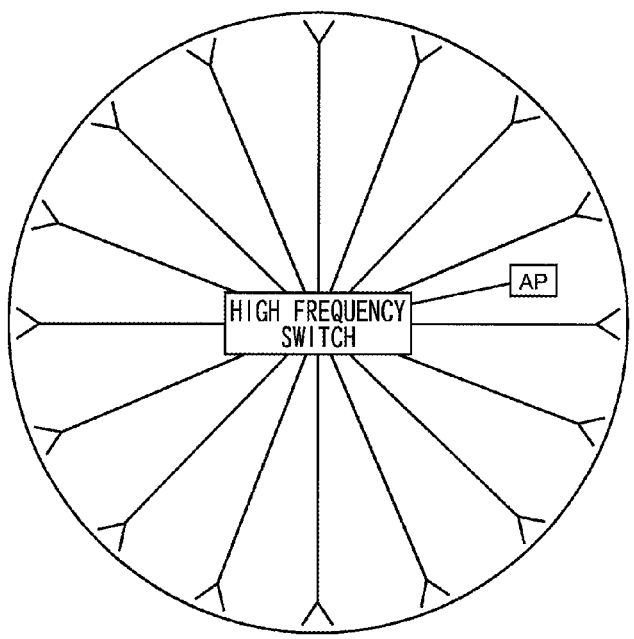
FIG. 45 is a block diagram showing another structure of the wireless base station according to conventional technology.
Figure 46:
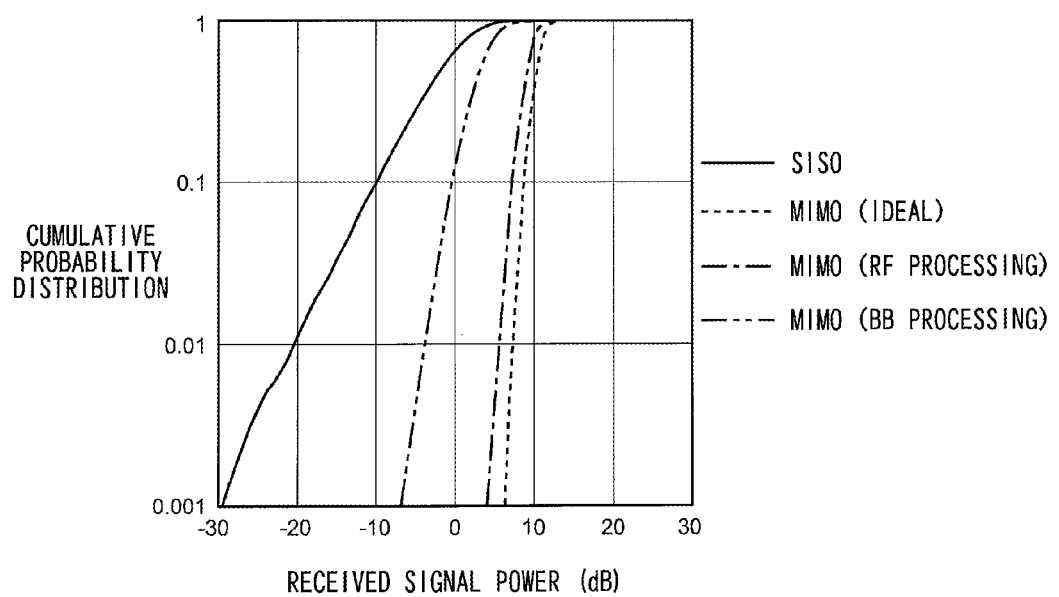
FIG. 46 is a view showing a comparison of the reception level distribution at the initial acquisition stage in a conventional MIMO technology and the present invention.

FIG. 40 shows a training sequence for antenna selection of IEEE802.11n. The time length of this training sequence is 184 µs. The multi-path fading frequency is 100 Hz at most during a high-speed movement, and the situation of the transmission line can be regarded as being substantially constant during a period of 184 us, and therefore this training sequence can be used in the training of the present invention. Of course, the present invention is not limited to this.

Additionally, M frames with respect to M antennas are not required to be placed in a single training sequence. For example, if the number of receiving antennas is four, process steps can be carried out such that two antennas are optimized in one training sequence, and another antenna is optimized in a subsequent training sequence, and the remaining antenna is optimized in a still subsequent training sequence.

Additionally, if an ACK frame with respect to each frame of a training signal is returned from an opposite wireless communication device disposed on an opposite side of a communication link, training count information can also be obtained by detecting the ACK frame.

The present invention can be used in, for example, vehicle-vehicle communication or vehicle-pedestrian communication. However, without being limited to this, the present invention can be applied to other uses, such as a portable terminal for wireless communication. Additionally, the present invention is not necessarily limited to mobile communication as its applicability, and can be applied to an arbitrary wireless communication system of the autonomous distributed type that employs a multiple access scheme.

REFERENCE SIGNAL LIST 11-1~11-P, 21-1~21-Q . . . weight processing unit, 12-1~12-P,22-1~22-Q . . . RF signal distributing/synthesizing unit, 13-1~13-P,23-1~23-Q . . . transmitting/receiving circuit, 14, 24, 105 . . . spatial mapping unit, 15, 25 . . . space-time block codes coding/decoding unit, 16-1~16-K, 26-1~26-k . . . baseband modulating/demodulating unit, 17, 27, 111 . . . stream parser, 18-1~18-P . . . duplexer, 19 . . . MIMO transmitter-receiver, 30 . . . beam forming state weight generating unit, 40 . . . training signal generating unit, 50, 82 . . . reception level holding unit, 51 . . . reception level information comparing unit, 52 . . . training period maximum reception level holding unit, 60 . . . phase shifter controller, 61 . . . non-beam forming state weight generating unit, 62 . . . beam forming state weight generating unit, 63 . . . weight selecting unit, 70 . . . timeliness unit, 71 . . . frame bundle reception detecting unit, 72 . . . end-of-frame detecting unit, 73 . . . sequence end detecting unit, 74 . . . training counter, 75 . . . beam forming valid flag generating unit, 80 . . . training receipt information holding unit, 81 . . . baseband received IQ signal holding unit, 84 . . . optimum weight determining unit, 85 . . . optimum weight updating signal unit, 101 . . . signal compound unit, 102 . . . stream disperse unit, 103-1~103-k . . . baseband Modulation unit, 104 . . . space-time code coding unit, 106-1~106-P . . . wireless transmitting unit, 107-1~107-P . . . wireless receiving unit, 108 . . . spatial demapping unit, 109 . . . space-time code decoding unit, 110-1~110-k . . . baseband demodulating unit, 112 . . . channel estimating unit, 113 . . . transmit and receive controller, A, B . . . wireless communication device, A', B' . . . MIMO (or SISO)transmitter-receiver, A11~APM, B11~BQN . . . antenna

The invention claimed is:

1. A multi-antenna wireless communication method in which wireless communication is performed with MIMO (Multiple Input Multiple Output) or SIMO (Single Input Multiple Output) technology using a plurality of radios in transmitting side or in receiving side or both and in which an antenna group comprising multiple antennas is used at every transmitting/receiving circuit and each antenna group performs wireless communication with MIMO technology, the multi-antenna wireless communication method comprising:

a first step of determining diversity combining information with respect to each signal of the antennas of each antenna group that optimizes a diversity reception state at each antenna group as a value optimum in each wireless communication device through two-way training signal transfer between the wireless communication devices that perform transmission and reception;

a second step of setting the value optimum of each diversity combining information with respect to each signal of the antennas of each antenna group determined by the first step for each wireless communication device; and a third step of enabling each wireless communication device to perform beam forming and diversity combining for a time of data transmission/reception at each antenna group in a state in which the value optimum of each diversity combining information has been set by the second step; wherein, in the first step, in each diversity reception in one or a plurality of times two-way training signal transfer, diversity combining information that optimizes a diversity reception state at each antenna group is obtained based on training reception information showing a receiving state of a diversity-combining received signal at each antenna group, thereafter diversity combining information is updated by the resulting diversity combining information after diversity reception, thereafter the diversity combining information updated thereby is set, and a training signal is transmitted, thereby determining a set of vectors asymptotically approaching to a set of eigenvectors with respect to a maximum eigenvalue of a correlation matrix of a channel matrix in a transfer between antenna groups of a couple of wireless communication devices that perform transmission and reception as the value optimum of diversity combining information between antenna groups of the couple of wireless communication devices.

2. A multi-antenna wireless communication device used to perform the multi-antenna wireless communication method of claim 1, the multi-antenna wireless communication device comprising:

a diversity combining information generating unit for generating diversity combining information with respect to each signal of the antennas of each antenna group;

a diversity combining information setting unit that controls an amplitude and a phase of each signal of the antennas of each antenna group based on the diversity combining information generated by the diversity combining information generating unit; and a signal distributing/synthesizing unit that performs beam forming transmission and diversity reception at each antenna group in combination with the diversity combining information setting unit; wherein the diversity combining information generating unit comprises:

a for-initial-acquisition diversity combining information generating unit for generating diversity combining information for initial acquisition with respect to each signal of the antenna of each antenna group and enabling drawing from an initial state to a value optimum of diversity combining information;

a for-training diversity combining information generating unit for sequentially changing and generating diversity combining information with respect to each signal of the antennas of each antenna group during diversity reception in two-way training signal transfer between an opposite wireless communication device disposed on an opposite side of a communication link and a wireless communication device corresponding to this opposite wireless communication device; and a diversity combining information value optimum generating unit for determining diversity combining information that optimizes a receiving state of a diversity-combining received signal based on training reception information showing a receiving state of a training signal received in a diversity reception manner in a state in which each of diversity combining information generated by the training diversity combining information generating unit has been set and for generating a value optimum of diversity combining information used for beam forming and diversity combining for a time of data transmission/reception; wherein, in each diversity reception in one or a plurality of times two-way training signal transfer, diversity combining information that optimizes a diversity reception state is obtained based on training reception information showing a receiving state of a training signal received in a diversity reception manner in a state in which each diversity combining information generated by the diversity combining information generating unit has been set, thereafter diversity combining information is updated by the diversity combining information after diversity reception, thereafter the diversity combining information updated thereby is set, and a training signal is transmitted, thereby determining a set of vectors asymptotically approaching to a set of eigenvectors with respect to a maximum eigenvalue of a correlation matrix of a channel matrix in a transfer between antenna groups of a couple of wireless communication devices that perform transmission and reception as the value optimum of diversity combining information between antenna groups of the couple of wireless communication devices.

3. The multi-antenna wireless communication device according to claim 2, wherein
the training reception information is baseband reception IQ information of a diversity-combining received signal or both the baseband reception IQ information and reception level information.

4. The multi-antenna wireless communication device according to claim 2, wherein
the training reception information is correlation information between a diversity combining received signal and a predetermined information sequence or both the correlation information and reception level information.

5. The multi-antenna wireless communication device according to claim 2, wherein
if a value optimum of the diversity combining information has been set through an immediately previous two-way training signal transfer, the diversity combining information value optimum generating unit newly generates a value optimum of diversity combining information while using this value optimum of the diversity combining information as an initial value, and, if a value optimum of the diversity combining information has not been set, the diversity combining information value optimum generating unit newly generates a value optimum of a diversity combining information while using a random initial value.

6. The multi-antenna wireless communication device disposed on a side of a terminal according to claim 2, wherein
a first training signal is transmitted in an immediately previous two-way training signal transfer to perform beam forming and diversity combining in data transmission/reception to/from the wireless communication device disposed on a side of a base station.

7. The multi-antenna wireless communication device according to claim 2, wherein, in transmission of broadcast frames or multicast frames from the wireless communication device disposed on the side of the base station that performs wireless communication with a plurality of wireless communication devices, a same frame is transmitted a plurality of times by using a plurality of pieces of diversity combining information that differ from each other.

8. The multi-antenna wireless communication device according to claim 2, wherein, in transmission of broadcast frames or multicast frames from the wireless communication device disposed on the side of the base station that performs wireless communication with a plurality of wireless communication devices, each of the broadcast frames or each of the multicast frames is transmitted to each of the plurality of wireless communication devices by use of a value optimum of the diversity combining information obtained through a two-way training signal transfer.

9. The multi-antenna wireless communication device according to claim 2, wherein, in the wireless communication device disposed on a base station that performs wireless communication with a plurality of wireless communication device, a diversity combining information value optimum storing unit is provided for storing a value optimum of the diversity combining information obtained through a two-way training signal transfer, for each wireless communication device disposed on the side of the terminal that performs wireless communication with the base station, and, before data transmission/reception to and from a terminal-side wireless communication device disposed on a side of a terminal, a value optimum of the diversity combining information with respect to this terminal-side wireless communication device, that is held by the diversity combining information value optimum storing unit, is set by the diversity combining information setting unit.

10. The multi-antenna wireless communication device according to claim 2, wherein
the diversity combining information setting unit and the signal distributing/synthesizing unit operate in an RF band, and multi-antenna beam forming transmission and multi-antenna diversity reception are performed by use of a single transmission/reception system.

11. A multi-antenna wireless communication method in which wireless communication is performed with MIMO (Multiple Input Multiple Output) or SIMO (Single Input Multiple Output) technology using a plurality of radios in transmitting side or in receiving side or both and in which an antenna group comprising multiple antennas is used at every transmitting/receiving circuit and each antenna group performs wireless communication with MIMO technology, the multi-antenna wireless communication method comprising:
a first step of determining diversity combining information with respect to each signal of the antennas of each antenna group that optimizes a diversity reception state at each antenna group as a value optimum in each wireless communication device through one or a plurality of times two-way training signal transfer between the wireless communication devices that perform transmission and reception;
a second step of setting the value optimum of each diversity combining information with respect to each signal of the antennas of each antenna group determined by the first step for each wireless communication device; and
a third step of enabling each wireless communication device to perform beam forming and diversity combining for a time of data transmission/reception at each antenna group in a state in which the value optimum of each diversity combining information has been set by the second step; wherein
the training signal is composed of a plurality of training sub-signals, and, in the first step, in diversity reception of the training sub-signals, one piece of diversity combining information with respect to each signal of the antennas of the antenna group of the wireless communication devices is sequentially changed, thereafter diversity combining information with respect to each signal of the antennas of the antenna group is updated by diversity combining information having a more excellent receiving state of a diversity-combining received signal before and after a sequential changing operation of the diversity combining information, thereafter the diversity combining information updated thereby is set, and a training signal is transmitted, thereby determining a set of vectors asymptotically approaching to a set of eigenvectors with respect to a maximum eigenvalue of a correlation matrix of a channel matrix in a transfer between antenna groups of a couple of wireless communication devices that perform transmission and reception as the value optimum of diversity combining information between antenna groups of the couple of wireless communication devices.

12. A multi-antenna wireless communication device used to perform the multi-antenna wireless communication method of claim 11, the multi-antenna wireless communication device comprising:
- a diversity combining information generating unit for generating diversity combining information with respect to each signal of the antennas of each antenna group;
- a diversity combining information setting unit that controls an amplitude and a phase of each signal of the antennas of each antenna group based on the diversity combining information generated by the diversity combining information generating unit; and
- a signal distributing/synthesizing unit that performs beam forming transmission and diversity reception at each antenna group in combination with the diversity combining information setting unit; wherein the diversity combining information generating unit comprises:
- a for-initial-acquisition diversity combining information generating unit for generating diversity combining information for initial acquisition with respect to each signal of the antenna of each antenna group and enabling drawing from an initial state to a value optimum of diversity combining information;
- a for-training diversity combining information generating unit for sequentially changing and generating diversity combining information with respect to each signal of the antennas of each antenna group during diversity reception in one or a plurality of times two-way training signal transfer between an opposite wireless communication device disposed on an opposite side of a communication link and a wireless communication device corresponding to this opposite wireless communication device;
- a reception-state determining unit that determines a diversity reception state in each setting based on training reception information showing a receiving state of a training signal received in a diversity reception manner in a state in which each piece of diversity combining information generated by the diversity combining information generating unit has been set; and
- a diversity combining information value optimum generating unit for determining diversity combining information that optimizes a diversity reception state determined by the reception-state determining unit as a value optimum of the diversity combining information and for generating a value optimum of diversity combining information used for beam forming and diversity combining at a time of data transmission/reception; wherein the training signal is composed of a plurality of training sub-signals, and, in diversity reception of the training sub-signals, one piece of diversity combining information with respect to each signal of the antennas of each antenna group of the wireless communication devices is sequentially changed, and thereafter diversity combining information with respect to each signal of the antennas of each antenna group is updated by diversity combining information having a more excellent receiving state of a diversity-combining received signal before and after a sequential changing operation of the diversity combining information, thereafter the diversity combining information updated thereby is set, and a training signal is transmitted, thereby determining a set of vectors asymptotically approaching to a set of eigenvectors with respect to a maximum eigenvalue of a correlation matrix of a channel matrix in a transfer between antenna groups of a couple of wireless communication devices that perform transmission and reception as the value optimum of diversity combining information between antenna groups of the couple of wireless communication devices.

13. The multi-antenna wireless communication device according to claim 12, wherein
the diversity combining information is 1-bit information, and the diversity combining information generating unit generates diversity combining information with respect to each signal of the antennas of each antenna group while sequentially subjecting the diversity combining information to phase inversion, and the reception-state determining unit makes a comparison between reception level information as the training reception information obtained before and after performing the phase inversion, and determines a diversity reception state at each antenna group from this comparison, and the diversity combining information value optimum generating unit generates a value optimum of the diversity combining information in the antennas of each antenna group based on the diversity reception state determined by the reception-state determining unit.

14. The multi-antenna wireless communication device according to claim 12, wherein
the reception-state determining unit determines a diversity reception state at each antenna group while using a diversity-combining received signal level or a gain of an AGC amplifier as an indicator.

15. A multi-antenna wireless communication method in which wireless communication is performed with MIMO (Multiple Input Multiple Output) or SIMO (Single Input Multiple Output) technology using a plurality of radios in transmitting side or in receiving side or both and in which an antenna group comprising multiple antennas is used at every transmitting/receiving circuit and each antenna group performs wireless communication with MIMO technology, the multi-antenna wireless communication method comprising:
- a first step of determining diversity combining information with respect to each signal of the antennas of each antenna group that optimizes a diversity reception state at each antenna group as a value optimum in each wireless communication device through one or a plurality of times two-way training signal transfer between the wireless communication devices that perform transmission and reception;
- a second step of setting the value optimum of each diversity combining information with respect to each signal of the antennas of each antenna group determined by the first step for each wireless communication device; and
- a third step of enabling each wireless communication device to perform beam forming and diversity combining for a time of data transmission/reception at each antenna group in a state in which the value optimum of each diversity combining information has been set by the second step; wherein the training signal is composed of a plurality of training sub-signals, and,
in the first step, in diversity reception of the plurality of training sub-signals, diversity combining information with respect to each signal of the antennas of the antenna group of the wireless communication devices is sequentially changed, thereafter diversity combining information that optimizes a receiving state of a diversity-combining received signal at each antenna group is determined based on training reception information showing a receiving state corresponding to each of the diversity combining information, thereafter diversity combining information with respect to each signal of the antennas of each antenna group is updated by the resulting diversity combining information after diversity reception, thereafter the diversity combining information updated thereby is set, and a training signal is transmitted, thereby determining a set of vectors asymptotically approaching to a set of eigenvectors with respect to a maximum eigenvalue of a correlation matrix of a channel matrix in a transfer between antenna groups of a couple of wireless communication devices that perform transmission and reception as the value optimum of diversity combining information between antenna groups of the couple of wireless communication devices.

16. A multi-antenna wireless communication device used to perform the multi-antenna wireless communication method of claim 15, the multi-antenna wireless communication device comprising:
a diversity combining information generating unit for generating diversity combining information with respect to each signal of the antennas of each antenna group;
a diversity combining information setting unit that controls an amplitude and a phase of each signal of the antennas of each antenna group based on the diversity combining information generated by the diversity combining information generating unit; and
a signal distributing/synthesizing unit that performs beam forming transmission and diversity reception at each antenna group in combination with the diversity combining information setting unit; wherein
the diversity combining information generating unit comprises:
a for-initial-acquisition diversity combining information generating unit for generating diversity combining information for initial acquisition with respect to each signal of the antenna of each antenna group and enabling drawing from an initial state to a value optimum of diversity combining information;
a for-training diversity combining information generating unit for sequentially changing and generating diversity combining information with respect to each signal of the antennas of each antenna group during diversity reception in one or a plurality of times two-way training signal transfer between an opposite wireless communication device disposed on an opposite side of a communication link and a wireless communication device corresponding to this opposite wireless communication device;
a training receiving state holding unit that holds training reception information showing a receiving state of a training signal received in a diversity reception manner in a state in which diversity combining information generated by the diversity combining information generating unit has been set; and
a diversity combining information value optimum generating unit for determining diversity combining information that optimizes a diversity reception state based on the training reception information held by the training receiving state holding unit as a value optimum of the diversity combining information and for generating a value optimum of diversity combining information used for beam forming and diversity combining at a time of data transmission/reception; wherein
the training signal is composed of a plurality of training sub-signals, and, in diversity reception of the training sub-signals, diversity combining information with respect to each signal of the antennas of each antenna group of the wireless communication devices is sequentially changed, thereafter training reception information corresponding to each piece of diversity combining information is stored in the training reception information holding unit, thereafter diversity combining information that optimizes a receiving state of a diversity-combining received signal is determined based on information held in the training reception information holding unit, thereafter diversity combining information is updated by the diversity combining information, thereafter the diversity combining information updated thereby is set, and a training signal is transmitted, thereby determining a set of vectors asymptotically approaching to a set of eigenvectors with respect to a maximum eigenvalue of a correlation matrix of a channel matrix in a transfer between antenna groups of a couple of wireless communication devices that perform transmission and reception as the value optimum of diversity combining information between antenna groups of the couple of wireless communication devices.

17. The multi-antenna wireless communication device according to claim 16, wherein
the diversity combining information is n-bit information (n is a natural number of 2 or greater), and the diversity combining information generating unit generates diversity combining information with respect to each signal of the antennas of each antenna group while sequentially subjecting the diversity combining information to phase inversion, and the training receiving state holding unit holds baseband reception IQ information or both the baseband reception IQ information and reception level information as the training reception information showing receiving state obtained before and after performing the phase inversion, and the diversity combining information value optimum generating unit generates a value optimum of the diversity combining information in the antennas of each antenna group based on the training reception information held by the training receiving state holding unit.

18. The multi-antenna wireless communication device according to claim 16, wherein
the training signal contains a plurality of frames or symbols as the training sub-signals, and
the diversity combining information value optimum generating unit determines a diversity reception state while using an amplitude of a baseband IQ signal or an IF signal of each frame or each symbol at each antenna group as an indicator.

19. A multi-antenna wireless communication method in which wireless communication is performed with MIMO (Multiple Input Multiple Output) or SIMO (Single Input Multiple Output) technology using a plurality of radios in transmitting side or in receiving side or both and in which an antenna group comprising multiple antennas is used at every transmitting/receiving circuit and each antenna group performs wireless communication with MIMO technology, the multi-antenna wireless communication method comprising:
a first step of determining diversity combining information with respect to each signal of the antennas of each antenna group that optimizes a diversity reception state at each antenna group as a value optimum in each wireless communication device through one or a plurality of times two-way training signal transfer between the wireless communication devices that perform transmission and reception;
a second step of setting the value optimum of each diversity combining information with respect to each signal of the antennas of each antenna group determined by the first step for each wireless communication device; and a third step of enabling each wireless communication device to perform beam forming and diversity combining for a time of data transmission/reception at each antenna group in a state in which the value optimum of each diversity combining information has been set by the second step; wherein the training signal is composed of a plurality of training sub-signals, and, in the first step, in diversity reception of the plurality of training sub-signals, diversity combining information with respect to each signal of the antennas of the antenna group of the wireless communication devices is sequentially changed, thereafter diversity combining complex weight information that optimizes a receiving state of a diversity-combining received signal at each antenna group is determined based on training reception information showing a receiving state corresponding to each of the diversity combining information, thereafter diversity combining information with respect to each signal of the antennas of each antenna group is updated by the resulting diversity combining complex weight information after diversity reception, thereafter the diversity combining information updated thereby is set, and a training signal is transmitted, thereby determining a set of vectors asymptotically approaching to a set of eigenvectors with respect to a maximum eigenvalue of a correlation matrix of a channel matrix in a transfer between antenna groups of a couple of wireless communication devices that perform transmission and reception as the value optimum of diversity combining information between antenna groups of the couple of wireless communication devices.

20. A multi-antenna wireless communication device used to perform the multi-antenna wireless communication method of claim 19, the multi-antenna wireless communication device comprising:

a diversity combining information generating unit for generating diversity combining information with respect to each signal of the antennas of each antenna group;

a diversity combining information setting unit that controls an amplitude and a phase of each signal of the antennas of each antenna group based on the diversity combining information generated by the diversity combining information generating unit; and a signal distributing/synthesizing unit that performs beam forming transmission and diversity reception at each antenna group in combination with the diversity combining information setting unit; wherein the diversity combining information generating unit comprises:

a for-initial-acquisition diversity combining information generating unit for generating diversity combining information for initial acquisition with respect to each signal of the antenna of each antenna group and enabling drawing from an initial state to a value optimum of diversity combining information;

a for-training diversity combining information generating unit for sequentially changing and generating diversity combining information with respect to each signal of the antennas of each antenna group during diversity reception in one or a plurality of times two-way training signal transfer between an opposite wireless communication device disposed on an opposite side of a communication link and a wireless communication device corresponding to this opposite wireless communication device;

a training reception information holding unit for holding training reception information showing a receiving state of a training signal received in a diversity reception manner in a state in which each piece of diversity combining information generated by the diversity combining information generating unit has been set; and a diversity combining information value optimum generating unit for determining diversity combining complex weight information that optimizes a receiving state of a diversity-combining received signal at each antenna group based on training reception information held by the training reception information holding unit as a value optimum of diversity combining information and for generating a value optimum of diversity combining information used for beam forming and diversity combining at each antenna group for a time of data transmission/reception; wherein the training signal is composed of a plurality of training sub-signals, in each diversity reception in a plurality of times two-way training signal transfer, diversity combining information with respect to each signal of the antennas of each antenna group of the wireless communication devices are sequentially changed, thereafter training reception information corresponding to each diversity combining information is stored in the training reception information holding unit, thereafter diversity combining complex weight information that optimizes a receiving state of a diversity-combining received signal is determined based on information held by the training reception information holding unit, thereafter diversity combining information is updated by diversity combining complex weight information after each diversity reception, thereafter the diversity combining information updated thereby is set, and a training signal is transmitted, thereby determining a set of vectors asymptotically approaching to a set of eigenvectors with respect to a maximum eigenvalue of a correlation matrix of a channel matrix in a transfer between antenna groups of a couple of wireless communication devices that perform transmission and reception as the value optimum of diversity combining information between antenna groups of the couple of wireless communication devices.

* * * * *